US010047234B2

(12) United States Patent
Ohori et al.

(10) Patent No.: US 10,047,234 B2
(45) Date of Patent: Aug. 14, 2018

(54) INK SET

(71) Applicant: Seiko Epson Corporation, Tokyo (JP)

(72) Inventors: Hiromi Ohori, Shiojiri (JP); Ryosuke Teramoto, Matsumoto (JP); Yuho Miyake, Shiojiri (JP); Miharu Kanaya, Azumino (JP); Hiroko Hayashi, Shiojiri (JP); Daisuke Ishihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 382 days.

(21) Appl. No.: 14/807,474

(22) Filed: Jul. 23, 2015

(65) Prior Publication Data

US 2016/0032125 A1 Feb. 4, 2016

(30) Foreign Application Priority Data

Jul. 24, 2014 (JP) ................................ 2014-150360
Jun. 23, 2015 (JP) ................................ 2015-125231

(51) Int. Cl.
*C09D 11/328* (2014.01)
*C09D 11/40* (2014.01)
*C09D 11/00* (2014.01)

(52) U.S. Cl.
CPC ............ *C09D 11/328* (2013.01); *C09D 11/00* (2013.01); *C09D 11/40* (2013.01)

(58) Field of Classification Search
CPC .............................. C09D 11/328; C09D 11/40
USPC ........... 106/31.48, 31.5, 31.47, 31.49, 31.52, 106/31.58, 31.59
See application file for complete search history.

(56) References Cited

U.S. PATENT DOCUMENTS

| | | | | |
|---|---|---|---|---|
| 6,482,256 B1 * | 11/2002 | Kanaya | C09D 11/40 | 106/31.47 |
| 8,790,458 B2 * | 7/2014 | Aruga | C09D 11/40 | 106/31.48 |
| 9,587,129 B2 * | 3/2017 | Miyake | C09D 11/328 | |
| 9,676,951 B2 * | 6/2017 | Miyake | C09D 11/328 | |
| 2004/0129172 A1 | 7/2004 | Harada et al. | | |
| 2005/0054751 A1 * | 3/2005 | Namba | C09D 11/40 | 523/160 |
| 2005/0115458 A1 | 6/2005 | Oki et al. | | |
| 2009/0000511 A1 | 1/2009 | Kitamura et al. | | |
| 2012/0213930 A1 | 8/2012 | Teramoto et al. | | |
| 2013/0300799 A1 | 11/2013 | Mizutani et al. | | |
| 2014/0345494 A1 * | 11/2014 | Miyake | C09D 11/328 | 106/31.48 |
| 2016/0122565 A1 * | 5/2016 | Teramoto | C09D 11/328 | 106/31.48 |
| 2016/0130454 A1 * | 5/2016 | Ohori | C09D 11/328 | 106/31.49 |
| 2016/0257832 A1 * | 9/2016 | Teramoto | C09D 11/328 | |

FOREIGN PATENT DOCUMENTS

| | | |
|---|---|---|
| CN | 103419489 A | 12/2013 |
| JP | 2004-083903 A | 3/2004 |
| JP | 2005-105135 A | 4/2005 |
| JP | 2008-081693 A | 4/2008 |
| JP | 2012-172031 A | 9/2012 |

OTHER PUBLICATIONS

OLFINE E1010 Material Safety Data Sheet, Jul. 2006; 5 pages.*
SURFYNOL 104 Product Summary, Air Products & Chemicals, 2010, no month available; 3 pages.*
SURFYNOL 465 Material Safety Data Sheet, Nov. 2005; 6 pages.*
Direct Yellow 86 formula structure from Chemical Abstracts, Nov. 1984; 2 pages.*

* cited by examiner

*Primary Examiner* — Helene Klemanski
(74) *Attorney, Agent, or Firm* — Nutter McClennen & Fish LLP; John J. Penny, Jr.; Alex Nagorniy

(57) ABSTRACT

There is provided an ink set including at least: a yellow ink; a magenta ink; and a cyan ink, in which the yellow ink includes one or more kinds selected from a group consisting of coloring materials represented by the following Formulae (Y-1) and (Y-2), the magenta ink includes one or more kinds selected from a group consisting of coloring materials represented by the following Formulae (M-1) and (M-2), and the cyan ink includes one or more kinds selected from a group consisting of coloring materials represented by the following Formulae (C-1) and (C-2).

13 Claims, No Drawings

INK SET

BACKGROUND

1. Technical Field

The present invention relates to an ink set.

2. Related Art

An ink jet recording method has been rapidly developed in various fields because a high-definition image can be recorded using a relatively simple device. In this situation, ejection stability or the like has been researched in various studies. For example, JP-A-2008-81693 discloses an ink set including a yellow ink, a magenta ink, and a cyan ink that respectively contain a predetermined colorant and an object of the disclosure is to provide an ink set capable of recording an image with excellent ozone resistance, light resistance, and moisture resistance on a recording medium.

An ink set is used by filling various ink containers such as a cartridge, a pack, and a large-capacity tank. In this manner, with the expansion of application of an ink, an ink set which has high reliability (initial filling properties and continuous printing stability) in addition to ozone resistance, light resistance, and moisture resistance described above and bleed resistance has been demanded.

SUMMARY

An advantage of some aspects of the invention is to provide an ink set which has excellent bleed resistance, initial filling properties, and continuous printing properties in addition to ozone resistance, light resistance, and moisture resistance.

The present inventors intensively conducted research in order to solve the above-described problems. As a result, the present inventors found that the above-described problems can be solved by using an ink set which includes an ink containing a predetermined coloring material, thereby completing the present invention.

That is, an aspect of the invention is as follows.

An ink set includes at least: a yellow ink; a magenta ink; and a cyan ink, in which the yellow ink includes one or more kinds selected from a group consisting of coloring materials represented by the following Formulae (Y-1) and (Y-2), the magenta ink includes one or more kinds selected from a group consisting of coloring materials represented by the following Formulae (M-1) and (M-2), and the cyan ink includes one or more kinds selected from a group consisting of coloring materials represented by the following Formulae (C-1) and (C-2).

(Y-1)

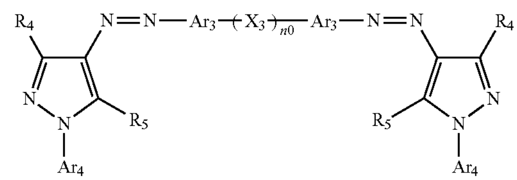

(in Formula (Y-1), $R_4$ represents a substituent; $R_5$ represents —$OR_6$ or —$NHR_7$; $R_6$ and $R_7$ each represent a hydrogen atom or a substituent; $X_3$ represents a divalent linking group; n0 represents 0 or 1; $Ar_3$ represents a divalent heterocyclic group; and $Ar_4$ represents an alkyl group, an aryl group, or a triazine group), (Y-2)

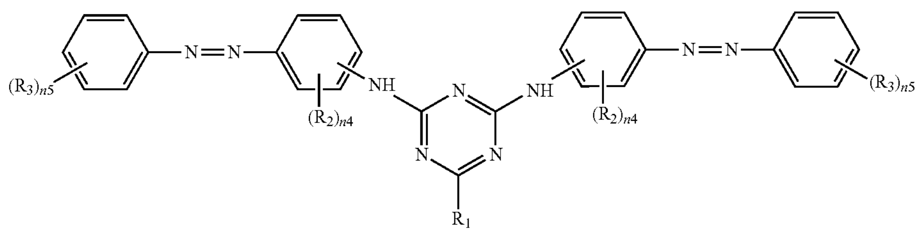

(in Formula (Y-2), $R_1$ represents a hydrogen atom or a substituent; $R_2$ represents a substituent; $R_3$ represents an ionic hydrophilic group or an alkyl group which may form a ring; n4 represents 0 to 4; and n5 represents 2 to 5), (M-1)

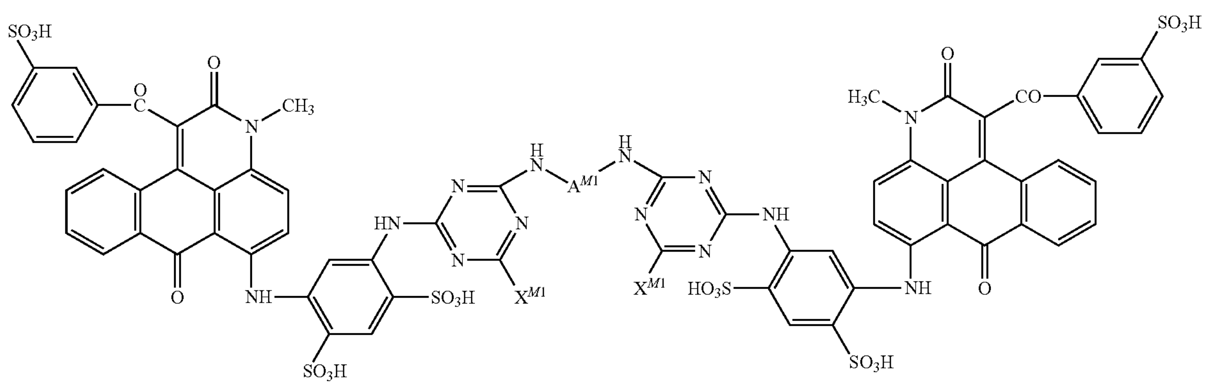

(in Formula (M-1), $A^{M1}$ represents an alkylene group having 1 or 2 carbon atoms, an alkylene group which contains a phenylene group and has 1 or 2 carbon atoms, or a group represented by the following Formula (M-1-1); and $X^{M1}$ represents an amino group, a hydroxy group, a chlorine atom, or a phenoxy group substituted with a sulfo group or a carboxy group), (M-1-1)

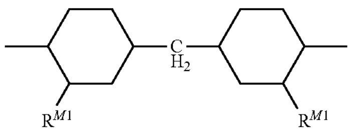

(in Formula (M-1-1), $R^{M1}$ represents a hydrogen atom or an alkyl group), (M-2)

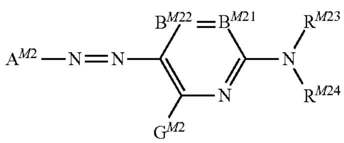

(in Formula (M-2), $A^{M2}$ represents a 5-membered heterocyclic group; $B^{M21}$ and $B^{M22}$ each represents —$CR^{M21}$= or —$CR^{M22}$=, or one of $B^{M21}$ and $B^{M22}$ represents a nitrogen atom and the other represents —$CR^{M21}$= or —$CR^{M22}$=; $R^{M23}$ and $R^{M24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group and $R^{M23}$ and $R^{M24}$ may further include a substituent; $G^{M2}$, $R^{M21}$, and $R^{M22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group, or a heterocyclic group, an acylamino group, an ureido group, a sulfamoylamino group, an alkoxycarbonylamino group, an aryloxycarbonylamino group, an alkyl and arylsulfonylamino group, an aryloxycarbonylamino group, a nitro group, an alkyl and arylthio group, an alkyl and arylsulfonyl group, an alkyl and arylsulfinyl group, a sulfamoyl group, a sulfo group, or a heterocyclic thio group and $G^{M2}$, $R^{M21}$, and $R^{M22}$ may be further substituted; and $R^{M21}$ and $R^{M23}$ or $R^{M23}$ and $R^{M24}$ may be bonded to each other to form a 5- or 6-membered ring), (C-1)

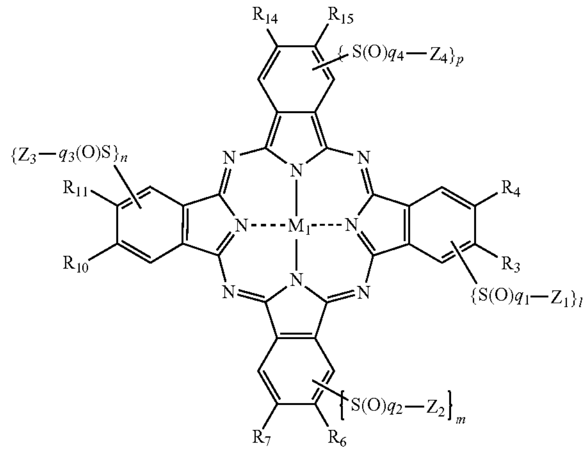

(in Formula (C-1), $R_2$, $R_3$, $R_6$, $R_7$, $R_{10}$, $R_{11}$, $R_{14}$ and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further include a substituent. $Z_1$, $Z_2$, $Z_3$, and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. In this case, at least one of $Z_1$, $Z_2$, $Z_3$, and $Z_4$ includes an ionic hydrophilic group as a substituent. 1, m, n, p, $q_1$, $q_2$, $q_3$, and $q_4$ each independently represent 1 or 2. $M_1$ represents a hydrogen atom, a metal atom, a metal oxide, a metal hydroxide, or a metal halide), (C-2)

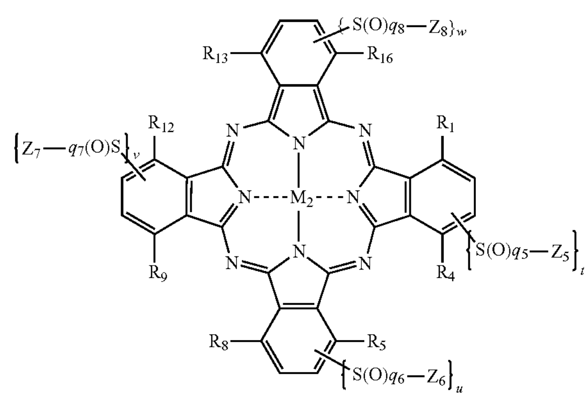

(in Formula (C-2), $R_1$, $R_4$, $R_5$, $R_8$, $R_9$, $R_{12}$, $R_{13}$, and $R_{16}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further include a substituent. $Z_5$, $Z_6$, $Z_7$, and $Z_8$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic ring. In this case, at least one of $Z_5$, $Z_6$, $Z_7$, and $Z_8$ includes an ionic hydrophilic group as a substituent. t, u, v, w, $q_5$, $q_6$, $q_7$, and $q_8$ each independently represent 1 or 2. $M_2$ represents a hydrogen atom, a metal atom, a metal oxide, a metal hydroxide, or a metal halide).

[2] The ink set according to [1], in which the yellow ink, the magenta ink, or the cyan ink contains an alkylene oxide adduct of acetylene glycol whose main chain has 12 or more carbon atoms and acetylene glycol whose main chain has 10 or more carbon atoms.

[3] The ink set according to [1] or [2], in which the yellow ink, the magenta ink, or the cyan ink contains polyoxy alkylene alkyl ether.

[4] The ink set according to any one of [1] to [3], in which the content of the alkylene oxide adduct of acetylene glycol whose main chain has 12 or more carbon atoms, which is contained in the yellow ink, is larger than the content of the alkylene oxide adduct of acetylene glycol whose main chain has 12 or more carbon atoms, which is contained in the magenta ink or the cyan ink.

[5] The ink set according to any one of [1] to [4], in which the content of the alkylene oxide adduct of acetylene glycol whose main chain has 12 or more carbon atoms, which is included in the yellow ink, the magenta ink, or the cyan ink is in a range of 0.1% by mass to 1% by mass.

[6] The ink set according to any one of [1] to [5], in which the content of the polyoxy alkylene alkyl ether which is contained in the yellow ink, the magenta ink, or the cyan ink is in a range of 0.1% by mass to 0.3% by mass.

[7] The ink set according to any one of [1] to [6], in which the magenta ink contains a coloring material represented by the following Formulae (M-1) and (M-2).

[8] The ink set according to any one of [1] to [7], in which the cyan ink contains a coloring material represented by the following Formulae (C-1) and (C-2).

[9] The ink set according to any one of [1] to [8], in which the yellow ink contains a coloring material represented by the following Formulae (Y-1) and (Y-2).

[10] The ink set according to any one of [1] to [9], further includes at least one of a dye black ink and a pigment black ink.

[11] The ink set according to any one of [1] to [10], in which the dye black ink contains an azo compound represented by the following Formula (Bk-1) or a salt thereof and at least one kind selected from a group consisting of coloring materials represented by the following Formula (Bw-1), (Bk-1)

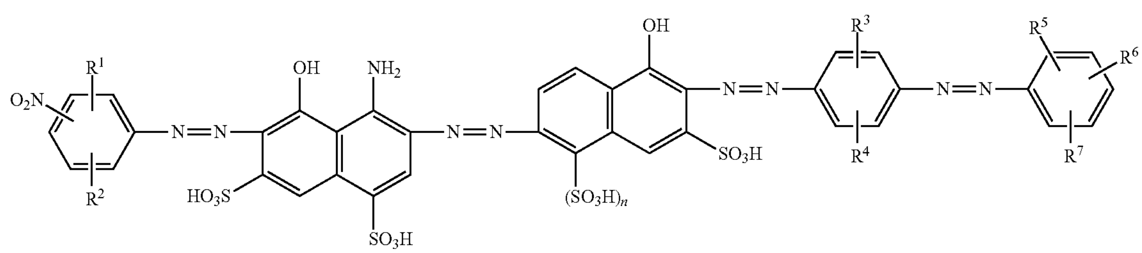

(in Formula (Bk-1), $R^1$, $R^2$, $R^5$, $R^6$, and $R^7$ each independently represent a hydrogen atom, a halogen atom, a cyano group, a hydroxyl group, a carboxyl group, a sulfo group, a sulfamoyl group, a N-alkylaminosulfonyl group, a N-phenylaminosulfonyl group, an alkylsulfonyl group which may be substituted with a hydroxyl group and has 1 to 4 carbon atoms, a phospho group, a nitro group, an acyl group, an ureido group, an alkyl group (which may be substituted with a hydroxyl group or an alkoxy group having 1 to 4 carbon atoms) having 1 to 4 carbon atoms, an alkoxy group (an alkyl group may be substituted with a hydroxyl group, an alkoxy group having 1 to 4 carbon atoms, a sulfo group, or a carboxyl group) having 1 to 4 carbon atoms, an acylamino group, an alkylsulfonylamino group, or a phenylsulfonylamino group (a phenyl group may be substituted with a halogen atom, an alkyl group, or a nitro group); $R^3$ and $R^4$ each independently represent a hydrogen atom, a halogen atom, a cyano group, a carboxyl group, a sulfo group, a nitro group, an alkyl group (which may be substituted with a hydroxyl group or an alkoxy group having 1 to 4 carbon atoms) having 1 to 4 carbon atoms, an alkoxy group having 1 to 4 carbon atoms (an alkyl group may be substituted with a hydroxyl group, an alkoxy group having 1 to 4 carbon atoms, a sulfo group, or a carboxyl group), an acylamino group, an alkylsulfonylamino group, or a phenylsulfonylamino group (a phenyl group may be substituted with a halogen atom, an alkyl group, or a nitro group); and n represents 0 or 1), (Bw-1)

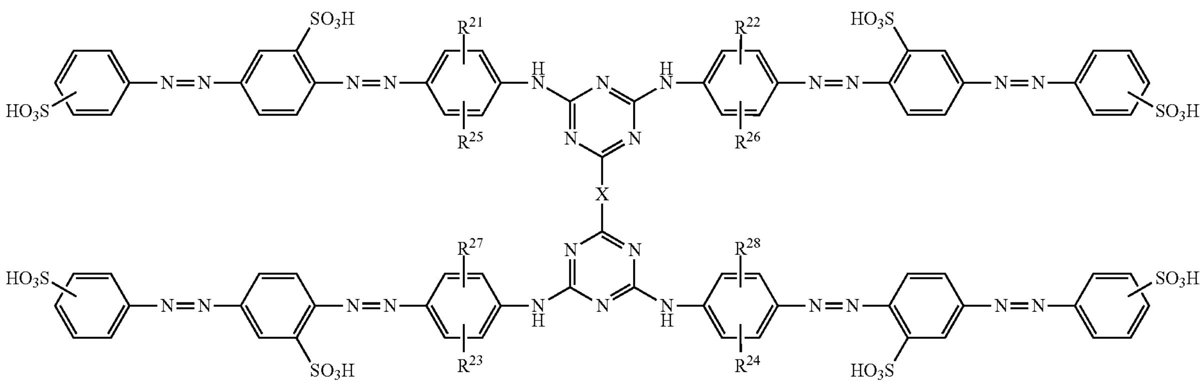

(in Formula (Bw-1), $R^{21}$, $R^{22}$, $R^{23}$, $R^{24}$, $R^{25}$, $R^{26}$, $R^{27}$, and $R^{28}$ each independently represent a hydrogen atom, a halogen atom, a sulfo group, a carboxy group, a sulfamoyl group, a carbamoyl group, an alkyl group having 1 to 4 carbon atoms, an alkoxy group having 1 to 4 carbon atoms, an alkoxy group which is substituted with at least one kind selected from a group consisting of a hydroxy group, an alkoxy group having 1 to 4 carbon atoms, an alkoxy group having 1 to 4 hydroxy-carbon atoms, a sulfo group, and a carboxy group as substituents and has 1 to 4 carbon atoms, an alkylcarbonylamino group having 1 to 4 carbon atom, an alkylcarbonylamino group which is substituted with a carboxy group and has 1 to 4 carbon atoms, an ureido group, an alkyl ureido group having 1 to 4 monocarbon atoms, an alkylureido group having 1 to 4 dicarbon atoms, an alkylureido group which is substituted with at least one kind selected from a group consisting of a hydroxy group, a sulfo group, and a carboxy group as substituents and has 1 to 4 monocarbon atoms, an alkylureido group which is substituted with at least one kind selected from a group consisting of a hydroxy group, a sulfo group, and a carboxy group as substituents and has 1 to 4 dicarbon atoms, a benzoylamino group, a benzoylamino group whose benzene ring is substituted with at least one kind selected from a group consisting of a halogen atom, an alkyl group having 1 to 4 carbon atoms, a nitro group, a sulfo group, and a carboxy group, a benzenesulfonylamino group, or a phenylsulfonylamino group whose benzene ring is substituted with at least one kind selected from a group consisting of a halogen atom, an alkyl group having 1 to 4 carbon atoms, a nitro group, a sulfo group, and a carboxy group; and X represents a divalent crosslinking group).

[12] The ink set according to [10] or [11], in which the pigment black ink contains a self-dispersion type pigment.

DESCRIPTION OF EXEMPLARY EMBODIMENTS

Hereinafter, an embodiment (hereinafter, referred to as "the present embodiment") of the invention will be described in detail. However, the invention is not limited thereto and various modifications are possible within the range not departing from the scope of the invention.

Ink Set

An ink set of the present embodiment includes at least a yellow ink, a magenta ink, and a cyan ink, the yellow ink includes one or more kinds selected from a group consisting of coloring materials represented by the following Formulae (Y-1) and (Y-2), the magenta ink includes one or more kinds selected from a group consisting of coloring materials represented by the following Formulae (M-1) and (M-2), and the cyan ink includes one or more kinds selected from a group consisting of coloring materials represented by the following Formulae (C-1) and (C-2).

(Y-1)

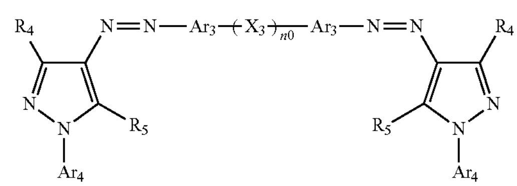

(In Formula (Y-1), $R_4$ represents a substituent; $R_5$ represents —$OR_6$ or —$NHR_7$; $R_6$ and $R_7$ each represent a hydrogen atom or a substituent; $X_3$ represents a divalent linking group; n0 represents 0 or 1; $Ar_3$ represents a divalent heterocyclic group; and $Ar_4$ represents an alkyl group, an aryl group, or a triazine group.)

(Y-2)

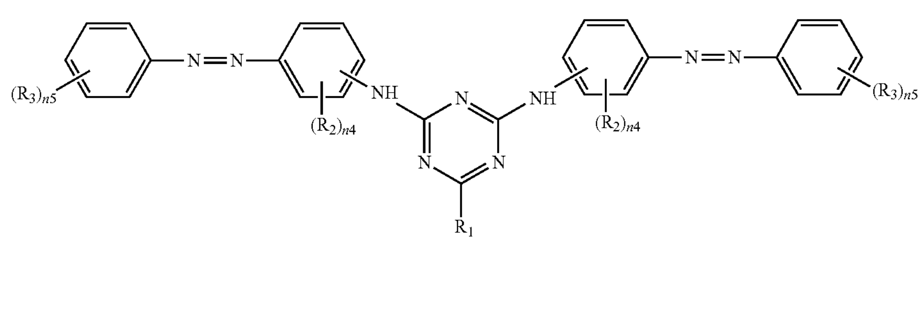

(In Formula (Y-2), $R_1$ represents a hydrogen atom or a substituent; $R_2$ represents a substituent; $R_3$ represents an ionic hydrophilic group or an alkyl group which may form a ring; n4 represents 0 to 4; and n5 represents 2 to 5.)

carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxy- (M-1)

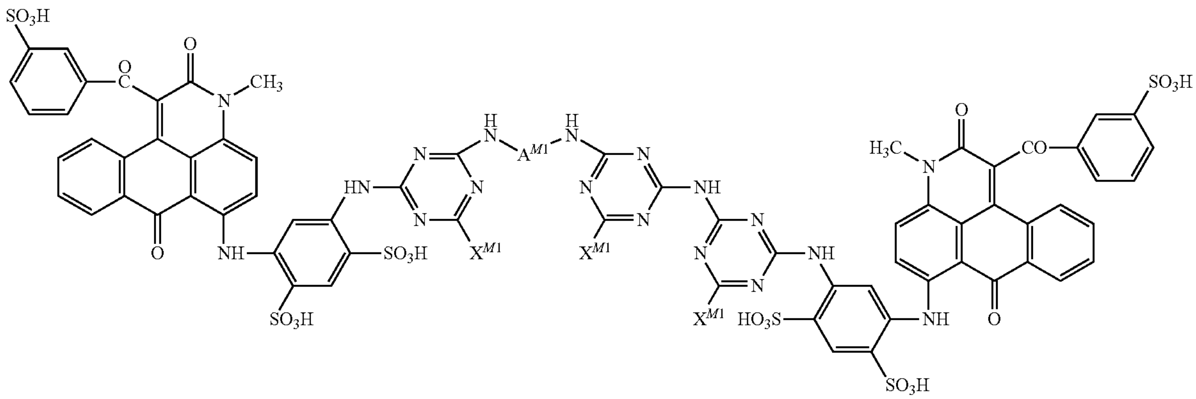

(In Formula (M-1), $A^{M1}$ represents an alkylene group having 1 or 2 carbon atoms, an alkylene group which contains a phenylene group and has 1 or 2 carbon atoms, or a group represented by the following Formula (M-1-1); and $X^{M1}$ represents an amino group, a hydroxy group, a chlorine atom, or a phenoxy group substituted with a sulfo group or a carboxy group.)

(M-1-1)

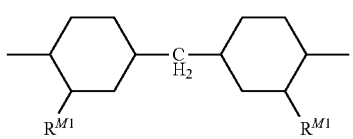

(In Formula (M-1-1), $R^{M1}$ represents a hydrogen atom or an alkyl group.)

(M-2)

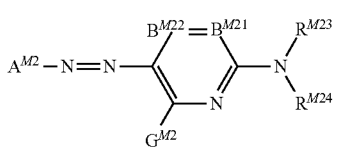

(In Formula (M-2), $A^{M2}$ represents a 5-membered heterocyclic group; $B^{M21}$ and $B^{M22}$ each represents —$CR^{M21}$= or —$CR^{M22}$=, or one of $B^{M21}$ and $B^{M22}$ represents a nitrogen atom and the other represents —$CR^{M21}$= or —$CR^{M22}$=; $R^{M23}$ and $R^{M24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group and $R^{M23}$ and $R^{M24}$ may further include a substituent; $G^{M2}$, $R^{M21}$, and $R^{M22}$ each independently represent a hydrogen atom, a halogen atom, an aliphatic group, an aromatic group, a heterocyclic group, a cyano group, a carboxyl group, a carbonyloxy group, an aryloxycarbonyloxy group, an amino group substituted with an alkyl group, an aryl group, or a heterocyclic group, an acylamino group, an ureido group, a sulfamoylamino group, an alkoxycarbonylamino group, an aryloxycarbonylamino group, an alkyl and arylsulfonylamino group, an aryloxycarbonylamino group, a nitro group, an alkyl and arylthio group, an alkyl and arylsulfonyl group, an alkyl and arylsulfinyl group, a sulfamoyl group, a sulfo group, or a heterocyclic thio group and $G^{M2}$, $R^{M21}$, and $R^{M22}$ may be further substituted; and $R^{M21}$ and $R^{M23}$ or $R^{M23}$ and $R^{M24}$ may be bonded to each other to form a 5- or 6-membered ring.)

(C-1)

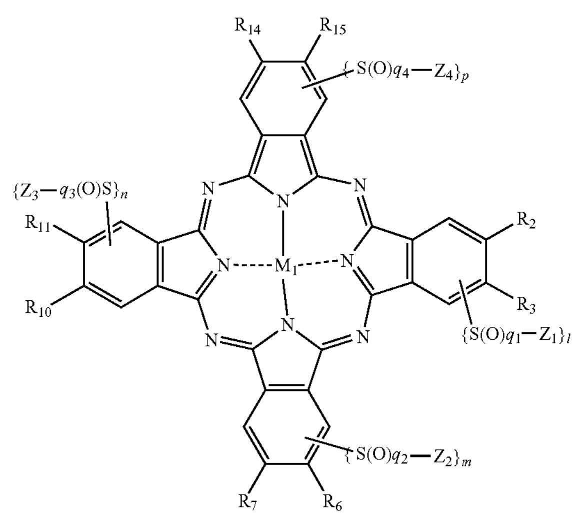

In Formula (C-1), $R_2$, $R_3$, $R_6$, $R_7$, $R_{10}$, $R_{11}$, $R_{14}$, and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further include a substituent.

$Z_1$, $Z_2$, $Z_3$, and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. In this case, at least one of $Z_1$, $Z_2$, $Z_3$, and $Z_4$ includes an ionic hydrophilic group as a substituent.

l, m, n, p, $q_1$, $q_2$, $q_3$, and $q_4$ each independently represent 1 or 2.

$M_1$ represents a hydrogen atom, a metal atom, a metal oxide, a metal hydroxide, or a metal halide.

(C-2)

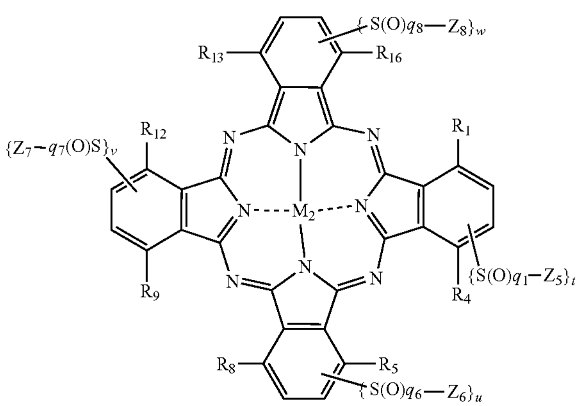

In Formula (C-2), $R_1$, $R_4$, $R_5$, $R_8$, $R_9$, $R_{12}$, $R_{13}$, and $R_{16}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may include a substituent.

$Z_5$, $Z_6$, $Z_7$, and $Z_8$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. In this case, at least one of $Z_5$, $Z_6$, $Z_7$, and $Z_8$ includes an ionic hydrophilic group as a substituent.

t, u, v, w, $q_5$, $q_6$, $q_7$, and $q_8$ each independently represent 1 or 2.

$M_2$ represents a hydrogen atom, a metal atom, a metal oxide, a metal hydroxide, or a metal halide.

Substituent Group A

First, a substituent group A and an ionic hydrophilic group will be defined.

Examples of the substituent group A, which are not particularly limited, include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a silyl group, a sulfonamide group, and an ionic hydrophilic group. These substituents may be further substituted and examples thereof may include groups selected from the above-described substituent group A.

More specifically, examples of the halogen atom include a fluorine atom, a chlorine atom, a bromine atom, and an iodine atom.

As an alkyl group, linear, branched, or cyclic substituted or unsubstituted alkyl groups are exemplified. Examples thereof include a cycloalkyl group, a bicycloalkyl group, and an alkyl group having a tricyclo structure with many ring structures. The alkyl group (for example, an alkyl group of an alkoxy group or an alkylthio group) in a substituent described below also represents an alkyl group showing such a concept. Specifically, preferable examples of the alkyl group include an alkyl group having 1 to 30 carbon atoms such as a methyl group, an ethyl group, an n-propyl group, an i-propyl group, a t-butyl group, an n-octyl group, an eicosyl group, a 2-chloroethyl group, a 2-cyanoethyl group, or a 2-ethylhexyl group; preferable examples of the cycloalkyl group include a substituted or unsubstituted cycloalkyl group having 3 to 30 carbon atoms such as a cyclohexyl group, a cyclopentyl group, or a 4-n-dodecylcyclohexyl group; and preferable examples of the bicycloalkyl group include a substituted or unsubstituted bicycloalkyl group having 5 to 30 carbon atoms, that is, a monovalent group obtained by removing one hydrogen atom from bicycloalkane having 5 to 30 carbon atoms such as a bicyclo[1,2,2]heptane-2-yl group or a bicyclo[2,2,2]octane-3-yl group.

Examples of the aralkyl group include a substituted or unsubstituted aralkyl group. As the substituted or unsubstituted aralkyl group, an aralkyl group having 7 to 30 carbon atoms is preferable and examples thereof include a benzyl group and a 2-phenethyl group.

Examples of the alkenyl group include a linear, branched, or cyclic substituted or unsubstituted alkenyl group such as a cycloalkenyl group or a bicycloalkenyl group. Specifically, preferable examples of the alkenyl group include a substituted or unsubstituted alkenyl group having 2 to 30 carbon atoms such as a vinyl group, an allyl group, a prenyl group, a geranyl group, or an oleyl group; preferable examples of the cycloalkenyl group include a substituted or unsubstituted cycloalkenyl group having 3 to 30 carbon atoms, that is, a monovalent group obtained by removing one hydrogen atom of cycloalkene having 3 to 30 carbon atoms such as a 2-cyclopentene-1-yl group or a 2-cyclohexene-1-yl group; examples of the bicycloalkenyl group include a substituted or unsubstituted bicycloalkenyl group and preferable examples thereof include a substituted or unsubstituted bicycloalkenyl group having 5 to 30 carbon atoms, that is, a monovalent group obtained by removing one hydrogen atom of bicycloalkene which has one double bond such as a bicyclo[2,2,1]hept-2-en-1-yl group or a bicyclo[2,2,2]oct-2-en-4-yl group.

Preferable examples of the alkynyl group include a substituted or unsubstituted alkynyl group having 2 to 30 carbon atoms such as an ethynyl group, a propargyl group, or a trimethylsilylethynyl group.

Preferable examples of the aryl group include a substituted or unsubstituted aryl group having 6 to 30 carbon atoms such as a phenyl group, a p-tolyl group, a naphthyl group, an m-chlorophenyl group, or an o-hexadecanoylaminophenyl group.

Preferable examples of the heterocyclic group include a monovalent group obtained by removing one hydrogen atom from a 5- or 6-membered substituted or unsubstituted aromatic or non-aromatic heterocyclic compound and still preferable examples thereof include a 5- or 6-membered aromatic heterocyclic group having 3 to 30 carbon atoms such as a 2-furyl group, a 2-thienyl group, a 2-pyrimidinyl group, or a 2-benzothiazolyl group.

Preferable examples of the alkoxy group include a substituted or unsubstituted alkoxy group having 1 to 30 carbon atoms such as a methoxy group, an ethoxy group, an isopropoxy group, a t-butoxy group, an n-octyloxy group, or a 2-methoxyethoxy group.

Preferable examples of the aryloxy group include a substituted or unsubstituted aryloxy group having 6 to 30 carbon atoms such as a phenoxy group, a 2-methylphenoxy group, a 4-t-butylphenoxy group, a 3-nitrophenoxy group, or a 2-tetradecanoylaminophenoxy group.

Preferable examples of the silyloxy group include a substituted or unsubstituted silyloxy group having 0 to 20 carbon atoms such as a trimethylsilyloxy group or a diphenylmethylsilyloxy group.

Preferable examples of the heterocyclic oxy group include a substituted or unsubstituted heterocyclic oxy group having 2 to 30 carbon atoms such as a 1-phenyltetrazole-5-oxy group or a 2-tetrahydropyranyloxy group.

Preferable examples of the acyloxy group include a formyloxy group, a substituted or unsubstituted alkylcarbonyloxy group having 2 to 30 carbon atoms, and a substituted or unsubstituted arylcarbonyloxy group having 6 to 30 carbon atoms such as an acetyloxy group, a pivaloyloxy group, a stearoyloxy group, a benzoyloxy group, or a p-methoxyphenylcarbonyloxy group.

Preferable examples of the carbamoyloxy group include a substituted or unsubstituted carbamoyloxy group having 1 to 30 carbon atoms such as a N,N-dimethylcarbamoyloxy group, a N,N-diethylcarbamoyloxy group, a morpholinocarbonyloxy group, a N,N-di-n-octylaminocarbonyloxy group, or a N-n-octylcarbamoyloxy group.

Preferable examples of the alkoxycarbonyloxy group include a substituted or unsubstituted alkoxycarbonyloxy group having 2 to 30 carbon atoms such as a methoxycarbonyloxy group, an ethoxycarbonyloxy group, a t-butoxycarbonyloxy group, or an n-octylcarbonyloxy group.

Preferable examples of the aryloxycarbonyloxy group include a substituted or unsubstituted aryloxycarbonyloxy group having 7 to 30 carbon atoms such as a phenoxycarbonyloxy group, a p-methoxyphenoxycarbonyloxy group, or a p-n-hexadecyloxyphenoxycarbonyloxy group.

Examples of the amino group include an alkylamino group, an arylamino group, and a heterocyclic amino group and preferable examples thereof include an amino group and a substituted or unsubstituted alkylamino group having 1 to 30 carbon atoms, and a substituted or unsubstituted anilino group having 6 to 30 carbon atoms such as a methylamino group, a dimethylamino group, an anilino group, a N-methyl-anilino group, a dipenylamino group, or a triazinylamino group.

Preferable examples of the acylamino group include a formylamino group, a substituted or unsubstituted alkylcarbonylamino group having 1 to 30 carbon atoms, and a substituted or unsubstituted arylcarbonylamino group having 6 to 30 carbon atoms such as an acetylamino group, a pivaloylamino group, a lauroylamino group, a benzoylamino group, or a 3,4,5-tri-n-octyloxyphenylcarbonylamino group.

Preferable examples of the aminocarbonylamino group include a substituted or unsubstituted aminocarbonylamino group having 1 to 30 carbon atoms such as a carbamoylamino group, a N,N-dimethylaminocarbonylamino group, a N,N-diethylaminocarbonylamino group, or a morpholinocarbonylamino group.

Preferable examples of the alkoxycarbonylamino group include a substituted or unsubstituted alkoxycarbonylamino group having 2 to 30 carbon atoms such as a methoxycarbonylamino group, an ethoxycarbonylamino group, a t-butoxycarbonylamino group, an n-octadecyloxycarbonylamino group, or a N-methyl-methoxycarbonylamino group.

Preferable examples of the aryloxycarbonylamino group include a substituted or unsubstituted aryloxycarbonylamino group having 7 to 30 carbon atoms such as a phenoxycarbonylamino group, a p-chlorophenoxycarbonylamino group, or an m-n-octyloxyphenoxycarbonylamino group.

Preferable examples of the sulfamoylamino group include a substituted or unsubstituted sulfamoylamino group having 0 to 30 carbon atoms such as a sulfamoylamino group, a N,N-dimethylaminosulfonylamino group, or a N-n-octylaminosulfonylamino group.

Preferable examples of the alkyl or arylsulfonylamino group include a substituted or unsubstituted alkylsulfonylamino group having 1 to 30 carbon atoms and a substituted or unsubstituted arylsulfonylamino group having 6 to 30 carbon atoms such as a methylsulfonylamino group, a butylsulfonylamino group, a phenylsulfonylamino group, a 2,3,5-trichlorophenylsulfonylamino group, or a p-methylphenylsulfonylamino group.

Preferable examples of an alkylthio group include a substituted or unsubstituted alkylthio group having 1 to 30 carbon atoms such as a methylthio group, an ethylthio group, or an n-hexadecylthio group.

Preferable examples of the arylthio group include a substituted or unsubstituted arylthio group having 6 to 30 carbon atoms such as a phenylthio group, a p-chlorophenylthio group, or an m-methoxyphenylthio group.

Preferable examples of the heterocyclic thio group include a substituted or unsubstituted heterocyclic thio group having 2 to 30 carbon atoms such as a 2-benzothiazolylthio group or a 1-phenyltetrazole-5-ylthio group.

Preferable examples of the sulfamoyl group include a substituted or unsubstituted sulfamoyl group having 0 to 30 carbon atoms such as a N-ethylsulfamoyl group, a N-(3-dodecyloxypropyl)sulfamoyl group, a N,N-dimethylsulfamoyl group, a N-acetylsulfamoyl group, a N-benzoylsulfamoyl group, or a N—(N'-phenylcarbamoyl)sulfamoyl group.

Preferable examples of the alkyl or arylsulfinyl group include a substituted or unsubstituted alkylsulfinyl group having 1 to 30 carbon atoms and a substituted or unsubstituted arylsulfinyl group having 6 to 30 carbon atoms such as a methylsulfinyl group, an ethylsulfinyl group, a phenylsulfinyl group, or a p-methylphenylsulfinyl group.

Preferable examples of the alkyl or arylsulfonyl group include a substituted or unsubstituted alkylsulfonyl group having 1 to 30 carbon atoms and a substituted or unsubstituted arylsulfonyl group having 6 to 30 carbon atoms such as a methylsulfonyl group, an ethylsulfonyl group, a phenylsulfonyl group, or a p-methylphenylsulfonyl group.

Preferable examples of the acyl group include a formyl group, a substituted or unsubstituted alkylcarbonyl group having 2 to 30 carbon atoms, a substituted or unsubstituted arylcarbonyl group having 7 to 30 carbon atoms, and a heterocyclic carbonyl group which is bonded to a carbonyl group with 2 to 30 substituted or unsubstituted carbon atoms such as an acetyl group, a pivaloyl group, a 2-chloroacetyl group, a stearoyl group, a benzoyl group, a p-n-octyloxyphenylcarbonyl group, a 2-pyridylcarbonyl group, or a 2-furylcarbonyl group.

Preferable examples of the aryloxycarbonyl group include a substituted or unsubstituted aryloxycarbonyl group having 7 to 30 carbon atoms such as a phenoxycarbonyl group, an o-chlorophenoxycarbonyl group, an m-nitrophenoxycarbonyl group, or a p-t-butylphenoxycarbonyl group.

Preferable examples of the alkoxycarbonyl group include a substituted or unsubstituted alkoxycarbonyl group having 2 to 30 carbon atoms such as a methoxycarbonyl group, an ethoxycarbonyl group, a t-butoxycarbonyl group, or an n-octadecyloxycarbonyl group.

Preferable examples of the carbamoyl group include a substituted or unsubstituted carbamoyl group having 1 to 30 carbon atoms such as a carbamoyl group, a N-methylcarbamoyl group, a N,N-dimethylcarbamoyl group, a N,N-di-n-octylcarbamoyl group, or a N-(methylsulfonyl)carbamoyl group.

Preferable examples of the aryl or heterocyclic azo group include a substituted or unsubstituted arylazo group having 6 to 30 carbon atoms and a substituted or unsubstituted heterocyclic azo group having 3 to 30 carbon atoms such as phenyl azo, p-chlorophenyl azo, or 5-ethylthio-1,3,4-thiadiazole-2-ylazo.

Preferable examples of the imide group include a N-succinimide group and a N-phthalimide group.

Preferable examples of the phosphino group include a substituted or unsubstituted phosphino group having 0 to 30 carbon atoms such as a dimethylphosphino group, a diphenylphosphino group, or a methyiphenoxyphosphino group.

Preferable examples of the phosphinyl group include a substituted or unsubstituted phosphinyl group having 0 to 30 carbon atoms such as a phosphinyl group, a dioctyloxyphosphinyl group, or a diethoxyphosphinyl group.

Preferable examples of the phosphinyloxy group include a substituted or unsubstituted phosphinyloxy group having 0 to 30 carbon atoms such as a diphenoxyphosphinyloxy group or a dioctyloxyphosphinyloxy group.

Preferable examples of the phosphinylamino group include a substituted or unsubstituted phosphinylamino group having 0 to 30 carbon atoms such as a dimethoxyphosphinylamino group or a dimethylaminophosphinylamino group.

Preferable examples of the silyl group include a substituted or unsubstituted silyl group having 0 to 30 carbon atoms such as a trimethylsilyl group, a t-butyldimethylsilyl group or a phenyldimethylsilyl group.

Ionic Hydrophilic Group

Examples of the ionic hydrophilic group include a sulfo group, a carboxyl group, a thiocarboxyl group, a sulfino group, a phosphono group, a dihydroxyphosphino group, and a quaternary ammonium group. Among these, a sulfo group and a carboxyl group are particularly preferable. Further, a carboxyl group, a phosphono group, and a sulfo group may be in a state of salts and examples of countercations forming salts include an ammonium ion, an alkali metal ion (such as a lithium ion, a sodium ion, or a potassium ion), and an organic cation (such as a tetramethyl ammonium ion, a tetramethyl guanidium ion, or tetramethyl phosphonium). In addition, lithium salts, sodium salts, potassium salts, and ammonium salts are preferable; lithium salts and mixed salts containing lithium salts as a main component are more preferable; and lithium salts are most preferable.

Yellow Ink

A yellow ink contains one or more kinds selected from a group consisting of coloring materials represented by the following Formulae (Y-1) and (Y-2). It is preferable that the yellow ink contains the coloring materials represented by the following Formulae (Y-1) and (Y-2). When the yellow ink contains the coloring material represented by the following Formulae (Y-1) and (Y-2), an image with excellent tinting strength, light resistance, and hue tends to be obtained.

Coloring material represented by formula (Y-1)

Hereinafter, an azo dye (yellow dye) represented by Formula (Y-1) will be described.

(Y-1)

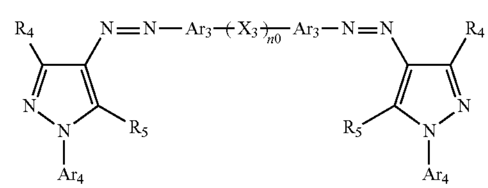

(In Formula (Y-1), $R_4$ represents a substituent; $R_5$ represents —$OR_6$ or —$NHR_7$; $R_6$ and $R_7$ each represent a hydrogen atom or a substituent; $X_3$ represents a divalent linking group; n0 represents 0 or 1; $Ar_3$ represents a divalent heterocyclic group; and $Ar_4$ represents an alkyl group, an aryl group, or a triazine group.)

In Formula (Y-1), as the divalent heterocyclic ring represented by $Ar_3$, a 5- or 6-membered cyclic group is preferable and the group may be further condensed. In addition, the divalent heterocyclic group may be an aromatic heterocyclic group or a non-aromatic heterocyclic group. Examples of the divalent heterocyclic group represented by $Ar_3$ include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzisothiazole, isothiadiazole, benzisothiazole, thiadiazole, isoxazole, benzisoxazole, pyrrolidine, piperidine, piperazine, imidazolidine, and thiazoline. Among these, an aromatic heterocyclic group is preferable and preferable examples thereof include pyridine, pyrazine, pyrimidine, pyridazine, triazine, pyrazole, imidazole, benzimidazole, triazole, thiazole, benzothiazole, isothiazole, benzisothiazole, and thiadiazole. Thiadiazole is most preferable. These may include substituents and the substituents have the same definitions as the above-described substituents A.

In Formula (Y-1), the substituents represented by $R_4$, $R_6$, and $R_7$ are selected from the substituent group A.

In Formula (Y-1), $R_4$ represents preferably an alkyl group, an alkoxy group, or an aryl group, more preferably an alkyl group having 1 to 4 carbon atoms, still more preferably a methyl group, an ethyl group, a tertiary butyl group, a phenyl group, a methoxy group, or an ethoxy group, and still more preferably represents a tertiary butyl group.

In Formula (Y-1), $R_5$ represents preferably a substituted or unsubstituted amino group and more preferably an unsubstituted amino group.

In Formula (Y-1), $Ar_4$ represents preferably a substituted or unsubstituted aryl group and more preferably a substituted or unsubstituted phenyl group.

In Formula (Y-1), as a substituent in a case where $R_4$, $R_5$, and $Ar_4$ further includes a substituent, the above-described substituents A are exemplified. In addition, an alkyl group, an aryl group, a heterocyclic group, a cyano group, a hydroxyl group, a nitro group, or an alkoxy group is preferable and an alkyl group, an aryl group, or a heterocyclic group is more preferable.

In Formula (Y-1), preferable examples of the divalent linking group represented by $X_3$ include an alkylene group (such as methylene, ethylene, propylene, butylene, or pentylene), an alkenylene group (such as ethenylene or propenylene), an alkynylene group (such as ethynylene or propynylene), an arylene group (such as phenylene or naphthylene), a divalent heterocyclic group (such as a 6-chloro-1,3,5-triazine-2,4-diyl group, a pyrimidine-2,4-diyl group, or a quinoxaline-2,3-diyl group), —O—, —CO—, —$NR_A$— ($R_A$ represents a hydrogen atom, an alkyl group, or an aryl group), —S—, —$SO_2$—, —SO—, or a combination of these.

In Formula (Y-1), an alkylene group, an alkenylene group, an alkynylene group, an arylene group, or a divalent heterocyclic group represented by $X_3$ and an alkyl group or an aryl group represented by $R_A$ may include a substituent. The substituents have the same definitions as the above-described substituent group. An alkyl group or an aryl group represented by $R_A$ contains a substituted or unsubstituted alkyl group or aryl group. An alkyl group having 1 to 30 carbon atoms is preferable as the substituted or unsubstituted alkyl group. An aryl group having 6 to 30 carbon atoms is preferable as the substituted or unsubstituted aryl group.

In Formula (Y-1), the divalent linking group represented by $X_3$ represents more preferably an alkylene group having 10 or less carbon atoms, an alkenylene group having 10 or less carbon atoms, an alkynylene group having 10 or less carbon atoms, an arylene group having 6 to 10 carbon atoms, a divalent heterocyclic group, —O—, —S—, or a combination of these and still more preferably an alkylene group, —S—, or a combination of these.

The total number of carbon atoms of the divalent linking group is preferably in the range of 0 to 50, more preferably in the range of 0 to 30, and most preferably in the range of 0 to 10.

In Formula (Y-1), the aryl group or arylene group represented by $Ar_4$ have the same definitions as the aryl group or arylene group represented by $R_A$ described above and the same applies to the preferable ones. Further, the triazine group represented by $Ar_4$ may include a monovalent substituent (the monovalent group has the same definition as the substituent group A described above and the same applies to the preferable ones).

The coloring material represented by Formula (Y-1) is not particularly limited, but a compound represented by the following Formula (Y-1-1) is preferable and a compound represented by the following Formula (Y-1-2) is more preferable.

(Y-1-1)

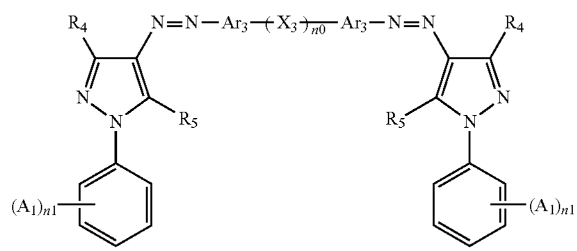

(In Formula (Y-1-1), $R_4$ represents a substituent; $R_5$ represents —$OR_6$ or —$NHR_7$; $R_6$ and $R_7$ each represent a hydrogen atom or a substituent; $X_3$ represents a divalent linking group; n0 represents 0 or 1; $Ar_3$ represents a divalent heterocyclic group; $A_1$ represents an ionic hydrophilic group; and n1 represents 0 to 2.)

In Formula (Y-1-1), $R_4$, $R_5$, $Ar_3$, n0, and $X_3$ have the same definitions as $R_4$, $R_5$, $Ar_3$, n0, and $X_3$ in Formula (Y-1) and the same applies to the preferable ones.

In Formula (Y-1-1), the ionic hydrophilic group represented by $A_1$ represents preferably —$SO_3M$ or —$CO_2M$, more preferably —$SO_3M$, and particularly preferably —$CO_2K$. M's each independently represent a hydrogen atom or a monovalent countercation and examples of the monovalent countercation include an ammonium ion, an alkali metal ion (such as a lithium ion, a sodium ion, or a potassium ion), and an organic cation (such as a tetramethyl ammonium ion, a tetramethyl guanidium ion, or tetramethyl phosphonium). In addition, lithium salts, sodium salts, potassium salts, and ammonium salts are preferable; potassium salts and mixed salts containing potassium salts as a main component are more preferable; and potassium salts are most preferable.

(Y-1-2)

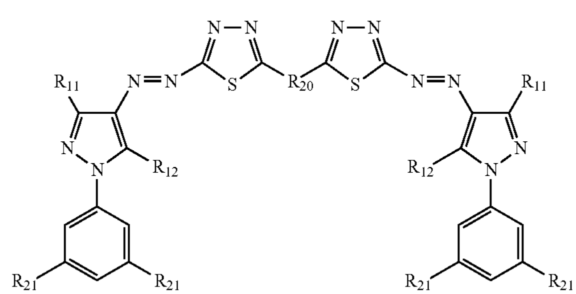

(In Formula (Y-1-2), $R_{20}$ represents an alkylene group, —S—, or a linking group formed of a combination of these; $R_{21}$ represents an ionic hydrophilic group; $R_{11}$ represents an alkyl group; and $R_{12}$ represents an amino group.)

In Formula (Y-1-2), $R_{20}$ has the same definition as the alkylene group in the divalent linking group represented by $X_3$ of Formula (Y-1) and the same applies to the preferable ones.

In Formula (Y-1-2), $R_{21}$ represents a carboxyl group (—$CO_2M$), M's each independently represent a hydrogen atom or a monovalent countercation, and examples of the monovalent countercation include an ammonium ion, an alkali metal ion (such as a lithium ion, a sodium ion, or a potassium ion), and an organic cation (such as a tetramethyl ammonium ion, a tetramethyl guanidium ion, or tetramethyl phosphonium). In addition, lithium salts, sodium salts, potassium salts, and ammonium salts are preferable; potassium salts and mixed salts containing potassium salts as a main component are more preferable; and potassium salts are most preferable.

In Formula (Y-1-2), the alkyl group represented by $R_{11}$ and the amino group represented by $R_{12}$ have the same definitions as the alkyl group and the amino group in $R_4$ and $R_5$ of Formula (Y-1) and the same applies to the preferable ones.

Specific examples of the compound represented by Formula (Y-1) will be described below, but the compounds used in the present embodiment are not limited thereto. Further, in the specific examples, Et and Ph respectively indicate ethyl and phenyl.

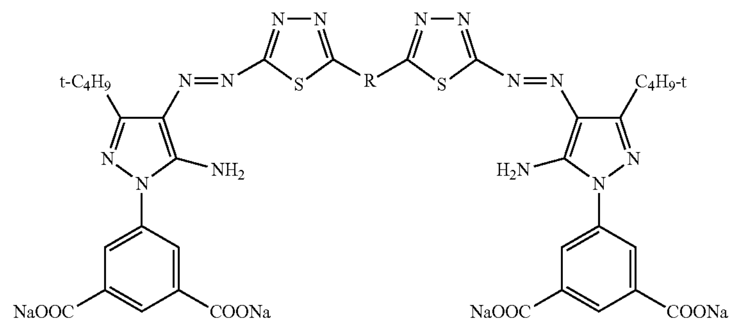

| Coloring matter | R |
|---|---|
| 1 | —$SCH_2S$— |
| 2 | —$SCH_2CH_2S$— |
| 3 | —$SCH_2CH_2CH_2S$— |
| 4 | —$SCH_2CH_2CH_2CH_2CH_2S$— |
| 5 | —$SCH_2CH(CH_3)S$— |
| 6 | —$SCH_2CH_2CH(CH_3)S$— |
| 7 | —$SC_2H_4OC_2H_4S$— |
| 8 | —$SC_2H_4OC_2H_4OC_2H_4S$— |
| 9 | —$SCH_2CH(OH)CH_2S$— |
| 10 | —$SCH_2CH(CH_2OH)S$— |
| 11 | —$SCH(COONa)CH_2S$— |
| 12 | —$SCH(COONa)CH_2CH_2CH(COONa)S$— |
| 13 | —$SCH(COONa)$—$CH(COONa)S$— |

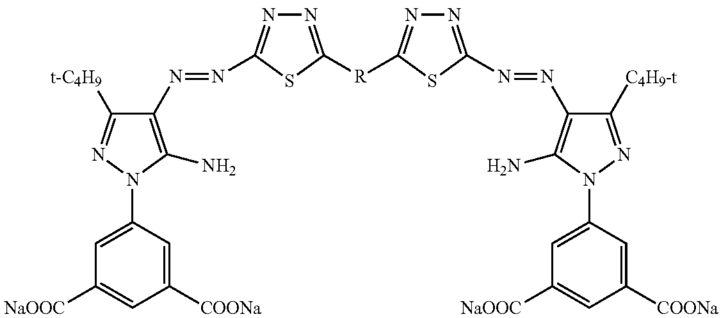
| Coloring matter | R |
|---|---|
| 14 | 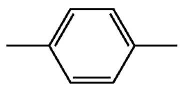 |
| 15 | 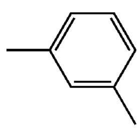 |
| 16 | 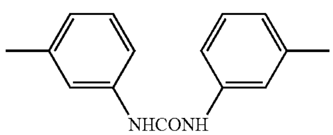 |
| 17 | 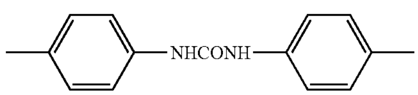 |
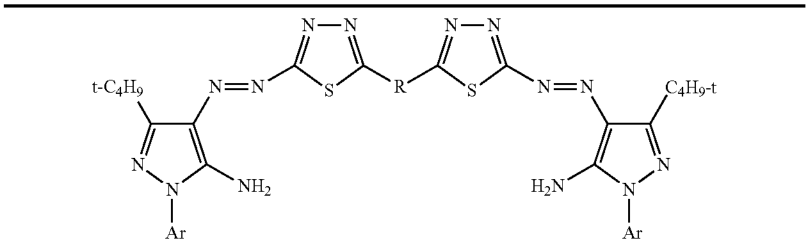
| Coloring Matter | Ar | R |
|---|---|---|
| 18 | 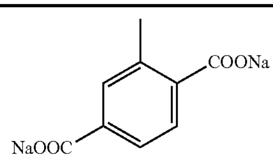 | —$SC_3H_6S$— |
| 19 | 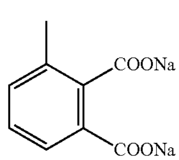 | —$SC_3H_6S$— |

-continued
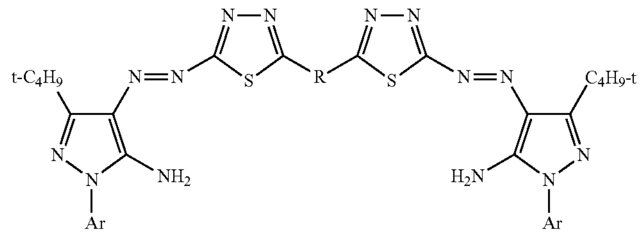
| Coloring Matter | Ar | R |
| --- | --- | --- |
| 20 | 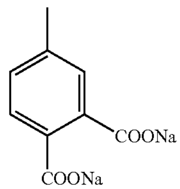 | —$SC_3H_6S$— |
| 21 | 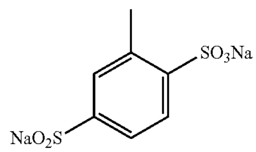 | —$SC_3H_6S$— |
| 22 | 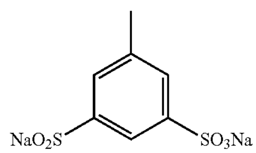 | —$SC_3H_6S$— |
| 23 | 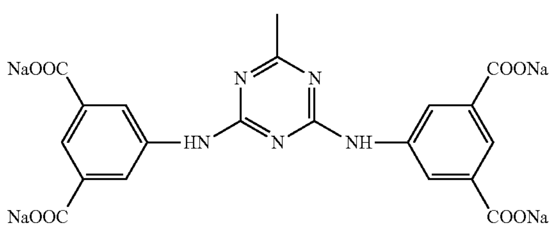 | —$SC_3H_6S$— |
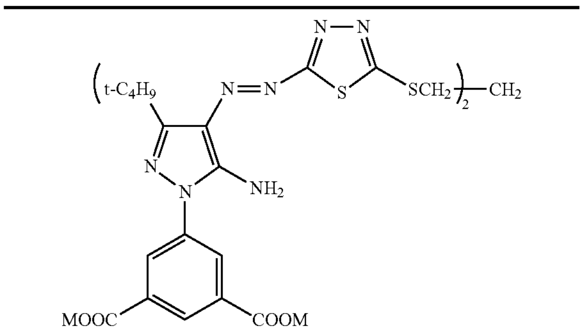
| Coloring matter | M |
| --- | --- |
| 24 | K |
| 25 | Li |
| 26 | $NH_4$ |
| 27 | $NH(Et)_3$ |

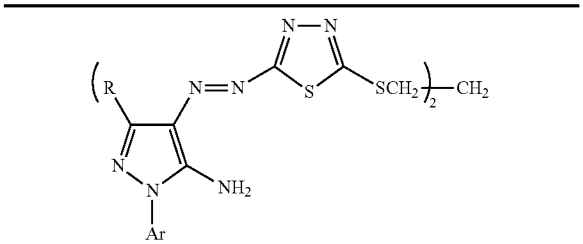
| Coloring matter | R | Ar |
| --- | --- | --- |
| 28 | OEt | 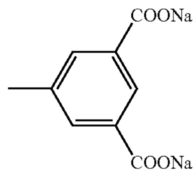 |
| 29 | Ph | 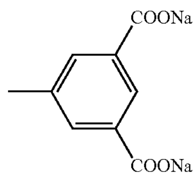 |
| 30 | t-$C_4H_9$ | $C_3H_5SO_3Na$ |
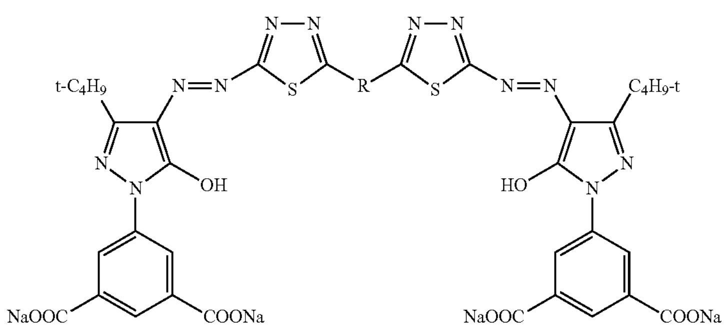
| Coloring matter | R |
| --- | --- |
| 31 | —$SCH_2CH_2S$— |
| 32 | —$SCH_2CH_2CH_2S$ |
| 33 | $SCH_2CH_2CH_2CH_2CH_2S$ |
| 34 | 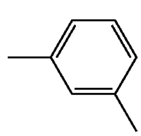 |

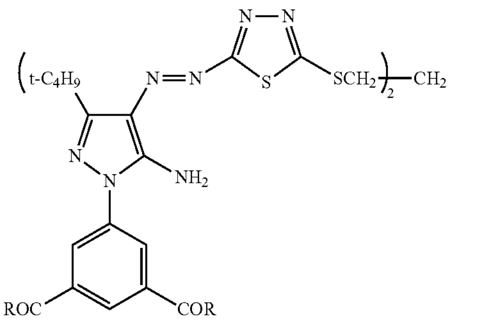

| Coloring matter | R |
|---|---|
| 35 | 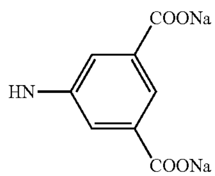 |
| 36 | $NHC_2H_4COONa$ |
| 37 | 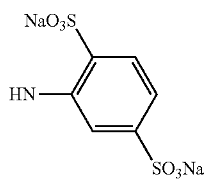 |

The compound represented by Formula (Y-1) can be synthesized using a general synthesis method and synthesized by changing and combining, for example, diazo components and coupling components described in JP-A-2004-083903.

The content of the coloring material represented by Formula (Y-1) is preferably in the range of 1.0% by mass to 7.0% by mass, more preferably in the range of 2.0% by mass to 6.0% by mass, and still more preferably in the range of 3.0% by mass to 5.0% by mass based on the total amount of the yellow ink. When the content of the coloring material represented by Formula (Y-1) is in the above-described range, an image with excellent tinting strength, light resistance, and hue tends to be obtained.

Coloring Material Represented by Formula (Y-2)

Hereinafter, the coloring material represented by Formula (Y-2) will be described below.

In Formula (Y-2), the substituents represented by $R_1$ and $R_2$ each independently represent alkyl which may be substituted, alkoxy which may be substituted, aryl which may be substituted, a heterocyclic group which may be substituted, $—NR^8R^9$, $—NHCOR^8$, $—NHCONR^8R^9$, $—C(O)R^8$, $—C(O)OR^8$, $—C(O)NR^8R^9$, $—PO_3H_2$, $—SR^8$, $—SO_2R^8$, $—SO_2NR^8R^9$, $—SOR^8$, $—SO_3H$, $—CF_3$, —CN, $—NO_2$, hydroxy or halogen. Here, $R^8$ and $R^9$ each independently represent H, an alkyl group which may be substituted and has 1 to 8 carbon atoms, an aryl group (for example, a phenyl group) which may be substituted, or a heterocyclic group which may be substituted or $R^8$ and $R^9$ can form a 5-membered or 6-membered ring (for example, piperidine, pyrrolidone, pyridine, piperizain (piperizine), or morpholine) which may be substituted using nitrogen atoms to which $R^8$ and $R^9$ are respectively bonded.

In Formula (Y-2), the ionic hydrophilic group represented by $R_3$ represents preferably $—SO_3M$ or $—CO_2M$ and more preferably $—SO_3M$. M's each independently represent a hydrogen atom or a monovalent countercation and examples of the monovalent countercation include an ammonium ion, an alkali metal ion (such as a lithium ion, a sodium ion, or a potassium ion), and an organic cation (such as a tetramethyl ammonium ion, a tetramethyl guanidium ion, or tetramethyl phosphonium). In addition, lithium salts, sodium salts, potassium salts, and ammonium salts are preferable. The ionic hydrophilic group represented by $R_3$ represents preferably a sulfo group and more preferably a potassium salt of a sulfo group.

In Formula (Y-2), the alkyl group represented by $R_3$ may include a substituent and represents preferably an alkyl group having 1 to 4 carbon atoms and examples thereof include methyl, ethyl, propyl, isopropyl, butyl, and sec-butyl which may be substituted with hydroxy, halogen, carboxy, or a sulfo group. Further, examples thereof, which are not particularly limited, include trifluoromethyl, hydroxyethyl, sulfopropyl, and carboxyethyl.

In Formula (Y-2), examples of a ring formed by alkyl groups represented by $R_3$ being bonded to each other include an aryl group which may be substituted or a heterocyclic group which may be substituted; examples of the aryl group and the heterocyclic group include an aryl group and a heterocyclic group in the above-described substituent group A; and examples of a ring formed by alkyl groups represented by $R_3$ being bonded to each other include a benzene ring or a naphthalene ring, and a benzene ring is preferable. Further, it is preferable that a ring formed by alkyl groups represented by $R_3$ being bonded to each other is substituted with a sulfonic acid group.

(Y-2)

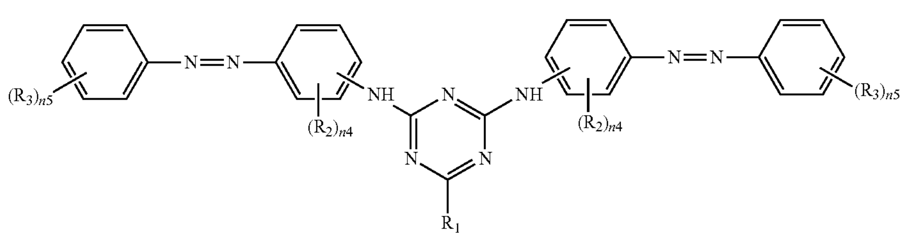

(In Formula (Y-2), $R_1$ represents a hydrogen atom or a substituent; $R_2$ represents a substituent; $R_3$ represents an ionic hydrophilic group or an alkyl group which may form a ring; n4 represents 0 to 4; and n5 represents 2 to 5.)

In Formula (Y-2), in a case where $R_1$ and $R_2$ represents alkoxy which may be substituted, the alkoxy is preferably alkoxy which may be substituted and has 1 to 8 carbon atoms and more preferably alkoxy having 1 to 4 carbon atoms, and examples thereof include methoxy, ethoxy, propoxy, isopropoxy, and butoxy which may be substituted with hydroxy, halogen, or a carboxy group. Examples thereof, which are not particularly limited, include carboxy propyloxy, carboxy ethoxy, hydroxy ethoxy, and chloroethoxy.

In Formula (Y-2), in a case where $R_1$ and $R_2$ represents an aryl group which may be substituted, it is preferable that $R_1$ and $R_2$ represent phenyl which may be substituted. Preferable examples of the substituent on an aryl ring include alkyl having 1 to 8 carbon atoms, alkoxy having 1 to 8 carbon atoms, —$NR^8R^9$, —$NHCOR^8$, —$NHCONR^8R^9$, —$C(O)R^8$, —$C(O)OR^8$, —$C(O)$ $NR^8R^9$, —$PO_3H_2$, —$SR^8$, —$SO_2R^8$, —$SO_2NR^8R^9$, —$SOR^8$, —$SO_3H$, —$CF_3$, —CN, —$NO_2$, hydroxy or halogen. Here, $R^8$ and $R^9$ are the same as those described above. Examples thereof, which are not particularly limited, include carboxyphenyl, sulfophenyl, nitrophenyl, and chlorophenyl.

In Formula (Y-2), in a case where $R_1$ and $R_2$ represent a heterocyclic group which may be substituted, that is, preferably, one of an aliphatic heterocyclic ring which may be substituted and an aromatic heterocyclic ring which may be substituted and examples thereof include thiophene which may be substituted, pyrazole, triazole, thiadiazole, thiazole, imidazole, pyridine, pyrrolidone, piperizain, morpholine, and pyrimidine. Preferable examples of the substituent on a heterocyclic ring include alkyl having 1 to 8 carbon atoms, —$NR^8R^9$, —$NHCOR^8$, —$NHCONR^8R^9$, —$C(O)OR^8$, —$C(O)NR^8R^9$, —$SR^8$, —$SO_2R^8$, —$SO_2NR^8R^9$, —$SOR^8$, —$SO_3H$, —$CF_3$, —CN, —$NO_2$, hydroxy or halogen. Here, $R^8$ and $R^9$ are the same as those described above. Examples thereof, which are not particularly limited, include carboxytriazole, chloropyridyl, and cyanothiophene.

In Formula (Y-2), $R_1$ and $R_2$ each independently represent a hydrogen atom, a hydroxyl group, an alkyl group (preferably, a methyl group or an ethyl group) which may be substituted and has 1 to 4 carbon atoms, an alkoxy group (preferably, a methoxy group or an ethoxy group) which may be substituted and has 1 to 4 carbon atoms, —$NR^8R^9$—$SO_2NR^8R^9$, or —$NHCONR^8R^9$. Here, $R^8$ and $R^9$ are the same as those described above. More preferably, $R^8$ represents H and $R^9$ represents H, an alkyl group (preferably, a methyl group or an ethyl group) which may be substituted and has 1 to 4 carbon atoms, or an aryl group (preferably, a phenyl group).

In Formula (Y-2), it is preferable that $R_1$ and $R_2$ each independently represent a hydrogen atom, a hydroxyl group, an alkyl group having 1 to 4 carbon atoms, an alkoxy group having 1 to 4 carbon atoms, a carboxylic acid group, —$NR^8R^9$, or $NHCONH_2$.

In Formula (Y-2), $R_1$ more preferably represents a hydroxyl group or —$NR^8R^9$. $R^8$ preferably represents H and $R^9$ preferably represents H or an alkyl group (preferably, a methyl group or an ethyl group) which may be substituted and has 1 to 4 carbon atoms. $R^8$ more preferably represents H and $R^9$ more preferably represents an alkyl group (preferably, a methyl group or an ethyl group) which may be substituted with a hydroxyl group and has 1 to 4 carbon atoms.

In Formula (Y-2), $R_2$ represents more preferably a hydrogen atom, alkyl having 1 to 4 carbon atoms, or carboxylic acid and more preferably carboxylic acid from viewpoints of particularly excellent solubility, light fastness, and ozone fastness.

In Formula (Y-2), n4 represents 0 or 4, preferably 1 to 4, and more preferably 1 to 2.

In Formula (Y-2), n5 represents 2 to 5, preferably 2 to 4, and more preferably 2 to 3 from a viewpoint of improving solubility of the compound represented by Formula (Y-2) in an aqueous liquid medium.

As the coloring material represented by Formula (Y-2), which is not particularly limited, a compound represented by the following Formula (Y-2-1) or a compound represented by the following Formula (Y-2-2) is preferable.

(Y-2-1)

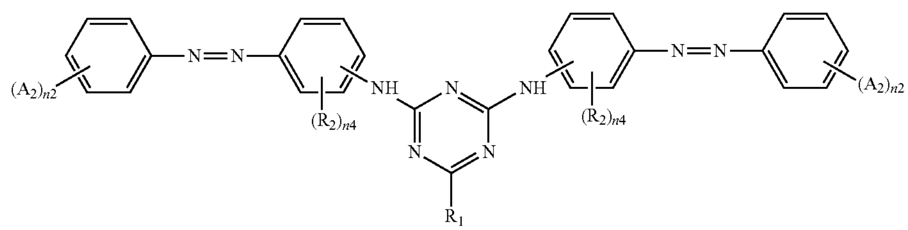

(In Formula (Y-2-1), $R_1$ represents a hydrogen atom or a substituent; $R_2$ represents a substituent; $A_2$ represents an ionic hydrophilic group; n4 represents 0 to 4; and n2 represents 2 to 4.)

In Formula (Y-2-1), the ionic hydrophilic group represented by $A_2$ represents preferably —$SO_3M$ or —$CO_2M$ and more preferably —$SO_3M$. M's each independently represent a hydrogen atom or a monovalent countercation and examples of the monovalent countercation include an ammonium ion, an alkali metal ion (such as a lithium ion, a sodium ion, or a potassium ion), and an organic cation (such as a tetramethyl ammonium ion, a tetramethyl guanidium ion, or tetramethyl phosphonium). In addition, lithium salts, sodium salts, and potassium salts are preferable. The ionic hydrophilic group represented by $A_2$ represents preferably a sulfo group and more preferably a potassium salt of a sulfo group.

In Formula (Y-2-1), $R_1$ and $R_2$ have the same definitions as $R_1$ and $R_2$ in Formula (Y-2) and the same applies to the preferable ones.

In Formula (Y-2-1), n4 represents 0 to 4, preferably 1 to 4, and more preferably 1 to 2 and n2 represents preferably 2 to 4 and more preferably 2 to 3 from a viewpoint of improving solubility of the compound represented by Formula (Y-2-1) in an aqueous liquid medium.

(Y-2-2)

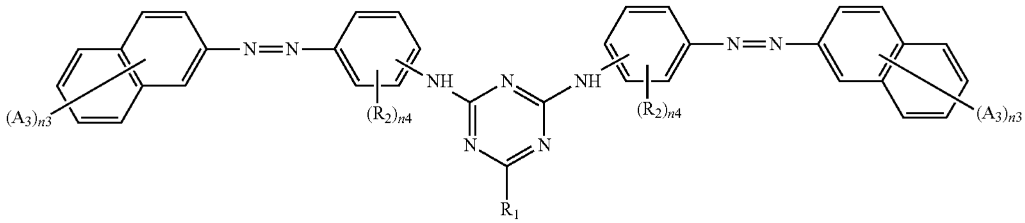

(In Formula (Y-2-2), $R_1$ represents a hydrogen atom or a substituent; $R_2$ represents a substituent; $A_3$ represents an ionic hydrophilic group; n4 represents 0 to 4; and n3 represents 2 to 4.)

In Formula (Y-2-2), the ionic hydrophilic group represented by $A_3$ represents preferably —$SO_3M$ or —$CO_2M$ and more preferably —$SO_3M$. M's each independently represent a hydrogen atom or a monovalent countercation and examples of the monovalent countercation include an ammonium ion, an alkali metal ion (such as a lithium ion, a sodium ion, or a potassium ion), and an organic cation (such as a tetramethyl ammonium ion, a tetramethyl guanidium ion, or tetramethyl phosphonium). In addition, lithium salts, sodium salts, potassium salts, and ammonium salts are preferable. The ionic hydrophilic group represented by $A_3$ represents preferably a sulfo group and more preferably a potassium salt of a sulfo group.

In Formula (Y-2-2), $R_1$ and $R_2$ have the same definitions as $R_1$ and $R_2$ in Formula (Y-2) and the same applies to the preferable ones.

In Formula (Y-2-2), n4 represents 0 to 4, preferably 1 to 4, and more preferably 1 to 2.

In Formula (Y-2-2), n3 represents preferably 2 to 4 and more preferably 2 to 3 from a viewpoint of improving solubility of the compound represented by Formula (Y-2-2) in an aqueous liquid medium.

It is more preferable that the compound represented by Formula (Y-2-2) is the compound represented by Formula (Y-2-3).

(In Formula (Y-2-3), $R_8$ represents a hydroxyl group or —$NR^8R^9$ and $R_9$'s each independently represent a hydrogen atom, a hydroxyl group, an alkyl group having 1 to 4 carbon atoms, an alkoxy group having 1 to 4 carbon atoms, a carboxylic acid group, —$NR^8R^9$, or $NHCOHN_2$. $R^8$ and $R^9$ each independently represent H, an alkyl group which may be substituted and has 1 to 8 carbon atoms, an aryl group (for example, a phenyl group) which may be substituted, or a heterocyclic group which may be substituted or $R^8$ and $R^9$ can form a 5-membered or 6-membered ring which may be substituted using nitrogen atoms to which $R^8$ and $R^9$ are respectively bonded. $R^{10}$'s each independently represent a carboxyl group or a sulfo group.)

In Formula (Y-2-3), as a 5- or 6-membered ring formed from $R^8$ and $R^9$, piperidine, pyrrolidone, pyridine, piperizain (piperizine), or morpholine is exemplified. These may include a substituent and examples thereof are the same as those of the substituent group A described above. The amino group represented by $R^8$, the alkyl group, the alkoxy group, the sulfo group, the aminocarbonylamino group represented by $R^9$, and the sulfo group represented by $R^{10}$ have the same definitions as the amino group, the alkyl group, the alkoxy group, the sulfo group, the aminocarbonylamino group, and the sulfo group in the substituent group A described above and the same applies to the preferable ones.

In Formula (Y-2-3), $R^{10}$ represents preferably a sulfo group and more preferably a potassium salt of a sulfo group.

The compounds represented by Formulae (Y-2) to (Y-2-3) may be symmetric or asymmetric. Next, specific examples of the coloring material represented by Formula (Y-2) of the present embodiment will be described below.

(Y-2-3)

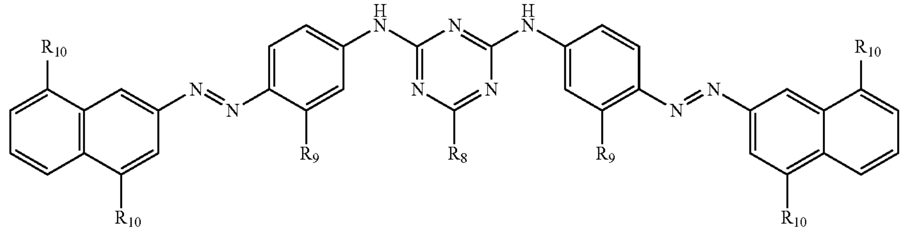

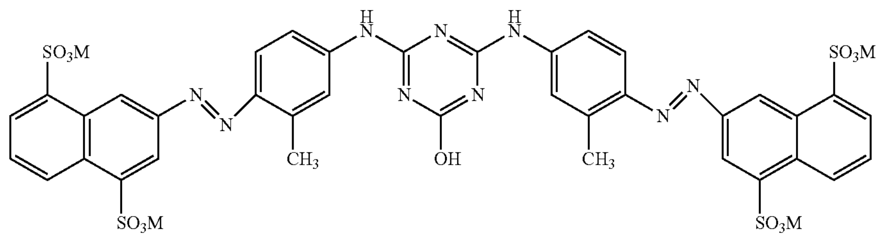
M:Li/Na = 4/1
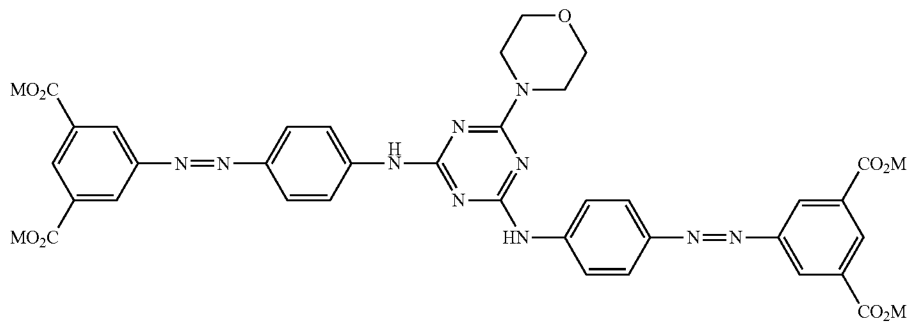
M:Na/$NH_4$ = 3/2
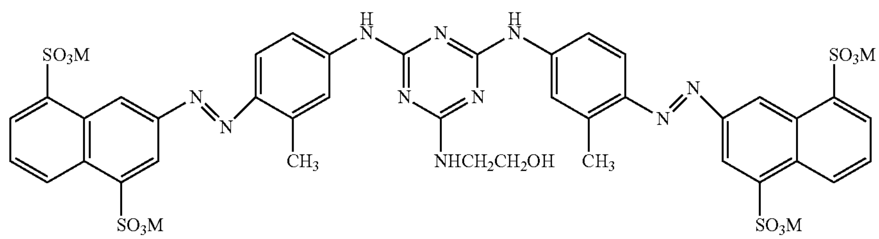
M:Na
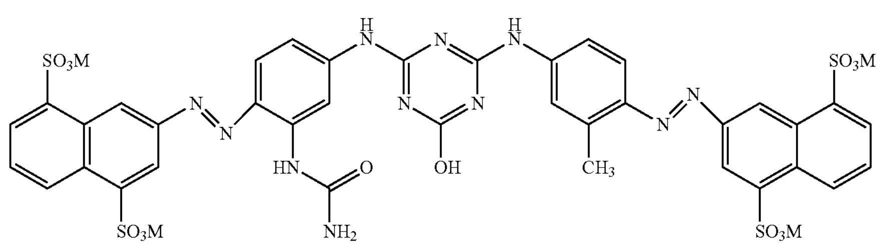
M:Li/Na = 4/1
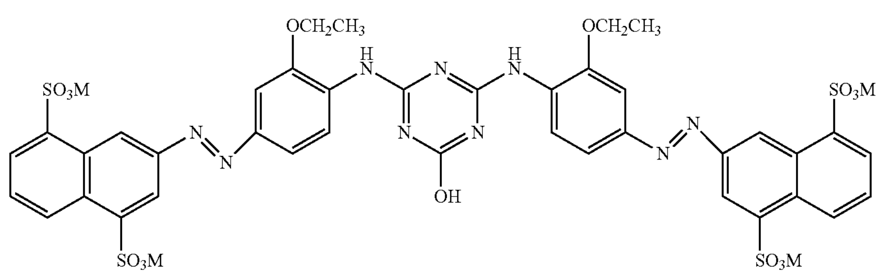
M:Li/Na = 4/1

-continued
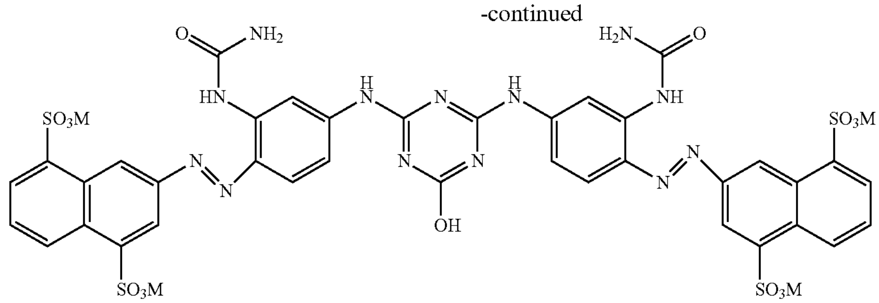
M:Li/Na = 4/1
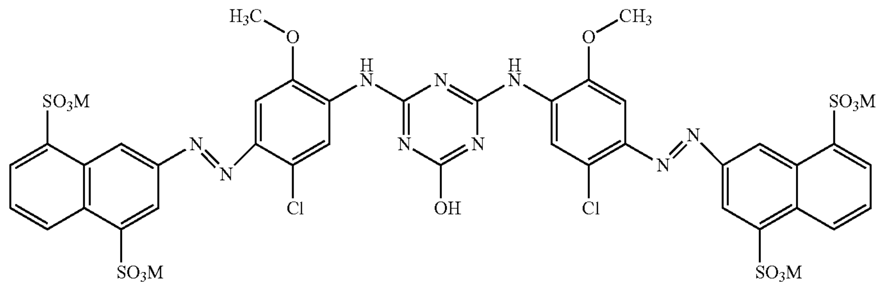
M:Li/Na = 4/1
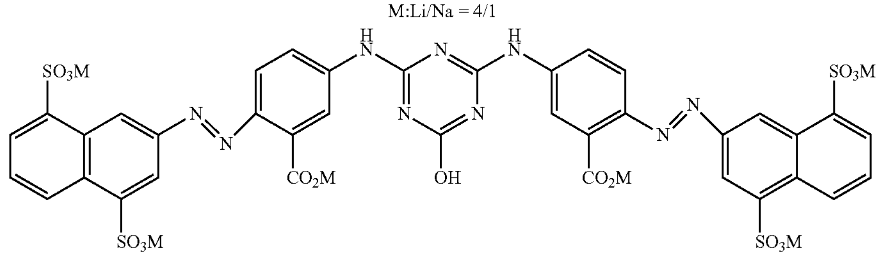
M:Li/Na = 4/1
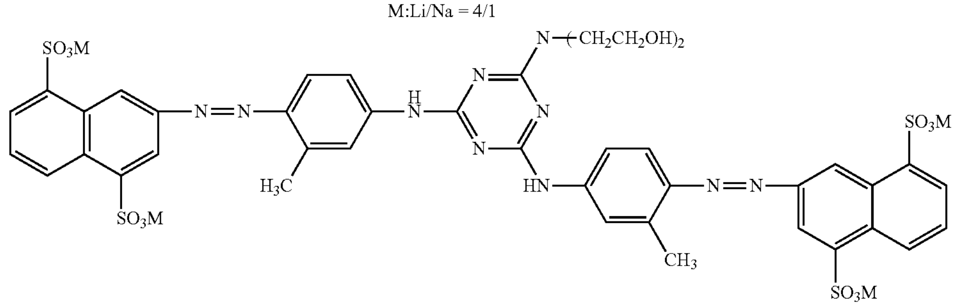
M:Na
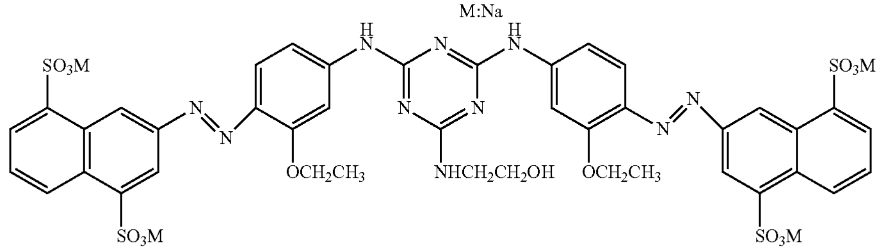
M:Na
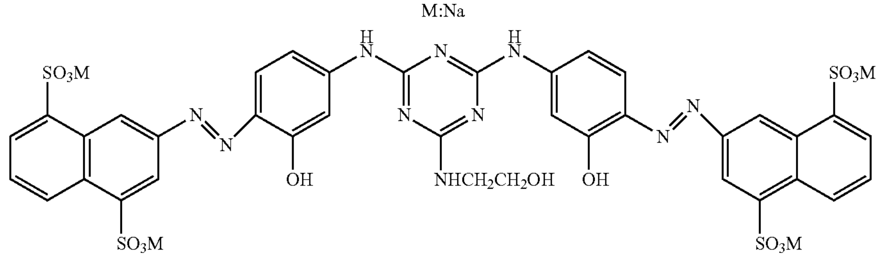
M:Na -continued
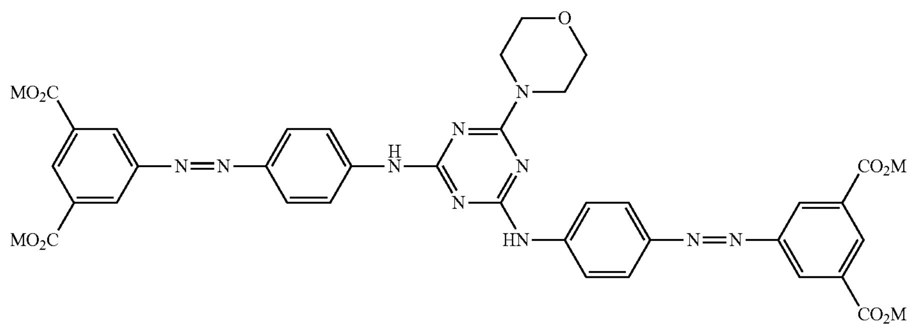
M:Na/NH$_4$ = 4/1
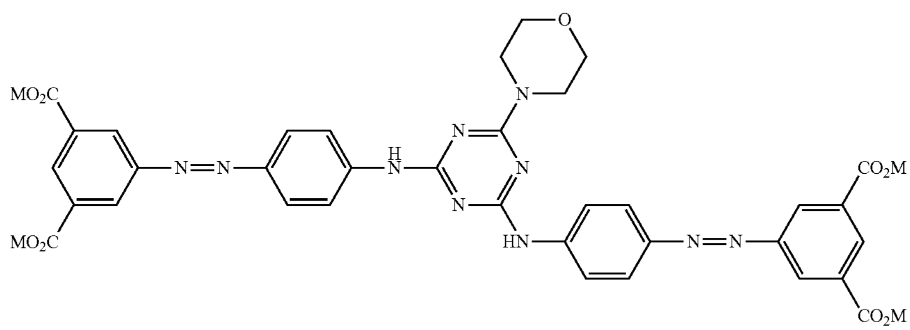
M:Na/NH$_4$ = 1/4
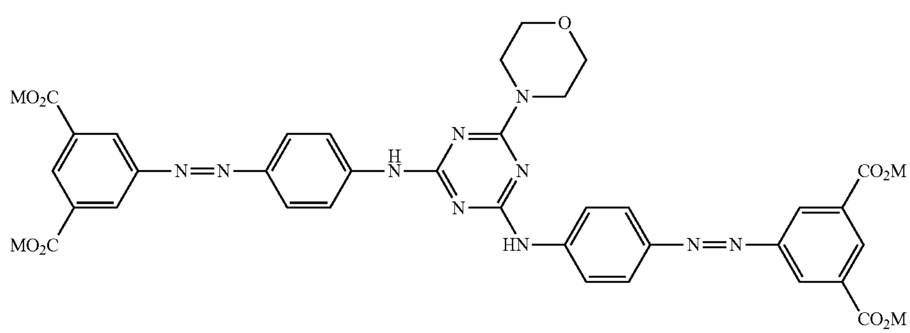
M:NH$_4$
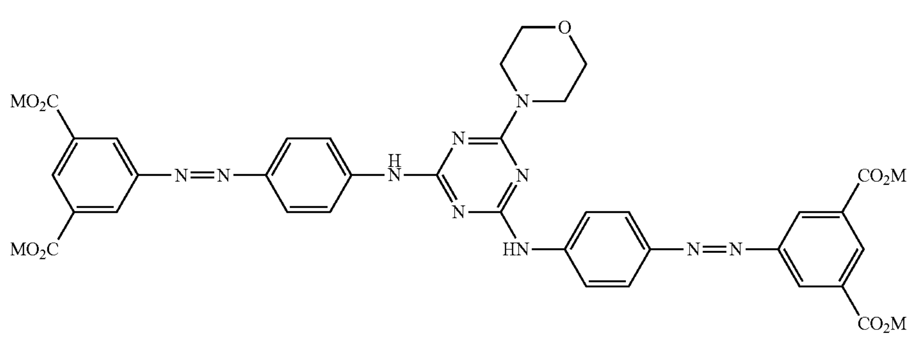
M:Na -continued
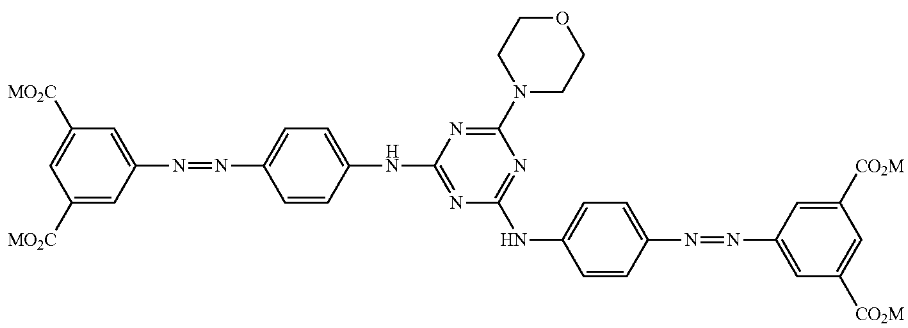
M:Na/$NH_4$ = 2/3
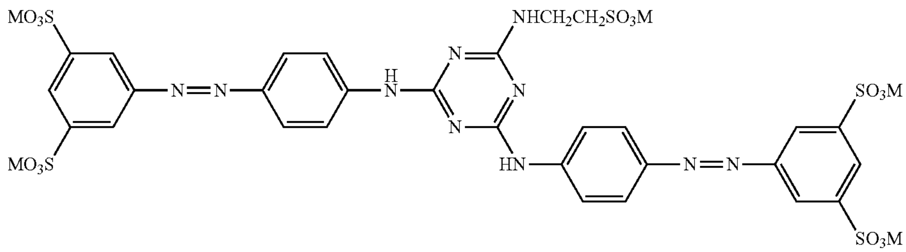
M:Na/$NH_4$ = 3/2
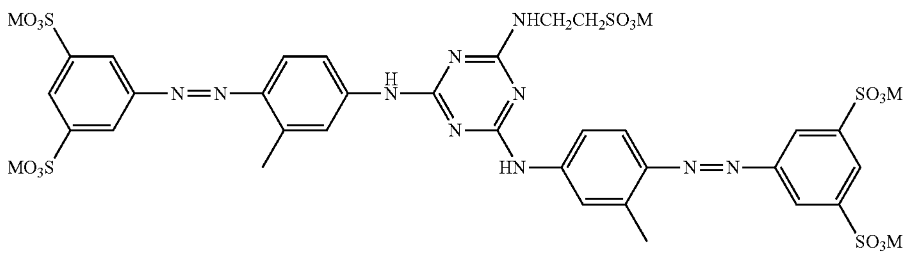
M:Na/$NH_4$ = 3/2
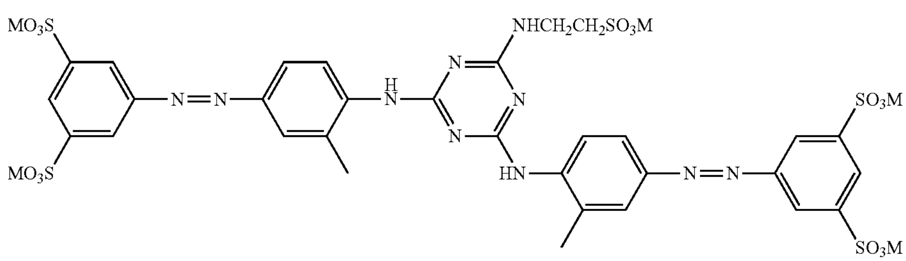
M:Na/$NH_4$ = 3/2
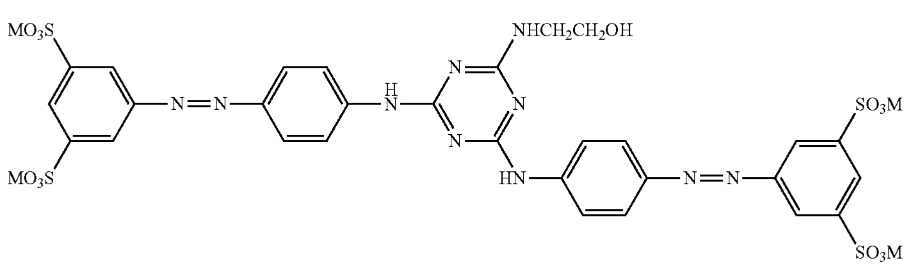
M:Na/$NH_4$ = 3/2

-continued
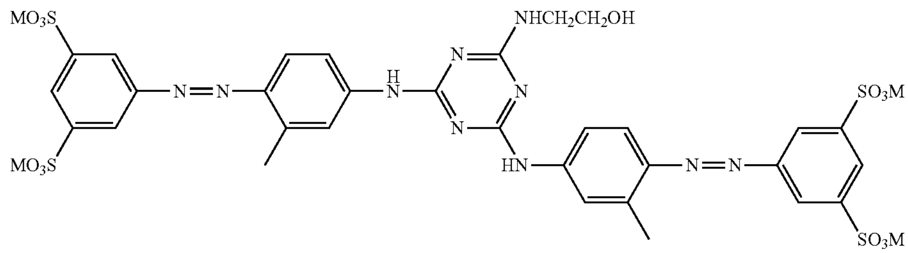
M:Na/NH$_4$ = 3/2
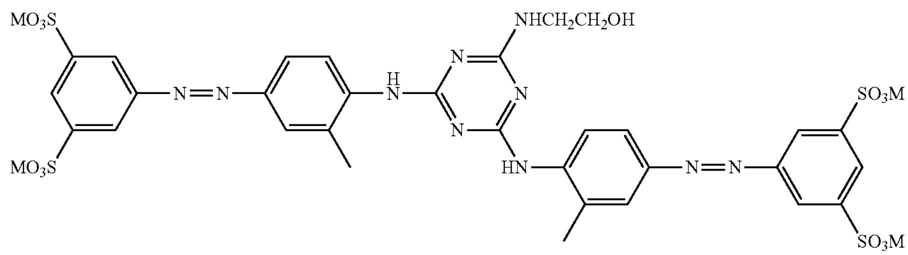
M:Na/NH$_4$ = 3/2
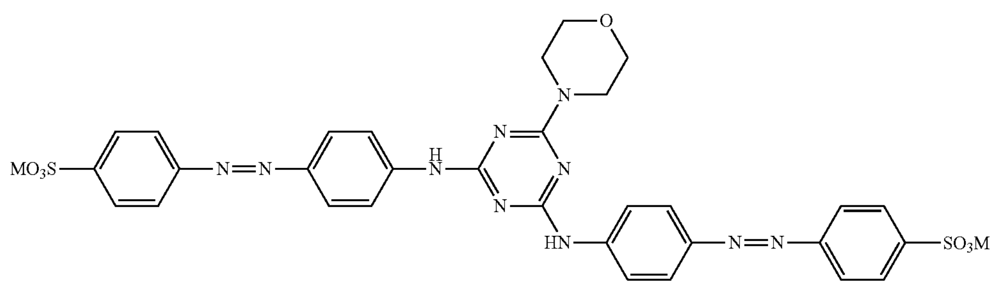
M:Na/NH$_4$ = 3/2
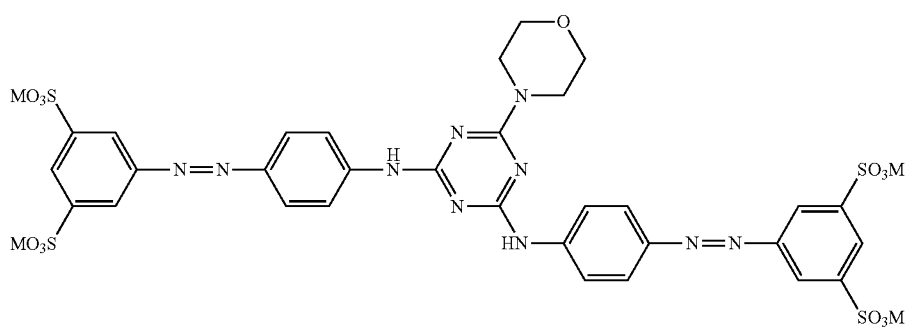
M:Na/NH$_4$ = 3/2
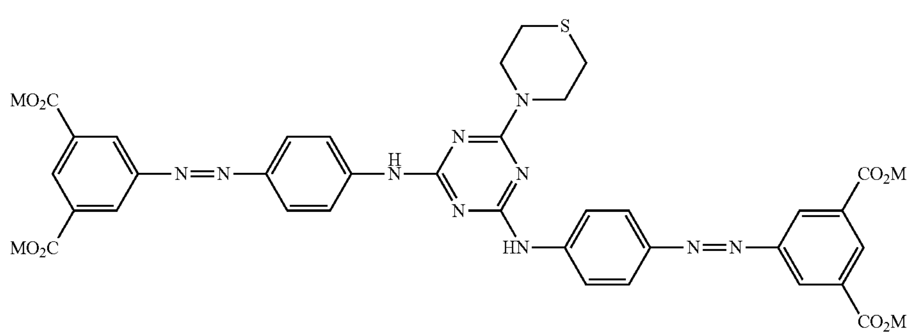
M:Na/NH$_4$ = 3/2

-continued
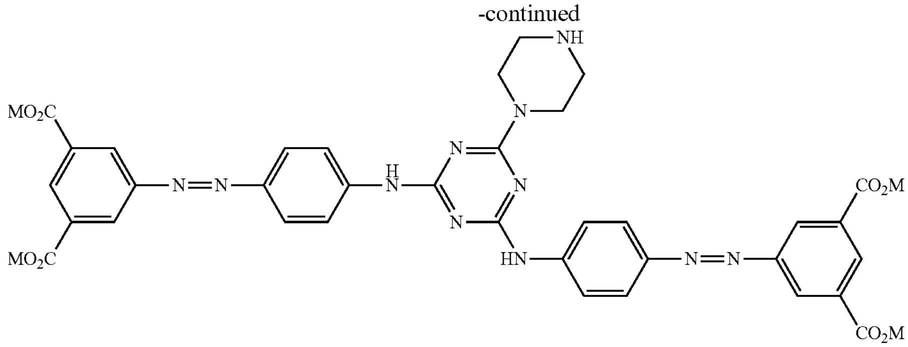
M:Na/$NH_4$ = 3/2
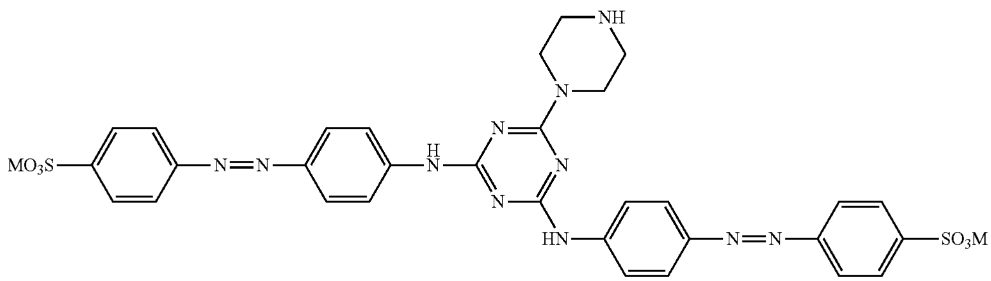
M:Na/$NH_4$ = 3/2
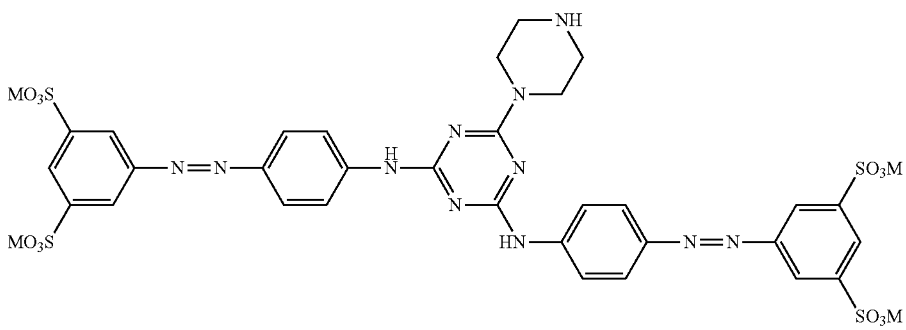
M:Na/$NH_4$ = 3/2
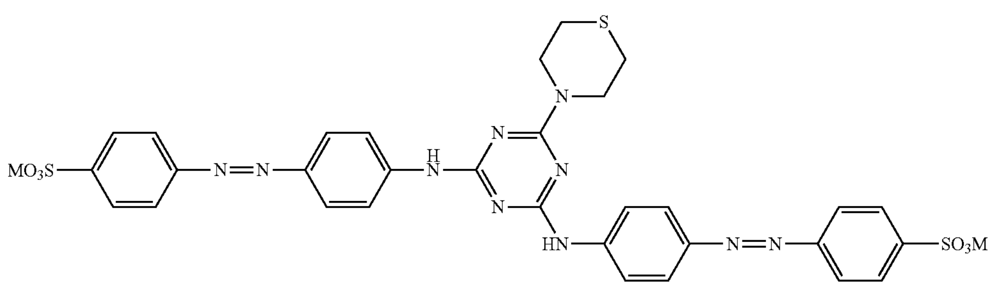
M:Na/$NH_4$ = 3/2
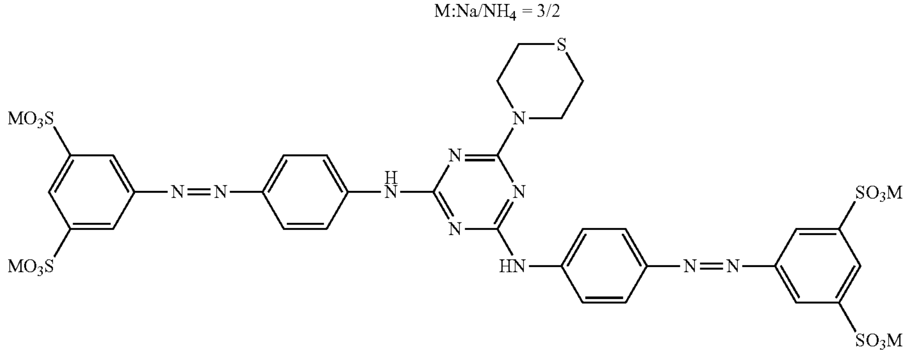
M:Na/$NH_4$ = 3/2

-continued
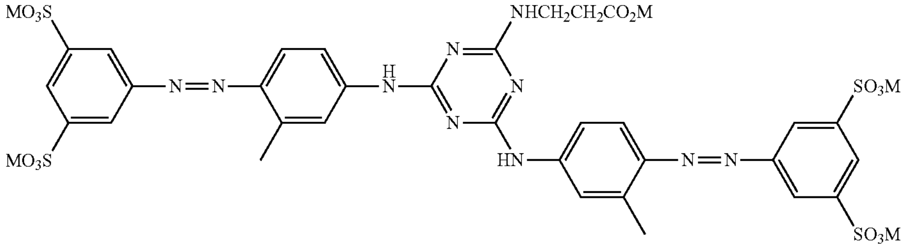
M:Na/$NH_4$ = 3/2
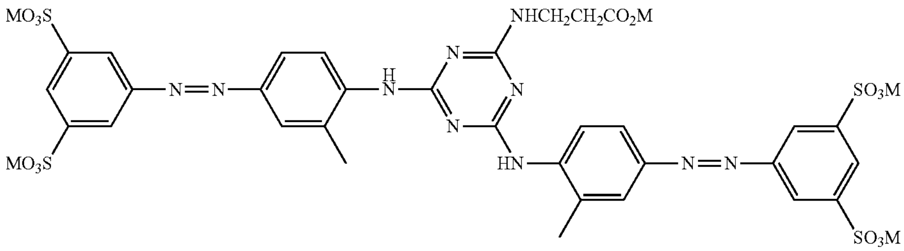
M:Na/$NH_4$ = 3/2
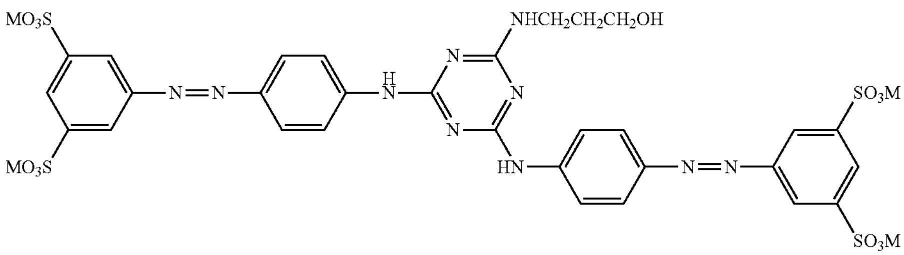
M:Na/$NH_4$ = 3/2
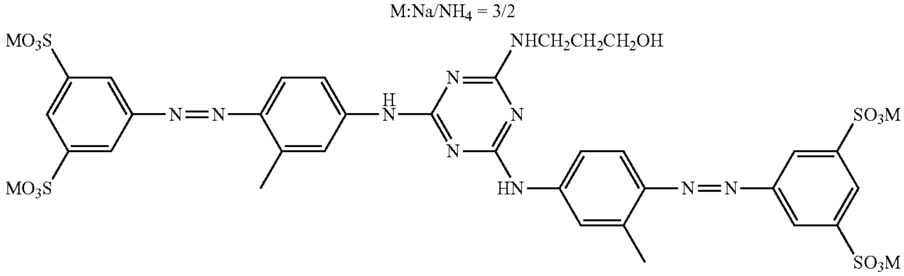
M:Na/$NH_4$ = 3/2
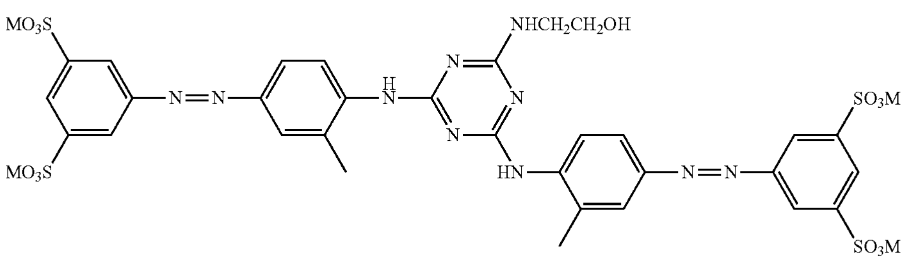
M:Na/$NH_4$ = 3/2
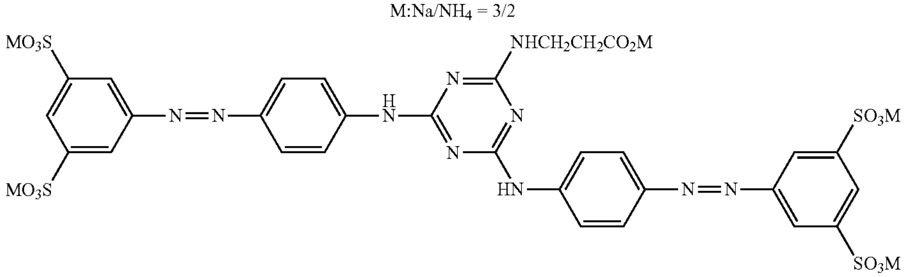
M:Na/$NH_4$ = 3/2

-continued
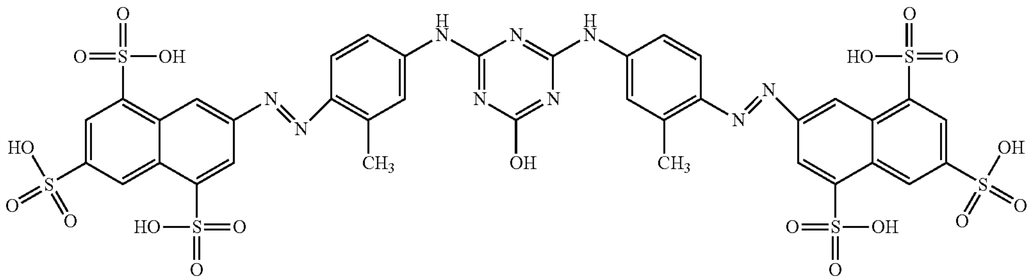
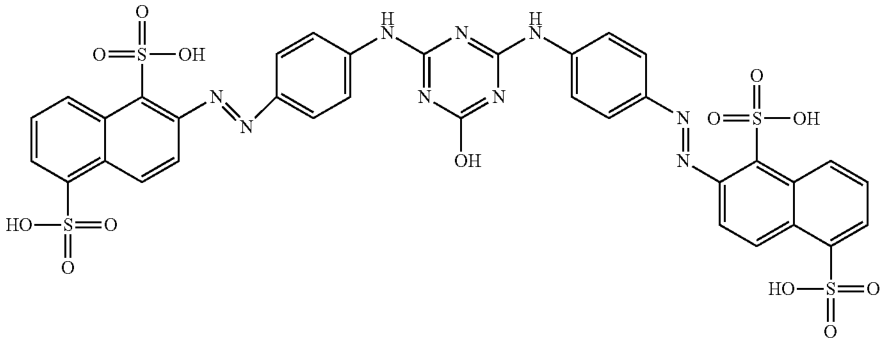
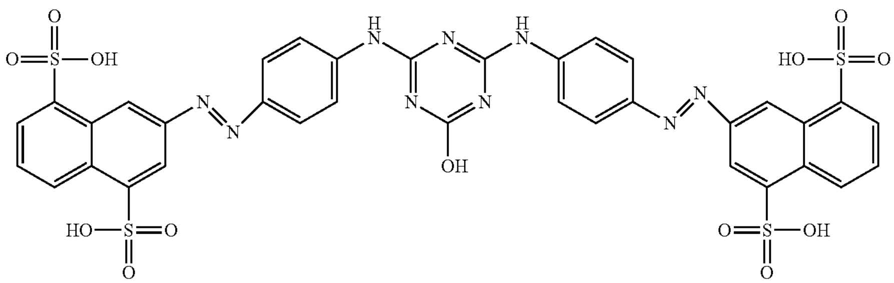
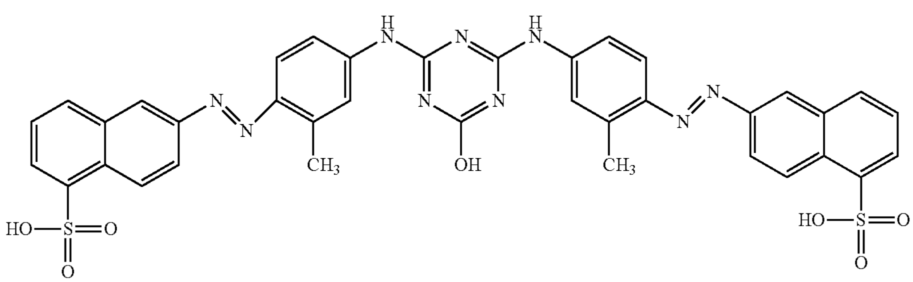
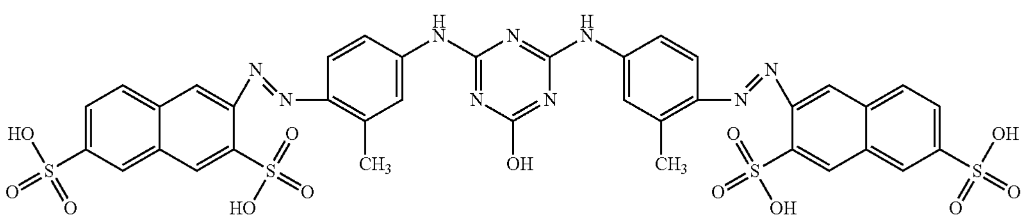
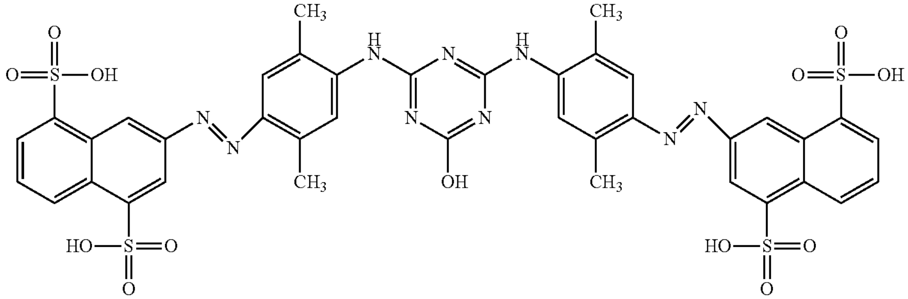

-continued
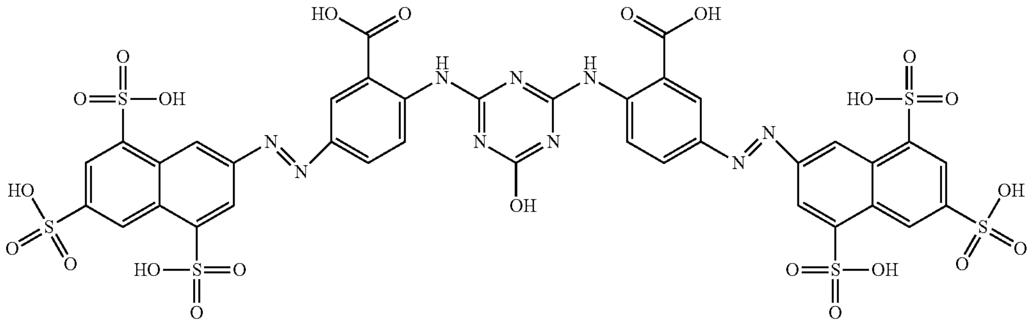
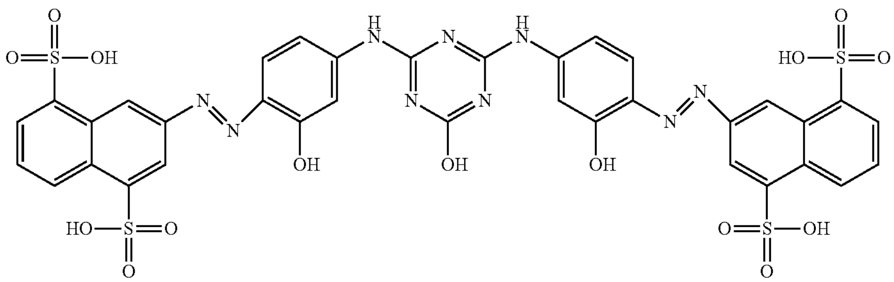
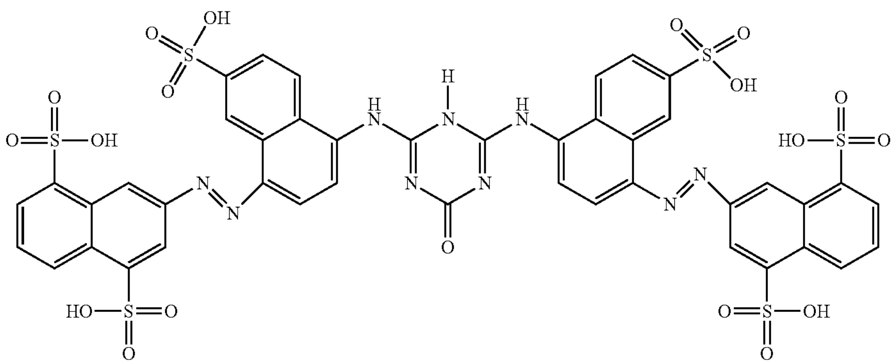
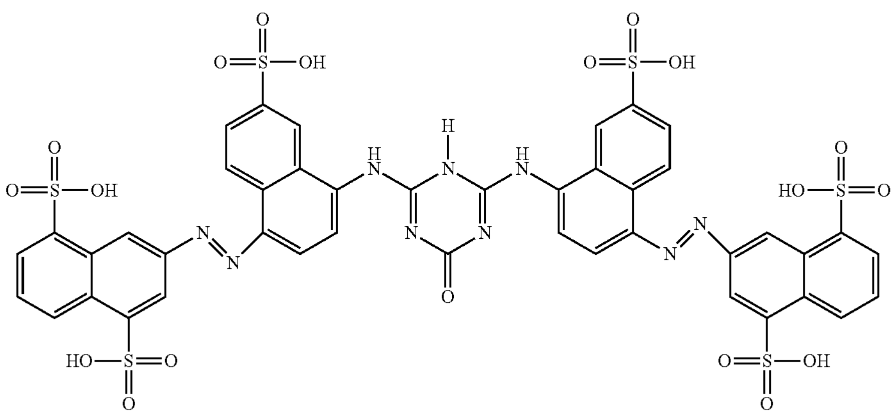
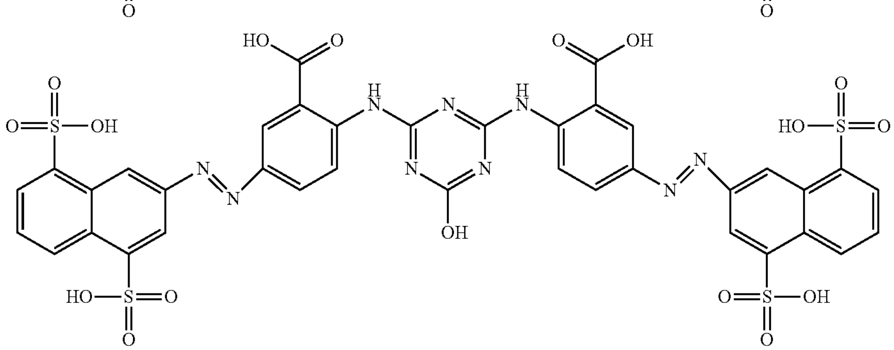

-continued

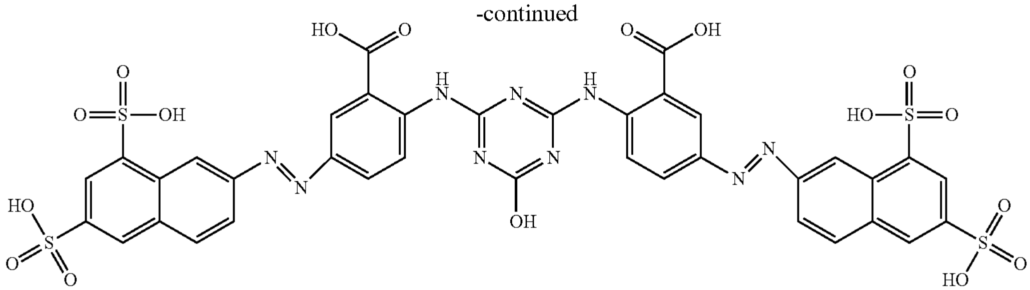

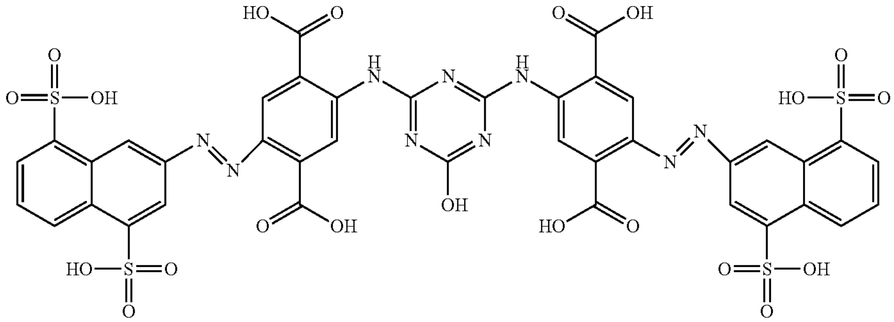

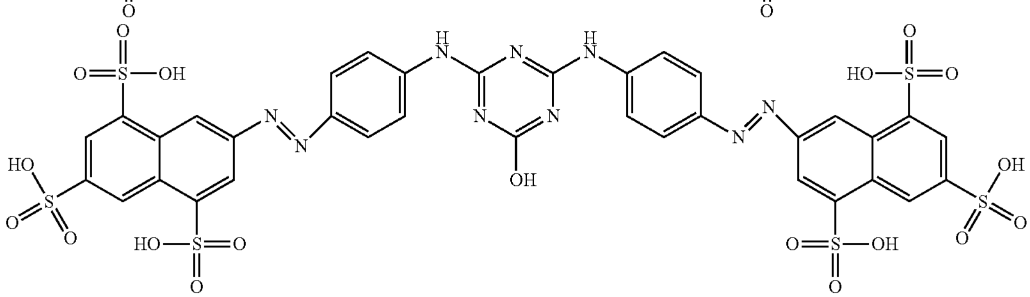

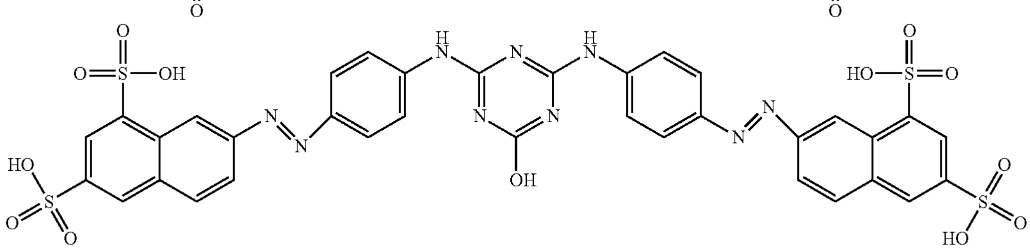

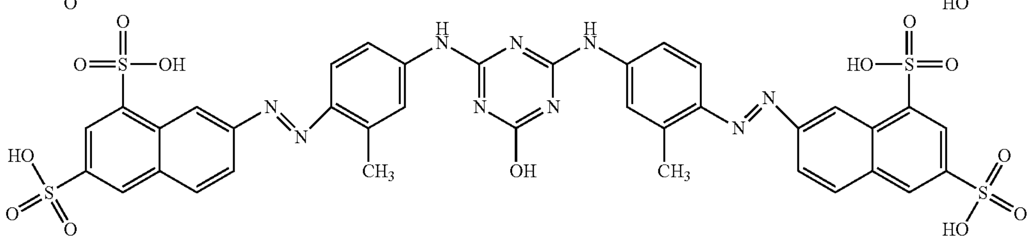

The coloring material represented by Formula (Y-2) can be synthesized using a general synthesis method and synthesized by changing and combining, for example, diazo components and coupling components described in JP-T-2008-537756.

The content of the coloring material represented by Formula (Y-2) is preferably in the range of 1.0% by mass to 7.0% by mass, more preferably in the range of 2.0% by mass to 6.0% by mass, and still more preferably in the range of 3.0% by mass to 5.0% by mass based on the total amount of the yellow ink. When the content of the coloring material represented by Formula (Y-2) is in the above-described range, an image with excellent tinting strength, light resistance, and hue tends to be obtained.

Magenta Ink

A magenta ink contains one or more kind selected from a group consisting of coloring materials represented by the following Formulae (M-1) and (M-2). It is preferable that the magenta ink contains the coloring materials represented by the following Formulae (M-1) and (M-2). When the magenta ink contains the coloring material represented by the following Formulae (M-1) and (M-2), an image with excellent coloring properties and moisture resistance tends to be obtained. Coloring material represented by formula (M-1)

Hereinafter, the coloring material represented by Formula (M-1) will be described. The coloring material represented by Formula (M-1) may form salts.

(M-1)

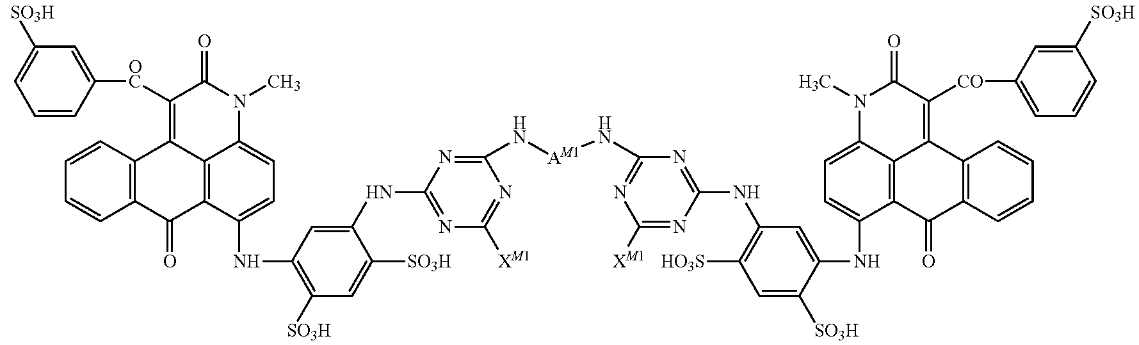

(In Formula (M-1), $A^{M1}$ represents an alkylene group having 1 or 2 carbon atoms, an alkylene group which contains a phenylene group and has 1 or 2 carbon atoms, or a group represented by the following Formula (M-1-1); and $X^{M1}$ represents an amino group, a hydroxy group, a chlorine atom, or a phenoxy group substituted with a sulfo group or a carboxy group.)

(M-1-1)

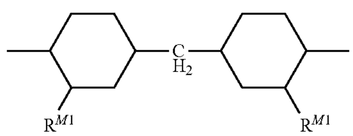

(In Formula (M-1-1), $R^{M1}$ represents a hydrogen atom or an alkyl group.)

In Formula (M-1), $A^{M1}$ represents preferably an alkylene group having 1 or 2 carbon atoms and more preferably an alkylene group having 2 carbon atoms.

In Formula (M-1), $X^{M1}$ represents an amino group, a hydroxy group, a chlorine atom, or a phenoxy group substituted with a sulfo group or a carboxy group. Among these, a phenoxy group substituted with a sulfo group or a carboxy group is preferable and a phenoxy group substituted with a carboxy group is more preferable. A phenoxy group substituted with a carboxy group has an effect of improving moisture resistance and a phenoxy group substituted with two carboxy groups is particularly preferable because the phenoxy group has more excellent moisture resistance.

In Formula (M-1), specific examples of the phenoxy group substituted with a sulfo group or a carboxy group include 4-sulfophenoxy, 2,4-disulfophenoxy, 4-carboxyphenoxy, and 3,5-dicarboxyphenoxy. Among these, 4-carboxyphenoxy and 3,5-dicarboxyphenoxy are preferable and 3,5-dicarboxyphenoxy is more preferable.

Examples of the salts of the compound represented by Formula (M-1) include ammonium salts and alkali metal salts.

The content of the coloring material represented by Formula (M-1) is preferably in the range of 0.5% by mass to 10% by mass, more preferably in the range of 1.0% by mass to 9.0% by mass, and still more preferably in the range of 3.0% by mass to 8.0% by mass based on the total amount of the magenta ink. When the content of the coloring material represented by Formula (M-1) is in the above-described range, an image with excellent coloring properties and moisture resistance tends to be obtained.

Coloring Material Represented by Formula (M-2)

Hereinafter, the coloring material represented by Formula (M-2) will be described below. The coloring material represented by Formula (M-2) may form salts.

(M-2)

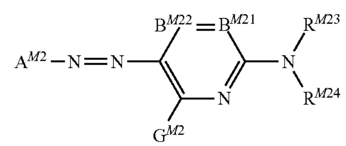

(In Formula (M-2), $A^{M2}$ represents a 5-membered heterocyclic group; $B^{M21}$ and $B^{M22}$ each represents $—CR^{M21}=$ or $—CR^{M22}=$, or one of $B^{M21}$ and $B^{M22}$ represents a nitrogen atom and the other represents $—CR^{M21}=$ or $—CR^{M22}=$; $R^{M23}$ and $R^{M24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group and $R^{M23}$ and $R^{M24}$ may further include a substituent; $G^{M2}$, $R^{M21}$, and $R^{M22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group, or a heterocyclic group, an acylamino group, an ureido group, a sulfamoylamino group, an alkoxycarbonylamino group, an aryloxycarbonylamino group, an alkyl and arylsulfonylamino group, an aryloxycarbonylamino group, a nitro group, an alkyl and arylthio group, an alkyl and arylsulfonyl group, an alkyl and arylsulfinyl group, a sulfamoyl group, a sulfo group, or a heterocyclic thio group and $G^{M2}$, $R^{M21}$, and $R^{M22}$ may be further substituted; and $R^{M21}$ and $R^{M23}$ or $R^{M23}$ and $R^{M24}$ may be bonded to each other to form a 5- or 6-membered ring.)

In Formula (M-2), examples of the 5-membered heterocyclic group include a pyrazole ring, an imidazole ring, a thiazole ring, an isothiazole ring, a thiadiazole ring, a benzothiazole ring, a benzoxazole ring, and a benzoisothiazole ring and each heterocyclic group may further include a substituent. In addition, a pyrazole ring is preferable from among heterocycles.

In Formula (M-2), $R^{M21}$ represents preferably a hydrogen atom or an alkyl group and more preferably a hydrogen atom.

In Formula (M-2), $R^{M22}$ represents preferably an aliphatic group and more preferably a methyl group, an ethyl group, a propyl group which may be branched, or a butyl group which may be branched.

In Formula (M-2), $R^{M23}$ and $R^{M24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. $R^{M23}$ and $R^{M24}$ may further include a substituent.

In Formula (M-2), $R^{M23}$ preferably represents an aromatic group and specific examples thereof include a benzene ring group and a naphthalene ring group. $R^{M24}$ preferably represents a heterocyclic group and specific examples thereof include a benzothiazole ring group.

In Formula (M-2), $G^{M2}$, $R^{M21}$, and $R^{M22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group, or a heterocyclic group, an acylamino group, an ureido group, a sulfamoylamino group, an alkoxycarbonylamino group, an aryloxycarbonylamino group, an alkyl and arylsulfonylamino group, an aryloxycarbonylamino group, a nitro group, an alkyl and arylthio group, an alkyl and arylsulfonyl group, an alkyl and arylsulfinyl group, a sulfamoyl group, a sulfo group, or a heterocyclic thio group. $R^{M23}$ and $R^{M24}$ may be further substituted. In addition, $R^{M21}$ and $R^{M23}$ or $R^{M23}$ and $R^{M24}$ may be bonded to each other to form a 5- or 6-membered ring.

Among the coloring materials represented by Formula (M-2), compounds represented by the following Formula (M-21) are preferable.

(M-21)

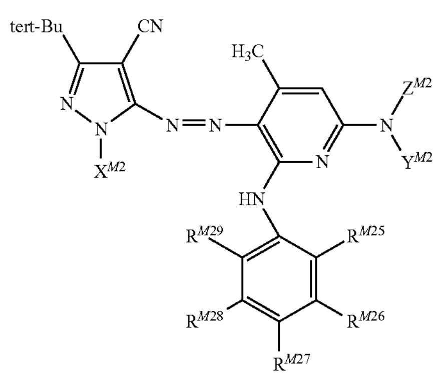

(In Formula (M-21), $R^{M25}$, $R^{M26}$, $R^{M27}$, $R^{M28}$, and $R^{M29}$ each independently represent a hydrogen atom, an alkyl group, a sulfo group, or salts thereof. In Formula (M-21), in a case where both of $R^{M25}$ and $R^{M29}$ represent an alkyl group, the total number of the carbon atoms constituting the alkyl group is 3 or more and substituents may be included therein. $X^{M2}$ represents a hydrogen atom, an aliphatic group, an aromatic group, or a heterocyclic group. $Y^{M2}$ and $Z^{M2}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Each group may further include a substituent. In addition, in a case where $R^{M25}$ to $R^{M29}$ contain a sulfo group, the shape thereof becomes a shape of —$SO_3M$. In this case, M represents preferably an alkali metal atom and more preferably at least one of Li and Na.)

In Formula (M-21), $X^{M2}$ particularly preferably represents an aromatic group, an aliphatic group, or a heterocyclic group and specific examples thereof include a benzene ring, a cyclopentane ring, a cyclohexene ring, a cycloheptane ring, a cyclooctane ring, a cyclohexane ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolan ring, and thian ring. Among these, a heterocycle is more preferable.

In Formula (M-21), preferable specific examples of $Y^{M2}$ and $Z^{M2}$ are the same as those of $R^{M23}$ and $R^{M24}$ in the dye (M-2).

The compound represented by the following Formula (M-22) is particularly preferable from among the compounds represented by Formula (M-21) because the compound represented by the following Formula (M-22) has excellent coloring properties and ozone resistance.

(M-22)

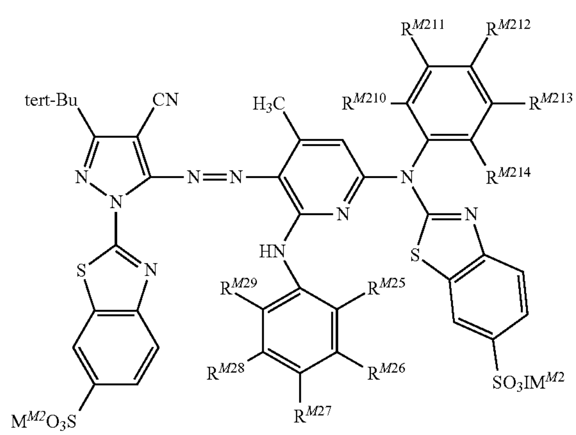

(In Formula (M-22), $R^{M25}$, $R^{M26}$, $R^{M27}$, $R^{M28}$, $R^{M29}$, $R^{M210}$, $R^{M211}$, $R^{M212}$, $R^{M213}$, and $R^{M214}$ each independently represent a hydrogen atom, an alkyl group, a sulfo group, or salts thereof and $M^{M2}$ represents a hydrogen atom or an alkali metal atom. In a case where both of $R^{M25}$ and $R^{M29}$ represent an alkyl group, the total number of the carbon atoms constituting the alkyl group is 3 or more and substituents may be further included therein. In a case where both of $R^{M210}$ and $R^{M214}$ represent an alkyl group, the total number of the carbon atoms constituting the alkyl group is 3 or more and substituents may be further included therein.)

The content of the coloring material represented by Formula (M-2) is preferably in the range of 0.5% by mass to 10% by mass, more preferably in the range of 1.0% by mass to 9.0% by mass, and still more preferably in the range of 3.0% by mass to 8.0% by mass based on the total amount of the magenta ink. When the content of the coloring material represented by Formula (M-2) is in the above-described range, an image with excellent coloring properties and moisture resistance tends to be obtained.

Moreover, in the magenta ink, in a case where the coloring material represented by Formula (M-1) and the coloring material represented by Formula (M-2) are combined to be used, the content ratio of the coloring material represented by Formula (M-1) to the coloring material represented by Formula (M-2) is preferably in the range of 1:2 to 15:1 and more preferably in the range of 5:1 to 13:1. When both dyes are contained at the above-described ratio, moisture resistance and ozone resistance tend to be satisfied at a high level.

In order to adjust the color tone or the like, the magenta ink may contain a magenta-based dye other than dyes described above within a range not significantly damaging respective characteristics in addition to light resistance.

Cyan Ink

A cyan ink contains one or more kinds selected from a group consisting of coloring materials represented by the following Formulae (C-1) and (C-2). It is preferable that the cyan ink contains the coloring materials represented by the following Formulae (C-1) and (C-2). When the coloring materials represented by the following Formulae (C-1) and (C-2) are included and an a-position substitution type coloring material represented by Formula (C-2) and a β-position substitution type coloring material represented by Formula (C-2) are used, the ratio of the a-position to the β-position can be adjusted not within molecules but between molecules and, as a result, an image with excellent fastness properties and high print density tends to be obtained.

Coloring Material Represented by Formula (C-1)

Hereinafter, the coloring material represented by Formula (C-1) will be described below.

(C-1)

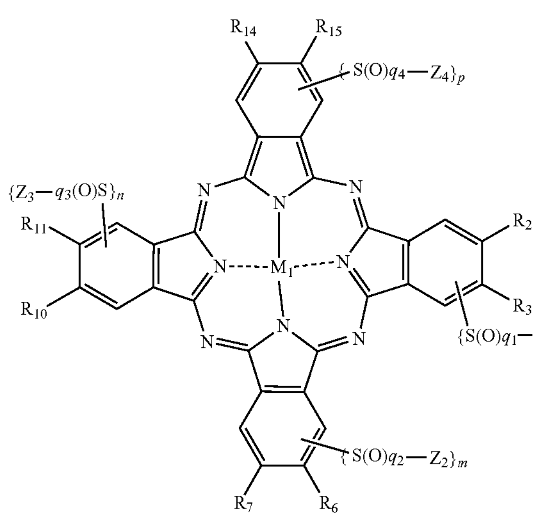

(In Formula (C-1), $R_2$, $R_3$, $R_6$, $R_7$, $R_{10}$, $R_{11}$, $R_{14}$, and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further include a substituent. $Z_1$, $Z_2$, $Z_3$, and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. In this case, at least one of $Z_1$, $Z_2$, $Z_3$, and $Z_4$ includes an ionic hydrophilic group as a substituent. l, m, n, p, $q_1$, $q_2$, $q_3$, and $q_4$ each independently represent 1 or 2. $M_1$ represents a hydrogen atom, a metal atom, a metal oxide, a metal hydroxide, or a metal halide.)

In Formula (C-1), $R_2$, $R_3$, $R_6$, $R_7$, $R_{10}$, $R_{11}$, $R_{14}$, and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further include a substituent. Examples of the substituent are the same as those of the substituent group A described above.

In Formula (C-1), examples of the halogen atom represented by $R_2$, $R_3$, $R_6$, $R_7$, $R_{10}$, $R_{11}$, $R_{14}$, and $R_{15}$ include a fluorine atom, a chlorine atom, and a bromine atom.

In Formula (C-1), the alkyl group represented by $R_2$, $R_3$, $R_6$, $R_7$, $R_{10}$, $R_{11}$, $R_{14}$, and $R_{15}$ contains an alkyl group having a substituent and an unsubstituted alkyl group. As the alkyl group, an alkyl group having 1 to 12 carbon atoms when a substituent is removed is preferable. Examples of the substituent include a hydroxyl group, an alkoxy group, a cyano group, a halogen atom, and an ionic hydrophilic group. Examples of the alkyl group include methyl, ethyl, butyl, isopropyl, t-butyl, hydroxyethyl, methoxyethyl, cyanomethyl, trifluoromethyl, 3-sulfopropyl, and 4-sulfobutyl.

In Formula (C-1), the cycloalkyl group represented by $R_2$, $R_3$, $R_6$, $R_7$, $R_{10}$, $R_{11}$, $R_{10}$, and $R_{15}$ contains a cycloalkyl group having a substituent and an unsubstituted cycloalkyl group. As the cycloalkyl group, a cycloalkyl group having 5 to 12 carbon atoms when a substituent is removed is preferable. Examples of the substituent include an ionic hydrophilic group. Examples of the cycloalkyl group include a cyclohexyl group.

In Formula (C-1), the alkenyl group represented by $R_2$, $R_3$, $R_6$, $R_7$, $R_{10}$, $R_{11}$, $R_{14}$, and $R_{15}$ contains an alkenyl group having a substituent and an unsubstituted alkenyl group. As the alkenyl group, an alkenyl group having 2 to 12 carbon atoms when a substituent is removed is preferable. Examples of the substituent include an ionic hydrophilic group. Examples of the alkenyl group include a vinyl group and an allyl group.

In Formula (C-1), the aralkyl group represented by $R_2$, $R_3$, $R_6$, $R_7$, $R_{10}$, $R_{11}$, $R_{14}$, and $R_{15}$ contains an aralkyl group having a substituent and an unsubstituted aralkyl group. As the aralkyl group, an aralkyl group having 7 to 12 carbon atoms when a substituent is removed is preferable.

Examples of the substituent include an ionic hydrophilic group. Examples of the aralkyl group include a benzyl group and a 2-phenethyl group.

In Formula (C-1), the aryl group represented by $R_2$, $R_3$, $R_6$, $R_7$, $R_{10}$, $R_{11}$, $R_{14}$, and $R_{15}$ contains an aryl group having a substituent and an unsubstituted aryl group. As the aryl group, an aryl group having 6 to 12 carbon atoms when a substituent is removed is preferable. Examples of the substituent include an alkyl group, an alkoxy group, a halogen atom, an alkylamino group, and an ionic hydrophilic group. Examples of the aryl group include phenyl, p-tolyl, p-methoxyphenyl, o-chlorophenyl, and m-(3-sulfopropylamino) phenyl.

In Formula (C-1), the heterocyclic group represented by $R_2$, $R_3$, $R_6$, $R_7$, $R_{10}$, $R_{11}$, $R_{14}$, and $R_{15}$ contains a heterocyclic group having a substituent and an unsubstituted heterocyclic group. As the heterocyclic group, a 5- or 6-membered heterocyclic group is preferable. Examples of the substituent include an ionic hydrophilic group. Examples of the heterocyclic group include a 2-pyridyl group, a 2-thienyl group, and a 2-furyl group.

In Formula (C-1), the alkylamino group represented by $R_2$, $R_3$, $R_6$, $R_7$, $R_{10}$, $R_{11}$, $R_{14}$, and $R_{15}$ contains an alkylamino group having a substituent and an unsubstituted alkylamino group. As the alkylamino group, an alkylamino group having 1 to 6 carbon atoms when a substituent is removed is preferable. Examples of the substituent include an ionic hydrophilic group. Examples of the alkylamino group include a methylamino group and a diethylamino group.

In Formula (C-1), the alkoxy group represented by $R_2$, $R_3$, $R_6$, $R_7$, $R_{10}$, $R_{11}$, $R_{14}$, and $R_{15}$ contains an alkoxy group having a substituent and an unsubstituted alkoxy group. As the alkoxy group when a substituent is removed, an alkoxy group having 1 to 12 carbon atoms is preferable. Examples of the substituent include an alkoxy group, a hydroxyl group, and an ionic hydrophilic group. Examples of the alkoxy group include a methoxy group, an ethoxy group, an isopropoxy group, a methoxyethoxy group, a hydroxyethoxy group, and a 3-carboxypropoxy group.

In Formula (C-1), the aryloxy group represented by $R_2$, $R_3$, $R_6$, $R_7$, $R_{10}$, $R_{11}$, $R_{14}$, and $R_{15}$ contains an aryloxy group having a substituent and an unsubstituted aryloxy group. As the aryloxy group, an aryloxy group having 6 to 12 carbon atoms when a substituent is removed is preferable. Examples of the substituent include an alkoxy group and an ionic hydrophilic group. Examples of the aryloxy group include a phenoxy group, a p-methoxyphenoxy group, and an o-methoxyphenoxy group.

In Formula (C-1), the amide group represented by $R_2$, $R_3$, $R_6$, $R_7$, $R_{10}$, $R_{11}$, $R_{14}$, and $R_{15}$ contains an amide group having a substituent and an unsubstituted amide group. As the amide group, an amide group having 2 to 12 carbon atoms when a substituent is removed is preferable. Examples of the substituent include an ionic hydrophilic group. Examples of the amide group include an acetamide group, a propionamide group, a benzamide group, and a 3,5-disulfobenzamide group.

In Formula (C-1), the arylamino group represented by $R_2$, $R_3$, $R_6$, $R_7$, $R_{10}$, $R_{11}$, $R_{14}$, and $R_{15}$ contains an arylamino group having a substituent and an unsubstituted arylamino group. As the arylamino group, an arylamino group having 6 to 12 carbon atoms when a substituent is removed is preferable. Examples of the substituent include a halogen atom and an ionic hydrophilic group. Examples of the arylamino group include an aniline group and a 2-chloroanilino group.

In Formula (C-1), the ureido group represented by $R_2$, $R_3$, $R_6$, $R_7$, $R_{10}$, $R_{11}$, $R_{14}$, and $R_{15}$ contains an ureido group having a substituent and an unsubstituted ureido group. As the ureido group, an ureido group having 1 to 12 carbon atoms when a substituent is removed is preferable. Examples of the substituent include an alkyl group and an aryl group. Examples of the ureido group include a 3-methylureido group, a 3,3-dimethylureido group, and a 3-phenylureido group.

In Formula (C-1), the sulfamoylamino group represented by $R_2$, $R_3$, $R_6$, $R_7$, $R_{10}$, $R_{11}$, $R_{14}$, and $R_{15}$ contains a sulfamoylamino group having a substituent and an unsubstituted sulfamoylamino group. Examples of the substituent include an alkyl group. As the sulfamoylamino group, a N,N-dipropylsulfamoylamino group is exemplified.

In Formula (C-1), the alkylthio group represented by $R_2$, $R_3$, $R_6$, $R_7$, $R_{10}$, $R_{11}$, $R_{14}$, and $R_{15}$ contains an alkylthio group having a substituent and an unsubstituted alkylthio group. As the alkylthio group, an alkylthio group having 1 to 12 carbon atoms when a substituent is removed is preferable. Examples of the substituent include an ionic hydrophilic group. Examples of the alkylthio group include a methylthio group and an ethylthio group.

In Formula (C-1), the arylthio group represented by $R_2$, $R_3$, $R_6$, $R_7$, $R_{10}$, $R_{11}$, $R_{14}$, and $R_{15}$ contains an arylthio group having a substituent and an unsubstituted arylthio group. As the arylthio group, an arylthio group having 6 to 12 carbon atoms when a substituent is removed is preferable. Examples of the substituent include an alkyl group and an ionic hydrophilic group. Examples of the arylthio group include a phenylthio group and a p-tolylthio group.

In Formula (C-1), the alkoxycarbonylamino group represented by $R_2$, $R_3$, $R_6$, $R_7$, $R_{10}$, $R_{11}$, $R_{14}$, and $R_{15}$ contains an alkoxycarbonylamino group having a substituent and an unsubstituted alkoxycarbonylamino group. As the alkoxycarbonylamino group, an alkoxycarbonylamino group having 2 to 12 carbon atoms when a substituent is removed is preferable. Examples of the substituent include an ionic hydrophilic group. Examples of the alkoxycarbonylamino group include an ethoxycarbonylamino group.

In Formula (C-1), the sulfonamide group represented by $R_2$, $R_3$, $R_6$, $R_7$, $R_{10}$, $R_{11}$, $R_{14}$, and $R_{15}$ contains a sulfonamide group having a substituent and an unsubstituted sulfonamide group. As the sulfonamide group, a sulfonamide group having 1 to 12 carbon atoms when a substituent is removed is preferable. Examples of the substituent include an ionic hydrophilic group. Examples of the sulfonamide group include methanesulfonamide, a bezenesulfonamide, and 3-carboxybenzenesulfonamide.

In Formula (C-1), the carbamoyl group represented by $R_2$, $R_3$, $R_6$, $R_7$, $R_{10}$, $R_{11}$, $R_{14}$, and $R_{15}$ contains a carbamoyl group having a substituent and an unsubstituted carbamoyl group. Examples of the substituent include an alkyl group. As the carbamoyl group, a methylcarbamoyl group or a dimethylcarbamoyl group is exemplified.

In Formula (C-1), the sulfamoyl group represented by $R_2$, $R_3$, $R_6$, $R_7$, $R_{10}$, $R_{11}$, $R_{14}$, and $R_{15}$ contains a sulfamoyl group having a substituent and an unsubstituted sulfamoyl group. Examples of the substituent include an alkyl group and an aryl group. As the sulfamoyl group, a dimethylsulfamoyl group, a di-(2-hydroxyethyl)sulfamoyl group, and a phenylsulfamoyl group.

In Formula (C-1), the alkoxycarbonyl group represented by $R_2$, $R_3$, $R_6$, $R_7$, $R_{10}$, $R_{11}$, $R_{14}$, and $R_{15}$ contains an alkoxycarbonyl group having a substituent and an unsubstituted alkoxycarbonyl group. As the alkoxycarbonyl group, an alkoxycarbonyl group having 2 to 12 carbon atoms when a substituent is removed is preferable. Examples of the substituent include an ionic hydrophilic group. Examples of the alkoxycarbonyl group include a methoxycarbonyl group and an ethoxycarbonyl group.

In Formula (C-1), the heterocyclic oxy group represented by $R_2$, $R_3$, $R_6$, $R_7$, $R_{10}$, $R_{11}$, $R_{14}$, and $R_{15}$ contains a heterocyclic oxy group having a substituent and an unsubstituted heterocyclic oxy group. As the heterocyclic oxy group, a heterocyclic oxy group having a 5- or 6-membered hetero ring is preferable. Examples of the substituent include a hydroxyl group and an ionic hydrophilic group. Examples of the heterocyclic oxy group include a 2-tetrahydropyranyloxy group.

In Formula (C-1), the azo group represented by $R_2$, $R_3$, $R_6$, $R_7$, $R_{10}$, $R_{11}$, $R_{14}$, and $R_{16}$ contains an azo group having a substituent and an unsubstituted azo group. As the azo group, a p-nitrophenylazo group is exemplified.

In Formula (C-1), the acyloxy group represented by $R_2$, $R_3$, $R_6$, $R_7$, $R_{10}$, $R_{11}$, $R_{14}$, and $R_{15}$ contains an acyloxy group having a substituent and an unsubstituted acyloxy group. As the acyloxy group, an acyloxy group having 1 to 12 carbon atoms when a substituent is removed is preferable. Examples of the substituent include an ionic hydrophilic group. Examples of the acyloxy group include an acetoxy group and a benzoyloxy group.

In Formula (C-1), the carbamoyloxy group represented by $R_2$, $R_3$, $R_6$, $R_7$, $R_{10}$, $R_{11}$, $R_{14}$, and $R_{15}$ contains a carbamoyloxy group having a substituent and an unsubstituted carbamoyloxy group. Examples of the substituent include an alkyl group. As the carbamoyloxy group, a N-methylcarbamoyloxy group is exemplified.

In Formula (C-1), the silyloxy group represented by $R_2$, $R_3$, $R_6$, $R_7$, $R_{10}$, $R_{11}$, $R_{14}$, and $R_{15}$ contains a silyloxy group having a substituent and an unsubstituted silyloxy group. Examples of the substituent include an alkyl group. As the silyloxy group, a trimethylsilyloxy group is exemplified.

In Formula (C-1), the aryloxycarbonyl group represented by $R_2$, $R_3$, $R_6$, $R_7$, $R_{10}$, $R_{11}$, $R_{14}$, and $R_{15}$ contains an aryloxycarbonyl group having a substituent and an unsubstituted aryloxycarbonyl group. As the aryloxycarbonyl group, an aryloxycarbonyl group having 7 to 12 carbon atoms when a substituent is removed is preferable. Examples of the substituent include an ionic hydrophilic group. Examples of the aryloxycarbonyl group include a phenoxycarbonyl group.

In Formula (C-1), the aryloxycarbonylamino group represented by $R_2$, $R_3$, $R_6$, $R_7$, $R_{10}$, $R_{11}$, $R_{14}$, and $R_{15}$ contains an aryloxycarbonylamino group having a substituent and an unsubstituted aryloxycarbonylamino group. As the aryloxycarbonylamino group, an aryloxycarbonylamino group having 7 to 12 carbon atoms when a substituent is removed is preferable. Examples of the substituent include an ionic hydrophilic group. Examples of the aryloxycarbonylamino group include a phenoxycarbonylamino group.

In Formula (C-1), the imide group represented by $R_2$, $R_3$, $R_6$, $R_7$, $R_{10}$, $R_{11}$, $R_{14}$, and $R_{15}$ contains an imide group having a substituent and an unsubstituted imide group. As the imide group, a N-phthalimide group or a N-succinimide group is exemplified.

In Formula (C-1), the heterocyclic thio group represented by $R_2$, $R_3$, $R_6$, $R_7$, $R_{10}$, $R_{11}$, $R_{14}$, and $R_{15}$ contains a heterocyclic thio group having a substituent and an unsubstituted heterocyclic thio group. As the heterocyclic thio group, a heterocyclic thio group having a 5- or 6-membered hetero ring is preferable. Examples of the substituent include an ionic hydrophilic group. Examples of the heterocyclic thio group include a 2-pyridylthio group.

In Formula (C-1), the phosphoryl group represented by $R_2$, $R_3$, $R_6$, $R_7$, $R_{10}$, $R_{11}$, $R_{14}$, and $R_{15}$ contains a phosphoryl group having a substituent and an unsubstituted phosphoryl group. As the phosphoryl group, a phenoxyphosphoryl group or a phenylphosphoryl group is exemplified.

In Formula (C-1), the acyl group represented by $R_2$, $R_3$, $R_6$, $R_7$, $R_{10}$, $R_{11}$, $R_{14}$, and $R_{15}$ contains an acyl group having a substituent and an unsubstituted acyl group. As the acyl group, an acyl group having 1 to 12 carbon atoms when a substituent is removed is preferable. Examples of the substituent include an ionic hydrophilic group. As the acyl group, an acetyl group or a benzoyl group is exemplified.

In Formula (C-1), the ionic hydrophilic group represented by $R_2$, $R_3$, $R_6$, $R_7$, $R_{10}$, $R_{11}$, $R_{14}$, and $R_{15}$ contains a sulfo group, a carboxyl group, and a quaternary ammonium group. As the ionic hydrophilic group, a carboxyl group or a sulfo group is preferable and a sulfo group is particularly preferable. The carboxyl group and the sulfo group may be in a state of salts and examples of the counterions forming salts include an alkali metal ion (such as a sodium ion or a potassium ion) and an organic cation (such as a tetramethyl guanidium ion).

In Formula (C-1), $R_2$, $R_3$, $R_6$, $R_7$, $R_{10}$, $R_{11}$, $R_{14}$, and $R_{15}$ represent preferably a hydrogen atom, a halogen atom, an alkyl group, an aryl group, a cyano group, an alkoxy group, an amide group, an ureido group, a sulfonamide group, a carbamoyl group, a sulfamoyl group, and an alkoxycarbonyl group, particularly preferably a hydrogen atom, a halogen atom, and a cyano group, and most preferably a hydrogen atom.

In Formula (C-1), $Z_1$, $Z_2$, $Z_3$, and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. In this case, at least one of $Z_1$, $Z_2$, $Z_3$, and $Z_4$ includes an ionic hydrophilic group as a substituent. Examples of the substituent include the substituents described in the substituent group A described above.

In Formula (C-1), the alkyl group represented by $Z_1$, $Z_2$, $Z_3$, and $Z_4$ contains an alkyl group having a substituent and an unsubstituted alkyl group. As the alkyl group, an alkyl group having 1 to 12 carbon atoms when a substituent is removed is preferable. Examples of the substituent include a hydroxyl group, an alkoxy group, a cyano group, an alkylamino group (RNH—, RR'N—), a carbamoyl group (—CONHR), a sulfamoyl group ($—SO_2NHR$, $—SO_2NRR'$), a sulfonylamino group ($—NHSO_2R$), a —SONHR group, a —SONRR' group, a halogen atom, and an ionic hydrophilic group (in addition, R and R' represent an alkyl group and a phenyl group and may include a substituent. Examples of the substituent include an alkylamino group, a hydroxyl group, and an ionic hydrophilic group. R and R' may be chemically bonded to each other to form a ring). Examples of the alkyl group include methyl, ethyl, butyl, n-propyl, isopropyl, t-butyl, hydroxyethyl, methoxyethyl, cyanomethyl, trifluoromethyl, 3-sulfopropyl, and 4-sulfobutyl.

In Formula (C-1), the cycloalkyl group represented by $Z_1$, $Z_2$, $Z_3$, and $Z_4$ contains a cycloalkyl group having a substituent and an unsubstituted cycloalkyl group. As the cycloalkyl group, a cycloalkyl group having 5 to 12 carbon atoms when a substituent is removed is preferable. Examples of the substituent include an ionic hydrophilic group. Examples of the cycloalkyl group include a cyclohexyl group.

In Formula (C-1), the alkenyl group represented by $Z_1$, $Z_2$, $Z_3$, and $Z_4$ contains an alkenyl group having a substituent and an unsubstituted alkenyl group. As the alkenyl group, an alkenyl group having 2 to 12 carbon atoms when a substituent is removed is preferable. Examples of the substituent include an ionic hydrophilic group. Examples of the alkenyl group include a vinyl group and an allyl group.

In Formula (C-1), the aralkyl group represented by $Z_1$, $Z_2$, $Z_3$, and $Z_4$ contains an aralkyl group having a substituent and an unsubstituted aralkyl group. As the aralkyl group, an aralkyl group having 7 to 12 carbon atoms when a substituent is removed is preferable. Examples of the substituent include an ionic hydrophilic group. Examples of the aralkyl group include a benzyl group and a 2-phenethyl group.

In Formula (C-1), the aryl group represented by $Z_1$, $Z_2$, $Z_3$, and $Z_4$ contains an aryl group having a substituent and an unsubstituted aryl group. As the aryl group, an aryl group having 6 to 12 carbon atoms when a substituent is removed is preferable. Examples of the aryl group include phenyl, p-tolyl, p-methoxyphenyl, o-chlorophenyl, m-(3-sulfopropylamino)phenyl, and m-sulfophenyl. Examples of the substituent include an alkyl group (R—), an alkoxy group (RO—), an alkylamino group (RNH—, RR'N—), a carbamoyl group (—CONHR), a sulfamoyl group (—$SO_2$NHR), a sulfonylamino group (—$NHSO_2$R), a halogen atom, and an ionic hydrophilic group (in addition, R and R' represent an alkyl group and a phenyl group and may include an ionic hydrophilic group).

In Formula (C-1), the heterocyclic group represented by $Z_1$, $Z_2$, $Z_3$, and $Z_4$ contains a heterocyclic group having a substituent or an unsubstituted heterocyclic group and may form a condensed ring with another ring. As the heterocyclic group, a 5- or 6-membered heterocyclic group is preferable. The heterocyclic group may further form a condensed ring with another ring. Examples of the heterocyclic group, which do not limit the substitution position of a hetero ring, include imidazole, benzimidazole, pyrazole, benzopyrazole, triazole, thiazole, benzothiazole, isothiazole, benzoisothiazole, oxazole, benzoxazole, thiadiazole, oxadiazole, pyrrole, benzopyrrole, indole, isoxazole, benzoisoxazole, thiophene, benzothiophene, furan, benzofuran, pyridine, quinoline, isoquinoline, pyridazine, pyridizine, pyrazine, cinnoline, phthalazine, quinazoline, quinoxaline, and triazine. Examples of the substituent include an alkyl group (R—), an aryl group (R—), an alkoxy group (RO—), an alkylamino group (RNH—, RR'N—), a carbamoyl group (—CONHR), a sulfamoyl group (—$SO_2$NHR), a sulfonylamino group (—$NHSO_2$R), a sulfonyl group (—$SO_2$R), an acylamino group (—NHCOR), a halogen atom, and an ionic hydrophilic group (in addition, R and R' represent an alkyl group and an aryl group and may further include an ionic hydrophilic group or a substituent having an ionic hydrophilic group).

In Formula (C-1), $Z_1$, $Z_2$, $Z_3$, and $Z_4$ represent preferably a substituted or unsubstituted alkyl group, a substituted or unsubstituted aryl group, or a substituted or unsubstituted heterocyclic group, more preferably a substituted alkyl group, a substituted aryl group, or a substituted heterocyclic group, and still more preferably a substituted alkyl group.

In Formula (C-1), at least one of $Z_1$, $Z_2$, $Z_3$, and $Z_4$ includes an ionic hydrophilic group as a substituent. The ionic hydrophilic group as a substituent contains a sulfo group, a carboxyl group, and a quaternary ammonium group. As the ionic hydrophilic group, a carboxyl group or a sulfo group is preferable and a sulfo group is particularly preferable. The carboxyl group and the sulfo group may be in a state of salts and examples of the counterions forming salts include an alkali metal ion (such as a sodium ion or a potassium ion) and an organic cation (such as a tetramethyl guanidium ion).

In Formula (C-1), l, m, n, and p each independently represent 1 or 2. That is, a relationship of "$4 \leq l+m+n+p \leq 8$" is satisfied. Preferably, a relationship of "$4 \leq l+m+n+p \leq 6$" is satisfied and, most preferably, each of l, m, n, and p represents 1 (l=m=n=p=1).

In Formula (C-1), $q_1$, $q_2$, $q_3$, and $q_4$ each independently represent 1 or 2. Particularly preferably, each of $q_1$, $q_2$, $q_3$, and $q_4$ represents 2 ($q_1=q_2=q_3=q_4=2$).

In Formula (C-1), $M_1$ represents a hydrogen atom, a metal atom, a metal oxide, a metal hydroxide, or a metal halide.

In Formula (C-1), preferable examples of $M_1$ as a metal atom other than a hydrogen atom include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, and Bi. Among these, Cu, Ni, Zn, and Al are particularly preferable and Cu is most preferable. Preferable examples of the metal oxide include VO and GeO. Examples of the metal hydroxide include $Si(OH)_2$, $Cr(OH)_2$, and $Sn(OH)_2$. Further, examples of the metal halide include AlCl, $SiCl_2$, VCl, $VCl_2$, VOCl, FeCl, GaCl, and ZrCl.

The content of the coloring material represented by Formula (C-1) is preferably in the range of 0.050% by mass to 1.0% by mass, more preferably in the range of 0.10% by mass to 0.80% by mass, and still more preferably in the range of 0.20% by mass to 0.60% by mass based on the total amount of the cyan ink. When the content of the coloring material represented by Formula (C-1) is in the above-described range, an image with excellent fastness properties and high print density tends to be obtained.

Coloring Material Represented by Formula (C-2)

Hereinafter, the coloring material represented by Formula (C-2) will be described below.

(C-2)

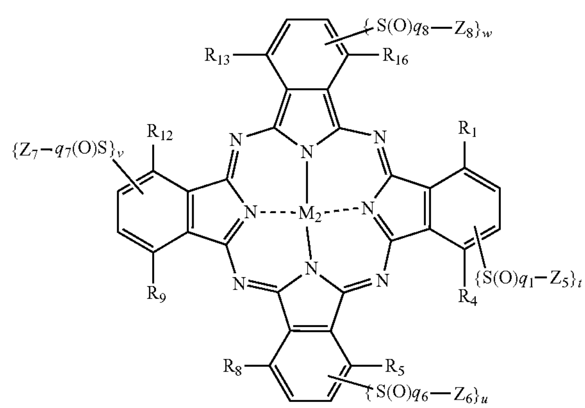

(In Formula (C-2), $R_1$, $R_4$, $R_5$, $R_8$, $R_9$, $R_{12}$, $R_{13}$, and $R_{16}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may include a substituent. $Z_5$, $Z_6$, $Z_7$, and $Z_8$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. In this case, at least one of $Z_5$, $Z_6$, $Z_7$, and $Z_8$ includes an ionic hydrophilic group as a substituent. t, u, v, w, $q_5$, $q_6$, $q_7$, and $q_8$ each independently represent 1 or 2. $M_2$ represents a hydrogen atom, a metal atom, a metal oxide, a metal hydroxide, or a metal halide.)

In Formula (C-2), $R_1$, $R_4$, $R_5$, $R_8$, $R_9$, $R_{12}$, $R_{13}$, and $R_{16}$ each independently have the same definitions as $R_2$, $R_3$, $R_6$, $R_7$, $R_{10}$, $R_{11}$, $R_{14}$, and $R_{15}$ in Formula (C-1).

In Formula (C-2), $Z_5$, $Z_6$, $Z_7$, and $Z_8$ each independently have the same definitions as $Z_1$, $Z_2$, $Z_3$, and $Z_4$ in Formula (C-1).

In Formula (C-2), t, u, v, w, $q_5$, $q_6$, $q_7$, and $q_8$ each independently represent 1 or 2.

In Formula (C-2), $M_2$ has the same definition as $M_1$ in Formula (C-1).

In Formula (C-2), $R_1$, $R_4$, $R_5$, $R_8$, $R_9$, $R_{12}$, $R_{13}$, and $R_{16}$ each independently have the same definitions as $R_2$, $R_3$, $R_6$, $R_7$ $R_{10}$, $R_{11}$, $R_{14}$, and $R_{15}$ in Formula (C-1), represent preferably a hydrogen atom, a halogen atom, an alkyl group, an aryl group, a cyano group, an alkoxy group, an amide group, an ureido group, a sulfonamide group, a carbamoyl group, a sulfamoyl group, and an alkoxycarbonyl group, particularly preferably a hydrogen atom, a halogen atom, and a cyano group, and most preferably a hydrogen atom. These groups may further include a substituent. Examples of the substituent include the substituents described in the substituent group A described above.

In Formula (C-2), $Z_5$, $Z_6$, $Z_7$, and $Z_8$ each independently have the same definitions as $Z_1$, $Z_2$, $Z_3$, and $Z_4$ in Formula (C-1).

In Formula (C-2), $Z_5$, $Z_6$, $Z_7$, and $Z_8$ represent preferably a substituted or unsubstituted alkyl group, a substituted or unsubstituted aryl group, or a substituted or unsubstituted heterocyclic group, more preferably a substituted alkyl group, a substituted aryl group, and a substituted heterocyclic group, and still more preferably a substituted alkyl group. In addition, it is most preferable that at least one of substituents included in the substituted alkyl group is a —SONHR group from a viewpoint of ozone fastness.

In Formula (C-2), the ionic hydrophilic group included in at least one of $Z_5$, $Z_6$, $Z_7$, and $Z_8$ as a substituent has the same definition as the ionic hydrophilic group included in the $Z_1$, $Z_2$, $Z_3$, and $Z_4$ in Formula (C-1) as a substituent and the same applies to the preferable ones.

In Formula (C-2), t, u, v and w each independently represent 1 or 2. That is, a relationship of "$4 \le t+u+v+w \le 8$" is satisfied. Preferably, a relationship of "$4 \le t+u+v+w \le 6$" is satisfied and, most preferably, each of t, u, v, and w represents 1 (t=u=v=w=1).

In Formula (C-2), $q_5$, $q_6$, $q_7$, and $q_8$ each independently represent 1 or 2. Particularly preferably, each of $q_5$, $q_6$, $q_7$, and $q_8$ represents 2 ($q_5=q_6=q_7=q_8=2$) each.

In Formula (C-2), $M_2$ has the same definition as $M_1$ in Formula (C-1) and the same applies to the preferable ones.

The content of the coloring material represented by Formula (C-2) is preferably in the range of 2.5% by mass to 7.5% by mass, more preferably in the range of 3.0% by mass to 5.0% by mass, and still more preferably in the range of 3.5% by mass to 4.5% by mass based on the total amount of the cyan ink. When the content of the coloring material represented by Formula (C-2) is in the above-described range, an image with excellent fastness properties and high print density tends to be obtained.

The coloring materials represented by Formulae (C-1) and (C-2) can be synthesized using a method which is described or cited in "*Phthalocyanines-Chemistry and Functions*—" (p. 1 to 62) coauthored by Shirai and Kobayashi, published by IPC Co., Ltd., and "*Phthalocyanines Properties and Applications*" (p. 1 to 54) coauthored by C. C. Leznoff and A. B. P. Lever, published by VCH or using a method similar to those.

Hereinafter, an example of synthesis of the coloring materials represented by Formula (C-2) will be described. A compound in which $R_1$, $R_4$, $R_5$, $R_8$, $R_9$, $R_{12}$, $R_{13}$, and $R_{16}$ from among coloring materials represented by Formula (C-2) represent hydrogen and $q_5$, $q_6$, $q_7$, and $q_8$ from among coloring materials represented by Formula (C-2) represent 2 can be synthesized by reacting a phthalonitrile derivative represented by the following Formula (C-2-1) and/or a diiminoisoindoline derivative represented by the following Formula (C-2-2) and a metal derivative represented by the following Formula M-(Y)-d.

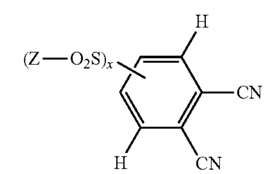

(C-2-1)

&/or

M—(Y)d →

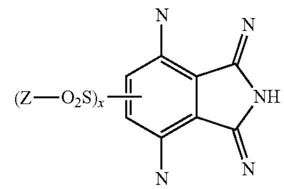

(C-2-2)

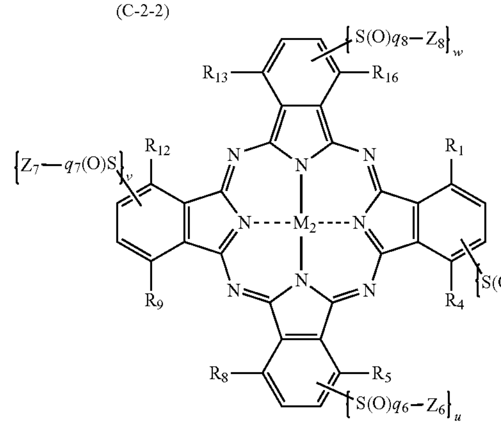

(C-2)

In Formula (C-2-1) and/or Formula (C-2-2), x has the same definition as t, u, v, and w in Formula (C-2). Z represents a substituent corresponding to $Z_5$, $Z_6$, $Z_7$, and $Z_8$.

Y represents a monovalent or divalent ligand such as a halogen atom, an acetic acid anion, acetyl acetate, or oxygen, and d represents an integer of 1 to 4.

Examples of the metal derivative represented by M-(Y)d include a halide such as Al, Si, Ti, V, Mn, Fe, Co, Ni, Cu, Zn, Ge, Ru, Rh, Pd, In, Sn, Pt, or Pb, a carboxylic acid derivative, sulfate, nitrate, a carbonyl compound, an oxide, and a complex. Specific examples thereof include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetate, acetylacetone manganese, manganese chloride, lead chloride, lead acetate, indium chloride, titanium chloride, and tin chloride.

From among the coloring materials represented by Formula (C-2), a phthalocyanine compound (for example, t=u=v=w=1) in which $R_1$, $R_4$, $R_5$, $R_8$, $R_9$, $R_{12}$, $R_{13}$, and $R_{16}$ represent hydrogen and $q_5$, $q_6$, $q_7$, and $q_8$ represent 2 is generally a mixture of compounds represented by the following Formulae (a)-1 to (a)-4 which are isomers in respective substitution positions of Ra($SO_2$—$Z_5$), Rb($SO_2$—$Z_6$), Rc($SO_2$—$Z_7$), and Rd($SO_2$—$Z_8$).

(C-2-3)

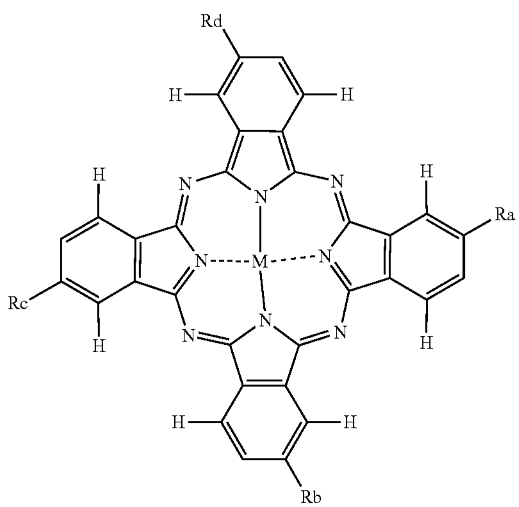

(C-2-4)

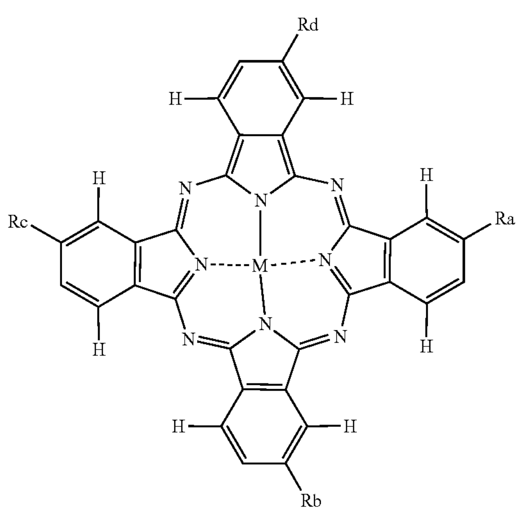

-continued (C-2-5)

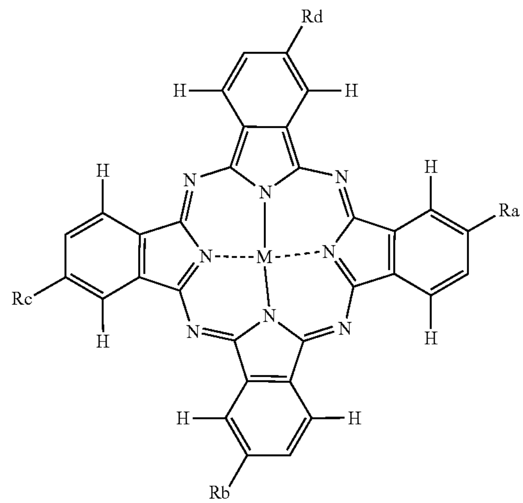

(C-2-6)

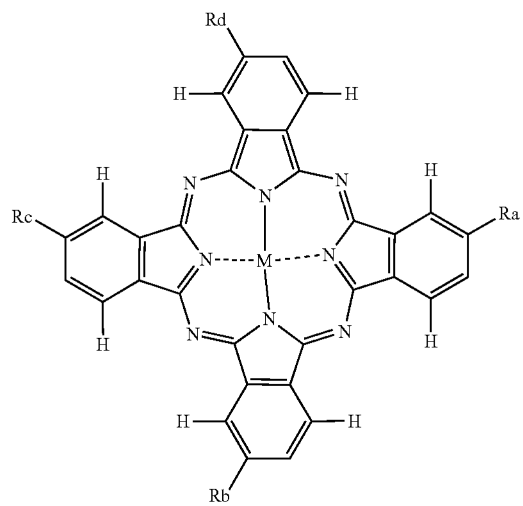

That is, the compound represented by Formulae (C-2-3) to (C-2-6) is a β-position substitution type compound (a phthalocyanine compound which has specific substituents at a 2- and/or 3-position, a 6- and/or 7-position, a 10- and/or 11-position, and a 14- and/or 15-position in a case where $R_1$ to $R_{16}$ in the following Formula (C-2) are set to be at 1- to 16-positions).

The coloring material represented by Formula (C-1) is an α-position substitution type compound (a phthalocyanine compound which has specific substituents at a 1- and/or 4-position, a 5- and/or 8-position, a 9- and/or 12-position, and a 13- and/or 16-position).

The coloring material represented by Formula (C-2) is a β-position substitution type compound (a phthalocyanine compound which has specific substituents at a 2- and/or 3-position, a 6- and/or 7-position, a 10- and/or 11-position, and a 14- and/or 15-position). Even in all substitution types in the present embodiment, from a viewpoint of excellent fastness properties, it is important to have specific substituents represented by —SO—Z and/or —$SO_2$—Z.

Specific examples of the coloring material represented by Formula (C-1) or (C-2) will be described with reference to Formula (C-2-7), but the phthalocyanine dye used in the present embodiment is not limited to the following examples.

(C-2-7)
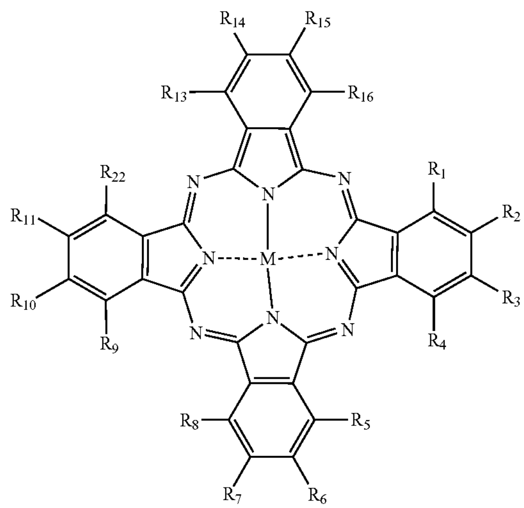
Examples of Coloring Material Represented by Formula (C-1)
Hereinafter, specific examples of respective sets of ($R_1$, $R_4$), ($R_2$, $R_3$), ($R_5$, $R_8$), ($R_6$, $R_7$), ($R_9$, $R_{12}$), ($R_{10}$, $R_{11}$), ($R_{13}$, $R_{16}$), ($R_{14}$, $R_{15}$) are each independently in random order.

| Exemplary Compound | M | $R_1R_4$ | $R_2$ $R_3$ | $R_5R_8$ | $R_6$ R) | $R_9R_{12}$ | $R_{10}$ $R_{11}$ | $R_{13}R_{16}$ | $R_{14}$ $R_{15}$ |
|---|---|---|---|---|---|---|---|---|---|
| 101 | Cu | H, | H, | H, | H, | H, | H, | H, | H, |
| α | | —SO—$(CH_2)_3SO_3Na$ | H | —SO—$(CH_2)_3SO_3Na$ | H | —SO—$(CH_2)_3SO_3Na$ | H | —SO—$(CH_2)_3SO_3Na$ | H |
| 102 | Cu | H, | H, | H, | H, | H, | H, | H, | H, |
| α | | —SO—$(CH_2)_3SO_3Na$ | H | —SO—$(CH_2)_3SO_3Na$ | H | —SO—$(CH_2)_3SO_3Na$ | H | —SO—$(CH_2)_3SO_3Na$ | H |
| 103 | Cu | H, | H, | H, | H, | H, | H, | H, | H, |
| α | | 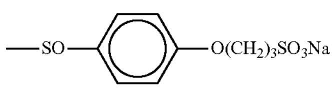 | H | 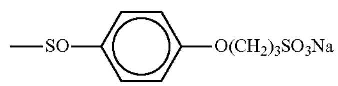 | H | 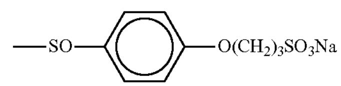 | H | 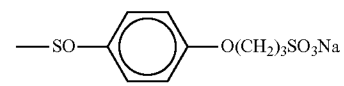 | H |
| 104 | Cu | H, | H, | H, | H, | H, | H, | H, | H, |
| α | | 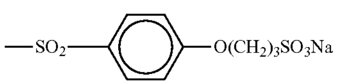 | H | 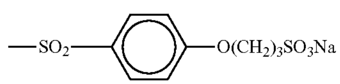 | H | 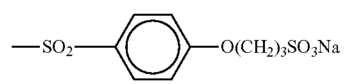 | H | 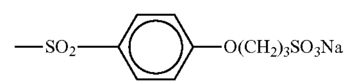 | H |
| 105 | Cu | —SO—$(CH_2)_3SO_3Na$ | H, | —SO—$(CH_2)_3SO_3Na$ | H, | —SO—$(CH_2)_3SO_3Na$ | H, | —SO—$(CH_2)_3SO_3Na$ | H, |
| α | | —SO—$(CH_2)_3SO_3Na$ | H | —SO—$(CH_2)_3SO_3Na$ | H | —SO—$(CH_2)_3SO_3Na$ | H | —SO—$(CH_2)_3SO_3Na$ | H |
| 106 | Cu | —SO—$(CH_2)_3SO_3Na$ | H, | —SO—$(CH_2)_3SO_3Na$ | H, | —SO—$(CH_2)_3SO_3Na$ | H, | —SO—$(CH_2)_3SO_3Na$ | H, |
| α | | —SO—$(CH_2)_3SO_3Na$ | H | —SO—$(CH_2)_3SO_3Na$ | H | —SO—$(CH_2)_3SO_3Na$ | H | —SO—$(CH_2)_3SO_3Na$ | H |

| Exemplary Compound | M | $R_1R_4$ | $R_2R_3$ | $R_5R_8$ | $R_6R_7$ |
|---|---|---|---|---|---|
| 107 α | Cu | H, 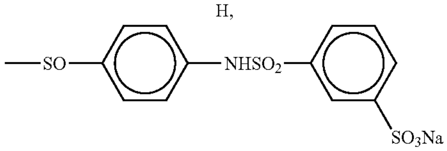 | H, H | H, 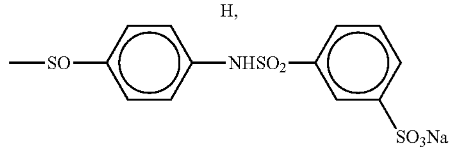 | H, H |
| 108 α | Cu | H, 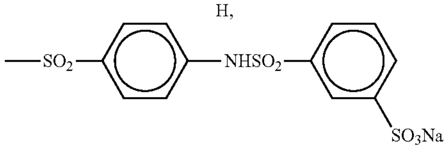 | H, H | H, 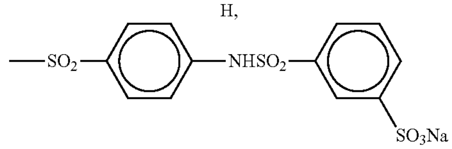 | H, H |
| 109 α | Cu | H, 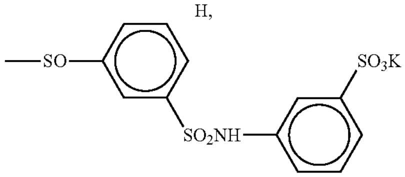 | H, H | H, 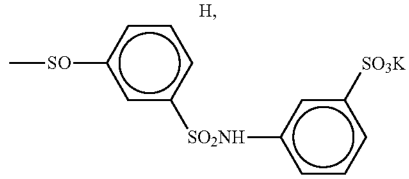 | H, H |
| 110 α | Cu | H, 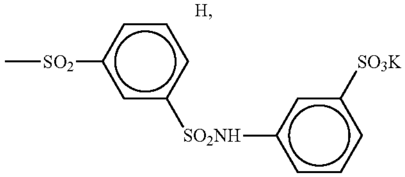 | H, H | H, 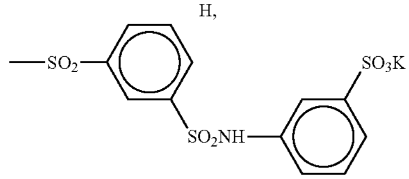 | H, H |
| Exemplary Compound | M | $R_9R_{12}$ | $R_{10}R_{11}$ | $R_{13}R_{16}$ | $R_{14}R_{15}$ |
|---|---|---|---|---|---|
| 107 α | Cu | H, 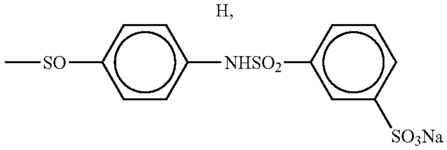 | H, H | H, 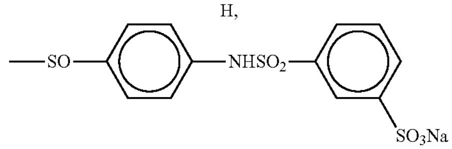 | H, H |
| 108 α | Cu | H, 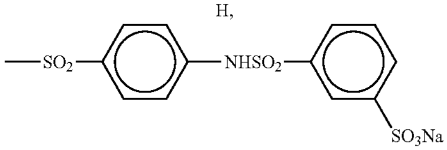 | H, H | H, 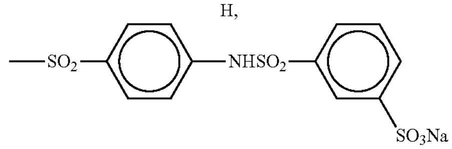 | H, H |
| 109 α | Cu | H, 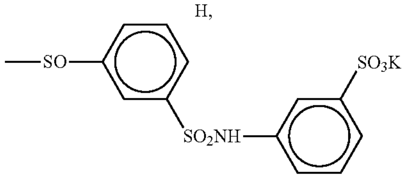 | H, H | H, 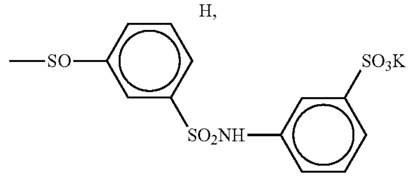 | H, H |
| 110 α | Cu | H, 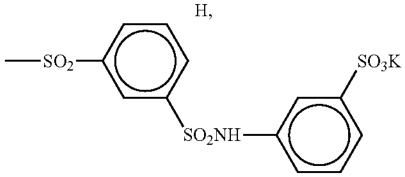 | H, H | H, 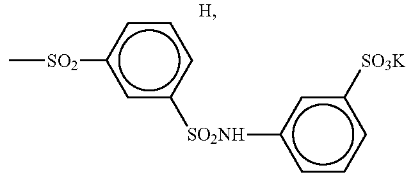 | H, H |

| Exemplary Compound | M | $R_1R_4$ | $R_2$ $R_3$ | $R_5R_8$ | $R_6$ $R_7$ | $R_9R_{12}$ | $R_{10}$ $R_{11}$ | $R_{13}R_{16}$ | $R_{14}$ $R_{15}$ |
|---|---|---|---|---|---|---|---|---|---|
| 111 | Cu | H, | H, | H, | H, | H, | H, | H, | H, |
| α | | 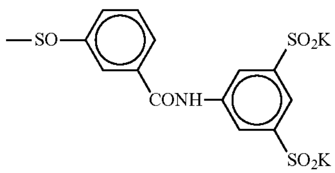 | H | 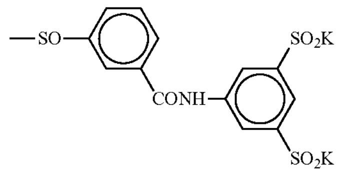 | H | 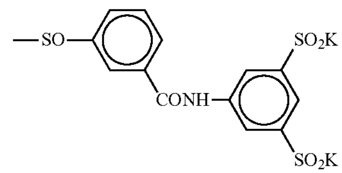 | H | 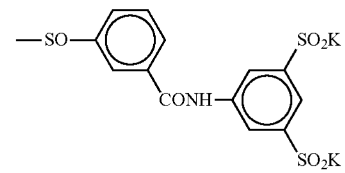 | H |
| 112 | Cu | H, | H, | H, | H, | H, | H, | H, | H, |
| α | | 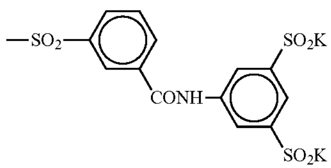 | H | 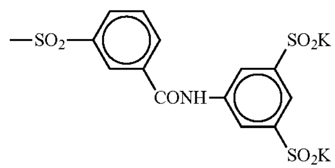 | H | 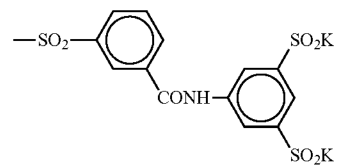 | H | 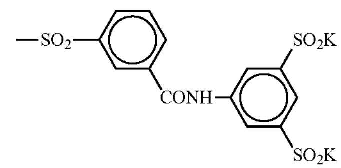 | H |
| 113 | Cu | H, | H, | H, | H, | H, | H, | H, | H, |
| α | | 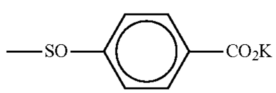 | H | 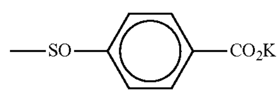 | H | 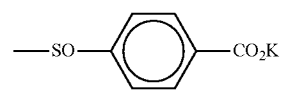 | H | 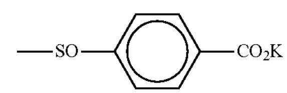 | H |
| 114 | Cu | H, | H, | H, | H, | H, | H, | H, | H, |
| α | | 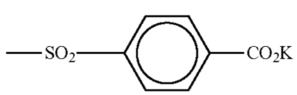 | H | 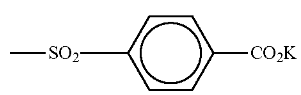 | H | 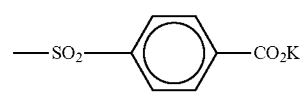 | H | 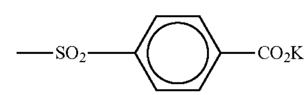 | H |

| Exemplary Compound | M | $R_1R_4$ | $R_2$ $R_3$ | $R_5R_8$ | $R_6$ $R_7$ | $R_9R_{12}$ | $R_{10}$ $R_{11}$ | $R_{13}R_{16}$ | $R_{14}$ $R_{15}$ |
|---|---|---|---|---|---|---|---|---|---|
| 115 | Cu | H, | H, | H, | H, | H, | H, | H, | H, |
| α | | 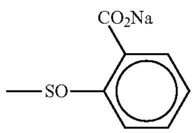 | H | 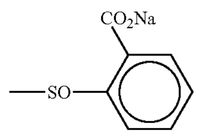 | H | 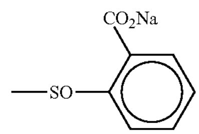 | H | 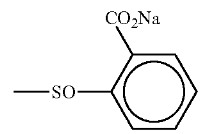 | H |
| 116 | Cu | H, | H, | H, | H, | H, | H, | H, | H, |
| α | | 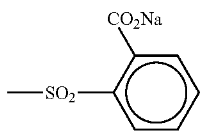 | H | 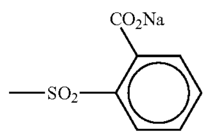 | H | 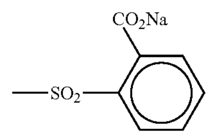 | H | 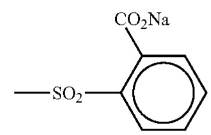 | H |
| 117 | Cu | H, | H, | H, | H, | H, | H, | H, | H, |
| α | | 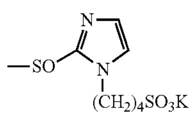 | H | 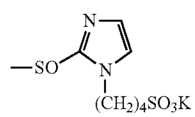 | H | 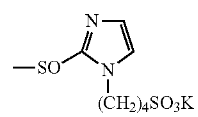 | H | 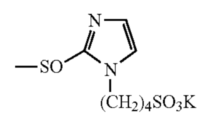 | H |
| 118 | Cu | H, | H, | H, | H, | H, | H, | H, | H, |
| α | | 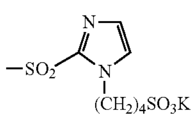 | H | 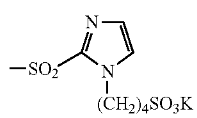 | H | 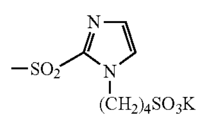 | H | 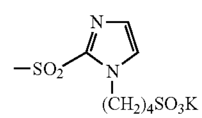 | H |

| Exemplary Compound | M | $R_1R_4$ | $R_2R_3$ | $R_5R_8$ | $R_6R_7$ | $R_9R_{12}$ | $R_{10}R_{11}$ | $R_{13}R_{16}$ | $R_{14}R_{15}$ |
|---|---|---|---|---|---|---|---|---|---|
| 119<br>α | Cu | H,<br>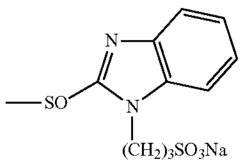 | H,<br>H | H,<br>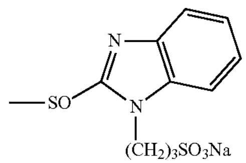 | H,<br>H | H,<br>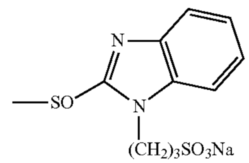 | H,<br>H | H,<br>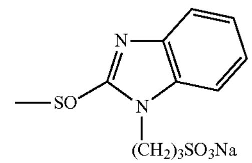 | H,<br>H |
| 120<br>α | Cu | H,<br>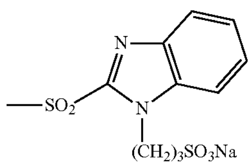 | H,<br>H | H,<br>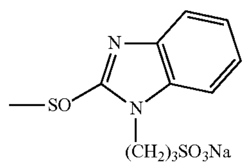 | H,<br>H | H,<br>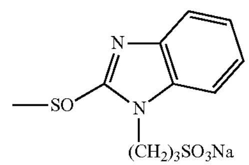 | H,<br>H | H,<br>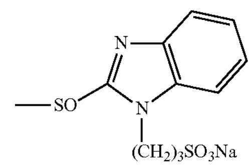 | H,<br>H |
| 121<br>α | Cu | H,<br>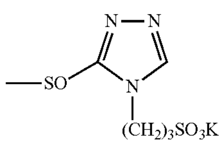 | H,<br>H | H,<br>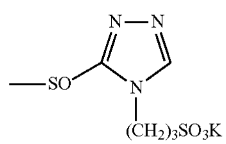 | H,<br>H | H,<br>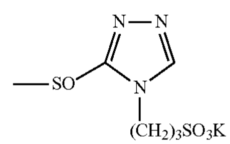 | H,<br>H | H,<br>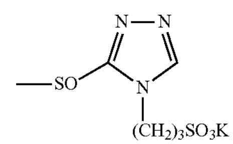 | H,<br>H |
| 122<br>α | Cu | H,<br>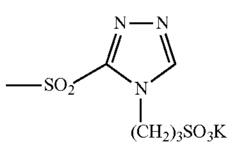 | H,<br>H | H,<br>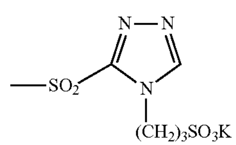 | H,<br>H | H,<br>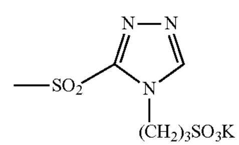 | H,<br>H | H,<br>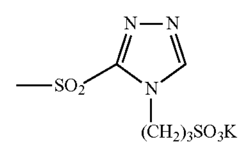 | H,<br>H |

| Exemplary Compound | M | $R_1R_4$ | $R_2R_3$ | $R_5R_8$ | $R_6R_7$ |
|---|---|---|---|---|---|
| 123 α | Cu | H, 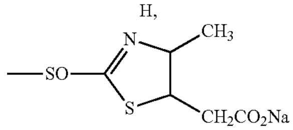 | H, H | H, 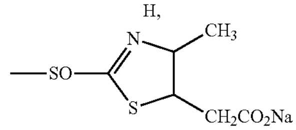 | H, H |
| 124 α | Cu | H, 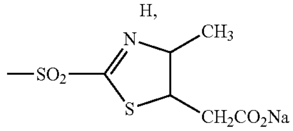 | H, H | H, 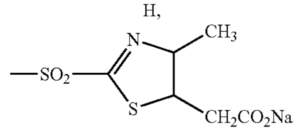 | H, H |
| 125 α | Cu | H, 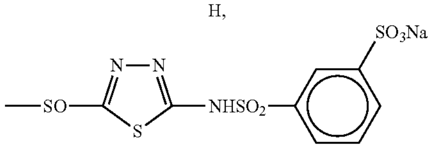 | H, H | H, 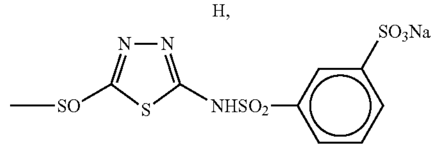 | H, H |
| 126 α | Cu | H, 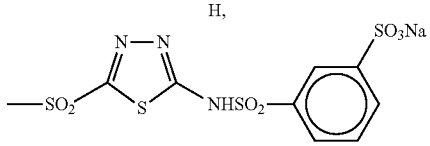 | H, H | H, 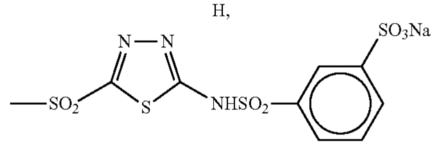 | H, H |
| Exemplary Compound | M | $R_9R_{12}$ | $R_{10}R_{11}$ | $R_{13}R_{16}$ | $R_{14}R_{15}$ |
|---|---|---|---|---|---|
| 123 α | Cu | H, 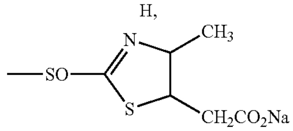 | H, H | H, 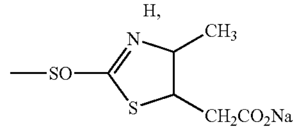 | H, H |
| 124 α | Cu | H, 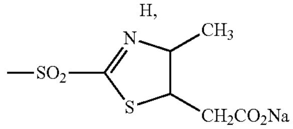 | H, H | H, 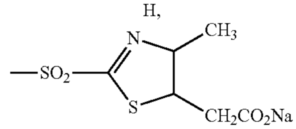 | H, H |
| 125 α | Cu | H, 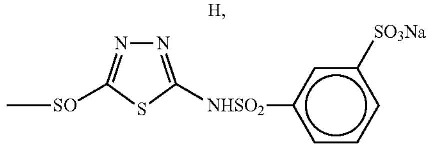 | H, H | H, 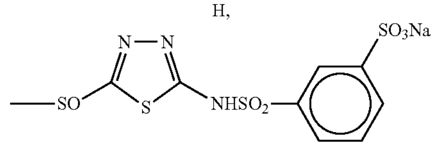 | H, H |
| 126 α | Cu | H, 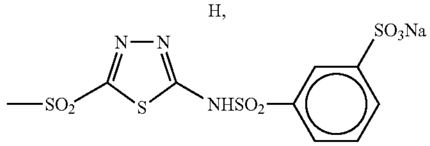 | H, H | H, 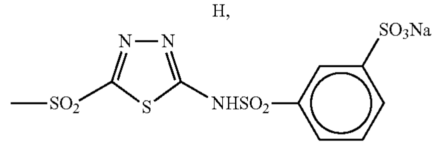 | H, H |
| Exemplary Compound | M | $R_1R_4$ | $R_2R_3$ | $R_5R_8$ | $R_6R_7$ |
|---|---|---|---|---|---|
| 127 α | Cu | H, 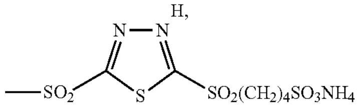 | H, H | H, 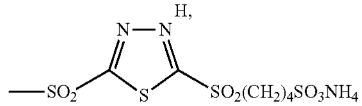 | H, H |

-continued

| | | | | | |
|---|---|---|---|---|---|
| 128 α | Cu | H, 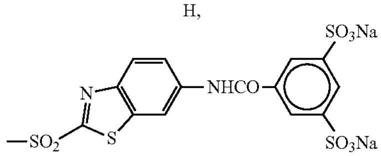 | H, H | H, 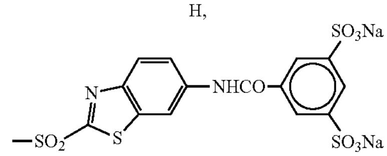 | H, H |
| 129 α | Cu | H, 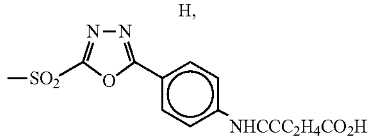 | H, H | H, 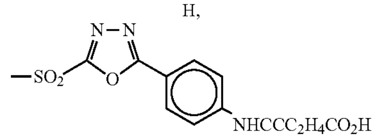 | H, H |
| 130 α | Cu | H, 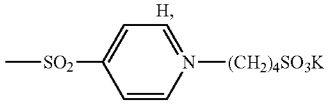 | H, H | H, 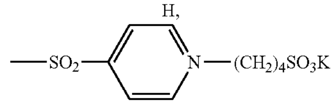 | H, H |

| Exemplary Compound | M | $R_9R_{12}$ | $R_{10}R_{11}$ | $R_{13}R_{16}$ | $R_{14}R_{15}$ |
|---|---|---|---|---|---|
| 127 α | Cu | H, 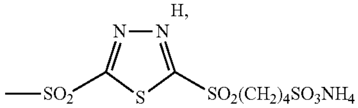 | H, H | H, 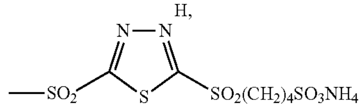 | H, H |
| 128 α | Cu | H, 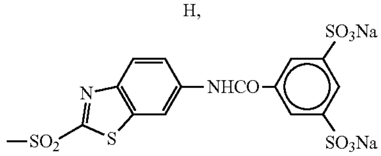 | H, H | H, 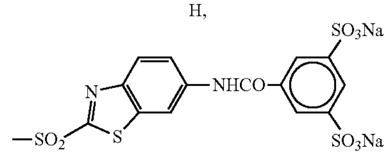 | H, H |
| 129 α | Cu | H, 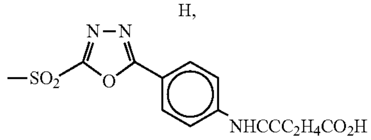 | H, H | H, 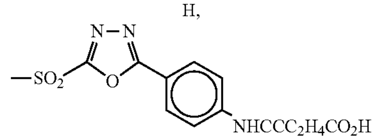 | H, H |
| 130 α | Cu | H, 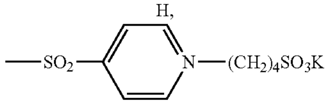 | H, H | H, 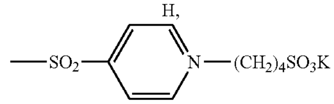 | H, H |

| Exemplary Compound | M | $R_1R_4$ | $R_2$ $R_3$ | $R_5R_8$ | $R_6$ $R_7$ | $R_9R_{12}$ | $R_{10}$ $R_{11}$ | $R_{13}R_{16}$ | $R_{14}$ $R_{15}$ |
|---|---|---|---|---|---|---|---|---|---|
| 134 α | Ni | —$SO_2$—$(CH_2)_3SO_3Na$, —$SO_2$—$(CH_2)_3SO_3Na$, | H, H | —$SO_2$—$(CH_2)_3SO_3Na$, —$SO_2$—$(CH_2)_3SO_3Na$, | H, H | —$SO_2$—$(CH_2)_3SO_3Na$, —$SO_2$—$(CH_2)_3SO_3Na$, | H, H | —$SO_2$—$(CH_2)_3SO_3Na$, —$SO_2$—$(CH_2)_3SO_3Na$, | H, H |
| 135 α | Zn | H, —$SO_2$—$(CH_2)_3SO_3Na$, | H, H | H, —$SO_2$—$(CH_2)_3SO_3Na$, | H, H | H, —$SO_2$—$(CH_2)_3SO_3Na$, | H, H | H, —$SO_2$—$(CH_2)_3SO_3Na$, | H, H |
| 136 α | Zn | H, 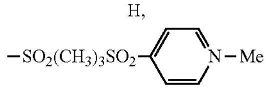 | H, H | H, —$SO_2$—$(CH_2)_3SO_3Na$, | H, H | H, —$SO_2$—$(CH_2)_3SO_3Na$, | H, H | H, —$SO_2$—$(CH_2)_3SO_3Na$, | H, H |
| 137 α | Qu | H, 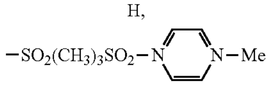 | H, H | H, —$SO_2$—$(CH_2)_3SO_3Na$, | H, H | H, —$SO_2$—$(CH_2)_3SO_3Na$, | H, H | H, —$SO_2$—$(CH_2)_3SO_3Na$, | H, H |

Examples of Coloring Material Represented by Formula (C-2)

Hereinafter, specific examples of respective sets of ($R_1$, $R_4$), ($R_2$, $R_3$), ($R_5$, $R_8$), ($R_6$, $R_7$), ($R_9$, $R_{12}$), ($R_{10}$, $R_{11}$), ($R_{13}$, $R_{16}$), ($R_{14}$, $R_{15}$) are each independently in random order.

| Exemplary Compound | M | $R_1R_4$ | $R_2R_3$ | $R_5R_8$ | $R_6R_7$ |
|---|---|---|---|---|---|
| 101 | Cu | H, | H, | H, | H, |
| β | | H | $—SO—(CH_2)_3SO_3Na$ | H | $—SO—(CH_2)_3SO_3Na$ |
| 102 | Cu | H, | H, | H, | H, |
| β | | H | $—SO_2—(CH_2)_3SO_3Na$ | H | $—SO_2—(CH_2)_3SO_3Na$ |
| 103 | Cu | H, | H, | H, | H, |
| β | | H | 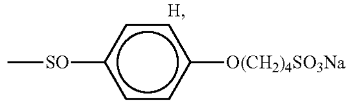 | H | 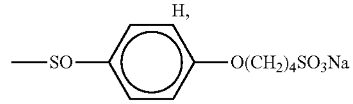 |
| 104 | Cu | H, | H, | H, | H, |
| β | | H | 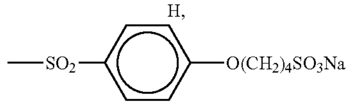 | H | 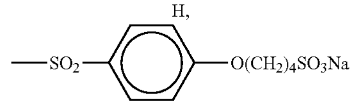 |
| 105 | Cu | H, | $—SO—(CH_2)_3SO_3Na$, | H, | $—SO—(CH_2)_3SO_3Na$, |
| β | | H | $—SO—(CH_2)_3SO_3Na$ | H | $—SO—(CH_2)_3SO_3Na$ |
| 106 | Cu | H, | $—SO_2—(CH_2)_3SO_3Na$, | H, | $—SO_2—(CH_2)_3SO_3Na$, |
| β | | H | $—SO_2—(CH_2)_3SO_3Na$ | H | $—SO_2—(CH_2)_3SO_3Na$ |

| Exemplary Compound | M | $R_9R_{12}$ | $R_{10}R_{11}$ | $R_{13}R_{16}$ | $R_{14}R_{15}$ |
|---|---|---|---|---|---|
| 101 | Cu | H, | H, | H, | H, |
| β | | H | $—SO—(CH_2)_3SO_3Na$ | H | $—SO—(CH_2)_3SO_3Na$ |
| 102 | Cu | H, | H, | H, | H, |
| β | | H | $—SO_2—(CH_2)_3SO_3Na$ | H | $—SO_2—(CH_2)_3SO_3Na$ |
| 103 | Cu | H, | H, | H, | H, |
| β | | H | 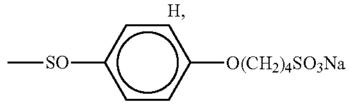 | H | 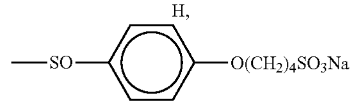 |
| 104 | Cu | H, | H, | H, | H, |
| β | | H | 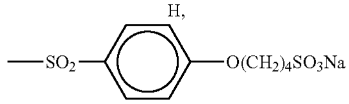 | H | 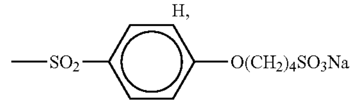 |
| 105 | Cu | H, | $—SO—(CH_2)_3SO_3Na$, | H, | $—SO—(CH_2)_3SO_3Na$, |
| β | | H | $—SO—(CH_2)_3SO_3Na$ | H | $—SO—(CH_2)_3SO_3Na$ |
| 106 | Cu | H, | $—SO_2—(CH_2)_3SO_3Na$, | H, | $—SO_2—(CH_2)_3SO_3Na$, |
| β | | H | $—SO_2—(CH_2)_3SO_3Na$ | H | $—SO_2—(CH_2)_3SO_3Na$ |

| Exemplary Compound | M | $R_1R_4$ | $R_2$ $R_3$ | $R_5R_8$ | $R_6$ $R_7$ | $R_9R_{12}$ | $R_{10}$ $R_{11}$ | $R_{13}R_{16}$ | $R_{14}$ $R_{15}$ |
|---|---|---|---|---|---|---|---|---|---|
| 107 | Cu | H, | H, | H, | H, | H, | H, | H, | H, |
| β | | 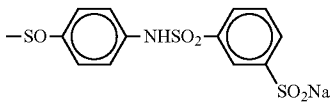  | H | 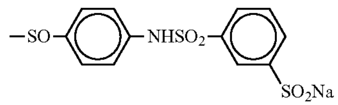  | H | 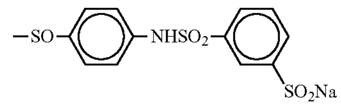  | H | 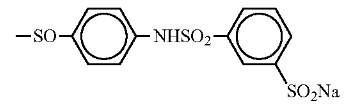  | H |
| 108 | Cu | H, | H, | H, | H, | H, | H, | H, | H, |
| β | | 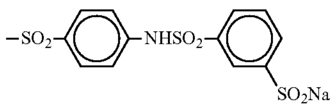  | H | 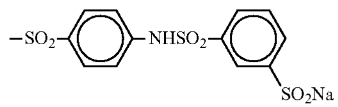  | H | 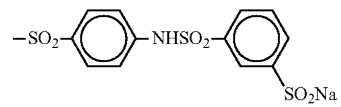  | H | 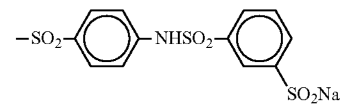  | H |
| 109 | Cu | H, | H, | H, | H, | H, | H, | H, | H, |
| β | | 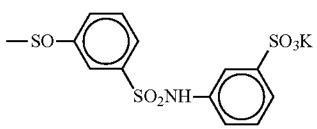  | H | 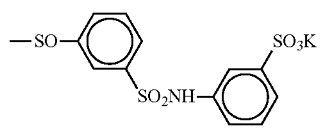  | H | 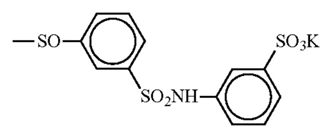  | H | 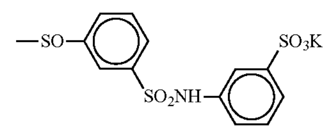  | H |
| 110 | Cu | H, | H, | H, | H, | H, | H, | H, | H, |
| β | | 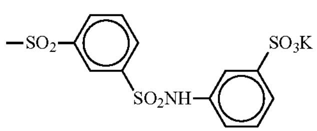  | H | 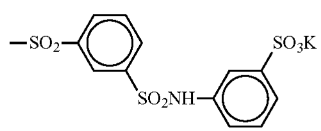  | H | 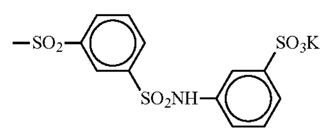  | H | 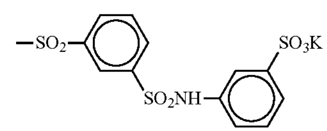  | H |

| Exemplary Compound | M | $R_1$, $R_4$ | $R_2$, $R_3$ | $R_5$, $R_8$ | $R_6$, $R_7$ | $R_9$, $R_{12}$ | $R_{10}$, $R_{11}$ | $R_{13}$, $R_{16}$ | $R_{14}$, $R_{15}$ |
|---|---|---|---|---|---|---|---|---|---|
| 111 β | Cu | H, H | H, 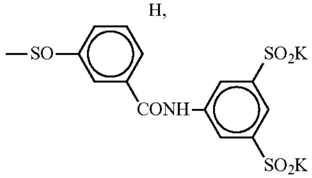 | H, H | H, 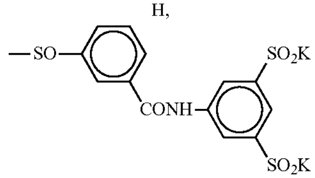 | H, H | H, 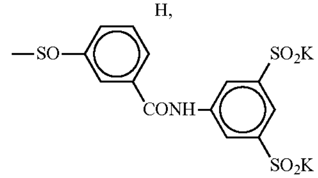 | H, H | H, 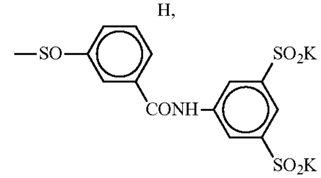 |
| 112 β | Cu | H, H | H, 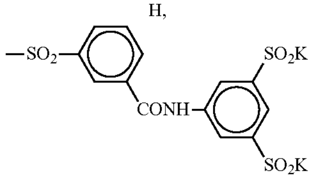 | H, H | H, 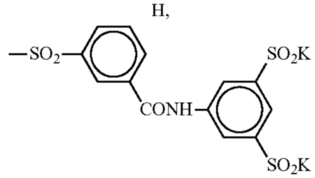 | H, H | H, 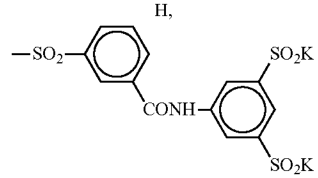 | H, H | H, 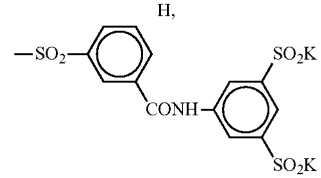 |
| 113 β | Cu | H, H | H, 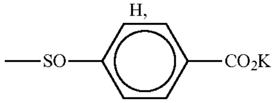 | H, H | H, 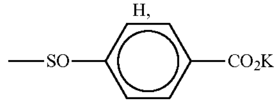 | H, H | H, 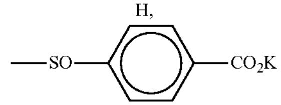 | H, H | H, 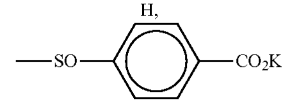 |
| 114 β | Cu | H, H | H, 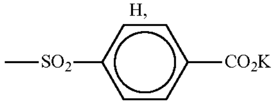 | H, H | H, 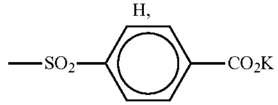 | H, H | H, 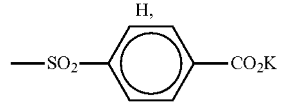 | H, H | H, 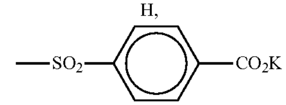 |

| Exemplary Compound | M | $R_1$, $R_4$ | $R_2$, $R_3$ | $R_5$, $R_8$ | $R_6$, $R_7$ | $R_9$, $R_{12}$ | $R_{10}$, $R_{11}$ | $R_{13}$, $R_{16}$ | $R_{14}$, $R_{15}$ |
|---|---|---|---|---|---|---|---|---|---|
| 115 β | Cu | H, H | H,<br>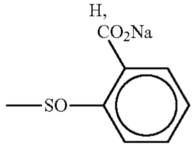 | H, H | H,<br>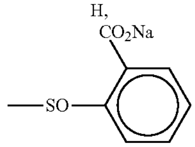 | H, H | H,<br>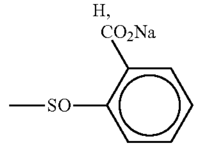 | H, H | H,<br>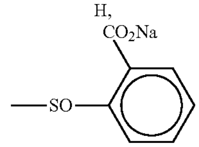 |
| 116 β | Cu | H, H | H,<br>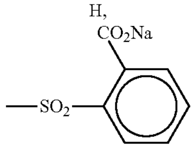 | H, H | H,<br>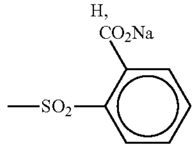 | H, H | H,<br>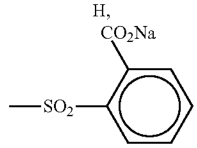 | H, H | H,<br>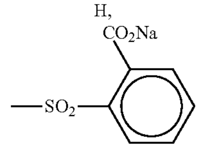 |
| 117 β | Cu | H, H | H,<br>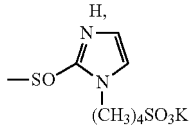 | H, H | H,<br>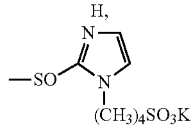 | H, H | H,<br>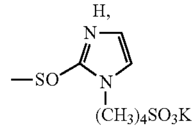 | H, H | H,<br>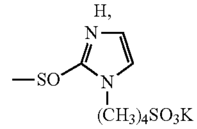 |
| 118 β | Cu | H, H | H,<br>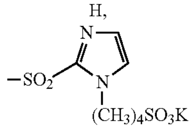 | H, H | H,<br>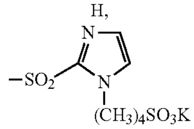 | H, H | H,<br>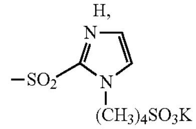 | H, H | H,<br>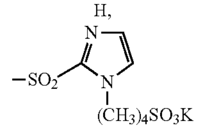 |

| Exemplary Compound | M | $R_1$, $R_4$ | $R_2$, $R_3$ | $R_5$, $R_8$ | $R_6$, $R_7$ | $R_9$, $R_{12}$ | $R_{10}$, $R_{11}$ | $R_{13}$, $R_{16}$ | $R_{14}$, $R_{15}$ |
|---|---|---|---|---|---|---|---|---|---|
| 119 β | Cu | H, H | H,<br>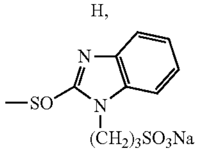 | H, H | H,<br>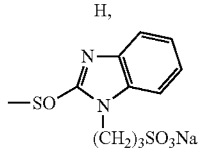 | H, H | H,<br>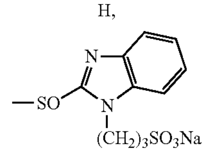 | H, H | H,<br>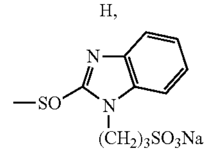 |
| 120 β | Cu | H, H | H,<br>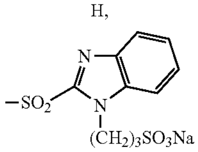 | H, H | H,<br>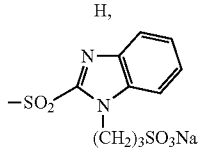 | H, H | H,<br>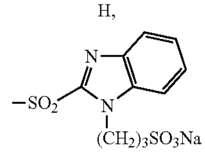 | H, H | H,<br>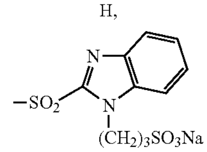 |
| 121 β | Cu | H, H | H,<br>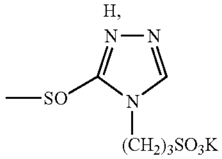 | H, H | H,<br>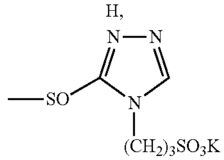 | H, H | H,<br>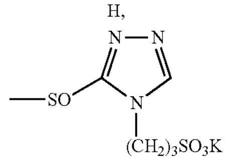 | H, H | H,<br>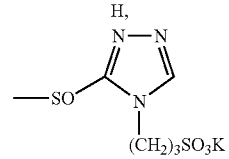 |
| 122 β | Cu | H, H | H,<br>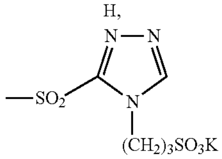 | H, H | H,<br>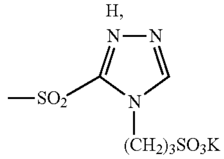 | H, H | H,<br>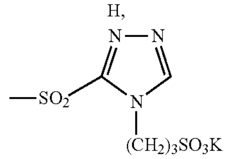 | H, H | H,<br>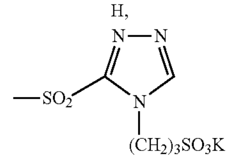 |

| Exemplary Compound | M | $R_1R_4$ | $R_2R_3$ | $R_5R_8$ | $R_6R_7$ |
|---|---|---|---|---|---|
| 123 β | Cu | H, H | H, 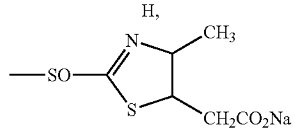 | H, H | H, 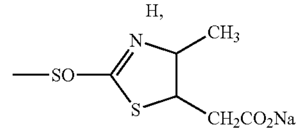 |
| 124 β | Cu | H, H | H, 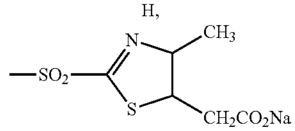 | H, H | H, 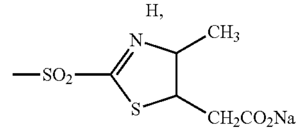 |
| 125 β | Cu | H, H | H, 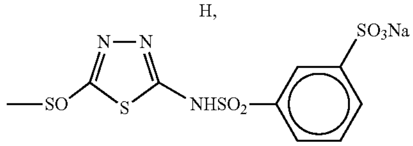 | H, H | H, 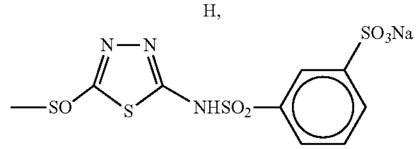 |
| 126 β | Cu | H, H | H, 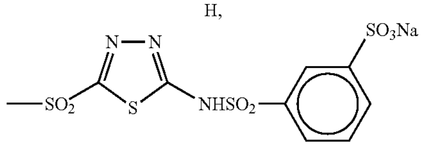 | H, H | H, 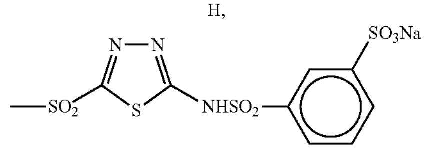 |
| Exemplary Compound | M | $R_9R_{12}$ | $R_{10}R_{11}$ | $R_{13}R_{16}$ | $R_{14}R_{15}$ |
|---|---|---|---|---|---|
| 123 β | Cu | H, H | H, 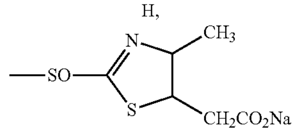 | H, H | H, 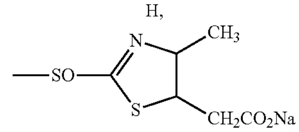 |
| 124 β | Cu | H, H | H, 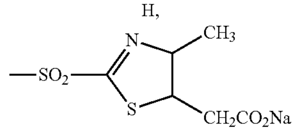 | H, H | H, 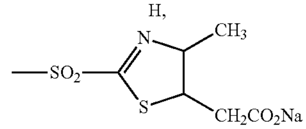 |
| 125 β | Cu | H, H | H, 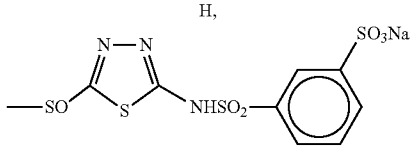 | H, H | H, 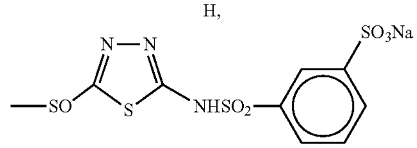 |
| 126 β | Cu | H, H | H, 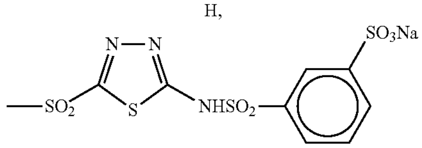 | H, H | H, 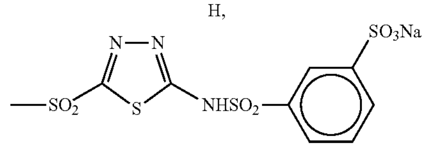 |
| Exemplary Compound | M | $R_1R_4$ | $R_2R_3$ | $R_5R_8$ | $R_6R_7$ |
|---|---|---|---|---|---|
| 127 β | Cu | H, H | H, 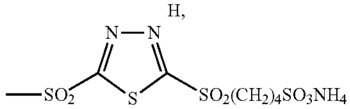 | H, H | H, 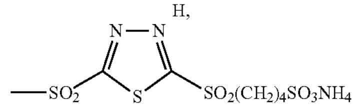 |

-continued

| | | | | | |
|---|---|---|---|---|---|
| 128 | Cu | H, | H, | H, | H, |
| β | | H | 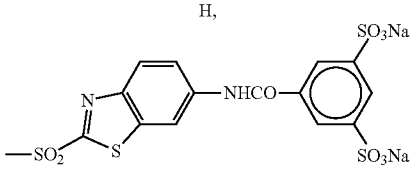 | H | 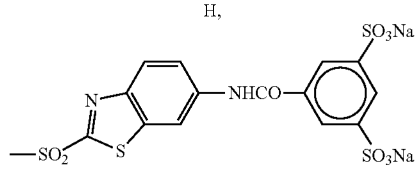 |
| 129 | Cu | H, | H, | H, | H, |
| β | | H | 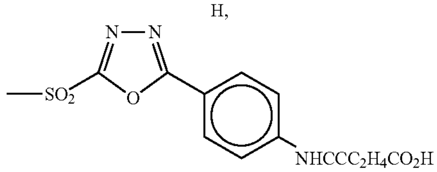 | H | 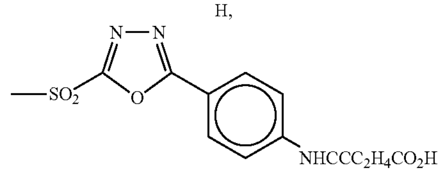 |
| 130 | Cu | H, | H, | H, | H, |
| β | | H | 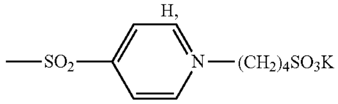 | H | 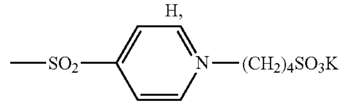 |

| Exemplary Compound | M | $R_9R_{12}$ | $R_{10}R_{11}$ | $R_{13}R_{16}$ | $R_{14}R_{15}$ |
|---|---|---|---|---|---|
| 127 | Cu | H, | H, | H, | H, |
| β | | H | 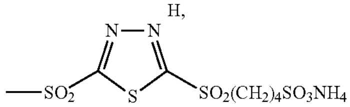 | H | 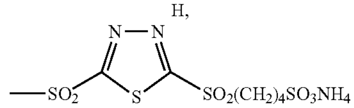 |
| 128 | Cu | H, | H, | H, | H, |
| β | | H | 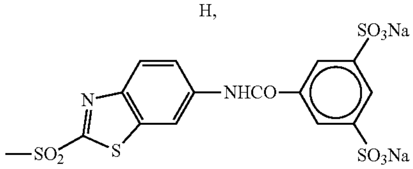 | H | 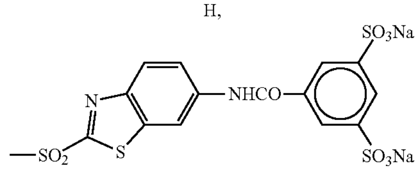 |
| 129 | Cu | H, | H, | H, | H, |
| β | | H | 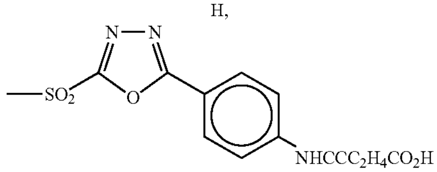 | H | 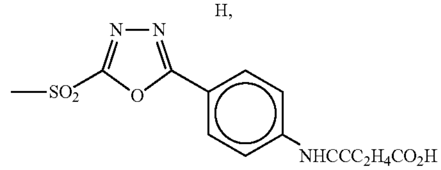 |
| 130 | Cu | H, | H, | H, | H, |
| β | | H | 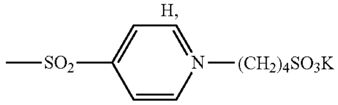 | H | 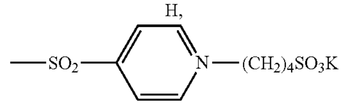 |

50

| Exemplary Compound | M | $R_1$, $R_4$ | $R_2$, $R_3$ | $R_5$, $R_8$ | $R_6$, $R_7$ | $R_9$, $R_{12}$ |
|---|---|---|---|---|---|---|
| 134 | Ni | H, | —$SO_2$—$(CH_2)_3SO_3Na$, | H, | —$SO_2$—$(CH_2)_3SO_3Na$, | H, |
| β | | H | —$SO_2$—$(CH_2)_3SO_3Na$ | H | —$SO_2$—$(CH_2)_3SO_3Na$ | H |
| 135 | Zn | H, | H, | H, | H, | H, |
| β | | H | —$SO_2$—$(CH_2)_3SO_3Na$ | H | —$SO_2$—$(CH_2)_3SO_3Na$ | H |
| 136 | Zn | H, | H, | H, | H, | H, |
| β | | H | 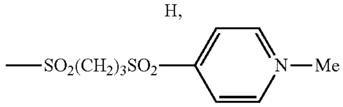 | H | —$SO_2$—$(CH_2)_3SO_3Na$ | H |
| 137 | Cu | H, | H, | H, | H, | H, |
| β | | H | —$SO_2(CH_2)_3SONHCH_2CH(OH)CH_3$ | H | —$SO_2$—$(CH_2)_3SO_3Na$ | H |
| 138 | Cu | H, | H, | H, | H, | H, |

-continued

| | | | | | | |
|---|---|---|---|---|---|---|
| β | | H | $—SO_2(CH_2)_3SONHCH_2CH(OH)CH_3$ | H | $—SO_2(CH_2)_3SONHCH_2CH(OH)CH_3$ | H |
| 139 | Cu | H, | H, | H, | H, | H, |
| β | | H | 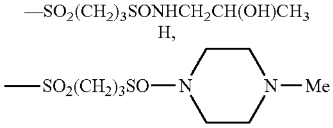 | H | $—SO_2—(CH_2)_3SO_3Na$ | H |

| Exemplary Compound | $R_{10}$, $R_{11}$ | $R_{13}$, $R_{16}$ | $R_{14}$, $R_{15}$ |
|---|---|---|---|
| 134 | $—SO_2—(CH_2)_3SO_3Na$, | H, | $—SO_2—(CH_2)_3SO_3Na$, |
| β | $—SO_2—(CH_2)_3SO_3Na$ | H | $—SO_2—(CH_2)_3SO_3Na$ |
| 135 | H, | H, | H, |
| β | $—SO_2—(CH_2)_3SO_3Na$ | H | $—SO_2—(CH_2)_3SO_3Na$ |
| 136 | H, | H, | H, |
| β | $—SO_2—(CH_2)_3SO_3Na$ | H | $—SO_2—(CH_2)_3SO_3Na$ |
| 137 | H, | H, | H, |
| β | $—SO_2—(CH_2)_3SO_3Na$ | H | $—SO_2—(CH_2)_3SO_3Na$ |
| 138 | H, | H, | H, |
| β | $—SO_2—(CH_2)_3SO_3Na$ | H | $—SO_2—(CH_2)_3SO_3Na$ |
| 139 | H, | H, | H, |
| β | $—SO_2—(CH_2)_3SO_3Na$ | H | $—SO_2—(CH_2)_3SO_3Na$ |

Black Ink

An ink set may further include at least one of a dye black ink and a pigment black ink.

Dye Black Ink

It is preferable that the dye black ink contains an azo compound represented by the following Formula (Bk-1) or salts thereof and at least one kind selected from a group consisting of coloring materials represented by the following Formulae (Bw-1), (b-1), and (b-3). It is more preferable that the dye black ink contains an azo compound represented by the following Formula (Bk-1) or salts thereof and at least one kind selected from a group consisting of coloring materials represented by the following Formula (Bw-1).

Azo Compound Represented by Formula (Bk-1) or Salts Thereof

Hereinafter, the azo compound represented by Formula (Bk-1) or salts thereof will be described in detail.

(Bk-1)

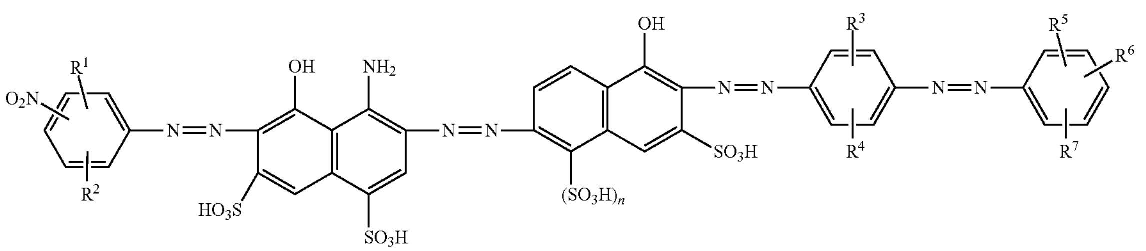

(In Formula (Bk-1), $R^1$, $R^2$, $R^5$, $R^6$, and $R^7$ each independently represent a hydrogen atom, a halogen atom, a cyano group, a hydroxyl group, a carboxyl group, a sulfo group, a sulfamoyl group, a N-alkylaminosulfonyl group, a N-phenylaminosulfonyl group, an alkylsulfonyl group which may be substituted with a hydroxyl group and has 1 to 4 carbon atoms, a phospho group, a nitro group, an acyl group, an ureido group, an alkyl group (which may be substituted with a hydroxyl group or an alkoxy group having 1 to 4 carbon atoms) having 1 to 4 carbon atoms, an alkoxy group (an alkyl group may be substituted with a hydroxyl group, an alkoxy group having 1 to 4 carbon atoms, a sulfo group, or a carboxyl group) having 1 to 4 carbon atoms, an acylamino group, an alkylsulfonylamino group, or a phenylsulfonylamino group (a phenyl group may be substituted with a halogen atom, an alkyl group, or a nitro group); $R^3$ and $R^4$ each independently represent a hydrogen atom, a halogen atom, a cyano group, a carboxyl group, a sulfo group, a nitro group, an alkyl group (which may be substituted with a hydroxyl group or an alkoxy group having 1 to 4 carbon atoms) having 1 to 4 carbon atoms, an alkoxy group having 1 to 4 carbon atoms (an alkyl group may be substituted with a hydroxyl group, an alkoxy group having 1 to 4 carbon atoms, a sulfo group, or a carboxyl group), an acylamino group, an alkylsulfonylamino group, or a phenylsulfonylamino group (a phenyl group may be substituted with a halogen atom, an alkyl group, or a nitro group); and n represents 0 or 1.)

In Formula (Bk-1), the number of carbon atoms of the alkyl group, the alkoxy group, and the acyl group whose number of carbon atoms is not particularly described is not particularly limited as long as the effects of the present embodiment can be achieved, but the number of carbon atoms is generally in the range of 1 to 20, preferably in the range of 1 to 10, and more preferably in the range of 1 to 4 in a case of an alkyl group, an alkoxy group, or an aliphatic acyl group and in the range of 7 to 11 in a case of an aromatic acyl group. Specific examples thereof include a benzoyl group and a naphthoyl group.

In $R^1$, $R^2$, $R^5$, $R^6$, and $R^7$ of Formula (Bk-1), examples of the N-alkylaminosulfonyl group include a N-methylaminosulfonyl group, a N-ethylaminosulfonyl group, a N-(n-butyl)aminosulfonyl group, a N,N-dimethylaminosulfonyl group, and a N,N-di(n-propyl)aminosulfonyl group.

In $R^1$, $R^2$, $R^5$, $R^6$, and $R^7$ of Formula (Bk-1), examples of the alkylsulfonyl group which may be substituted with a hydroxyl group and has 1 to 4 carbon atoms include methyl sulfonyl, ethyl sulfonyl, propyl sulfonyl, butyl sulfonyl, hydroxy ethyl sulfonyl, and 2-hydroxy propyl sulfonyl.

In $R^1$, $R^2$, $R^5$, $R^6$, and $R^7$ of Formula (Bk-1), preferable examples of the acyl group include alkyl carbonyl having 1 to 4 carbon atoms such as acetyl, propionyl, butyryl, or isobutyryl, and aromatic carbonyl having 7 to 11 carbon atoms such as benzoyl or naphthoyl.

In $R^1$ to $R^7$ of Formula (Bk-1), examples of the alkyl group which has 1 to 4 carbon atoms, and may be substituted with a hydroxy group or an alkoxy group having 1 to 4 carbon atoms include methyl, ethyl, n-propyl, isopropyl, n-butyl, isobutyl, sec-butyl, tert-butyl, 2-hydroxyethyl, 2-hydroxypropyl, 3-hydroxypropyl, methoxyethyl, 2-ethoxyethyl, n-propoxyethyl, isopropoxyethyl, n-butoxyethyl, methoxypropyl, ethoxypropyl, n-propoxypropyl, isopropoxybutyl, and n-propoxybutyl.

In $R^1$ to $R^7$ of Formula (Bk-1), examples of the alkoxy group which may be substituted with a substituent selected from a group consisting of a hydroxy group, alkoxy having 1 to 4 carbon atoms, a sulfo group, and a carboxyl group and has 1 to 4 carbon atoms include methoxy, ethoxy, n-propoxy, isopropoxy, n-butoxy, sec-butoxy, tert-butoxy, 2-hydroxyethoxy, 2-hydroxypropoxy, 3-hydroxypropoxy, methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, n-propoxybutoxy, 2-hydroxyethoxyethoxy, carboxymethoxy, 2-carboxyethoxy, 3-carboxypropoxy, 3-sulfopropoxy, and 4-sulfobutoxy.

In $R^1$ to $R^7$ of Formula (Bk-1), preferable examples of the acyl group of the acylamino group include a preferable acyl group exemplified in the section of the acyl group and preferable examples of the acylamino group include acetylamino, propionylamino, butyrylamino, isobutyrylamino, benzoylamino, and naphthoylamino.

In $R^1$ to $R^7$ of Formula (Bk-1), preferable examples of the alkylsulfonylamino group include methylsulfonylamino, ethylsulfonylamino, and propylsulfonylamino.

In $R^1$ to $R^7$ of Formula (Bk-1), preferable examples of the phenylsulfonylamino group which may be substituted with a group selected from a group consisting of a halogen atom, an alkyl group, and a nitro group include benzenesulfonylamino, toluenesulfonylamino, chlorobenzenesulfonylamino, and nitrobenzenesulfonylamino.

In Formula (Bk-1), $R^1$ and $R^2$ each independently represent preferably a hydrogen atom, a chlorine atom, a bromine atom, a cyano group, a carboxyl group, a sulfo group, a sulfamoyl group, a N-methylaminosulfonyl group, a N-phenylaminosulfonyl group, a methylsulfonyl group, a hydroxyethylsulfonyl group, a phosphate group, a nitro group, an acetyl group, a benzoyl group, an ureido group, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4-sulfobutoxy group, a carboxymethoxy group, a 2-carboxyethoxy group, an acetylamino group, or a benzoylamino group; more preferably a hydrogen atom, a chlorine atom, a cyano group, a sulfamoyl group, an acetyl group, a nitro group, a carboxyl group, or a sulfo group; and still more preferably a hydrogen atom, a carboxyl group, or a sulfo group. $R^1$ represents still more preferably a carboxyl group or a sulfo group and particularly preferably a sulfo group. $R^2$ particularly preferably represents a hydrogen atom.

In Formula (Bk-1), it is preferable that the substitution position of the nitro group is at a para-position with respect to the azo group in a case where the substitution position of $R^1$ is at an ortho-position with respect to the azo group and the substitution position of the nitro group is at the ortho-position with respect to the azo group in a case where the substitution position of $R^1$ is at the para-position with respect to the azo group.

In Formula (Bk-1), $R^3$ and $R^4$ each independently represent preferably a hydrogen atom, a cyano group, a carboxyl group, a sulfo group, a nitro group, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4-sulfobutoxy group, a carboxymethoxy group, a 2-carboxyethoxy group, or an acetylamino group; more preferably a hydrogen atom, a carboxyl group, a sulfo group, a methyl group, a methoxy group, or a 3-sulfopropoxy group; and still more preferably a hydrogen atom or a sulfo group. In addition, a combination of $R^3$ representing a sulfo group and $R^4$ representing a hydrogen atom is particularly preferable.

In Formula (Bk-1), $R^5$ to $R^7$ each independently represent preferably a hydrogen atom, a chlorine atom, a bromine atom, a cyano group, a carboxyl group, a sulfo group, a sulfamoyl group, a N-methylaminosulfonyl group, a N-phenylaminosulfonyl group, a methylsulfonyl group, a hydroxyethylsulfonyl group, a phosphate group, a nitro group, an acetyl group, a benzoyl group, an ureido group, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4-sulfobutoxy group, a carboxymethoxy group, a 2-carboxyethoxy group, an acetylamino group, or a benzoylamino group; more preferably a hydrogen atom, a chlorine atom, a cyano group, a sulfamoyl group, an acetyl group, a nitro group, a carboxyl group, or a sulfo group; and still more preferably a hydrogen atom, a carboxyl group, or a sulfo group. $R^5$ particularly preferably represents a hydrogen atom, a carboxyl group, or a sulfo group, $R^6$ particularly preferably represents a carboxyl group or a sulfo group, and $R^7$ particularly preferably represents a hydrogen atom.

In Formula (Bk-1), it is preferable that one of $R^1$ and $R^2$ represents a hydrogen atom or a sulfo group and the other represents a carboxyl group, a sulfo group, or an alkoxy group having 1 to 4 carbon atoms and more preferable that one of $R^1$ and $R^2$ represents a hydrogen atom and the other represents a carboxyl group or a sulfo group. n represents preferably 0 or 1 and more preferably 1.

In Formula (Bk-1), it is preferable that one of $R^3$ and $R^4$ represents a sulfo group or an alkoxy group having 1 to 4 sulfo-carbon atoms and the other represents a hydrogen atom, a sulfo group, or an alkyl group having 1 to 4 carbon atoms and more preferable that one of $R^3$ and $R^4$ represents a sulfo group and the other represents a hydrogen atom. Further, one of $R^5$, $R^6$, and $R^7$ represents preferably a sulfo group, a carboxyl group, a sulfopropoxy group, a hydroxy group, or an alkylsulfonyl group having 1 to 4 hydroxy-carbon atoms, more preferably a sulfo group or a carboxyl group, and still more preferably a sulfo group; one of the rest represents preferably a hydrogen atom, a sulfo group, a carboxyl group, an alkyl group having 1 to 4 carbon atoms, a nitro group, or an aminosulfonyl group, more preferably a hydrogen atom, a sulfo group, or a carboxyl group; and the remaining one represents preferably a hydrogen atom, a sulfo group, a toluenesulfonylamino group, or an acetylamino group and more preferably a hydrogen atom.

In the description above, a combination of preferable ones is more preferable, a combination of preferable one and more preferable one is still more preferable, and a combination of more preferable ones is most preferable.

A salt of the compound represented by Formula (Bk-1) is an inorganic or organic salt of a cation ion. Specific examples of the inorganic salt include an alkali metal salt, an alkaline earth metal salt, and an ammonium salt and preferable examples of the inorganic salt include a lithium salt, a sodium salt, a potassium salt, and an ammonium salt. Further, examples of the organic salt of a cation ion include a salt of the compound represented by the following Formula (Bk-2), but the organic salt is not limited thereto.

(Bk-2)

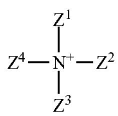

(In Formula (Bk-2), $Z^1$, $Z^2$, $Z^3$, and $Z^4$ each independently represent an alkyl group, a hydroxyalkyl group, or a hydroxyalkoxyalkyl group.)

In Formula (Bk-2), examples of the alkyl group represented by $Z^1$, $Z^2$, $Z^3$, and $Z^4$ include methyl, ethyl, n-propyl, isopropyl, n-butyl, isobutyl, sec-butyl, and tert-butyl. Examples of the hydroxyalkyl group include an alkyl group having 1 to 4 hydroxy-carbon atoms such as a hydroxymethyl group, a hydroxyethyl group, a 3-hydroxypropyl group, a 2-hydroxypropyl group, a 4-hydroxybutyl group, a 3-hydroxybutyl group, or a 2-hydroxybutyl group. Examples of the hydroxyalkoxyalkyl group include a hydroxy-C1-C4 alkoxy-C1-C4 alkyl group such as a hydroxyethoxymethyl group, a 2-hydroxyethoxyethyl group, a 3-hydroxyethoxypropyl group, a 2-hydroxyethoxypropyl group, a 4-hydroxyethoxybutyl group, a 3-hydroxyethoxybutyl group, or a 2-hydroxyethoxybutyl group. Among these, an alkyl group having 1 to 4 hydroxyethoxy-carbon atoms is preferable. Further, particularly preferable examples thereof include a hydrogen atom; a methyl group; an alkyl group having 1 to 4 hydroxy-carbon atoms such as a hydroxymethyl group, a hydroxyethyl group, a 3-hydroxypropyl group, a 2-hydroxypropyl group, a 4-hydroxybutyl group, a 3-hydroxybutyl group, or a 2-hydroxybutyl group; and an alkyl group having 1 to 4 hydroxyethoxy-carbon atoms such as a hydroxyethoxymethyl group, a 2-hydroxyethoxyethyl group, a 3-hydroxyethoxypropyl group, a 2-hydroxyethoxypropyl group, a 4-hydroxyethoxybutyl group, a 3-hydroxyethoxybutyl group, or a 2-hydroxyethoxybutyl group.

In Formula (Bk-2), specific examples of $Z^1$, $Z^2$, $Z^3$, and $Z^4$ are described below.

| Compound No. | $Z^1$ | $Z^2$ | $Z^3$ | $Z^4$ |
|---|---|---|---|---|
| 1-1 | H | —C2H40H | —C2H40H | —C2H40H |
| 1-2 | CH3 | —C2H40H | —C2H40H | —C2H40H |
| 1-3 | H | —CH2CH(0H)CH3 | —CH2CH(0H)CH3 | —CH2CH(OH)CH3 |
| 1-4 | CH3 | —CH2CH(0H)CH3 | —CH2CH(0H)CH3 | —CH2CH(OH)CH3 |
| 1-5 | H | —C2H40H | H | —C2H40H |
| 1-6 | CH3 | —C2H40H | H | —C2H40H |
| 1-7 | H | —CH2CH(0H)CH3 | H | —CH2CH(0H)CH3 |
| 1-8 | CH3 | —CH2CH(0H)CH3 | H | —CH2CH(0H)CH3 |
| 1-9 | CH3 | —C2H40H | CH3 | —C2H40H |
| 1-10 | CH3 | —CH2CH(0H)CH3 | CH3 | —CH2CH(0H)CH3 |

The compounds represented by Formula (Bk-1) can be produced using a method described in Japanese Patent No. 4764829.

As preferable examples of the compound represented by Formula (Bk-1), which are not particularly limited, the following structures are exemplified.

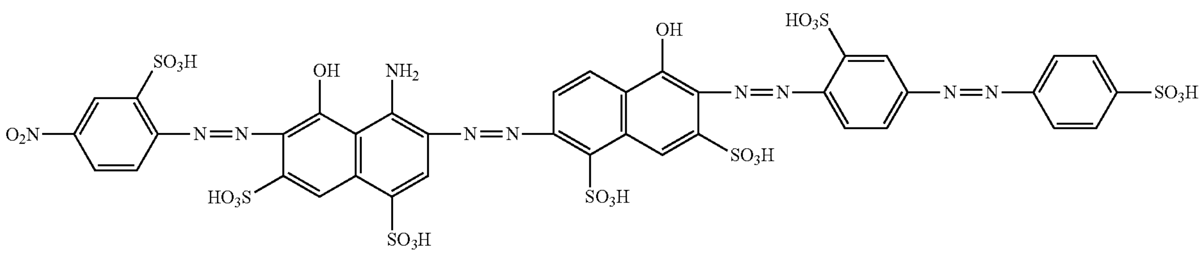

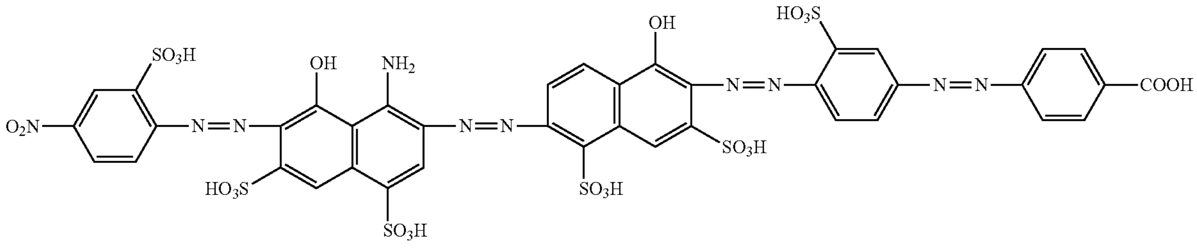

-continued
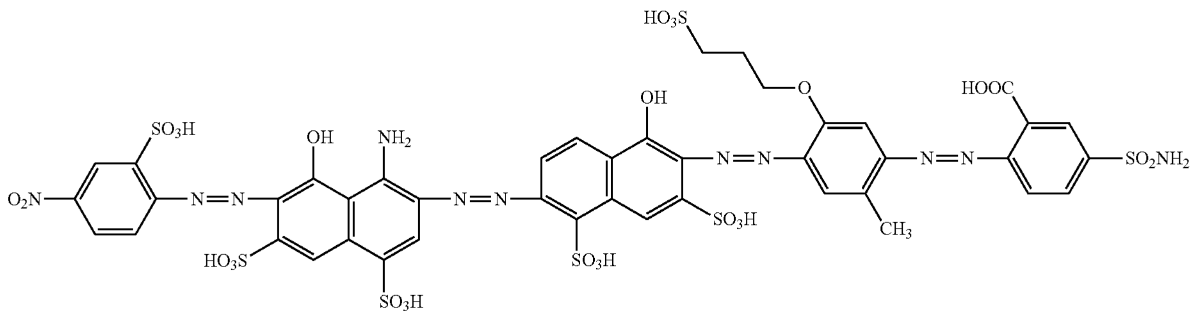
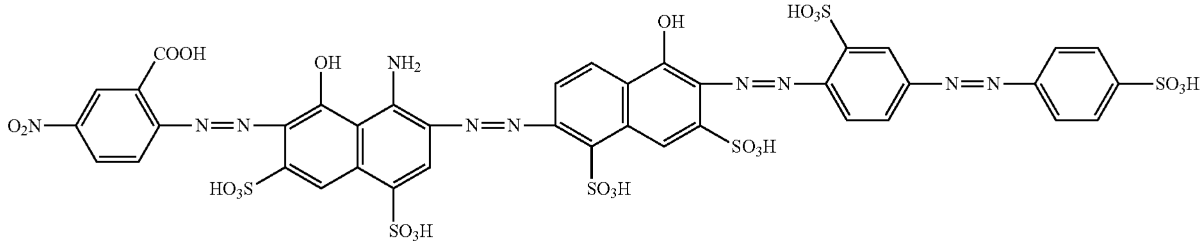
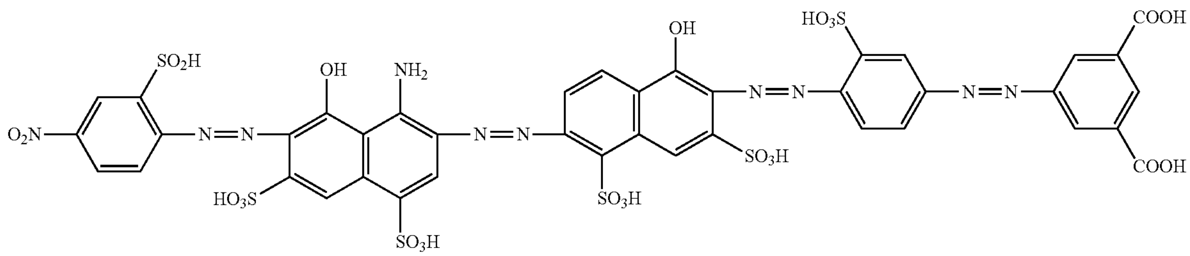
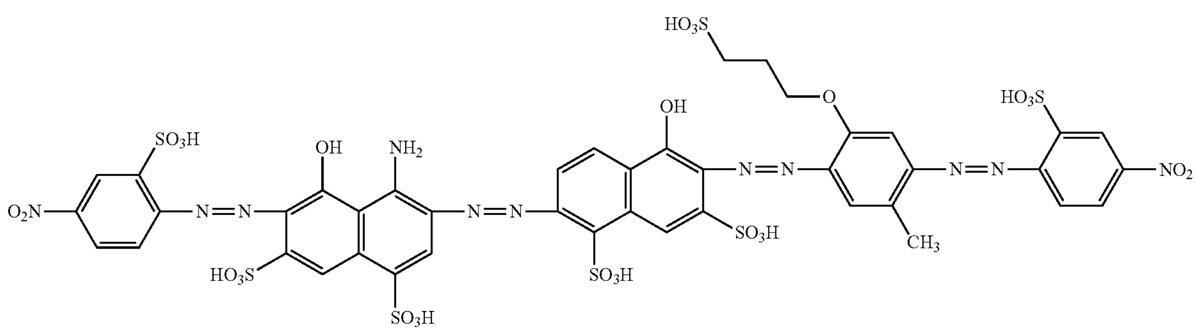
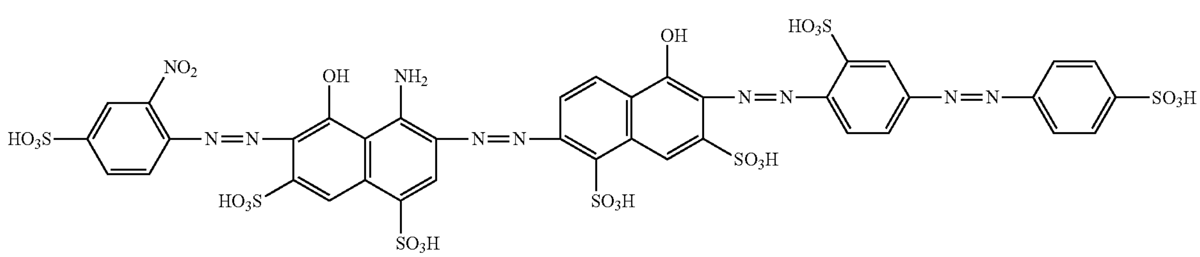
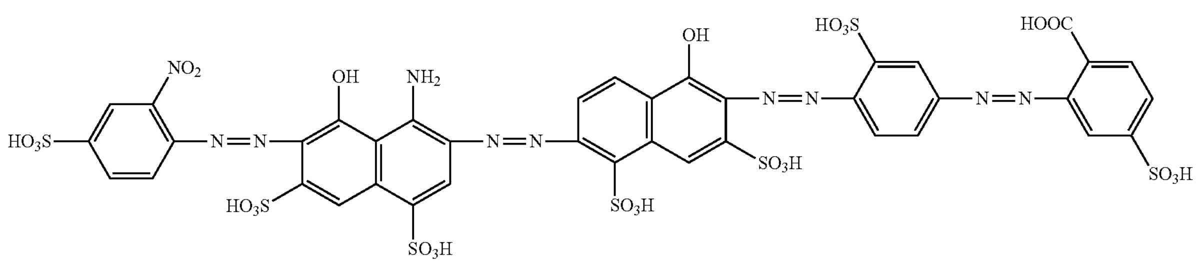

-continued
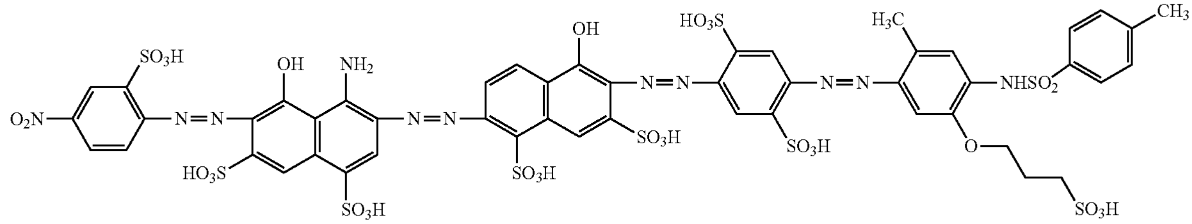
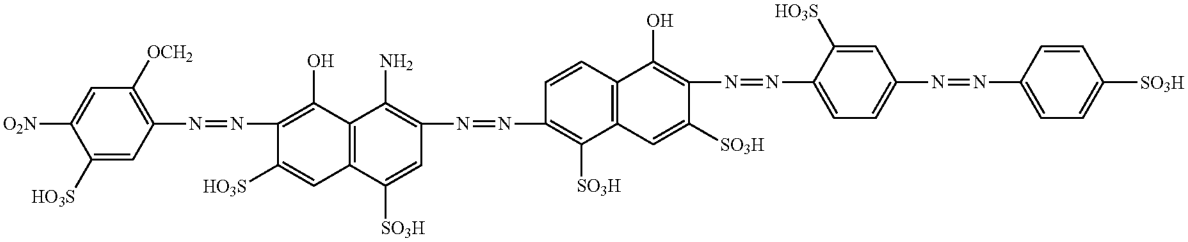
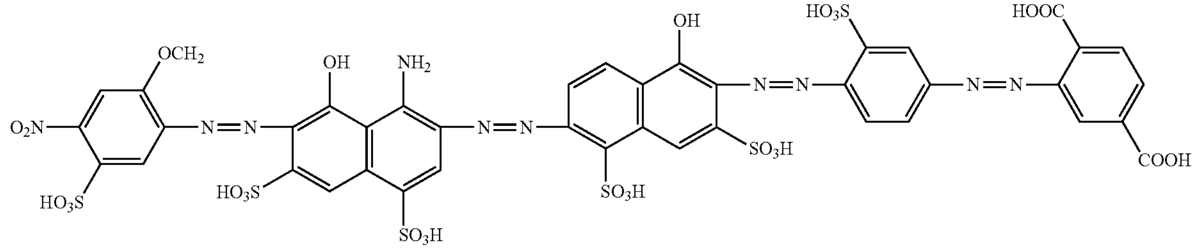
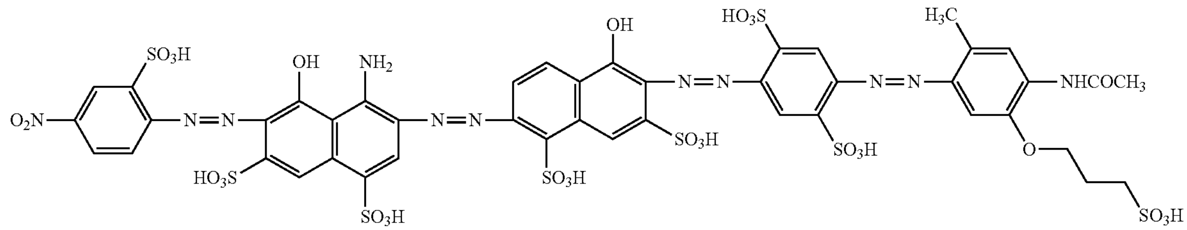
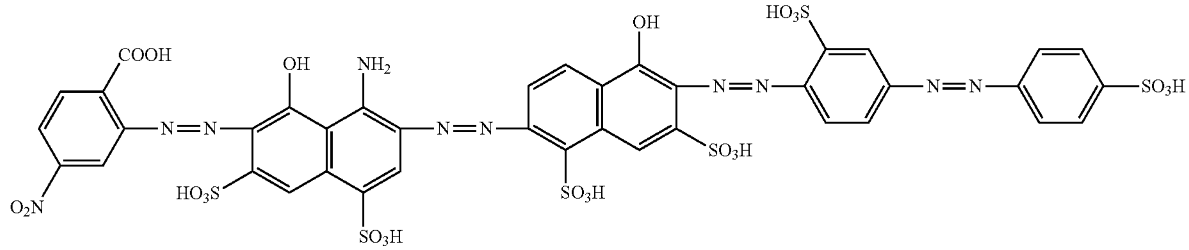
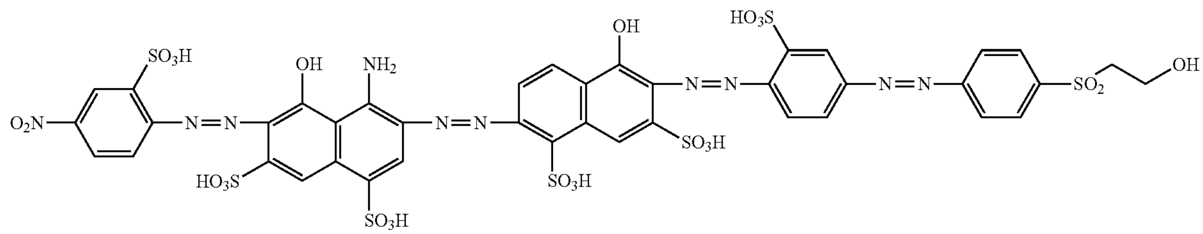
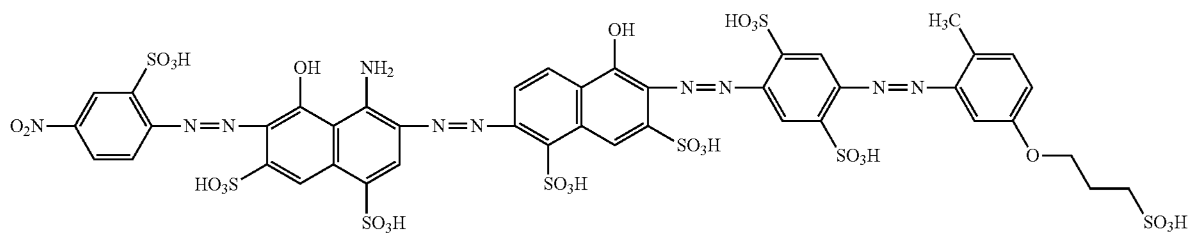

-continued
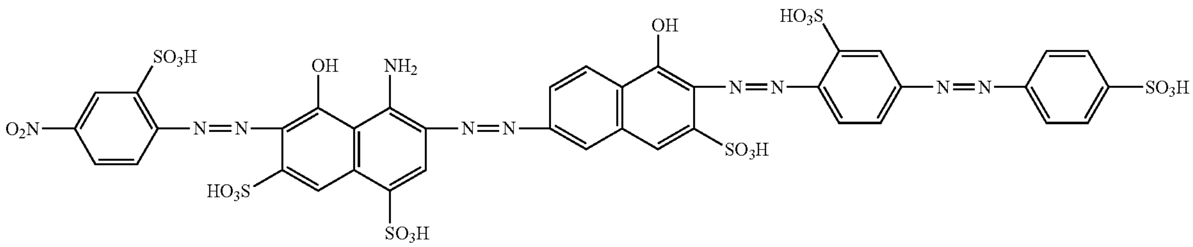
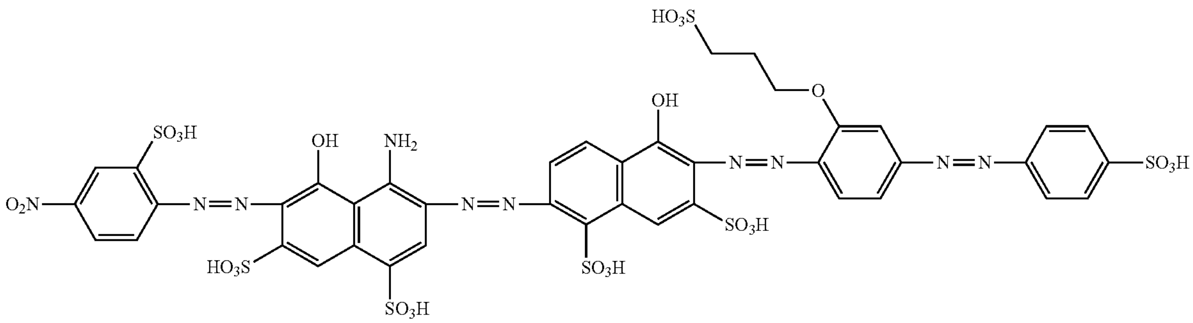
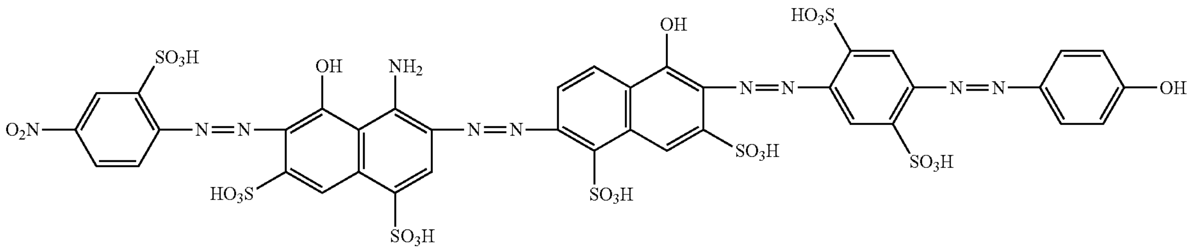
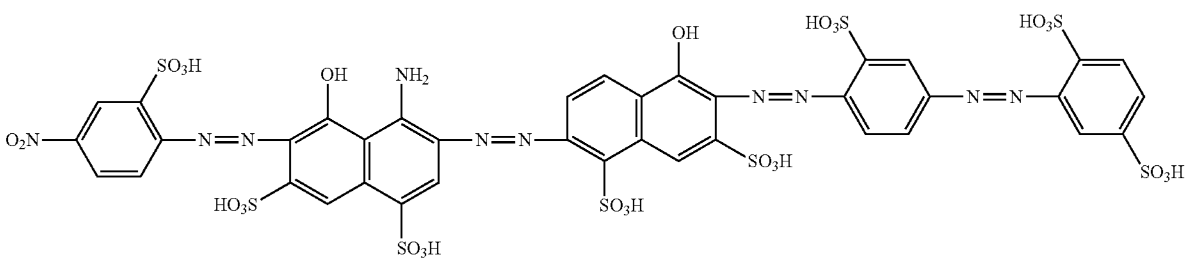
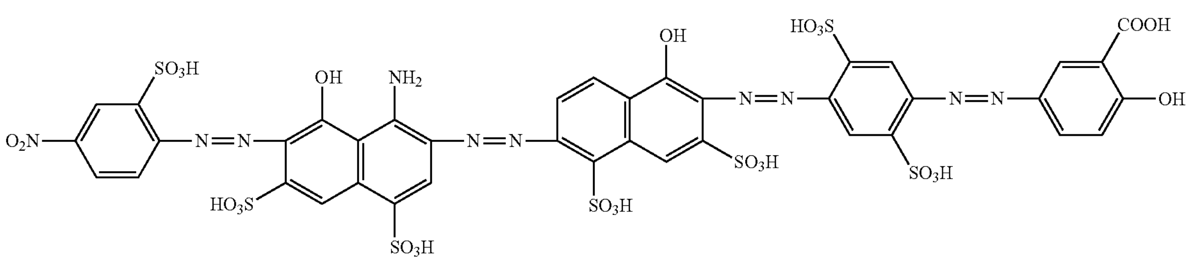
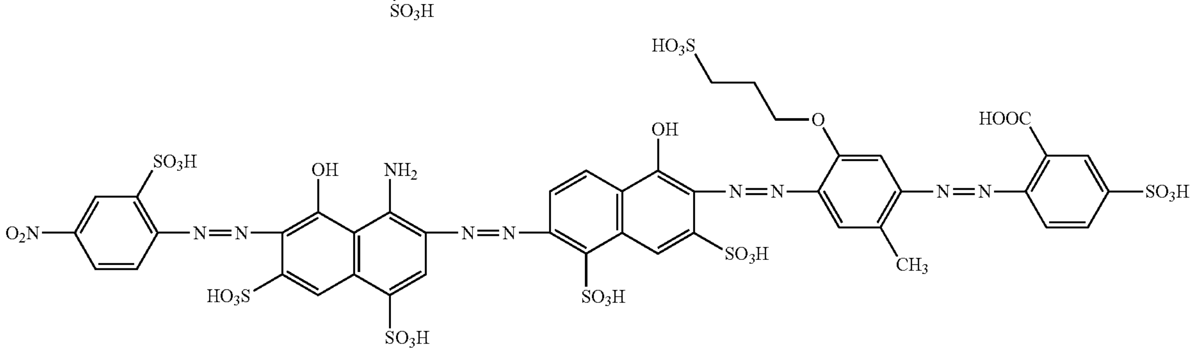

The content of the coloring material represented by Formula (Bk-1) is preferably in the range of 2.5% by mass to 7.5% by mass, more preferably in the range of 3.0% by mass to 5.0% by mass, and still more preferably in the range of 3.5% by mass to 4.5% by mass based on the total amount of the black ink. When the content of the coloring material represented by Formula (Bk-1) is in the above-described range, a visually excellent black color tends to be exhibited.

Azo Compound Represented by Formula (Bw-1) and Salt Thereof

Hereinafter, the coloring material represented by Formula (Bw-1) will be described in detail. The coloring material represented by Formula (Bw-1) is a dye for color correction of the coloring material represented by Formula (Bk-1). Accordingly, by adjusting the content of the coloring material represented by Formula (Bk-1) and the coloring material represented by Formula (Bw-1) in the ink and the content ratio of these dyes, the hue of an image to be formed using an ink becomes easily closer to an achromatic color. That is, an image to be recorded using an ink can exhibit a visually excellent black color through a complementary action between the coloring material represented by Formula (Bk-1) and the coloring material represented by Formula (Bw-1).

In the present specification, the "excellent black color" indicates a color in which an a* value of an image is in the range of −3 to 3 and a b* value is in the range of −3 to 3. The a* value and the b* value are defined as an L*a*b* color system by International Commission on Illumination (CIE).

Further, an image with excellent coloring properties can be obtained when the coloring material represented by Formula (Bw-1) and the coloring material represented by Formula (Bk-1) are contained in the ink. Particularly, a bronzing phenomenon is unlikely to occur even when an image is recorded with a high duty value using an ink containing the coloring material represented by Formula (Bk-1) and the coloring material represented by Formula (Bw-1). The "bronzing phenomenon" indicates a phenomenon which easily occurs when an image is recorded with a high duty value and in which the coloring properties or the hue is degraded by exhibiting a hue different from the original hue or exhibiting metallic luster.

In addition, the "duty value" is a value calculated using an expression of "duty (%)=actual number of ejected dots/(vertical resolution x horizontal resolution)×100 (in Formula, the "actual number of ejected dots" is an actual number of ejected dots per unit area and the "vertical resolution" and the "horizontal resolution" respectively indicate resolution per unit area).

In addition, the coloring material represented by Formula (Bw-1) is unlikely to be decomposed in an ink in the same manner as the coloring material represented by Formula (Bk-1). For this reason, the ink has excellent storage stability. Further, similar to the coloring material represented by Formula (Bk-1), the coloring material represented by Formula (Bw-1) is unlikely to be decomposed in the ink even when irradiated with light or exposed to gas (particularly, ozone) in the air. Accordingly, since an image formed using the ink has excellent light resistance and gas resistance (particularly, ozone resistance), discoloration or decoloration caused by influence of light or the air is unlikely to occur. Further, since the coloring material represented by Formula (Bk-1) and the coloring material represented by Formula (Bw-1) are synergistically acted in the ink, the storage stability of the ink is improved or the coloring density, light resistance, and ozone resistance of an image to be recorded using the ink are further improved.

In the black ink, the ratio (MB/MA) of the content [MA (% by mass)] of the coloring material represented by Formula (Bk-1) to the content [MB (% by mass)] of the coloring material represented by Formula (Bw-1) is preferably in the range of 0.2 to 1 and more preferably in the range of 0.4 to 1. When the ratio of the content of the coloring material represented by Formula (Bk-1) to the content of the coloring material represented by Formula (Bw-1) is in the above-described range, an image exhibiting an excellent black color (close to an achromatic color) can be obtained, the coloring density of an image to be recorded can be improved, and the light resistance and the gas resistance can be improved.

(Bw-1)

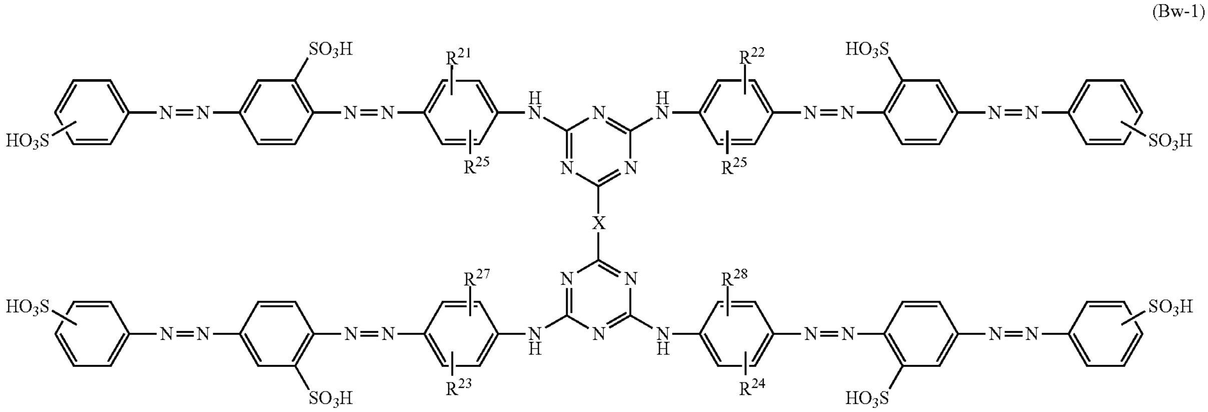

(In Formula (Bw-1), $R^{21}$, $R^{22}$, $R^{23}$, $R^{24}$, $R^{25}$, $R^{26}$, $R^{27}$, and $R^{28}$ each independently represent a hydrogen atom, a halogen atom, a sulfo group, a carboxy group, a sulfamoyl group, a carbamoyl group, an alkyl group having 1 to 4 carbon atoms, an alkoxy group having 1 to 4 carbon atoms, an alkoxy group which is substituted with at least one kind selected from a group consisting of a hydroxy group, an alkoxy group having 1 to 4 carbon atoms, an alkoxy group having 1 to 4 hydroxy-carbon atoms, a sulfo group, and a carboxy group as substituents and has 1 to 4 carbon atoms, an alkylcarbonylamino group having 1 to 4 carbon atom, an alkylcarbonylamino group which is substituted with a carboxy group and has 1 to 4 carbon atoms, an ureido group, an alkyl ureido group having 1 to 4 monocarbon atoms, an alkylureido group having 1 to 4 dicarbon atoms, an alkylureido group which is substituted with at least one kind selected from a group consisting of a hydroxy group, a sulfo group, and a carboxy group as substituents and has 1 to 4 monocarbon atoms, an alkylureido group which is substituted with at least one kind selected from a group consisting of a hydroxy group, a sulfo group, and a carboxy group as substituents and has 1 to 4 dicarbon atoms, a benzoylamino group, a benzoylamino group whose benzene ring is substituted with at least one kind selected from a group consisting of a halogen atom, an alkyl group having 1 to 4 carbon atoms, a nitro group, a sulfo group, and a carboxy group, a benzenesulfonylamino group, or a phenylsulfonylamino group whose benzene ring is substituted with at least one kind selected from a group consisting of a halogen atom, an alkyl group having 1 to 4 carbon atoms, a nitro group, a sulfo group, and a carboxy group.)

In Formula (Bw-1), X represents a divalent crosslinking group.

In Formula (Bw-1), examples of the halogen atom in $R^{21}$ to $R^{28}$ include a fluorine atom, a chlorine atom, a bromine atom, and an iodine atom. Among these, a fluorine atom, a chlorine atom, and a bromine atom are preferable and a chlorine atom is particularly preferable.

In Formula (Bw-1), examples of the alkyl group having 1 to 4 carbon atoms in $R^{21}$ to $R^{28}$ include a linear or branched alkyl group, and a linear alkyl group is preferable. Examples of the alkyl group having 1 to 4 carbon atoms include a linear alkyl group such as methyl, ethyl, n-propyl, or n-butyl; and a branched alkyl group such as isopropyl, isobutyl, sec-butyl, or t-butyl. As specific examples thereof, methyl and ethyl are preferable and methyl is particularly preferable.

In Formula (Bw-1), examples of the alkoxy group having 1 to 4 carbon atoms in $R^{21}$ to $R^{28}$ include a linear or branched alkoxy group. Specific examples thereof include a linear alkoxy group such as methoxy, ethoxy, n-propoxy, or n-butoxy; and a branched alkoxy group such as isopropoxy, isobutoxy, sec-butoxy, or t-butoxy. As specific examples thereof, methoxy and ethoxy are preferable and methoxy is particularly preferable.

In Formula (Bw-1), examples of the alkoxy group having 1 to 4 carbon atoms which is substituted with at least one group selected from a group consisting of a hydroxy group, an alkoxy group having 1 to 4 carbon atoms, an alkoxy group having 1 to 4 hydroxy-carbon atoms, a sulfo group, and a carboxy group as substituents in $R^{21}$ to $R^{28}$ include an alkoxy group having 1 to 4 carbon atoms in which the above-described substituents are included in an arbitrary carbon atom. The number of the substituents is generally 1 or 2 and preferably 1. The substitution position is not particularly limited, but a substitution position in which two or more oxygen atoms are not substituted with the same carbon atom is preferable. Specific examples thereof include an alkoxy group having 1 to 4 hydroxy-carbon atoms such as 2-hydroxyethoxy, 2-hydroxypropoxy, or 3-hydroxypropoxy; an alkoxy group having 1 to 4 alkoxy-carbon atoms and 1 to 4 carbon atoms such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, or n-propoxybutoxy; an alkoxy group having 1 to 4 alkoxy-carbon atoms and 1 to 4 hydroxy carbon atoms such as 2-hydroxyethoxyethoxy; an alkoxy group having 1 to 4 carboxy carbon atoms such as carboxymethoxy, 2-carboxyethoxy, or 3-carboxypropoxy; and an alkoxy group having 1 to 4 sulfo-carbon atoms such as 2-sulfoethoxy, 3-sulfopropoxy, or 4-sulfopropoxy.

In Formula (Bw-1), examples of the alkylcarbonylamino group having 1 to 4 carbon atoms in $R^{21}$ to $R^{28}$ include a linear or branched alkylcarbonylamino group, and a linear alkylcarbonylamino group is preferable. Specific examples thereof include a linear alkylcarbonylamino group such as acetylamino (methylcarbonylamino), ethylcarbonylamino, propylcarbonylamino, or butylcarbonylamino and a branched alkylcarbonylamino group such as isopropylcarbonylamino or t-butylcarbonylamino.

In Formula (Bw-1), specific examples of the alkylcarbonylamino group in $R^{21}$ to $R^{28}$ which is substituted with a carboxy group and has 1 to 4 carbon atoms include an alkylcarbonylamino group having 1 to 4 carboxy-carbon atoms such as 2-carboxyethylcarbonylamino or 3-carboxypropylcarbonylamino. The number of the substituents of the carboxy group is generally 1 or 2 and preferably 1.

In Formula (Bw-1), examples of the alkylureido group having 1 to 4 monocarbon atoms in $R^{21}$ to $R^{28}$ include an alkylureido group whose alkyl moiety is linear or branched. The substitution position of the alkyl having 1 to 4 carbon atoms is not particularly limited, but it is preferable to substitute with "N'". In the present specification, the "alkylureido group having 1 to 4 monocarbon atoms" indicates a "NH—CO—NH-(alkyl having 1 to 4 carbon atoms)" group or a "$H_2N$—CO—N— (alkyl having 1 to 4 carbon atoms)" group. Further, a nitrogen atom which is directly bonded to a benzene ring is noted as "N" and a nitrogen atom which is bonded to the nitrogen atom through a carbonyl (CO) group is noted as "N'" in the benzene ring to which $R^{21}$ to $R^{28}$ are bonded. Therefore, as the substitution position of the alkyl having 1 to 4 carbon atoms, the former is "N'" and the latter is "N". Specific examples thereof include an alkylureido group with a straight chain such as N'-ethylureido, N'-propylureido, or N'-butylureido and an alkylureido with a branched chain such as N'-isopropylureido, N'-isobutylureido, or N'-t-butylureido.

In Formula (Bw-1), examples of the alkylureido group having 1 to 4 dicarbon atoms in $R^{21}$ to $R^{28}$ include an alkylureido group having a straight chain or a branched chain. The substitution position of the alkyl having 1 to 4 carbon atoms is not particularly limited, but the alkyls may be substituted with "N" and "N'" one by one or two of them may be substituted with "N'" in accordance with the substitution position in the "alkylureido group having 1 to 4 monocarbon atoms," and the latter is preferable. Further, the two alkyls having 1 to 4 carbon atoms may be the same as or different from each other, but it is preferable that the two alkyls are the same as each other. Specific examples thereof include an alkylureido group with a straight chain such as N',N'-dimethylureido, N',N'-diethylureido, N',N'-dipropylureido, or N',N'-dibutylureido and an alkylureido group with a branched chain such as N',N'-diisopropylureido, or N',N'-diisobutylureido.

In Formula (Bw-1), examples of the alkylureido group which is substituted with at least one selected from a group consisting of a hydroxy group, a sulfo group, and a monocarboxy group as substituents and has 1 to 4 carbon atoms in $R^{21}$ to $R^{28}$ include an alkylureido group having these substituents in an arbitrary carbon atom in the alkyl ureido group having 1 to 4 monocarbon atoms. The number of the substituents is generally 1 or 2 and preferably 1. The position of the substituent is not particularly limited, but it is preferable that a nitrogen atom and a hydroxy group are not substituted with the same carbon atom. Specific examples thereof include a N'-mono(alkyl having 1 to 4 hydroxy-carbon atoms) ureido group such as N'-2-hydroxyethylureido or N'-3-hydroxypropylureido; a N'-mono(alkyl having 1 to 4 sulfo-carbon atoms) ureido group such as N'-2-sulfoethylureido or N'-3-sulfopropylureido; and a N'-mono (alkyl having 1 to 4 carboxy-carbon atoms) ureido group such as N'-carboxymethylureido, N'-2-carboxyethylureido, N'-3-carboxypropylureido, or N'-4-carboxybutylureido.

In Formula (Bw-1), examples of the alkylureido group which is substituted with at least one selected from a group consisting of a hydroxy group, a sulfo group, and a carboxy group as substituents and has 1 to 4 dicarbon atoms in $R^{21}$ to $R^{28}$ include an alkylureido group having these substituents in an arbitrary carbon atom in the alkylureido group having 1 to 4 dicarbon atoms. The number of the substituents is generally 1 or 2 and preferably 2. The position of the substituent is not particularly limited, but it is preferable that a nitrogen atom and a hydroxy group are not substituted with the same carbon atom. Further, when a plurality of substituents are included, the substituents may be the same as or different from each other, but it is preferable that the substituents are the same as each other. Specific examples thereof include a N',N'-di(alkyl having 1 to 4 hydroxy-carbon atoms)ureido group such as N',N'-di(2-hydroxyethyl) ureido, N',N'-di(2-hydroxypropyl)ureido, or N',N'-di(3-hydroxypropyl)ureido; a N',N'-di(alkyl having 1 to 4 sulfo-carbon atoms) ureido group such as N',N'-di(3-sulfopropyl) ureido; and a N',N'-di(alkyl having 1 to 4 carboxy-carbon atoms) ureido group such as N',N'-di(carboxymethyl)ureido.

In Formula (Bw-1), examples of a benzoylamino group in which a benzene ring is substituted with at least one selected from a group consisting of a halogen atom (a fluorine atom, a chlorine atom, a bromine atom, or an iodine atom is exemplified and a chlorine atom is particularly preferable), an alkyl group having 1 to 4 carbon atoms, a nitro group, a sulfo group, and a carboxy group as substituents in $R^{21}$ to $R^{28}$ include a benzoylamino group having 1 to 3 substituents and a benzoylamino group preferably having 1 or 2 substituents described above. When a plurality of the substituents are included, the substituents may be the same as or different from each other, but it is preferable that the substituents are the same as each other. Specific examples thereof include a halogen atom-substituted benzoylamino group such as 2-chlorobenzoylamino, 4-chlorobenzoylamino, or 2,4-dichlorobenzoylamino; an alkyl-substituted benzoylamino group having 1 to 4 carbon atoms such as 2-methylbenzoylamino, 3-methylbenzoylamino, or 4-methylbenzoylamino; a nitro-substituted benzoylamino group such as 2-nitrobenzoylamino, 4-nitrobenzoylamino, or 3,5-dinitrobenzoylamino; a sulfo-substituted benzoylamino group such as 2-sulfobenzoylamino or 4-sulfobenzoylamino; and a carboxy-substituted benzoylamino group such as 2-carboxybenzoylamino, 4-carboxybenzoylamino, or 3,5-dicarboxybenzoylamino.

In Formula (Bw-1), examples of a phenylsulfonylamino group in which a benzene ring is substituted with at least one selected from a group consisting of a halogen atom, an alkyl group having 1 to 4 carbon atoms, a nitro group, a sulfo group, and a carboxy group in $R^{21}$ to $R^{28}$ include a phenylsulfonylamino group having 1 to 3 substituents, a phenylsulfonylamino group preferably having 1 or 2 substituents, and a phenylsulfonylamino group more preferably having one substituent described above. When a plurality of the substituents are included, the substituents may be the same as or different from each other. Specific examples thereof include a halogen atom-substituted phenylsulfonylamino group such as 2-chlorophenylsulfonylamino or 4-chlorophenylsulfonylamino; an alkyl-substituted phenylsulfonylamino group having 1 to 4 carbon atoms such as 2-methylphenylsulfonylamino, 4-methylphenylsulfonylamino, or 4-t-butylphenylsulfonylamino; a nitro-substituted phenylsulfonylamino group such as 2-nitrophenylsulfonylamino, 3-nitrophenylsulfonylamino, or 4-nitrophenylsulfonylamino; a sulfo-substituted phenylsulfonylamino group such as 3-sulfophenylsulfonylamino or 4-sulfophenylsulfonylamino; and a carboxy-substituted phenylsulfonylamino group such as 3-carboxyphenylsulfonylamino or 4-carboxyphenylsulfonylamino.

In Formula (Bw-1), as $R^{21}$ to $R^{28}$, a hydrogen atom, a halogen atom, an alkyl group having 1 to 4 carbon atoms, an alkoxy group having 1 to 4 carbon atoms, an alkoxy group which is substituted with a sulfo group or a carboxy group and has 1 to 4 carbon atoms, and an alkylcarbonylamino group having 1 to 4 carbon atoms are preferable. Among these, a hydrogen atom, methyl, ethyl, t-butyl, 2-carboxyethoxy, 3-carboxypropoxy, 2-sulfoethoxy, 3-sulfopropoxy, and 4-sulfobutoxy are more preferable. In addition, among these, a hydrogen atom, methyl, and 3-sulfopropoxy are particularly preferable.

In Formula (Bw-1), as $R^{21}$ to $R^{28}$, an alkoxy group in which at least one of $R^{21}$ to $R^{28}$ is substituted with a sulfo group and which has 1 to 4 carbon atoms is preferable. Further, it is more preferable that $R^{21}$ to $R^{24}$ each independently represent an alkoxy group which is substituted with a hydrogen atom, an alkyl group having 1 to 4 carbon atoms, or a sulfo group and which has 1 to 4 carbon atoms, $R^{25}$ to $R^{28}$ each independently represent an alkoxy group in which at least one of $R^{21}$ to $R^{24}$ is substituted with a sulfo group and which has 1 to 4 carbon atoms, and $R^{21}$ to $R^{24}$ each independently represent a hydrogen atom or an alkyl group having 1 to 4 carbon atoms. Further, it is still more preferable that at least one of $R^{21}$ and $R^{22}$ represents a sulfopropoxy group, at least one of $R^{23}$ and $R^{24}$ represents a sulfopropoxy group, and $R^{25}$ to $R^{28}$ represents an alkyl group having 1 to 4 carbon atoms.

In Formula (Bw-1), the substitution positions of $R^{21}$ to $R^{28}$ are not particularly limited, but it is preferable that $R^{21}$ to $R^{24}$ are substituted at a 2-position and $R^{25}$ to $R^{28}$ are substituted at a 5-position when the substitution position of a nitrogen atom to be bonded to a triazine ring is set to a 1-position and the substitution position of an azo group is set to a 4-position in respective benzene rings with which $R^{21}$ to $R^{28}$ are substituted.

In Formula (Bw-1), a crosslinking group representing X is not particularly limited as long as the crosslinking group is divalent within a range in which the compound represented by Formula (Bw-1) is soluble in water. Here, as the solubility of the compound represented by Formula (Bw-1) in water, 5 g or more of the compound represented by Formula (Bw-1) is generally dissolved in 1 L of water. Further, the amount of the compound represented by Formula (Bw-1) to be dissolved in 1 L of water is preferably 10 g or more, more preferably 25 g or more, still more preferably 50 g or more, and particularly preferably 100 g or more. Specific examples thereof include a divalent atom (preferably a divalent heteroatom) such as a nitrogen atom, an oxygen atom, or a sulfur atom; an alkylenediamino group having 1 to 8 carbon atoms, an alkylenedioxy group having 1 to 8 carbon atoms, or an alkylenedithio group having 1 to 8 carbon atoms; a N,N'-hydrazinediyl group; an amino-alkoxyalkylamino group or the like in which two alkylamino groups are substituted with an oxygen atom; and an amino-alkoxyalkoxyalkylamino group or the like in which one amino group and one alkylamino group are substituted at the terminal of an alkylene oxide chain containing one or more ether bonds. The divalent crosslinking group representing X may include a group selected from a group consisting of a hydroxy group, a carboxy group, and an alkoxy group as a substituent of a carbon atom, and an alkyl group in which an alkyl moiety may be substituted with a hydroxy group or a carboxy group as a substituent of a nitrogen atom.

In Formula (Bw-1), as the divalent crosslinking group representing X, a group selected from a group consisting of an alkylenediamino group having 1 to 8 carbon atoms; an alkylenediamino group which is substituted with a hydroxy group or a carboxy group and has 1 to 8 carbon atoms; a N—C1-C4 alkyl-C1-C6 alkylenediamino group; a N—C1-C4 alkyl-C1-C6 alkylenediamino group in which an alkyl moiety is substituted with a hydroxy group or a carboxy group; an amino-C1-C6 alkoxy-C1-C6 alkylamino group; an amino C1-C4 alkoxy-C1-C4 alkoxy-C1-C4 alkylamino group; a xylylenediamino group; a piperazine-1,4-diyl group; a piperazine-1,4-diyl group which is substituted with an alkyl group having 1 to 4 carbon atoms or an alkoxy group having 1 to 4 carbon atoms; and a phenylenediamino group is preferable. In addition, all of these divalent cross-linking groups are "diamino" groups having two amino groups. Accordingly, the "diamino" group is cross-linked with any one nitrogen atom (that is, turned into N,N-diyl) after some groups such as piperazine-1,4-diyl and the like are removed or cross-linked with two different nitrogen atoms (that is, turned into N,N'-diyl). In these two cases, the latter case in which the diamino is cross-linked with two different nitrogen atoms to be N,N'-diyl is particularly preferable.

In Formula (Bw-1), examples of an alkylenediamino group having 1 to 8 carbon atoms in X include an alkylenediamino group with a linear chain and an alkylenediamino group with a branched chain, and the alkylenediamino group with a linear chain is preferable. The number of carbon atoms is generally 1 to 8, preferably 2 to 8, more preferably 2 to 6, and still more preferably 2 to 4. Specific examples thereof include an alkylenediamino group with a linear chain such as ethylenediamino, 1,3-propylenediamino, 1,4-butylenediamino, 1,5-pentylenediamino, 1,6-hexylenediamino, 1,7-heptylenediamino, or 1,8-octylenediamino and an alkylenediamino group with a branched chain such as 2-methyl-1,3-propylenediamino, 3-methyl-1,4-butylenediamino, or 4-methyl-1,6-hexylenediamino.

In Formula (Bw-1), examples of the alkylenediamino group which is substituted with a hydroxy group or a carboxy group and has 1 to 8 carbon atoms in X include an alkylenediamino group having these substituents in an arbitrary carbon atom in the alkylenediamino group having 1 to 8 carbon atoms. The number of carbon atoms is not particularly limited, but preferably 1 or 2. When a plurality of the substituents are included, the substituents may be the same as or different from each other and it is preferable that the substituents are the same as each other. Specific examples thereof include a hydroxy-substituted alkyleneamino group having 1 to 8 carbon atoms such as 2-hydroxy-1,3-propylenediamino, 2-hydroxy-1,4-butylenediamino, or 3-hydroxy-1,6-hexylenediamino; and a carboxy-substituted alkylenediamino group having 1 to 8 carbon atoms such as 1-carboxyethylenediamino, 1-carboxy-1,3-propylenediamino, 1-carboxy-1,4-butylenediamino, 1-carboxy-1,5-pentylenediamino, or 1,5-dicarboxy-1,5-pentylenediamino.

In Formula (Bw-1) in X, the N—C1-C4 alkyl-C1-C6 alkylenediamino group means that one nitrogen atom of the alkylenediamino group having 1 to 6 carbon atoms is substituted with an alkylene group having 1 to 4 carbon atoms. In the present specification, a nitrogen atom substituted with an alkyl group having 1 to 4 carbon atoms in the diamino group is noted as "N" and another nitrogen atom is noted as "N'" if necessary. The number of carbon atoms of the alkylene moiety is generally 1 to 6, preferably 2 to 4, and particularly preferably 2 or 3. As the alkyl group having 1 to 4 carbon atoms, an alkyl group with a linear chain or a branched chain is exemplified and an alkyl group with a linear chain is preferable. Specific examples thereof include a N-linear C1-C4 alkyl-C1-C6 alkylenediamino group such as a N-methylethylenediamino group, a N-ethylethylenediamino group, a N-propylethylenediamino group, or a N-butylethylenediamino group; and a N-branched C1-C4 alkyl-C1-C6 alkylenediamino group such as a N-isopropylethylenediamino group, a N-isobutylethylenediamino group, a N-sec-butylethylenediamino group, or a N-tert-butylethylenediamino group.

In Formula (Bw-1), as a N—C1-C4 alkyl-C1-C6 alkyenediamino group in which the alkyl moiety is substituted with a hydroxy group or a carboxy group in X, an alkylenediamino group which includes these substituents in an arbitrary carbon atom of the alkyl moiety of the N—C1-C4 alkyl group in the N—C1-C4 alkyl-C1-C6 alkylenediamino group is exemplified. The position of the substituent is not particularly limited, but it is preferable that a nitrogen atom and a hydroxy group are not substituted with the same carbon atom. As the number of carbon atoms in the alkylene moiety, the number of carbon atoms in the N—C1-C4 alkyl-C1-C6 alkylenediamino group is exemplified. In addition, the number of carbon atoms in the alkyl moiety is generally 1 to 4, preferably 2 to 4, and more preferably 2 or 3. The number of the substituents is generally 1 or 2 and preferably 1. In addition, when a plurality of the substituents are included, the substituents may be the same as or different from each other, but it is preferable that the substituents are the same as each other. Specific examples thereof include a N-hydroxy-substituted C1-C4 alkyl-C1-C6 alkylenediamino group such as a N-(2-hydroxyethyl)ethylenediamino group, a N-(3-hydroxypropyl)ethylenediamino group, a N-(2-hydroxypropyl)ethylenediamino group, or a N-(4-hydroxybutyl)ethylenediamino group; and a N-carboxy-substituted C1-C4 allkyl-C1-C6 alkylenediamino group such as a N-(carboxymethyl)ethylenediamino group, a N-(2-carboxyethyl)ethylenediamino group, a N-(3-carboxypropyl)ethylenediamino group, or a N-(4-carboxybutyl) ethylenediamino group.

In Formula (Bw-1), examples of the amino C1-C6 alkoxy-C1-C6 alkylamino group in X include an alkylamino group with a linear chain and an alkylamino group with a branched chain, and an alkylamino group with a linear chain is preferable. Further, as the amino C1-C6 alkoxy-C1-C6 alkylamino group with the preferable number of carbon atoms, an amino C2-C4 alkoxy-C2-C4 alkylamino group is exemplified. As the amino C1-C6 alkoxy-C1-C6 alkylamino group with the particularly preferable number of carbon atoms, an amino C2-C3 alkoxy-C2-C3 alkylamino group is exemplified. Specific examples thereof include aminoethoxyethylamino, aminoethoxypropylamino, aminopropoxypropylamino, and aminoethoxypentylamino.

In Formula (Bw-1) in X, as examples of the amino C1-C4 alkoxy C1-C4-alkoxy C1-C4-alkylamino group, an alkylamino group with a linear chain or an alkylamino group with a branched chain is exemplified and an alkylamino group with a linear chain is preferable. Further, as the amino C1-C4 alkoxy C1-C4-alkoxy C1-C4-alkylamino group with the preferable number of carbon atoms, an amino C2-C4 alkoxy-C2-C4 alkoxy-C2-C4 alkylamino group is exemplified. As the amino C1-C4 alkoxy C1-C4-alkoxy C1-C4-alkylamino group with the particularly preferable number of carbon atoms, an amino C2-C3 alkoxy-C2-C3 alkoxy-C2-C3 alkylamino group is exemplified. Specific examples thereof include an alkylamino group with a linear chain such as aminoethoxyethoxyethylamino, aminoethoxypropoxyethylamino, or aminoethoxybutoxyethylamino; and an alkylamino group with a branched chain such as aminoethoxy (2-methylethoxy)ethylamino or aminoethoxy(2-methylpropoxy)ethylamino.

In Formula (Bw-1), preferable examples of the xylylenediamino group in X include an o-xylylenediamino group, an m-xylylenediamino group, and a p-xylylenediamino group. Among these, an m-xylylenediamimo group or a p-xylylenediamino group is preferable.

In Formula (Bw-1), as a piperazine-1,4-diyl group which is substituted with an alkyl group having 1 to 4 carbon atoms or an alkoxy group having 1 to 4 carbon atoms in X, a diyl group having these substituents in an arbitrary carbon atom of annular atoms of a piperazine ring is exemplified. The number of substituents is generally 1 or 2 and preferably 1. In addition, when a plurality of substituents are included, the substituents may be the same as or different from each other, but it is preferable that the substituents are the same as each other. Specific examples thereof include a 2-methylpiperazine-1,4-diyl group, a 2-ethylpiperazine-1,4-diyl group, a 2,5-dimethylpiperazine-1,4-diyl group, a 2,6-dimethylpiperazine-1,4-diyl group, a 2,5-diethylpiperazine-1,4-diyl group, and a 2-methyl-5-ethylpiperazine-1,4-diyl group.

In Formula (Bw-1), examples of the phenylenediamino group in X include an o-phenylenediamino group, an m-phenylenediamino group, and a p-phenylenediamino group, and an m-phenylenediamino group or a p-phenylenediamino group is preferable.

Among these described above, it is preferable that X represents an alkyldiamino group having 1 to 8 carbon atoms, an alkylenediamino group which is substituted with a carboxy group and has 1 to 8 carbon atoms, a N—C1-C4 alkyl-C1-C6 alkylenediamino group in which the alkyl moiety is substituted with hydroxy; an amino C1-C4-alkoxy C1-C4-alkoxy C1-C4-alkylamino group, a xylyleneamino group, or a piperazine-1,4-diyl group. Among these, it is more preferable that X represents an alkylenediamino group having 1 to 8 carbon atoms, a xylylenediamino group, or a piperazine-1,4-diyl group. Among these, preferable specific examples thereof include 1,2-ethylenedimino, 1,3-propylenediamino, 1,4-butylenediamino, 1-carboxypentylene-1,5-diamino, N-2-hydroxyethyl-ethylenediamino, aminoethoxyethoxyethylamino, m-xylylenediamino, and piperazine-1,4-diyl.

In Formula (Bw-1), the substitution positions of four sulfo groups, which are not specified, are not particularly limited. A sulfo group which is substituted with a benzene ring having one azo bond may be substituted at a 2-, 3-, or 4-position when the substitution position of the azo bond is set to a 1-position. In addition, it is preferable that the sulfo group is substituted at the 4-position.

It is preferable that the coloring material represented by Formula (Bw-1) is a compound represented by the following Formula (Bw-1-1) and more preferable that the coloring material represented by Formula (Bw-1) is a compound represented by the following Formula (Bw-1-2).

(Bw-1-1)

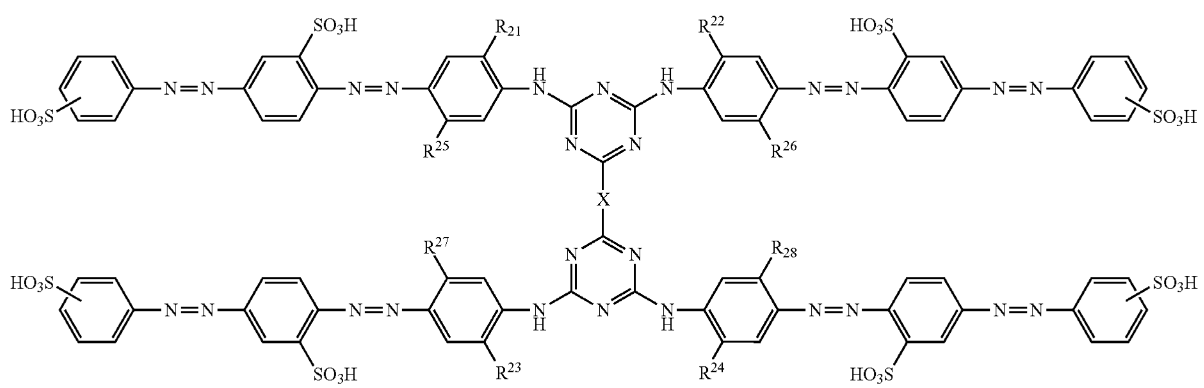

(In Formula (Bw-1-1), $R^{21}$ to $R^{28}$ and X have the same definitions as those in Formula (Bw-1).)

(Bw-1-2)

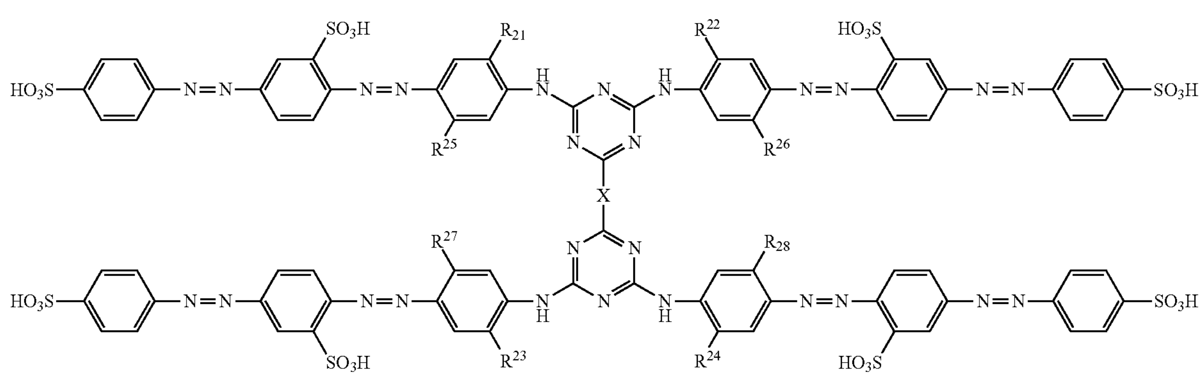

(In Formula (Bw-1-2), $R^{21}$ to $R^{28}$ and X have the same definitions as those in Formula (Bw-1).)

In regard to $R^{21}$ to $R^{28}$ in Formulae (Bw-1) to (Bw-1-2), the substitution positions of $R^{21}$ to $R^{28}$ in Formula (Bw-1) in Formulae (Bw-1) and (Bw-1-1), and the substitution position of sulfo which has not been specified, a compound obtained by combining preferable ones is more preferable and a compound obtained by combining more preferable ones is still more preferable. The same applies to the combinations of preferable compounds or a preferable compound and a more preferable compound.

A salt of the compound represented by Formula (Bw-1) may be an organic or inorganic salt of a cation ion. Examples of the inorganic salt include an alkali metal salt, an alkaline earth metal salt, and an ammonium salt. Among these, preferable examples of the inorganic salt include an alkali metal salt such as lithium, sodium, or potassium, and an ammonium salt. Further, examples of the organic salt of a cation ion include a quaternary ammonium ion represented by Formula (7), but the organic salt thereof is not limited thereto.

Further, free acids of the coloring material represented by Formula (Bw-1) and various salts thereof may be a mixture. Examples of the mixture include a mixture of sodium salts of the coloring material represented by Formula (Bw-1) and ammonium salts of the coloring material represented by Formula (Bw-1); a mixture of free acids of the coloring material represented by Formula (Bw-1) and sodium salts of the coloring material represented by Formula (Bw-1); and a mixture of lithium salts of the coloring material represented by Formula (Bw-1), sodium salts of the coloring material represented by Formula (Bw-1), and ammonium salts of the coloring material represented by Formula (Bw-1), and any combination may be used. Since the physical properties such as solubility or the like vary depending on the kind of salt, a mixture having target physical properties can be obtained by selecting the kind of salt according to the necessity and changing the ratio of salts when plural kinds of salts are contained.

Preferable specific examples of the coloring material represented by Formula (Bw-1), which are not particularly limited, include compounds represented by the following structural formulae. For the sake of convenience, functional groups such as a sulfo group and a carboxy group in respective Tables are described as a form of a free acid.

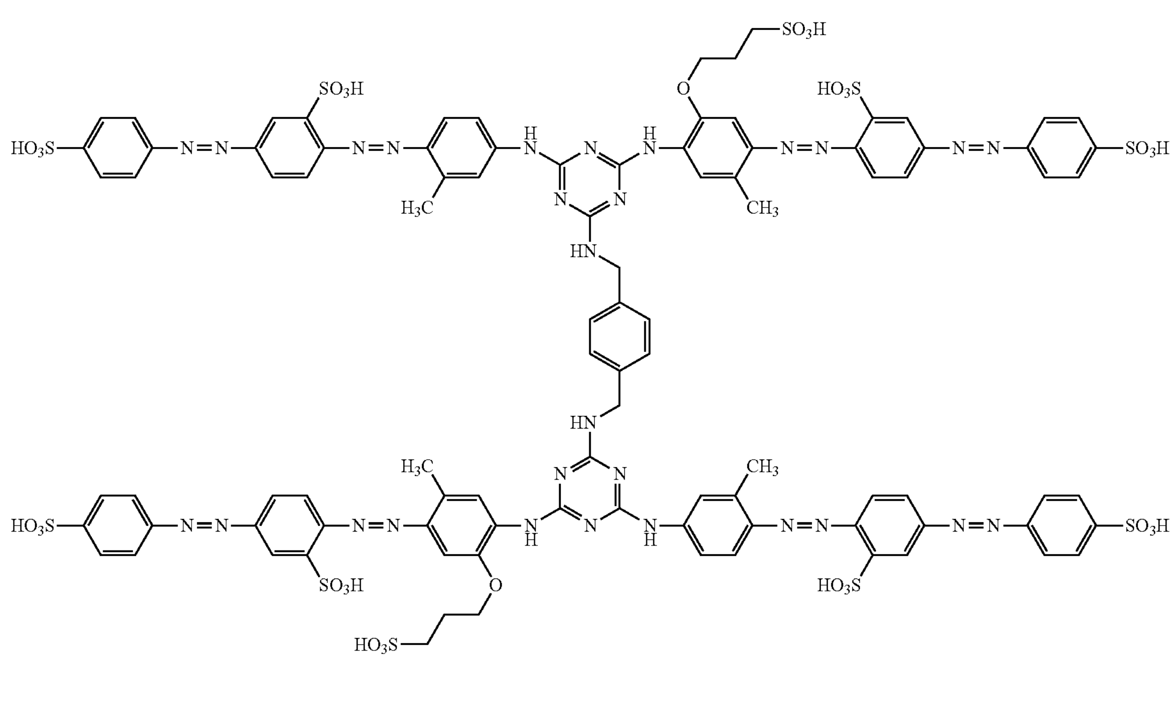

-continued
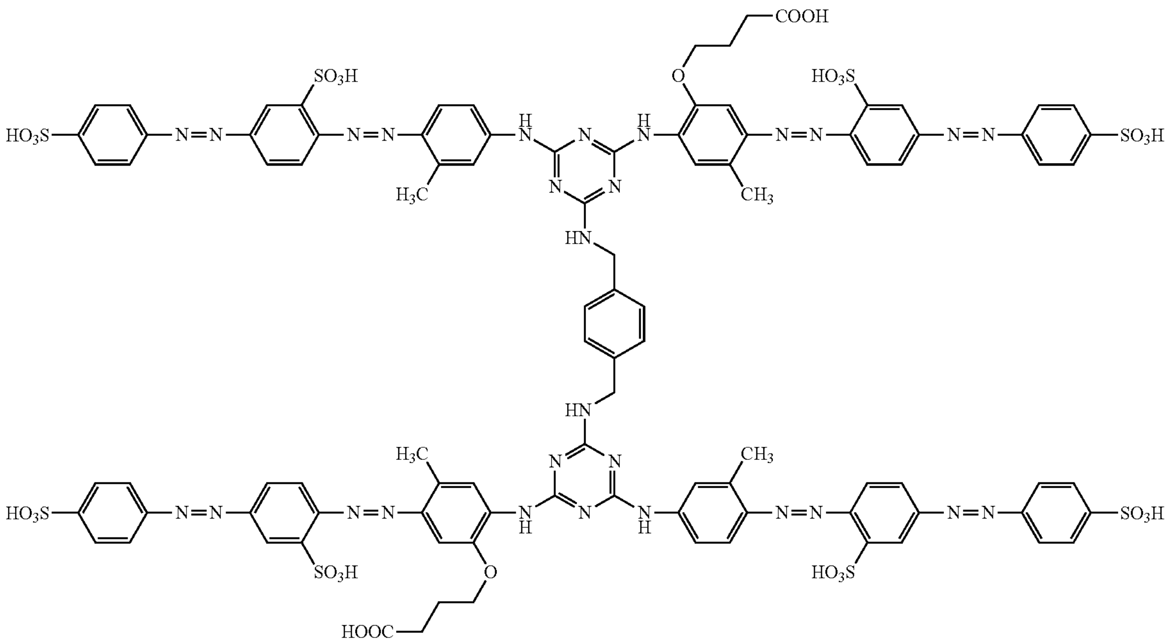
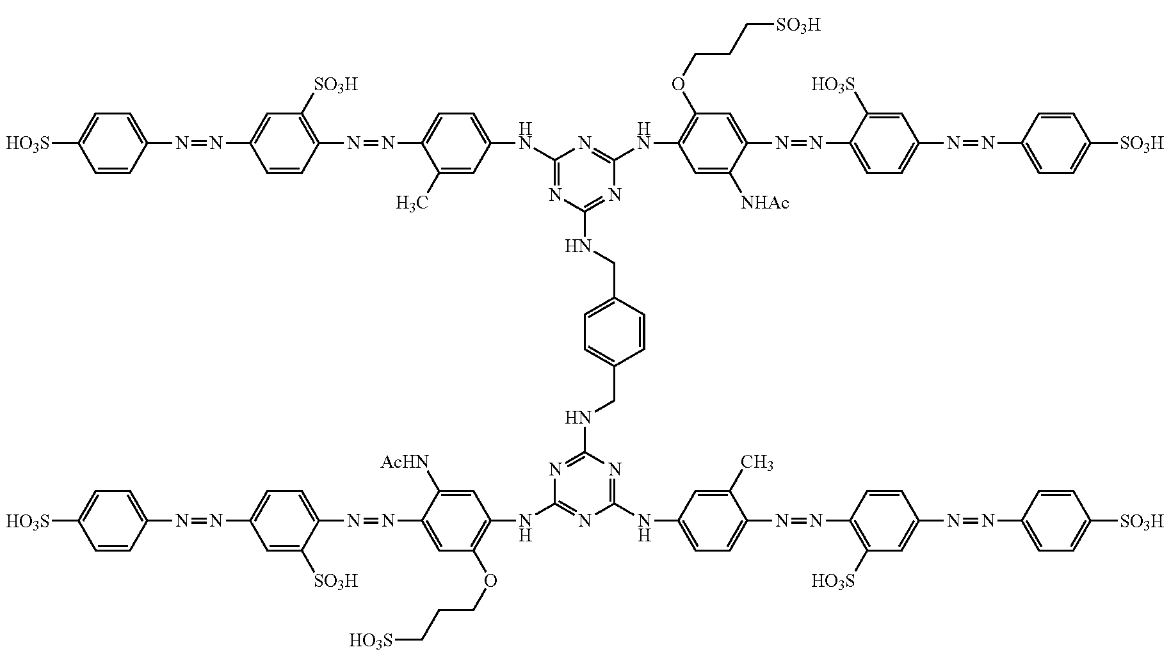

-continued
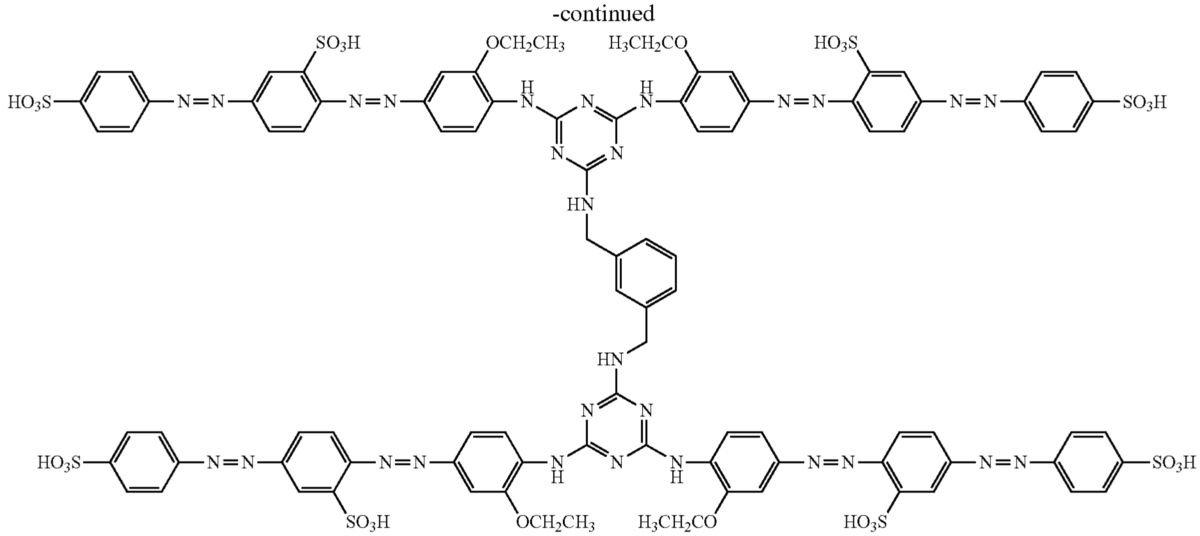
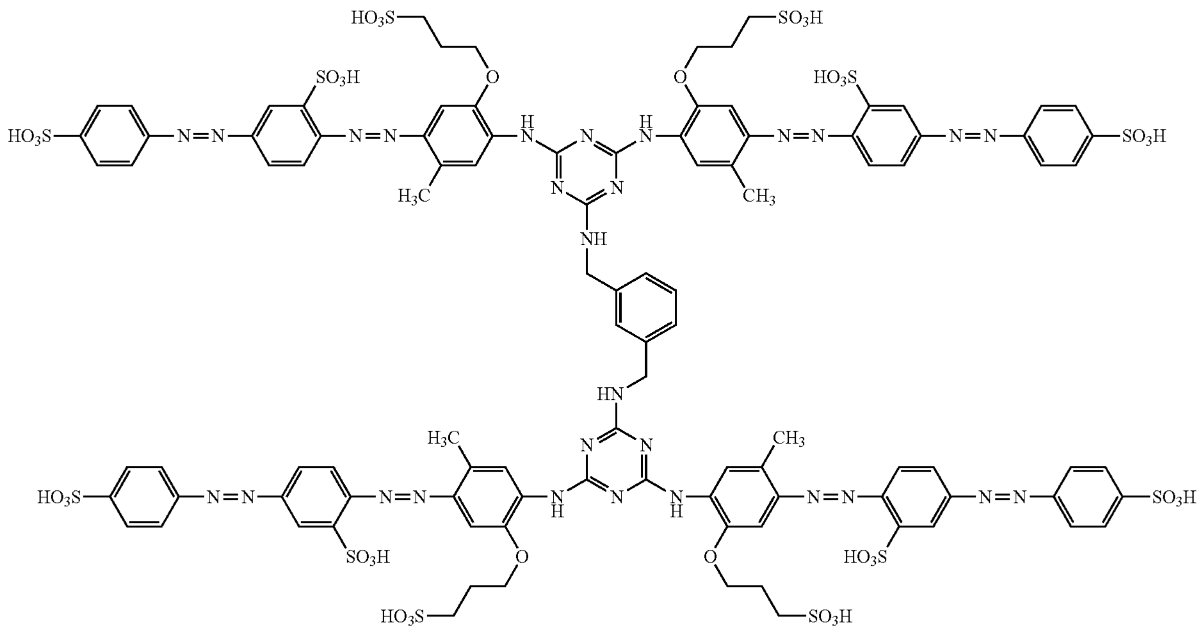
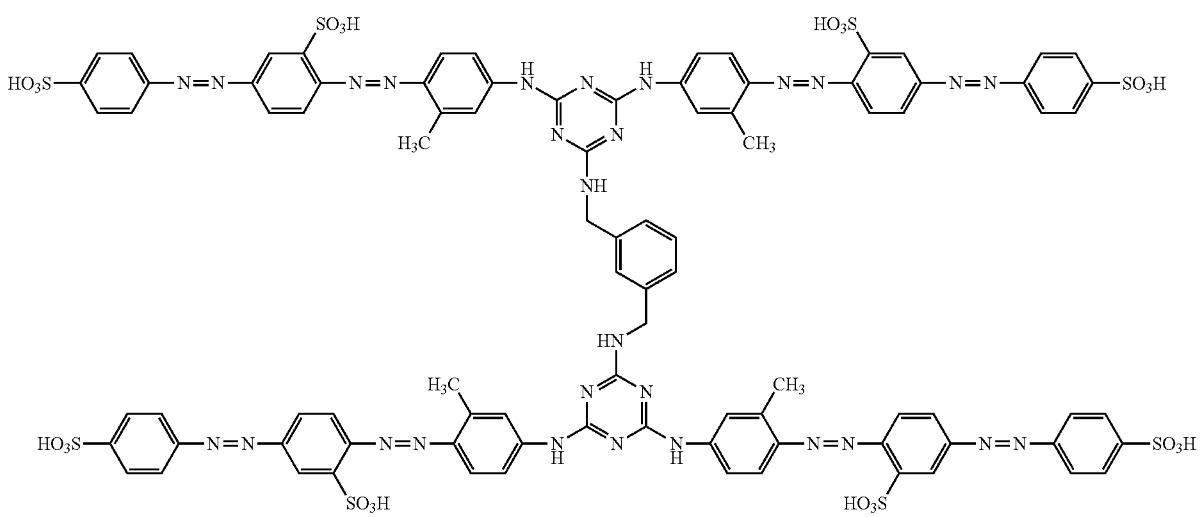

-continued
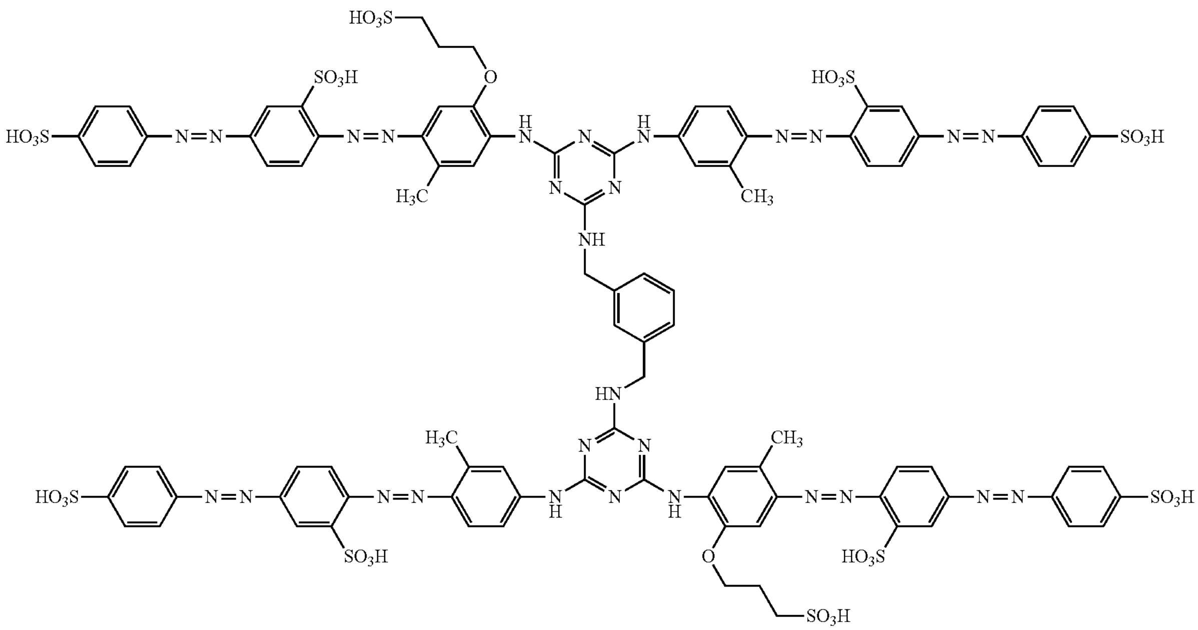
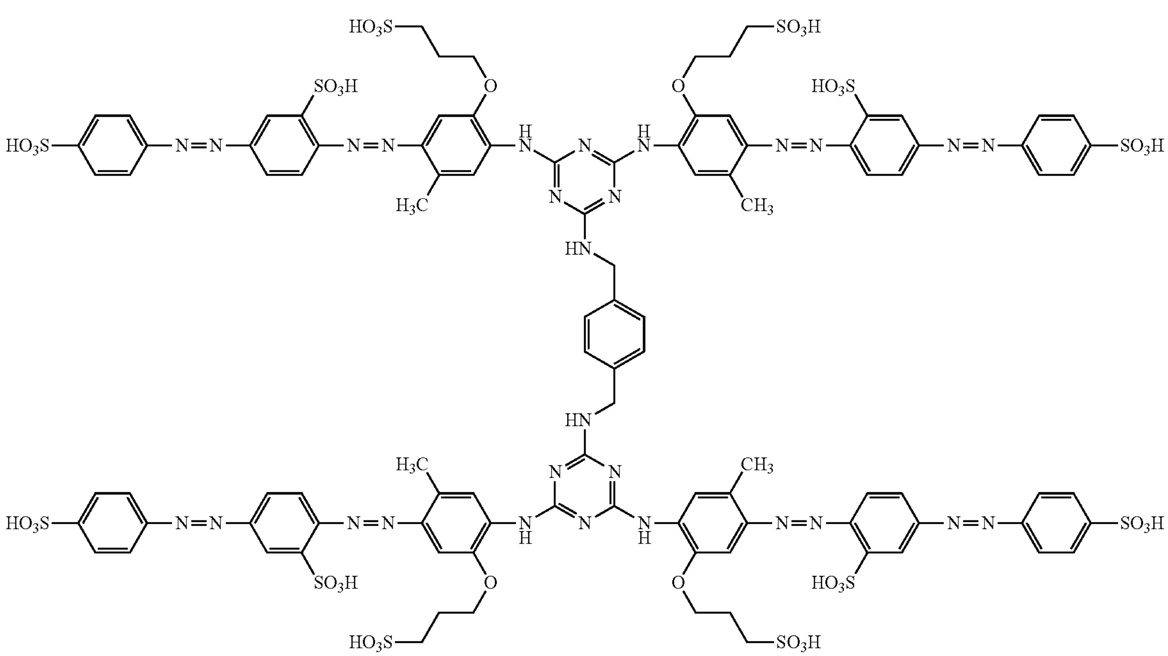

-continued
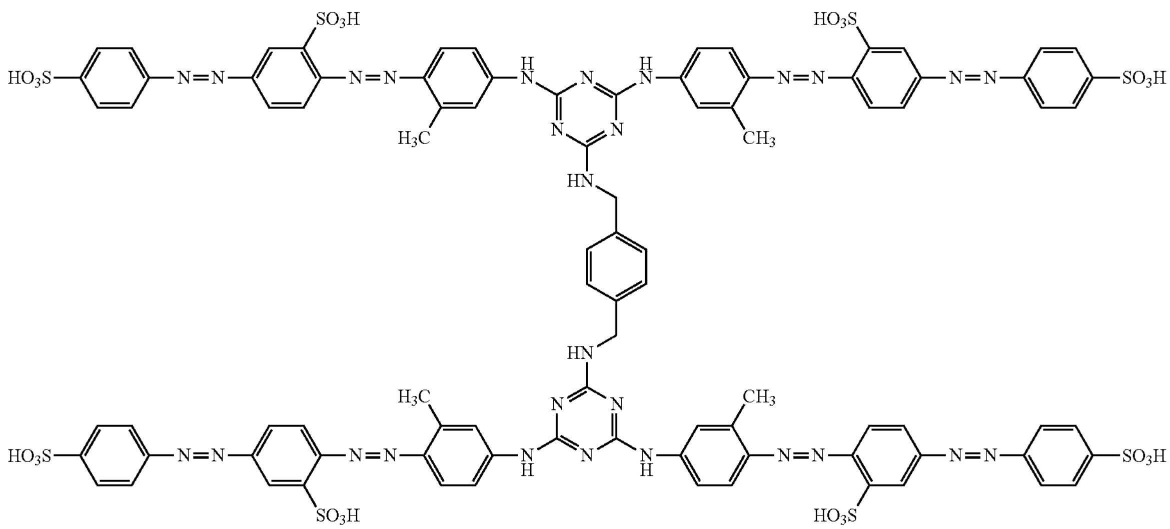
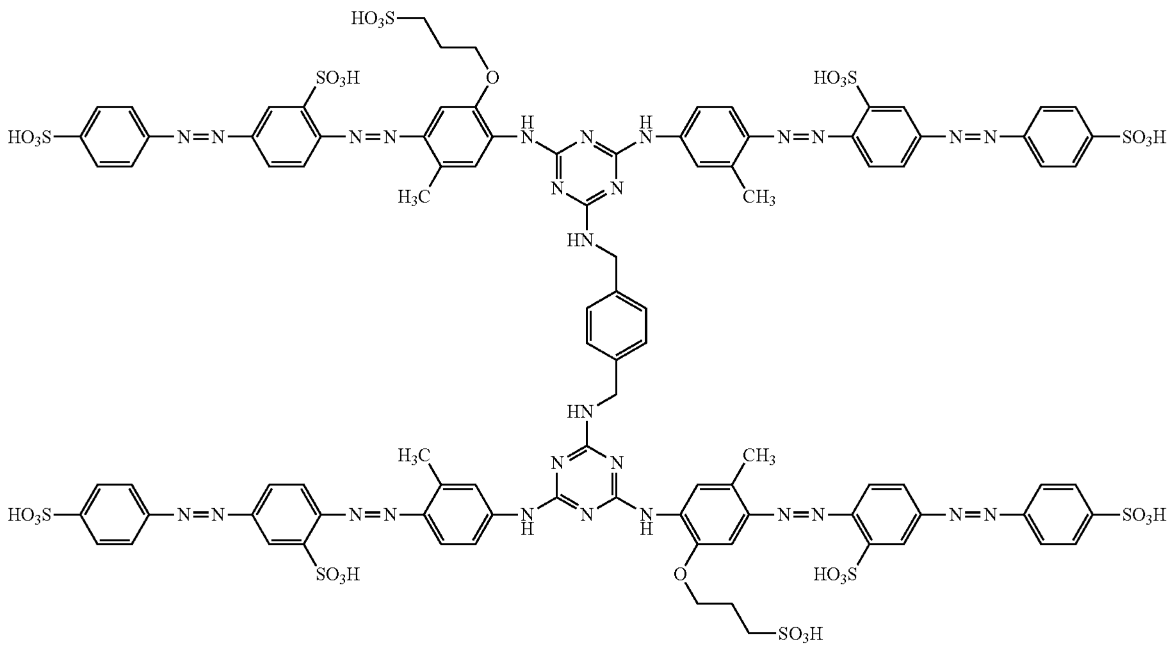
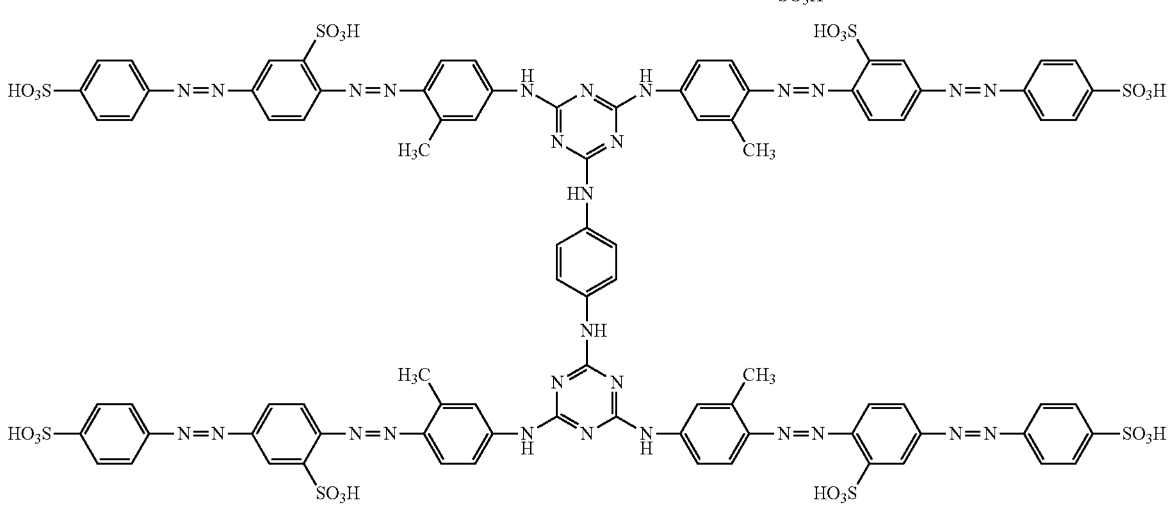

-continued
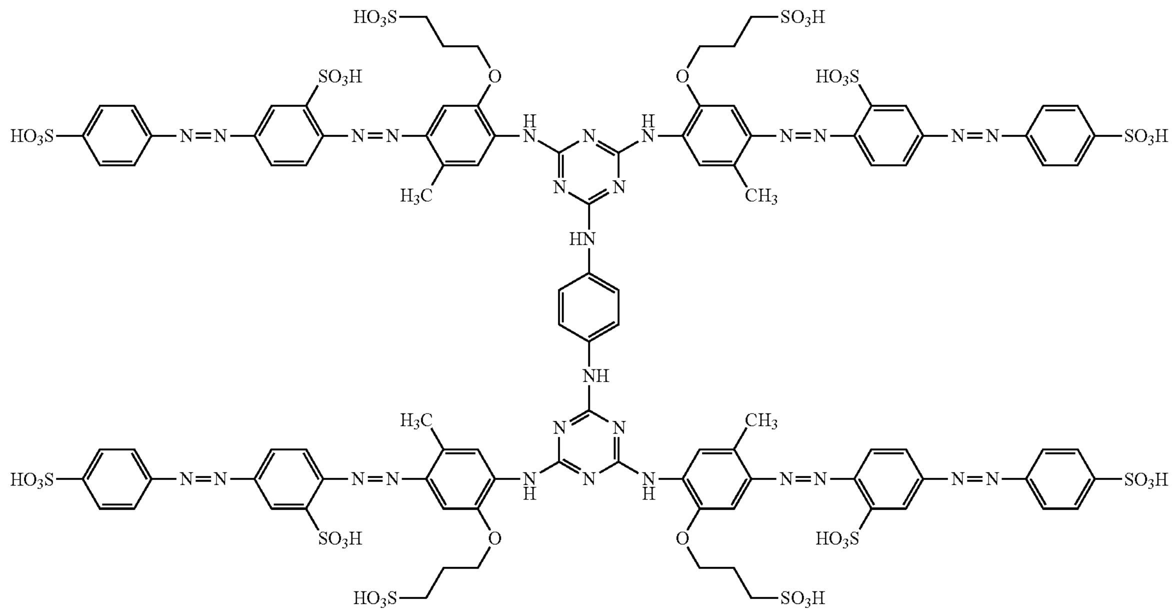
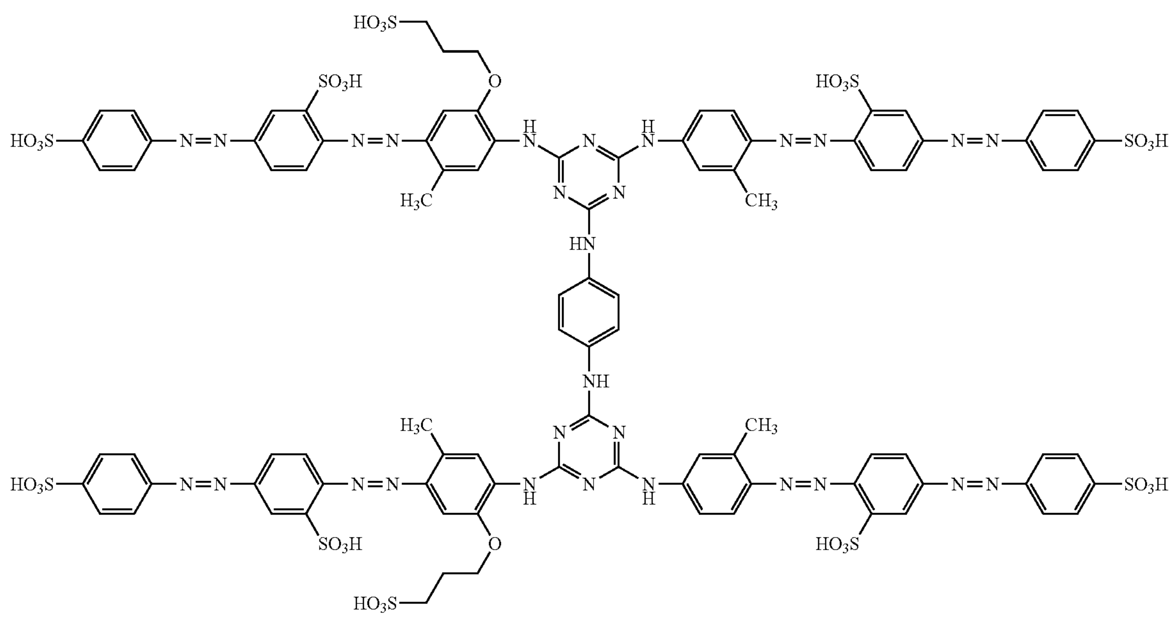
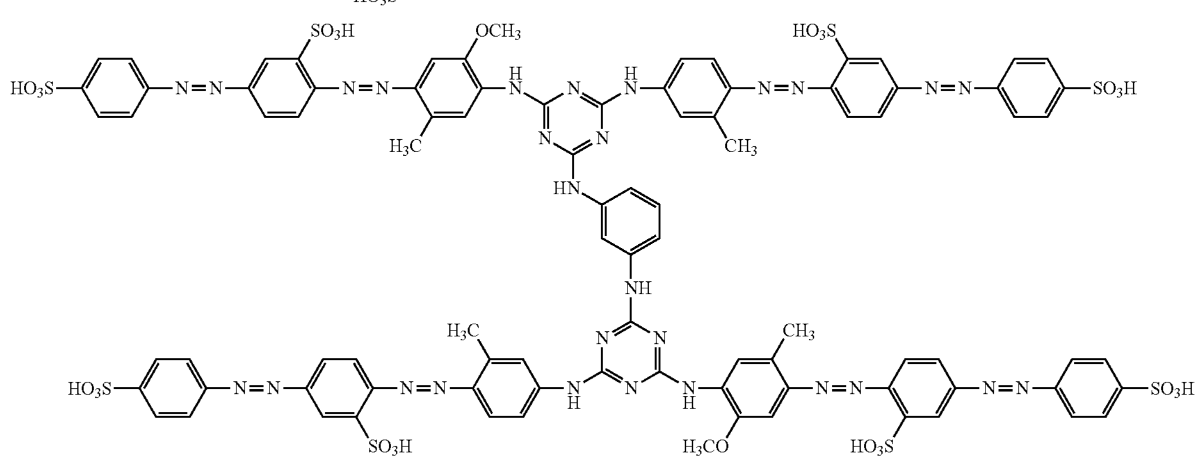

-continued
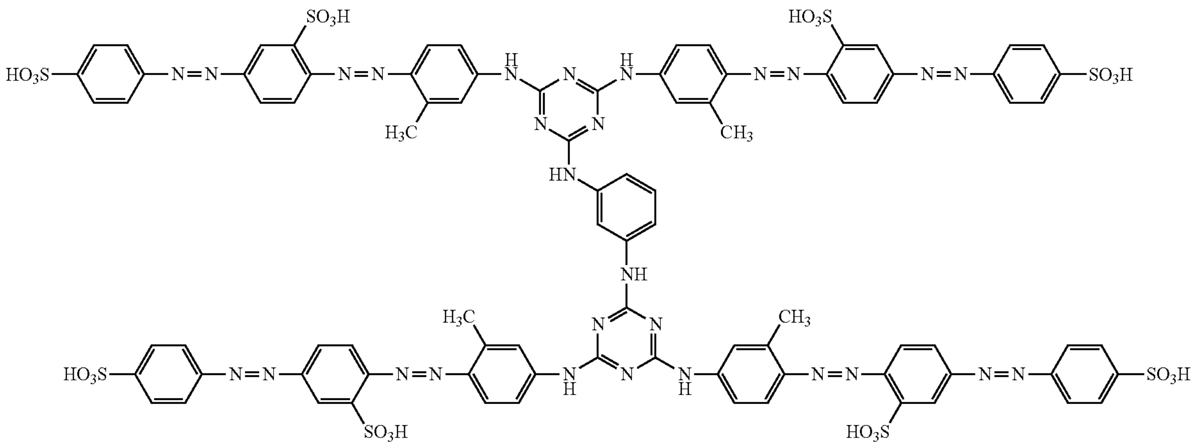
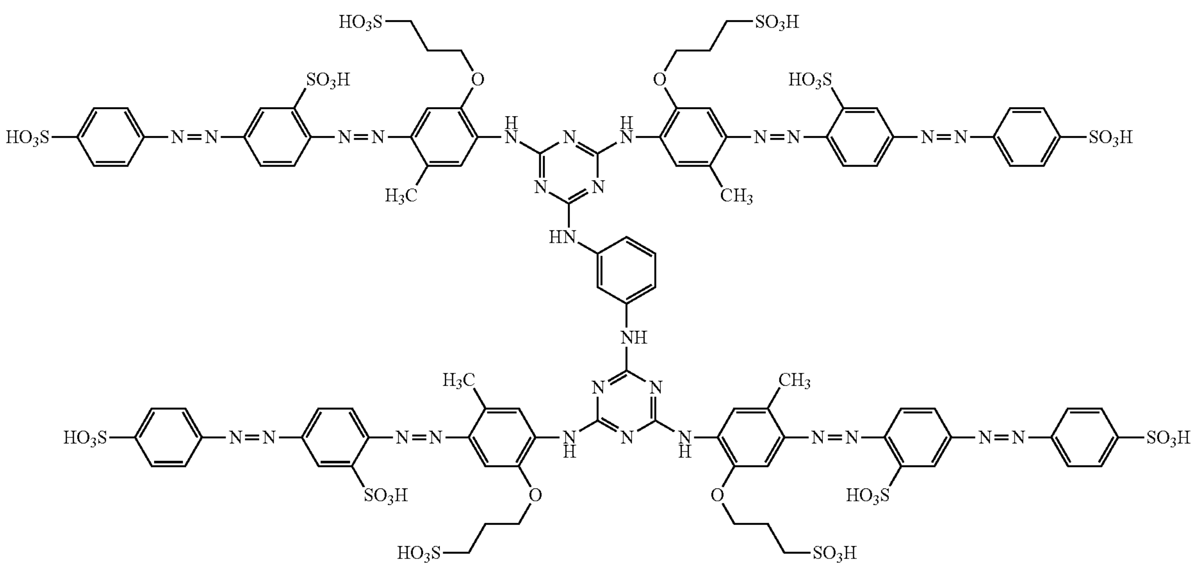
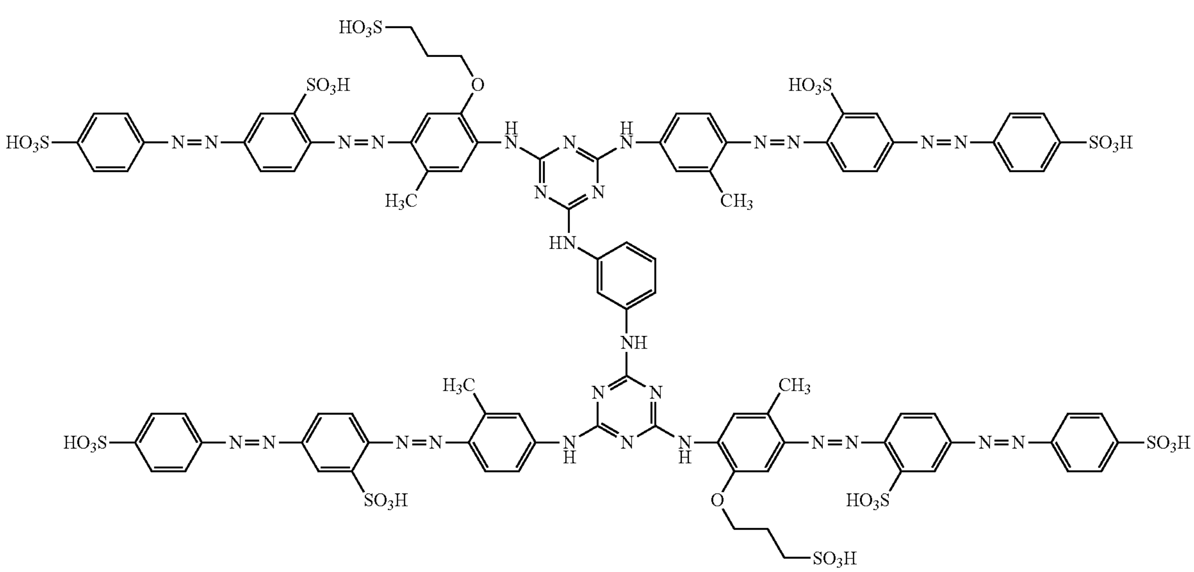

-continued
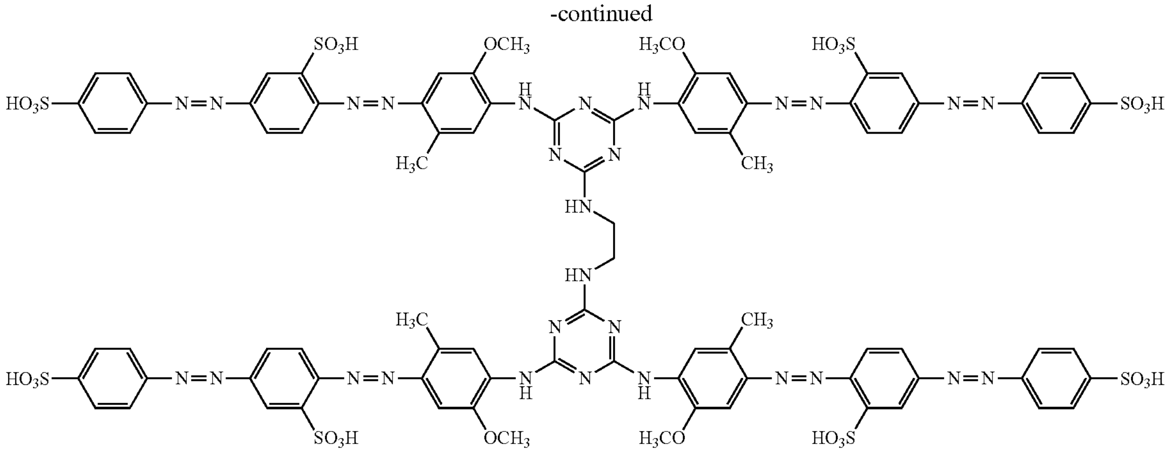
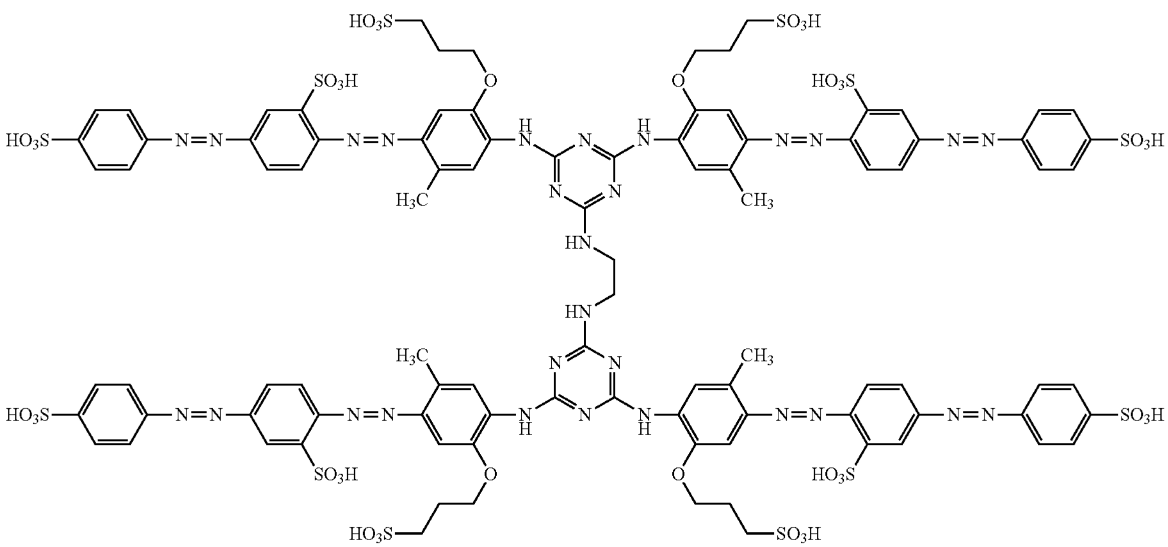
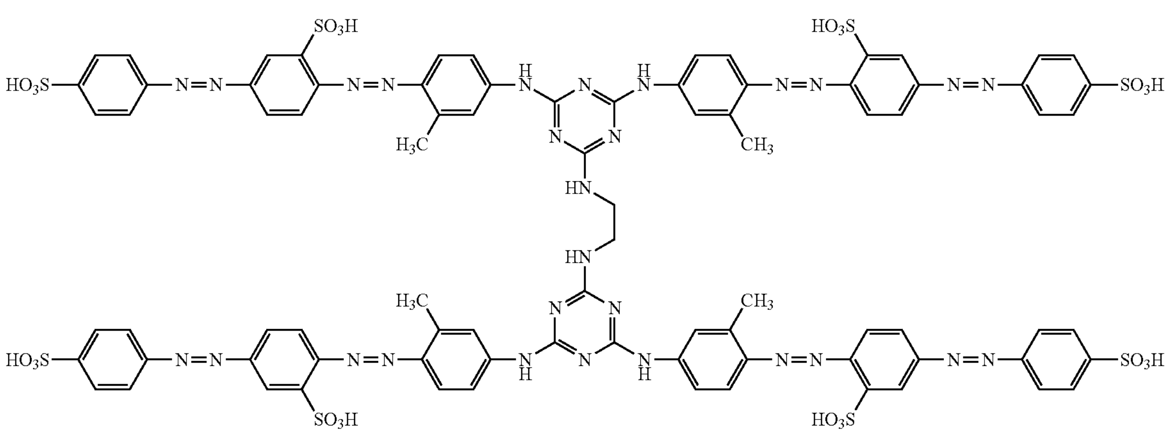

-continued
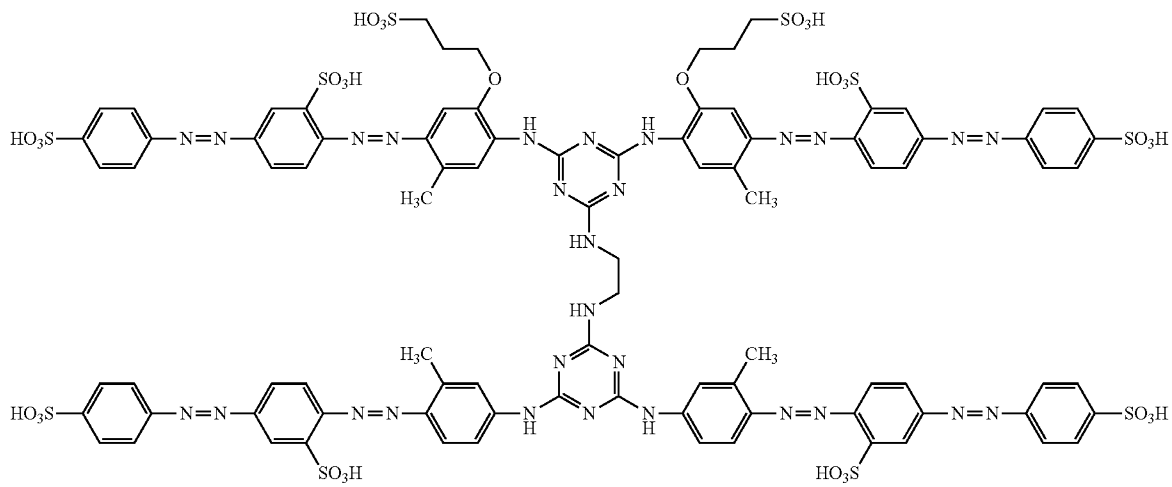
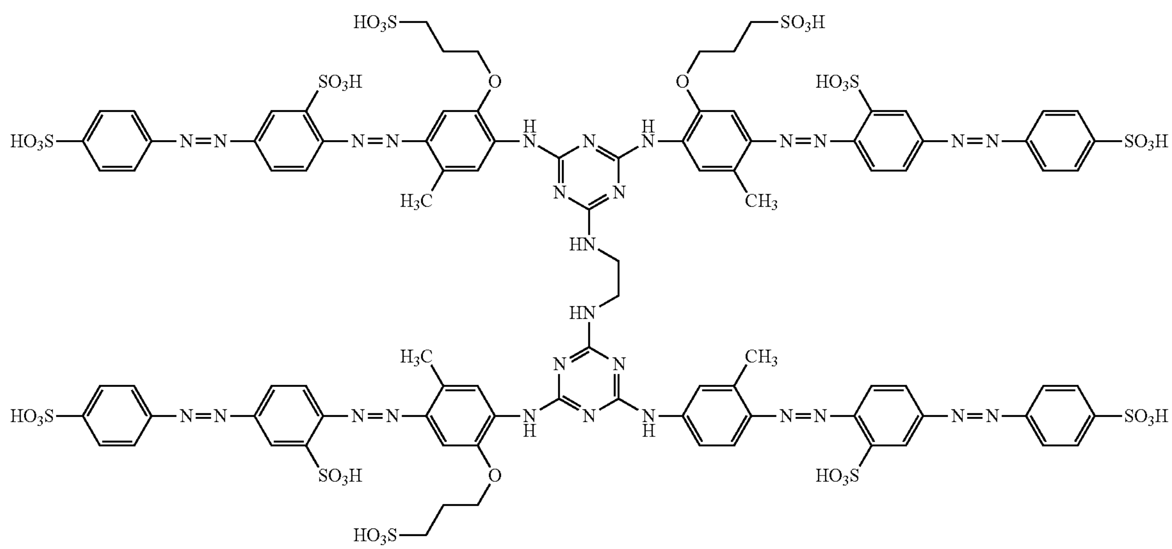
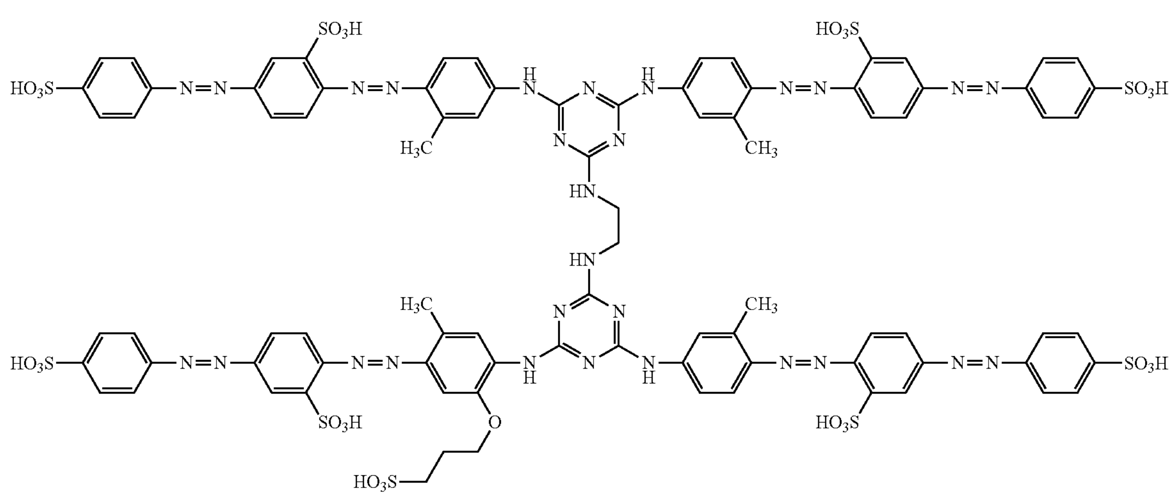

-continued
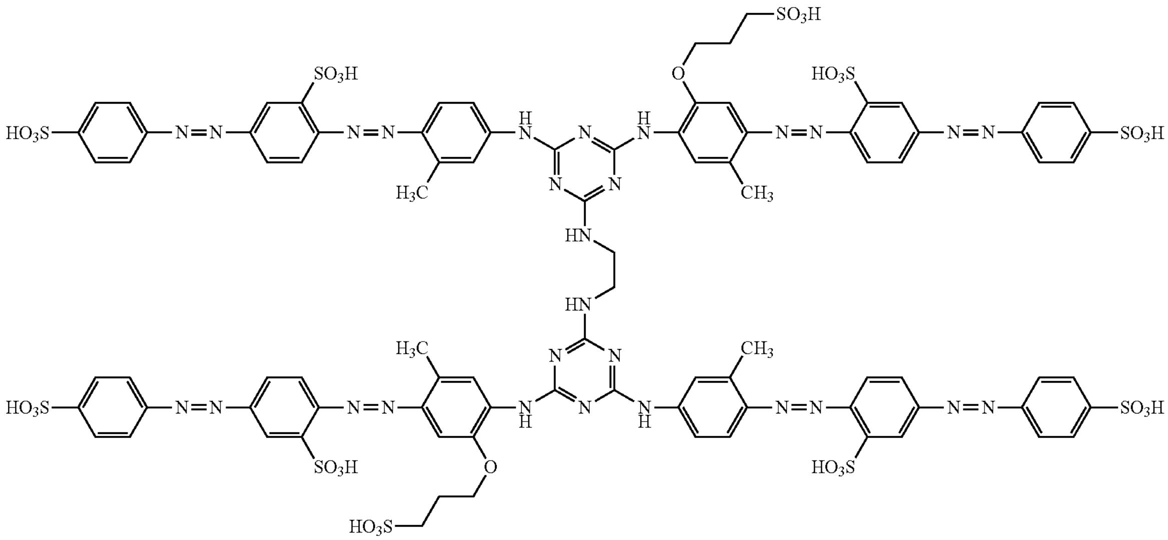
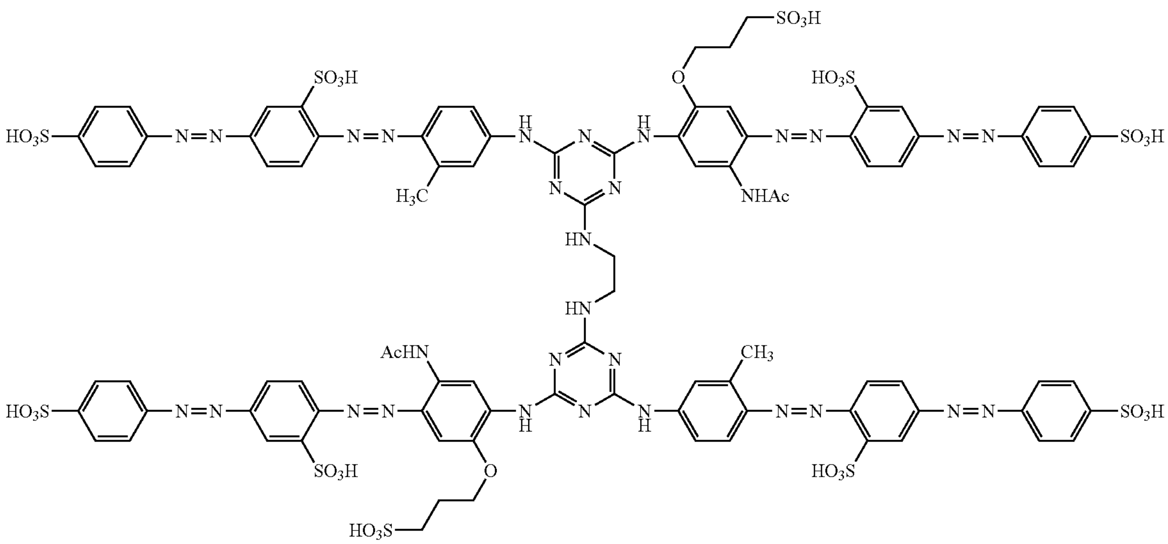
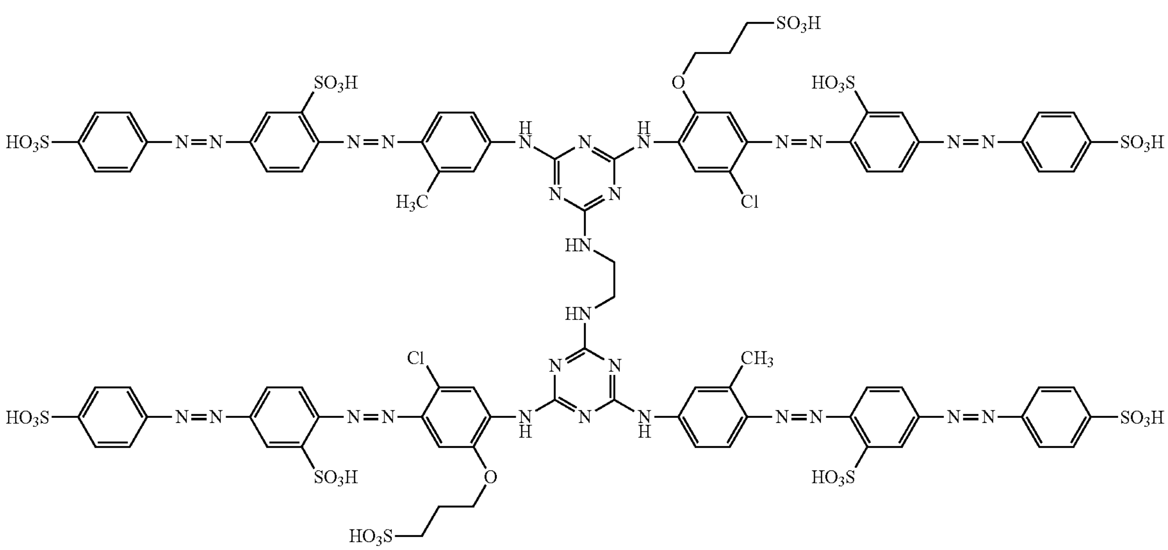

-continued
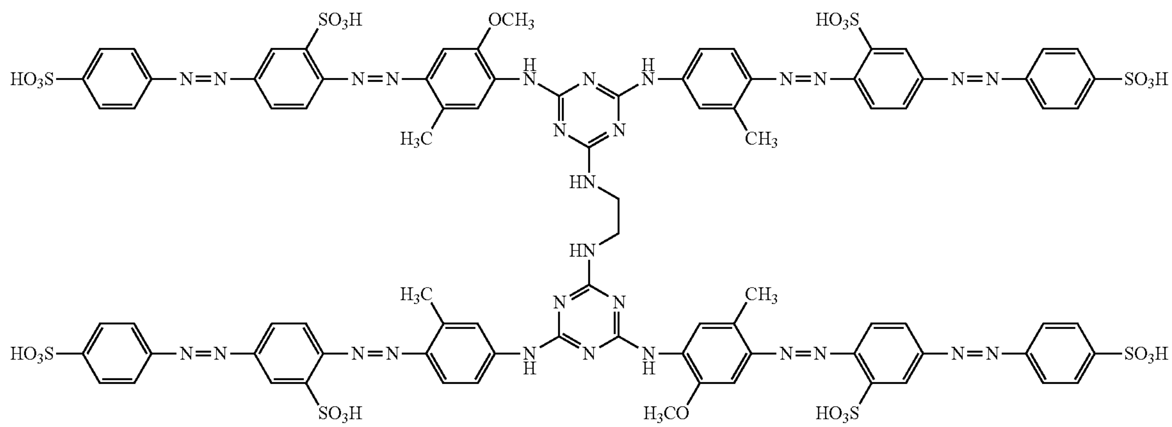
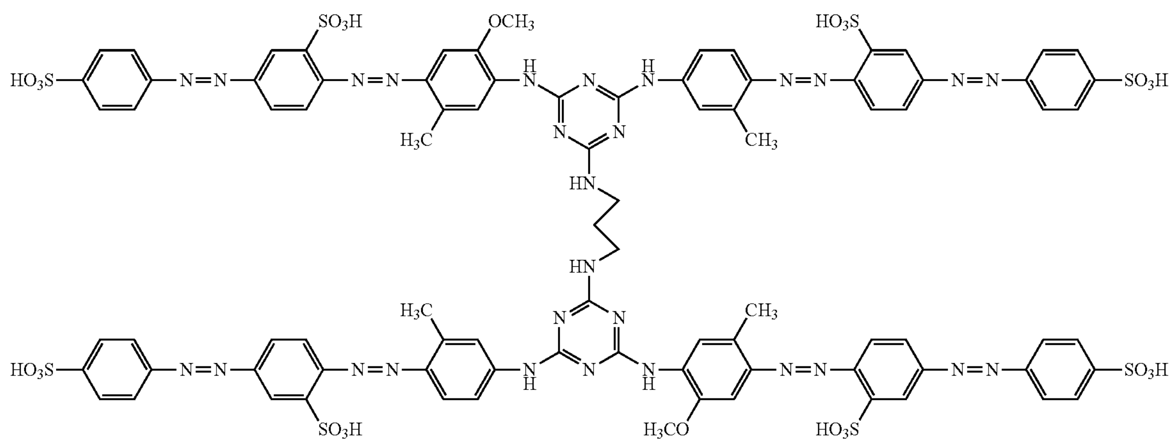
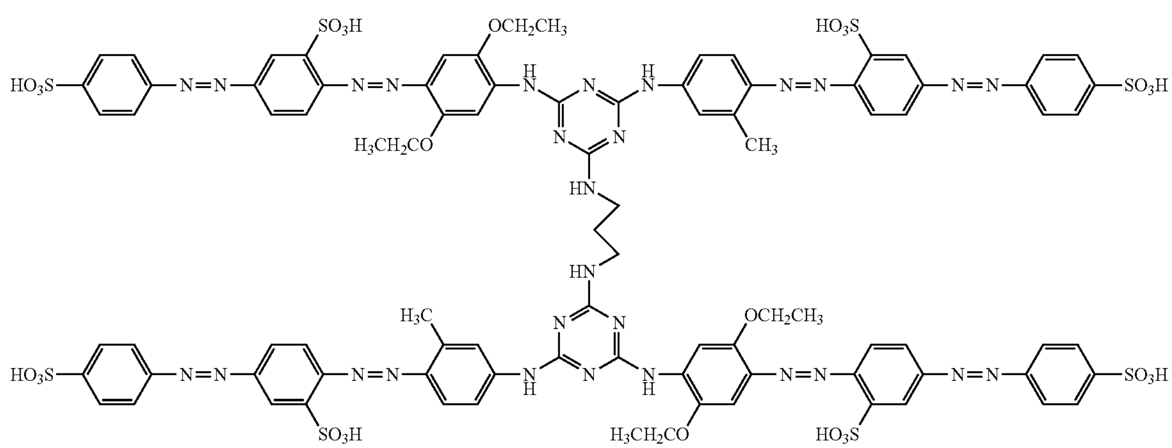

-continued
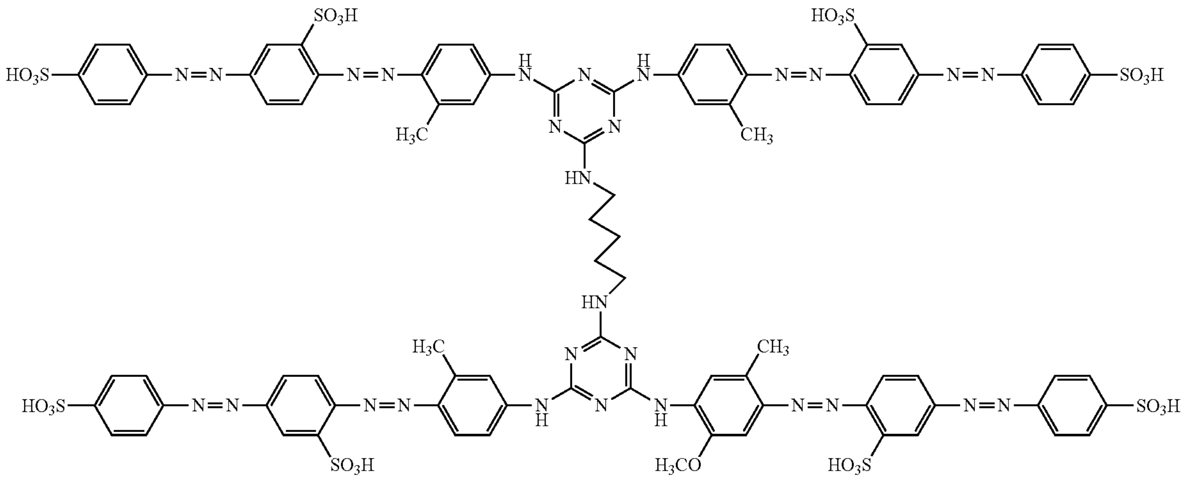
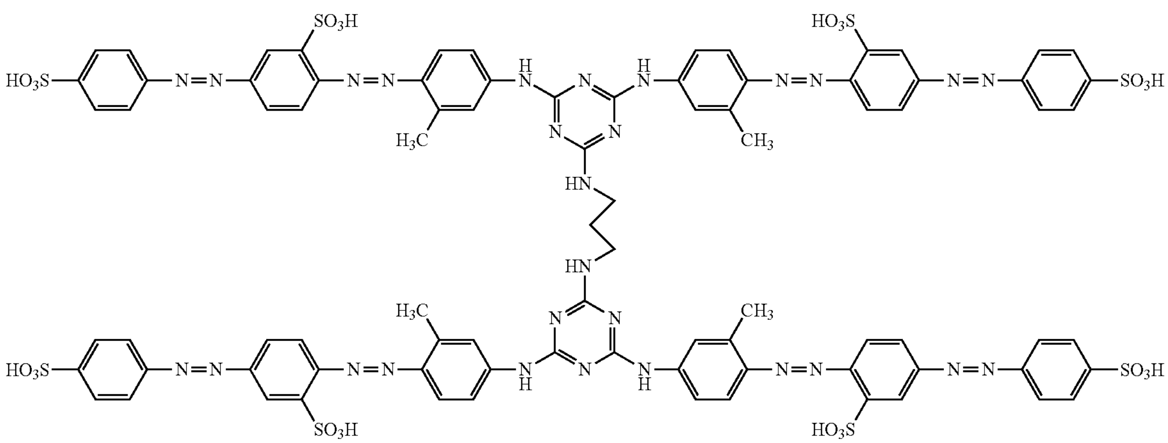
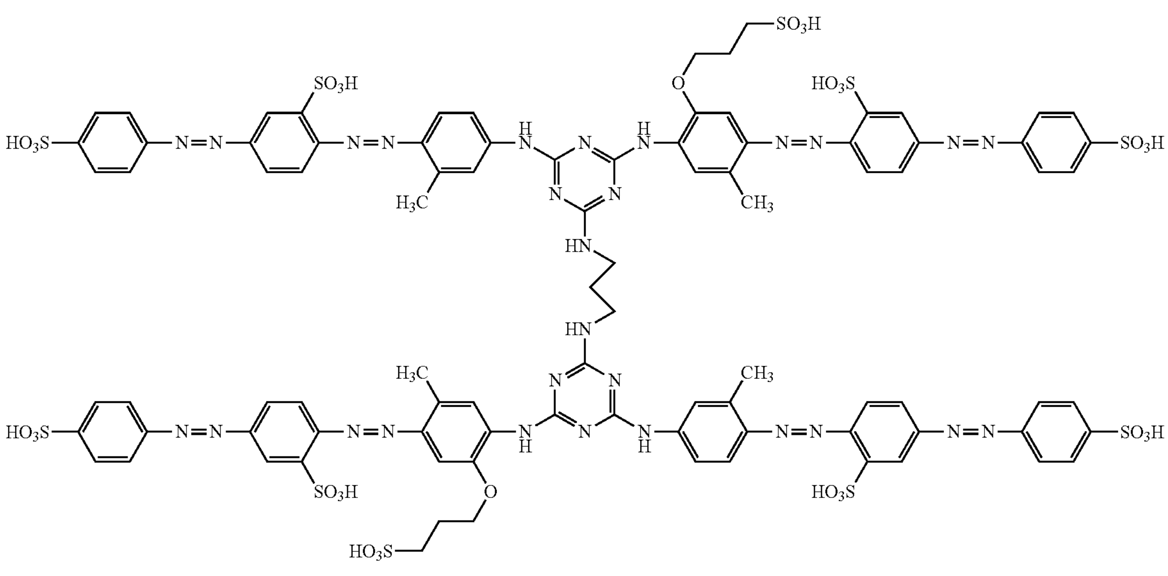

-continued
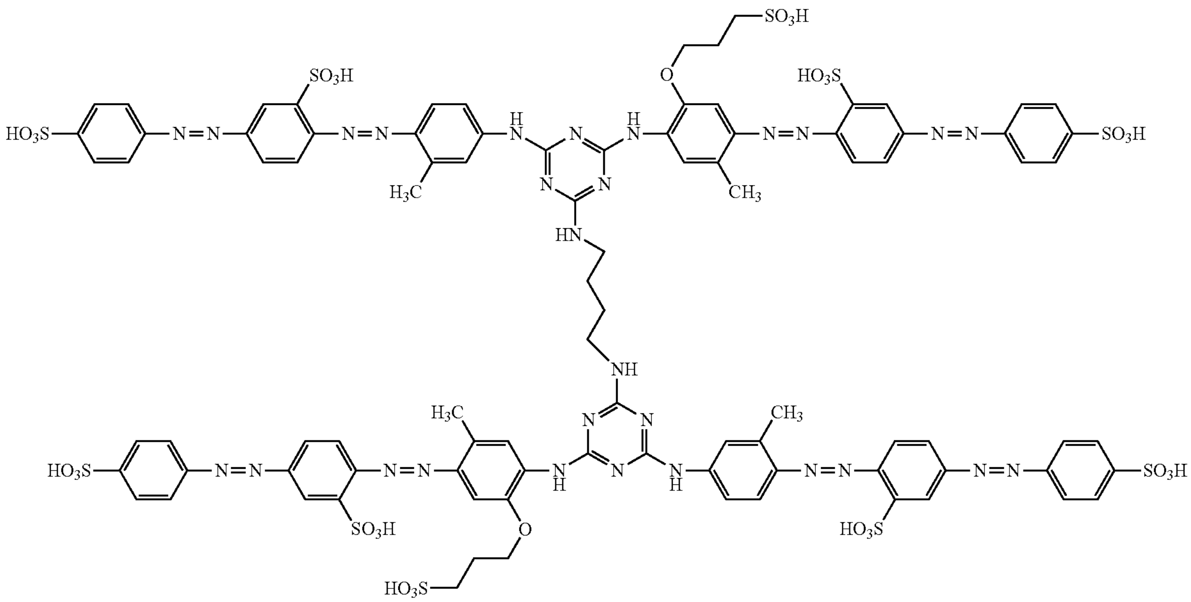
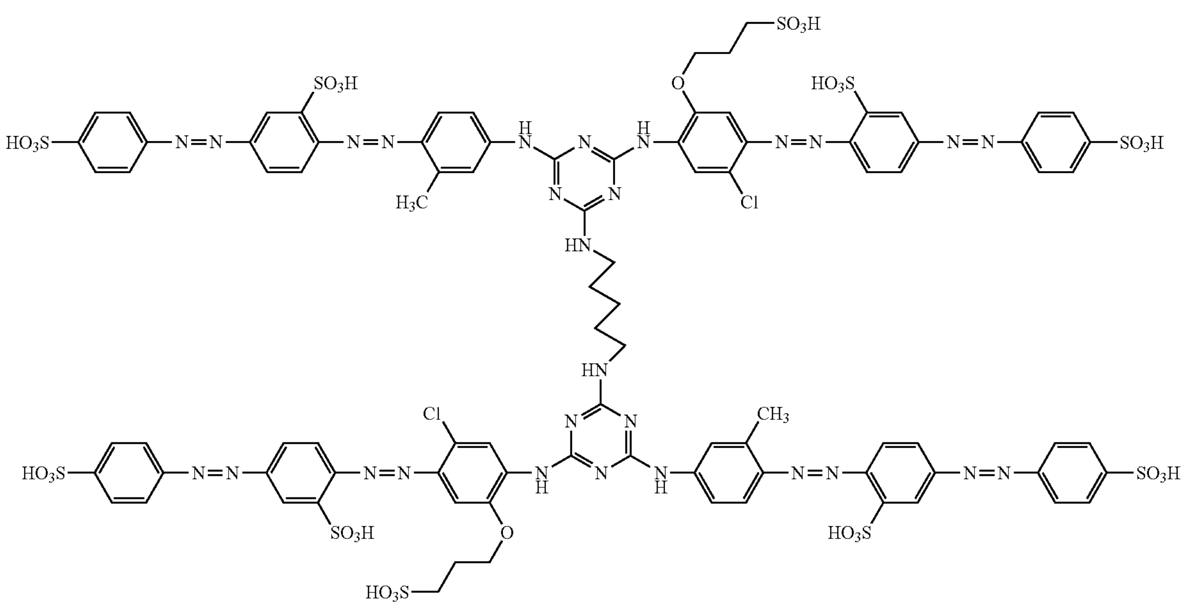

-continued
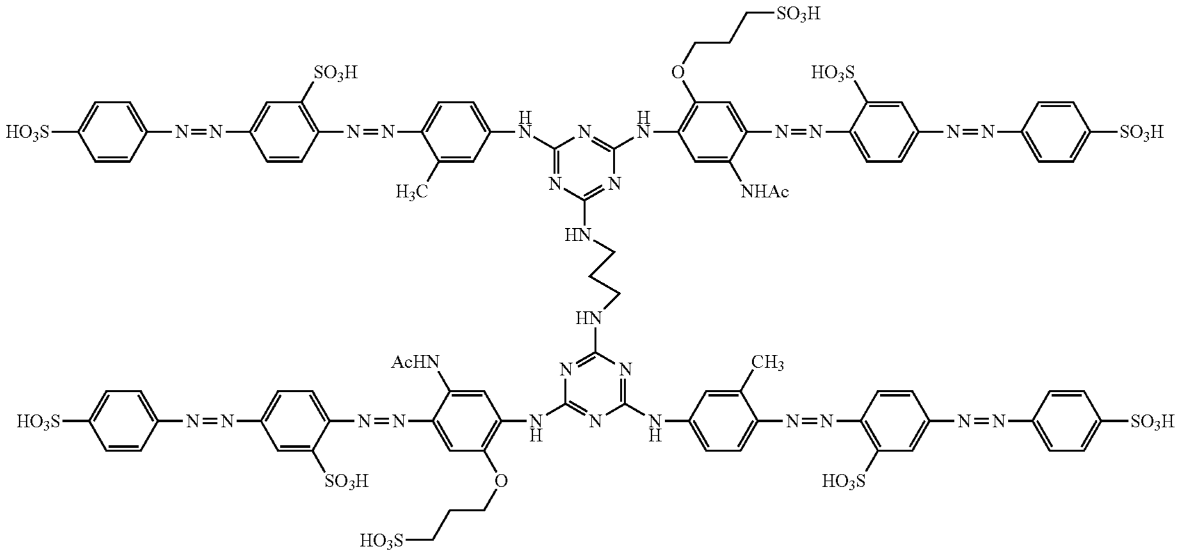
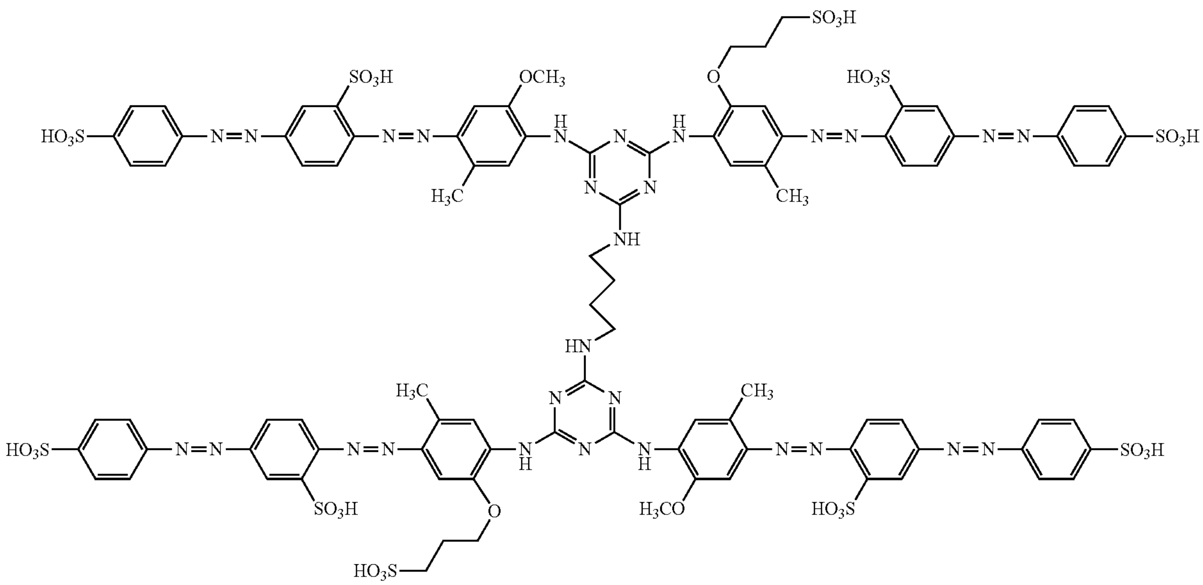
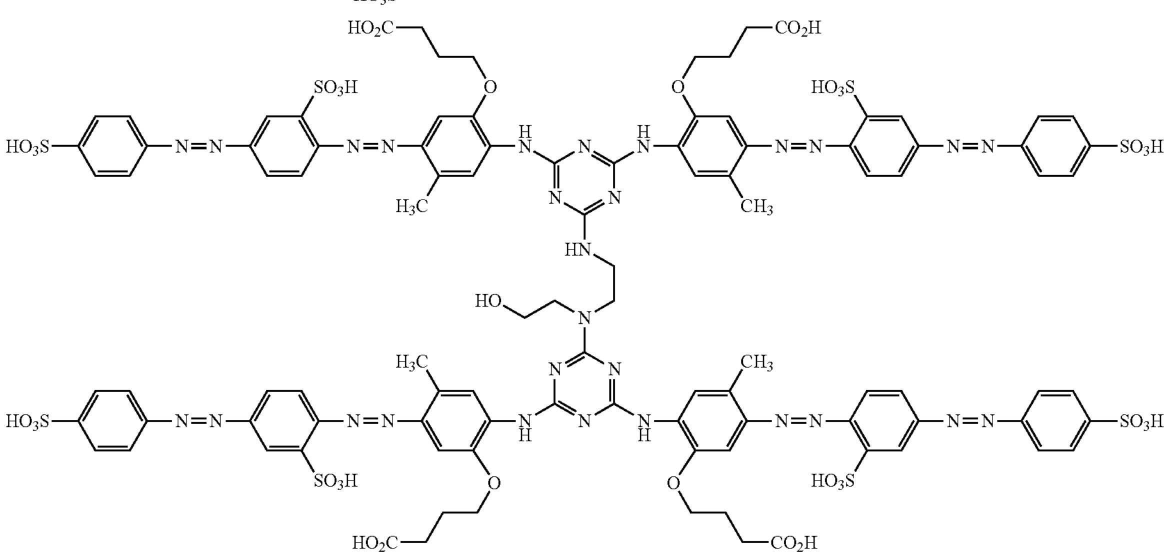

-continued
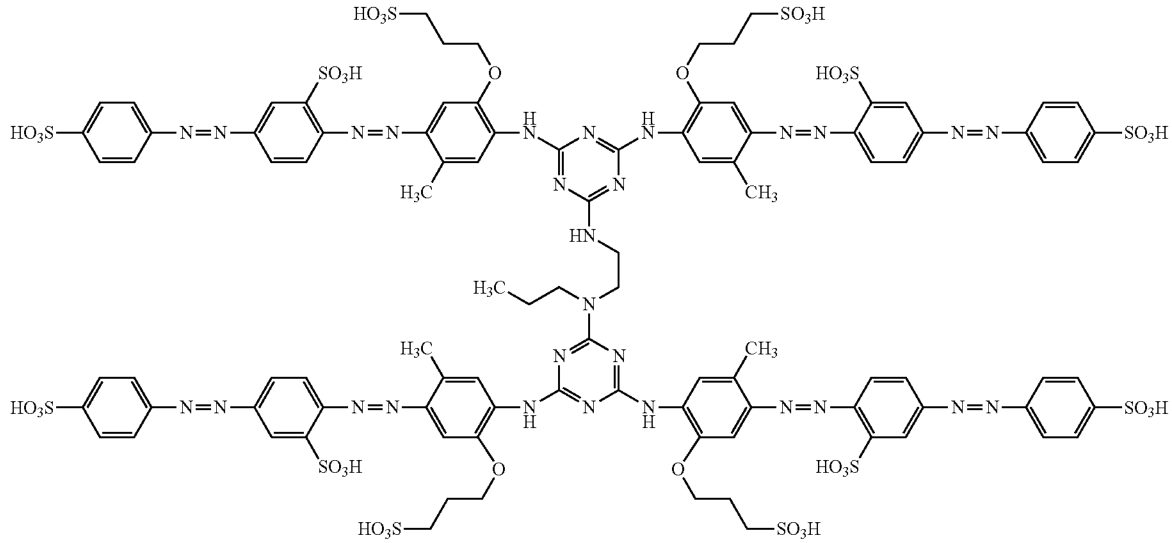
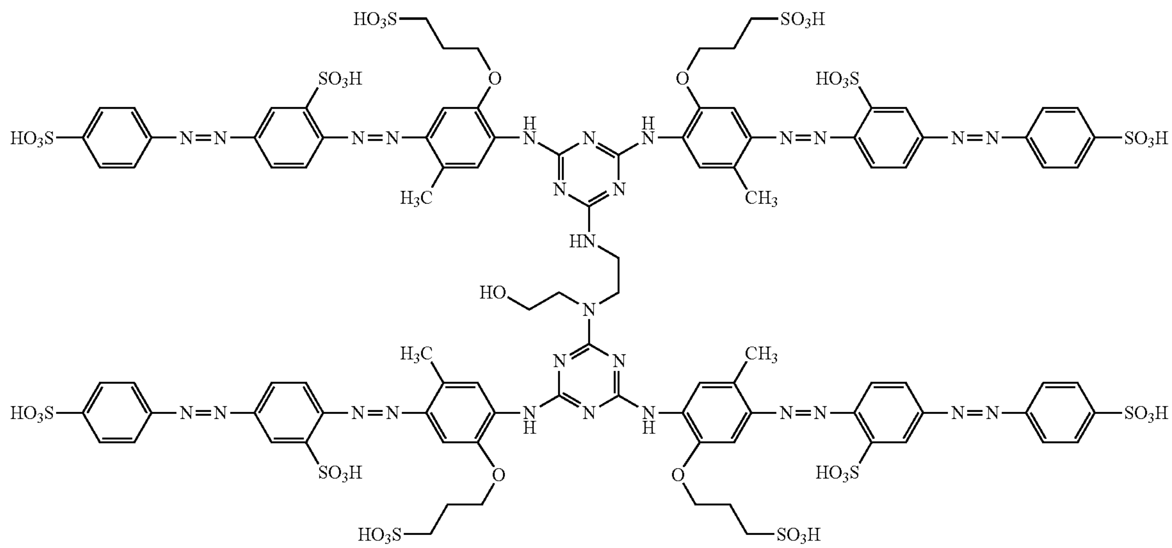
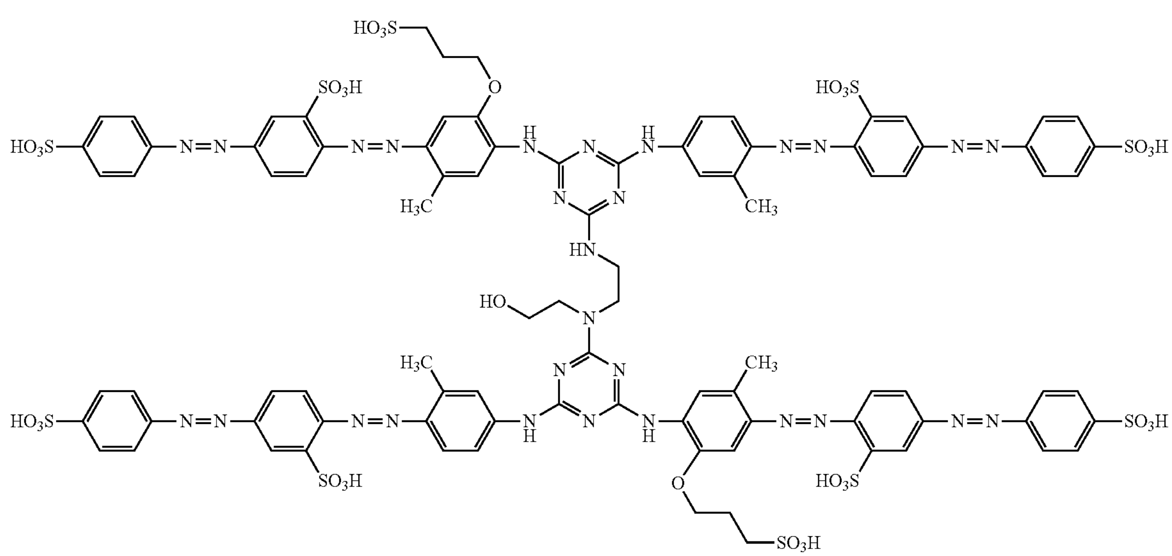

-continued
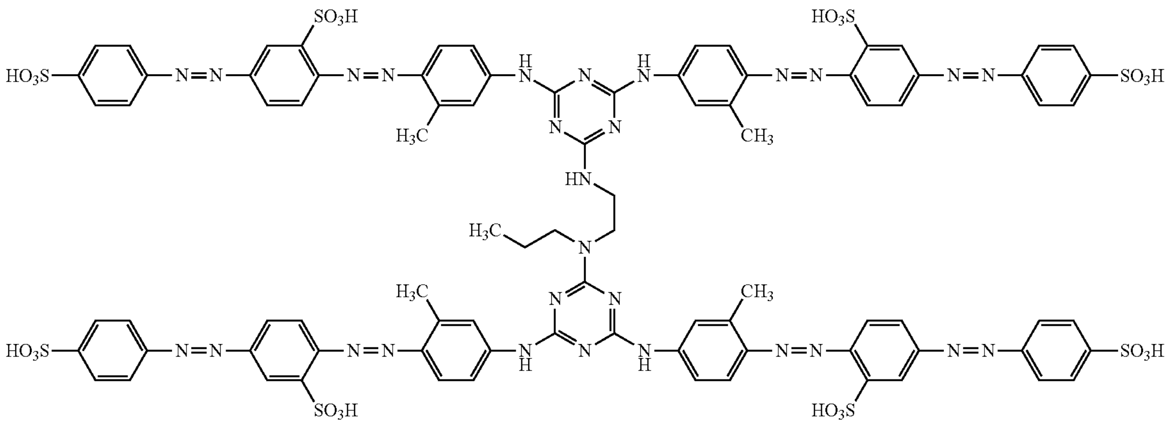
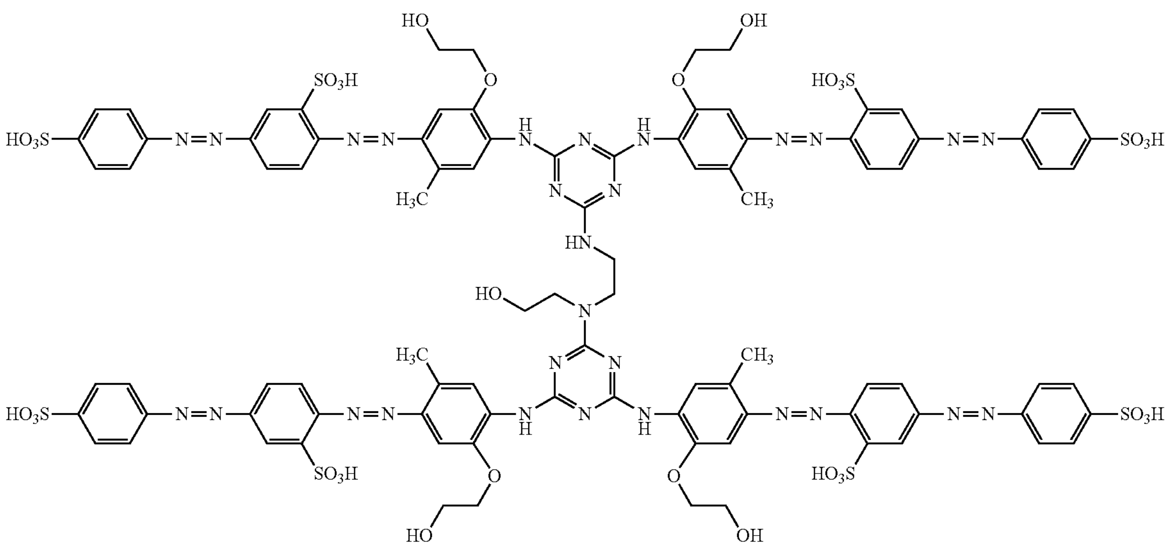
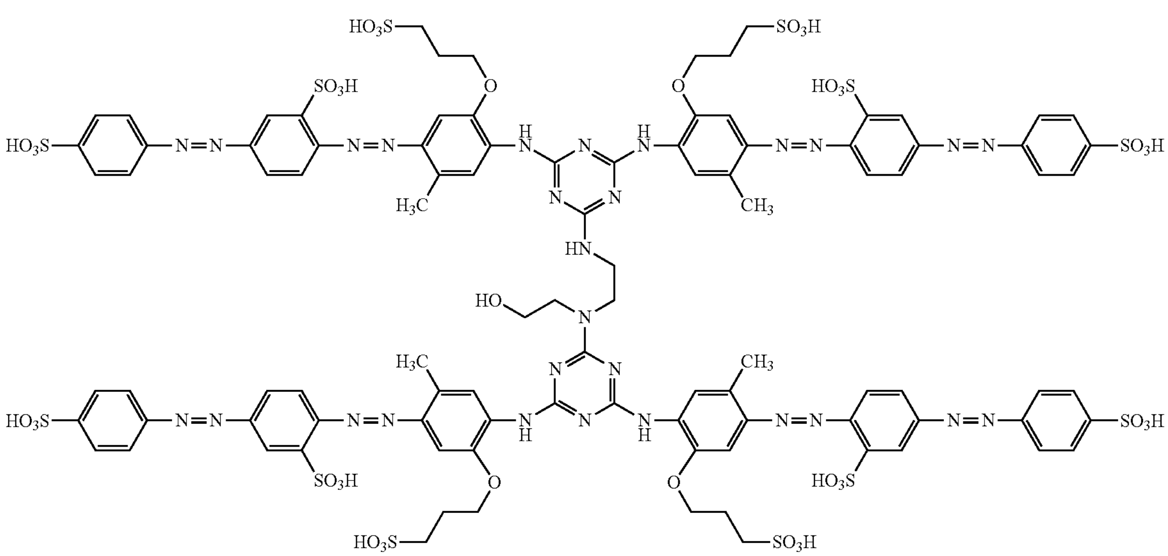

-continued
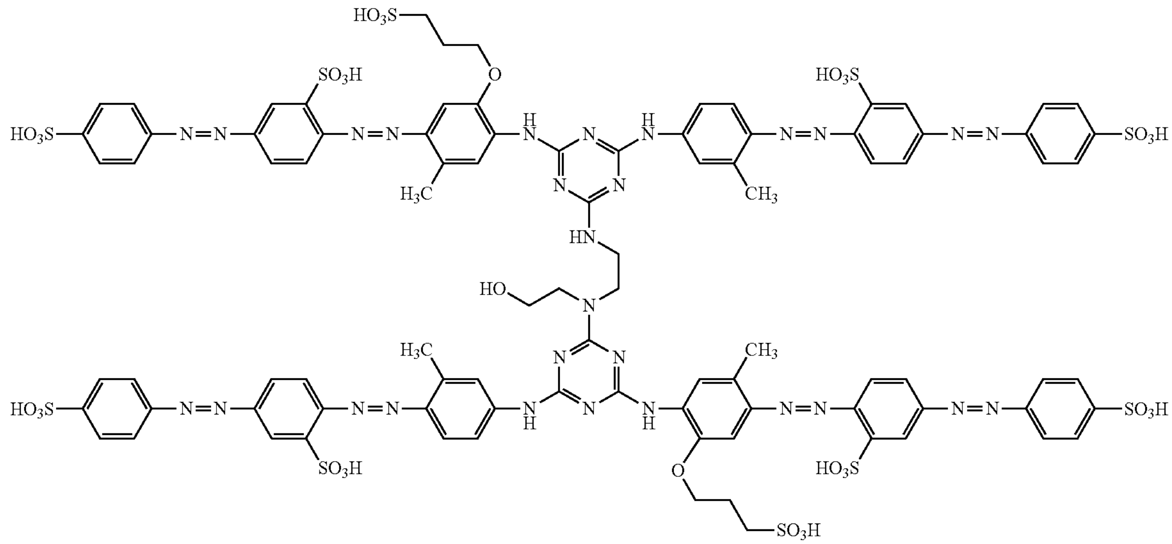
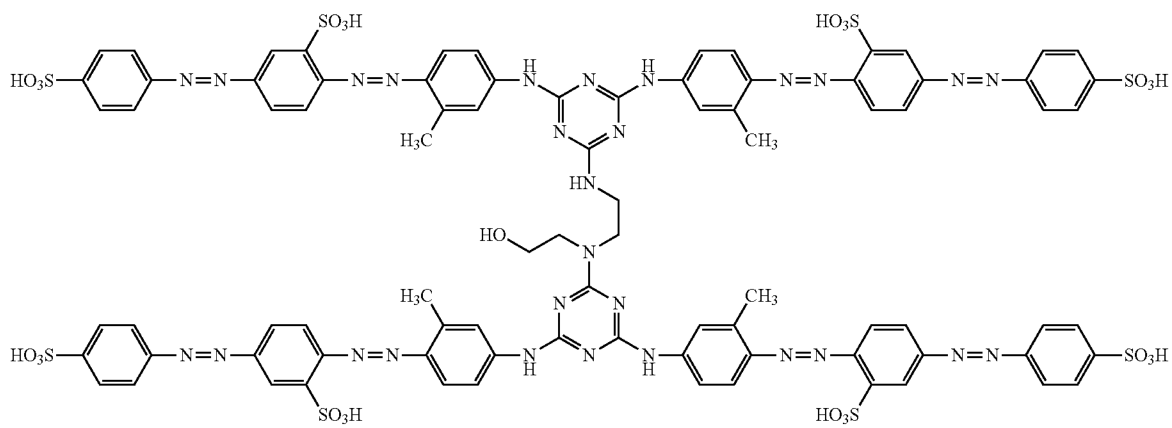
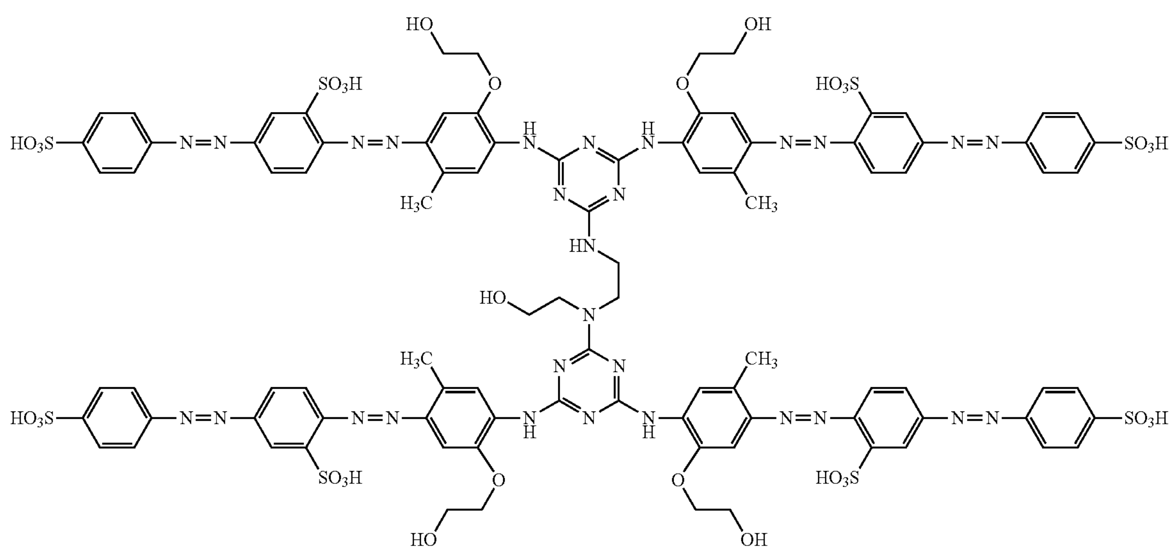

-continued
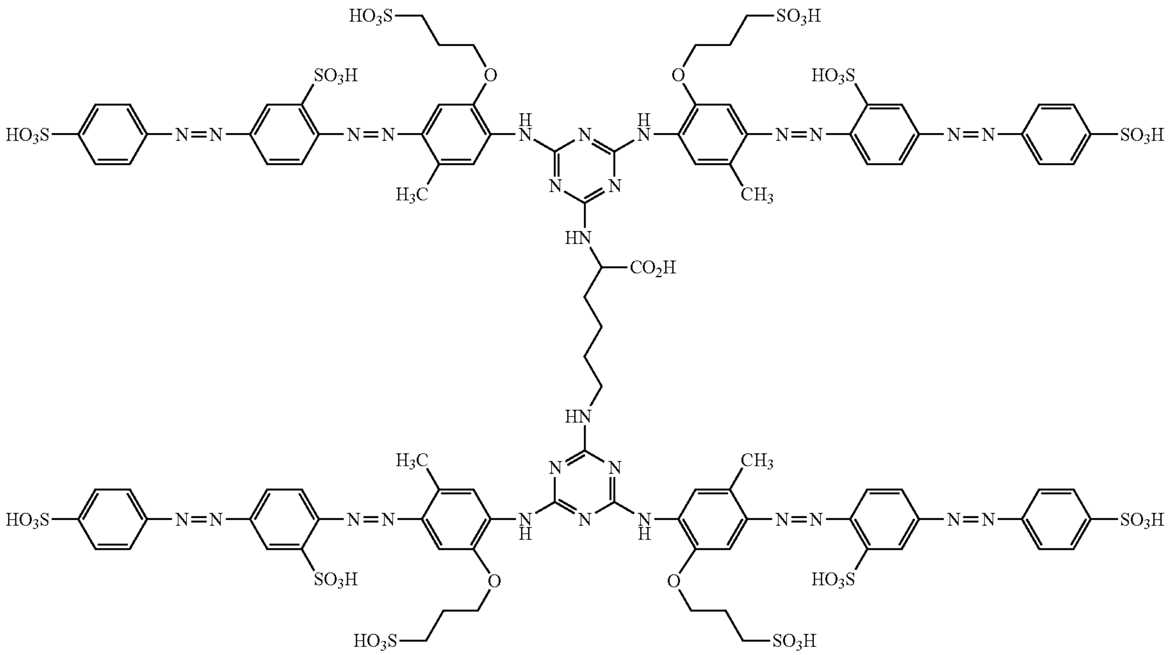
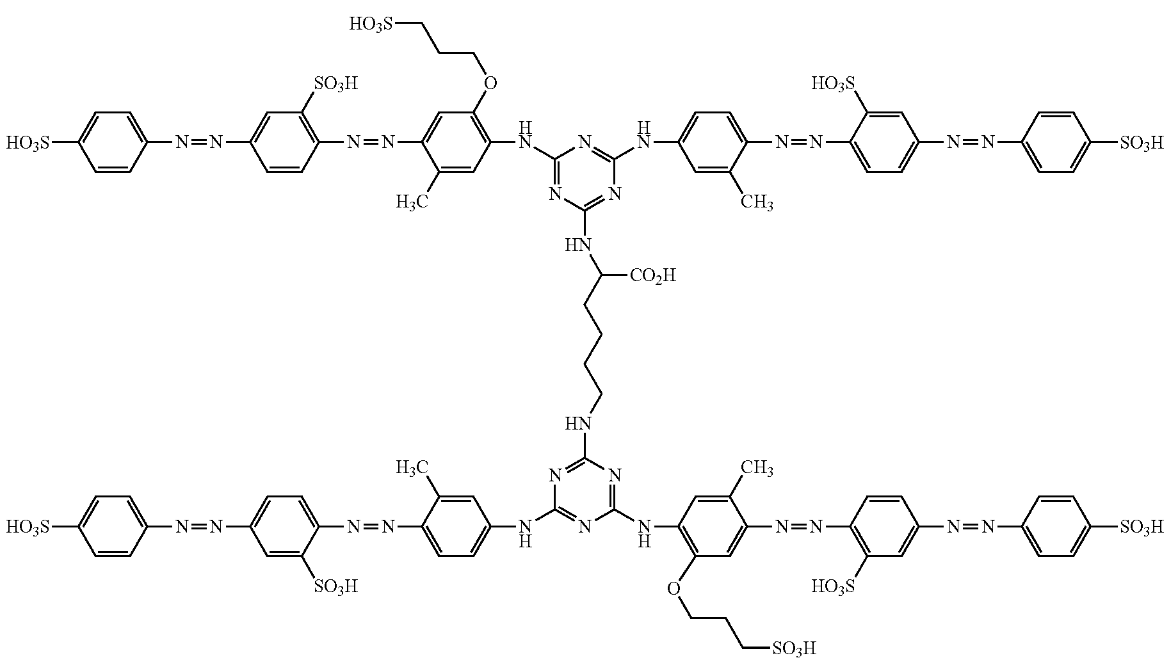

-continued
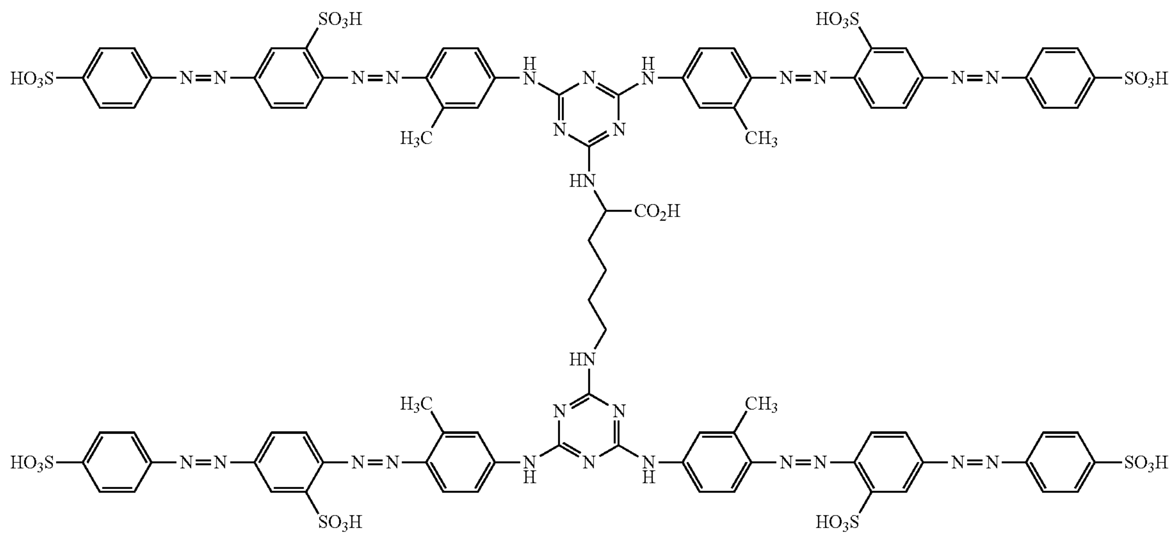
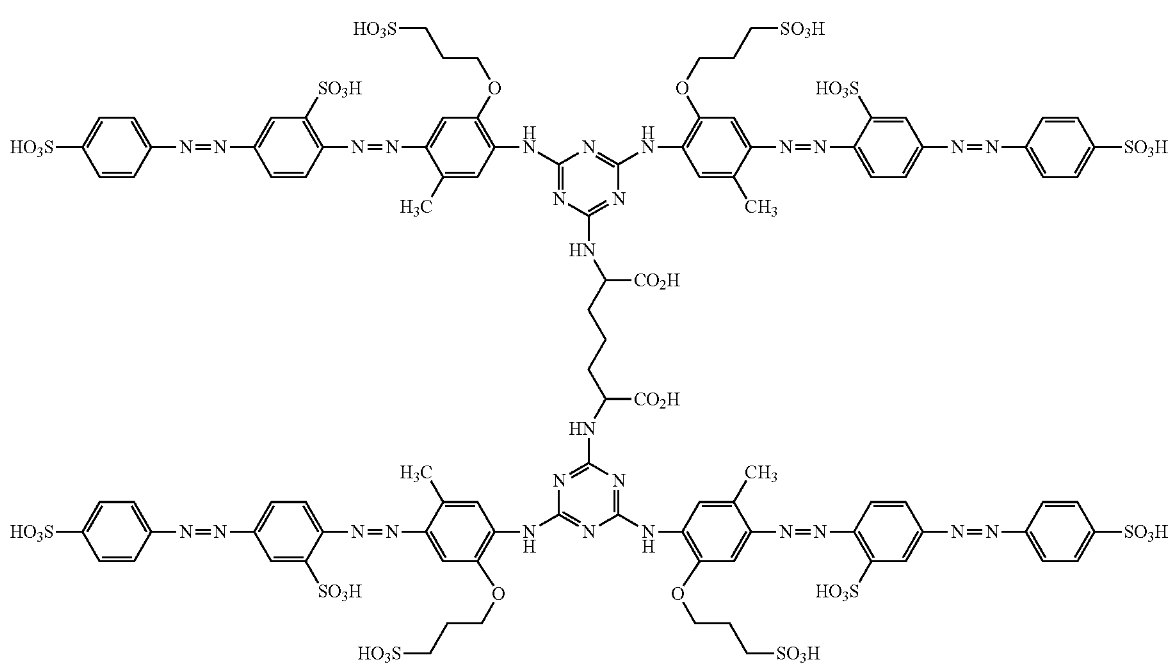

-continued
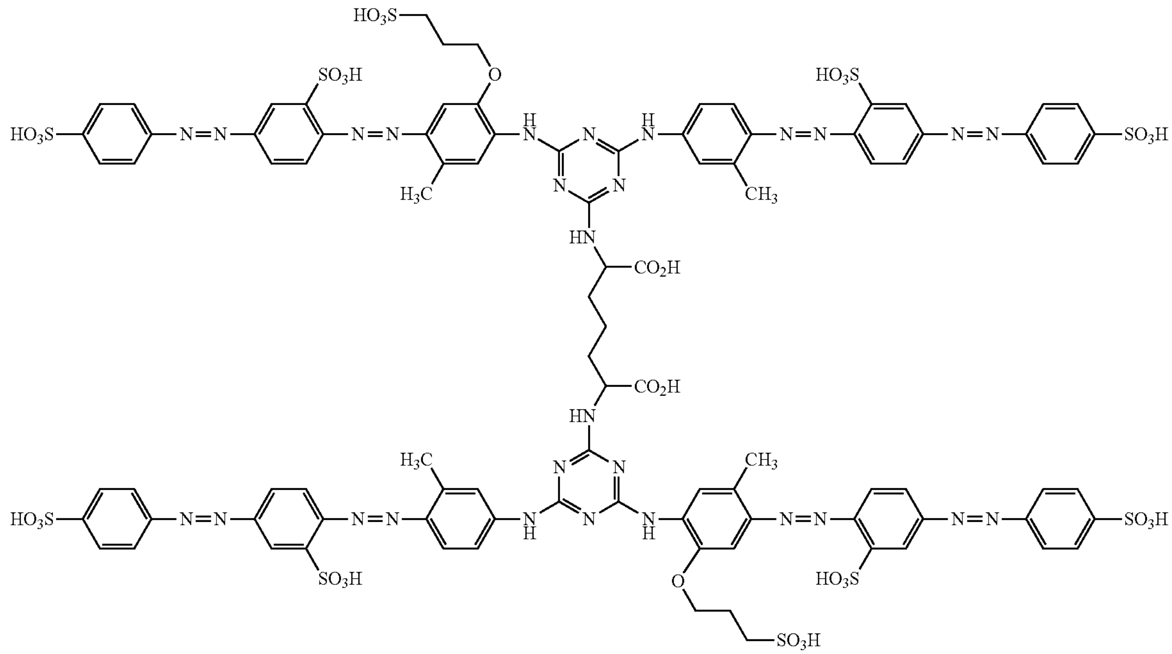
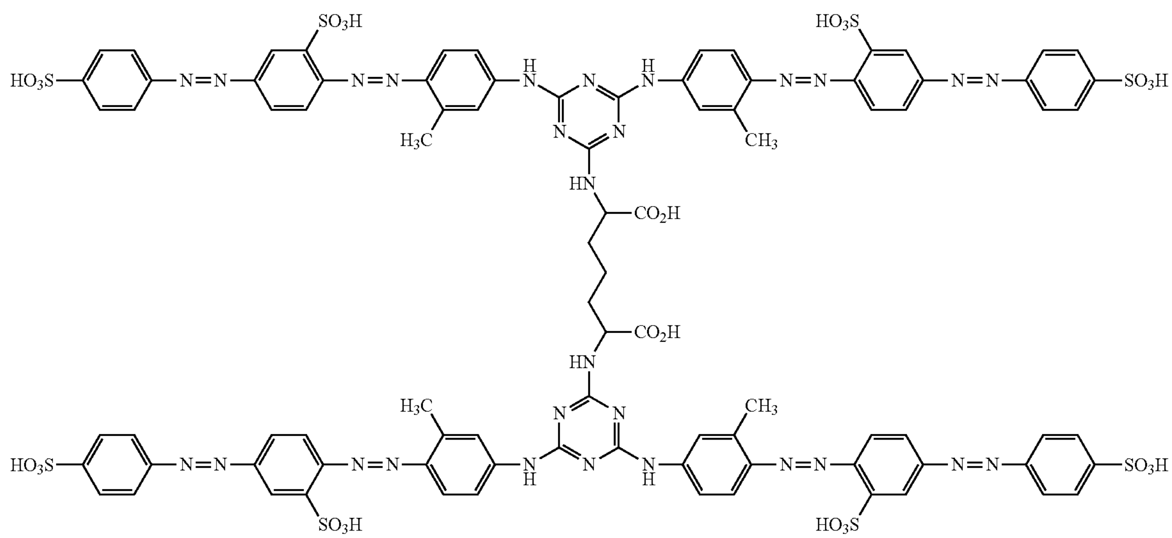
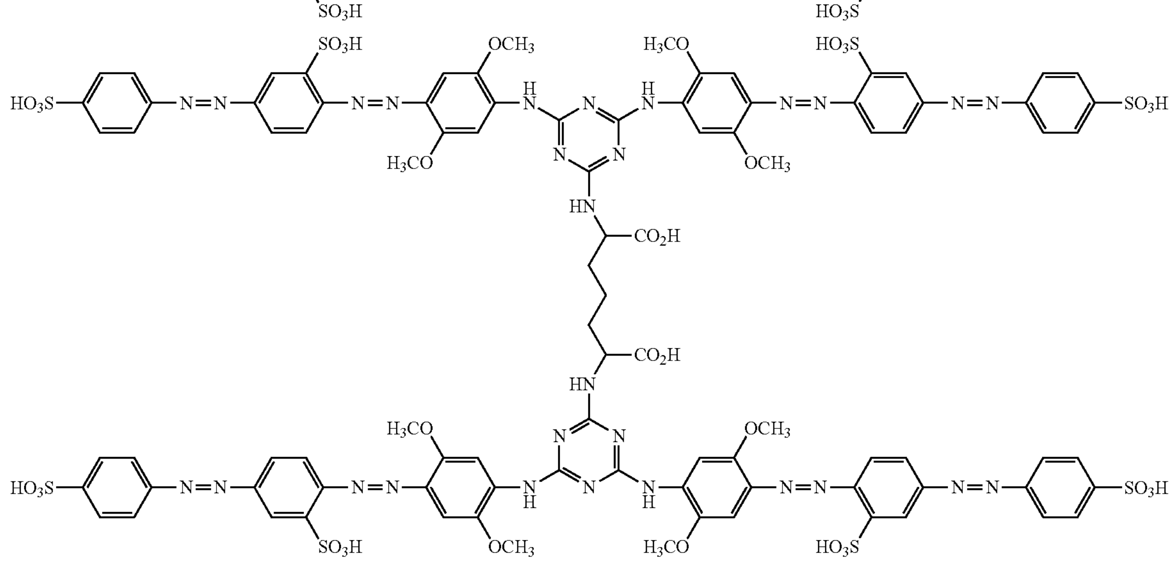

-continued
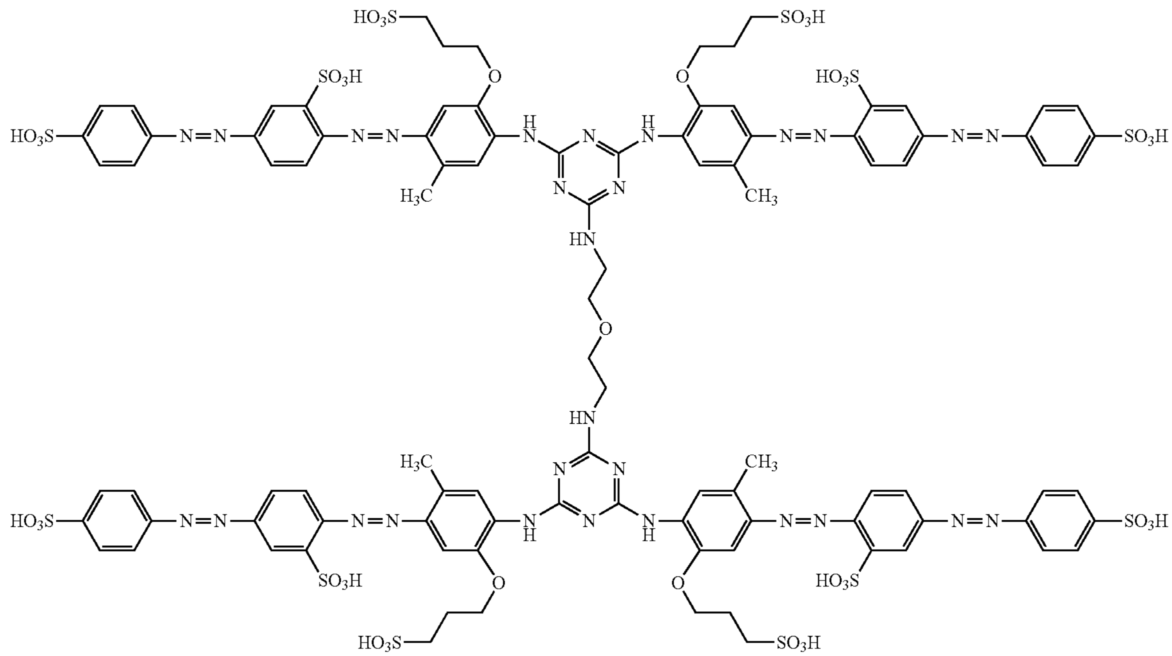
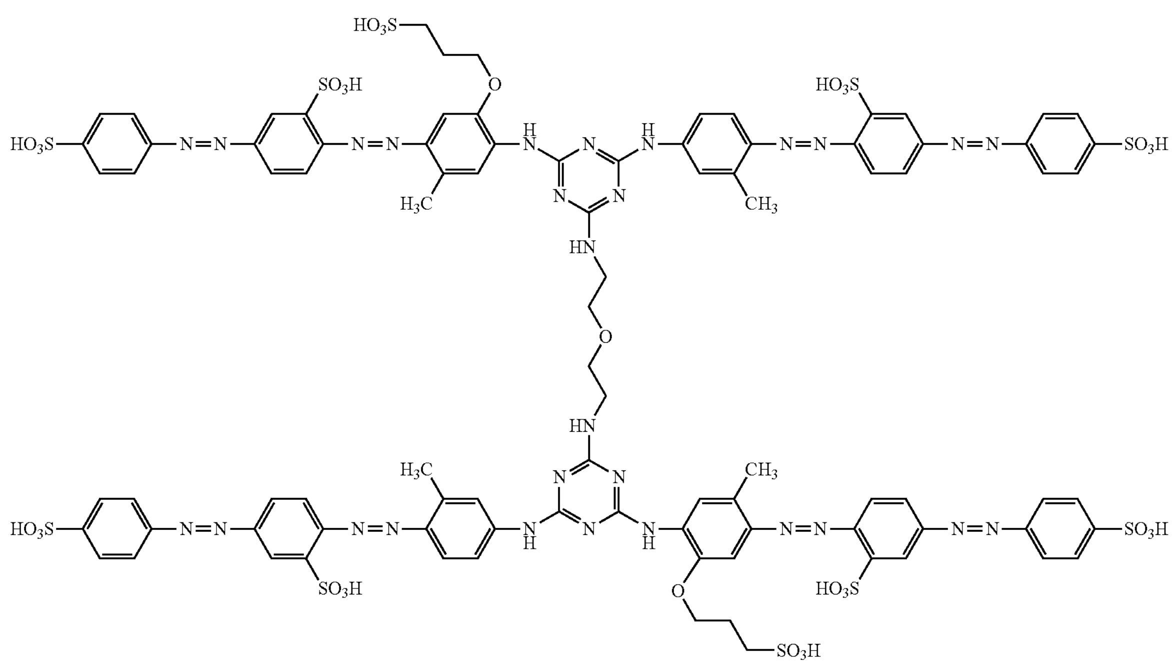

-continued
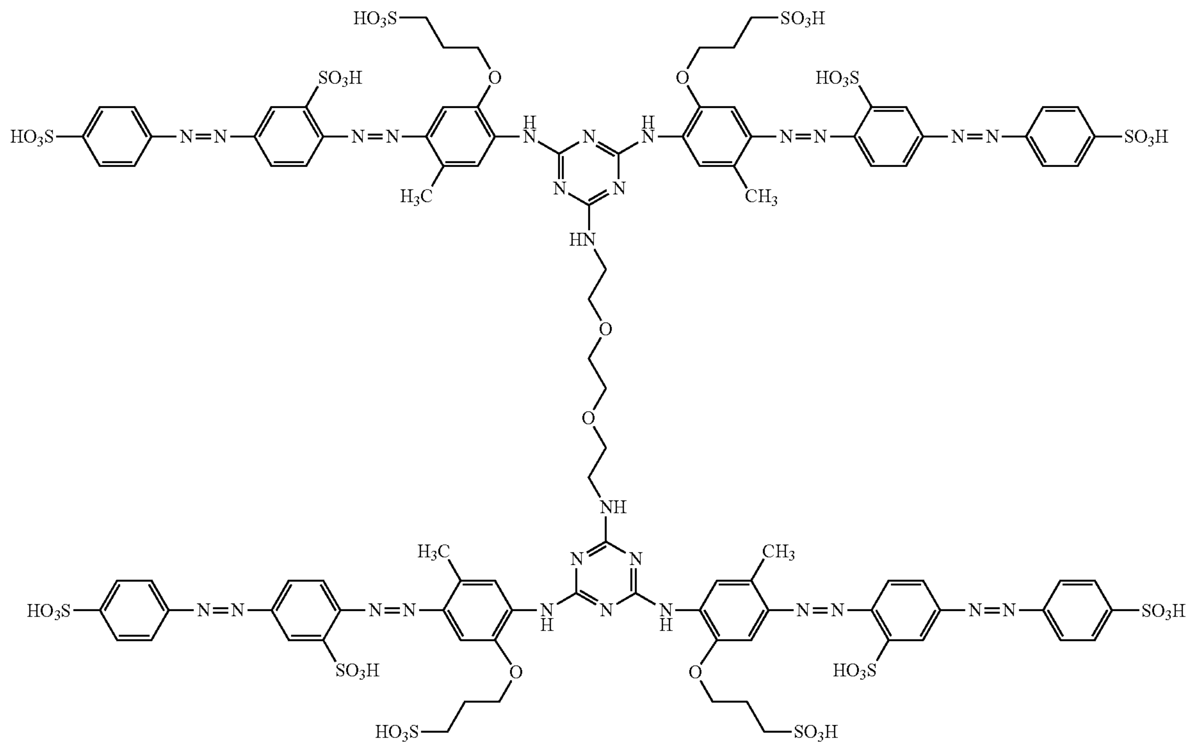
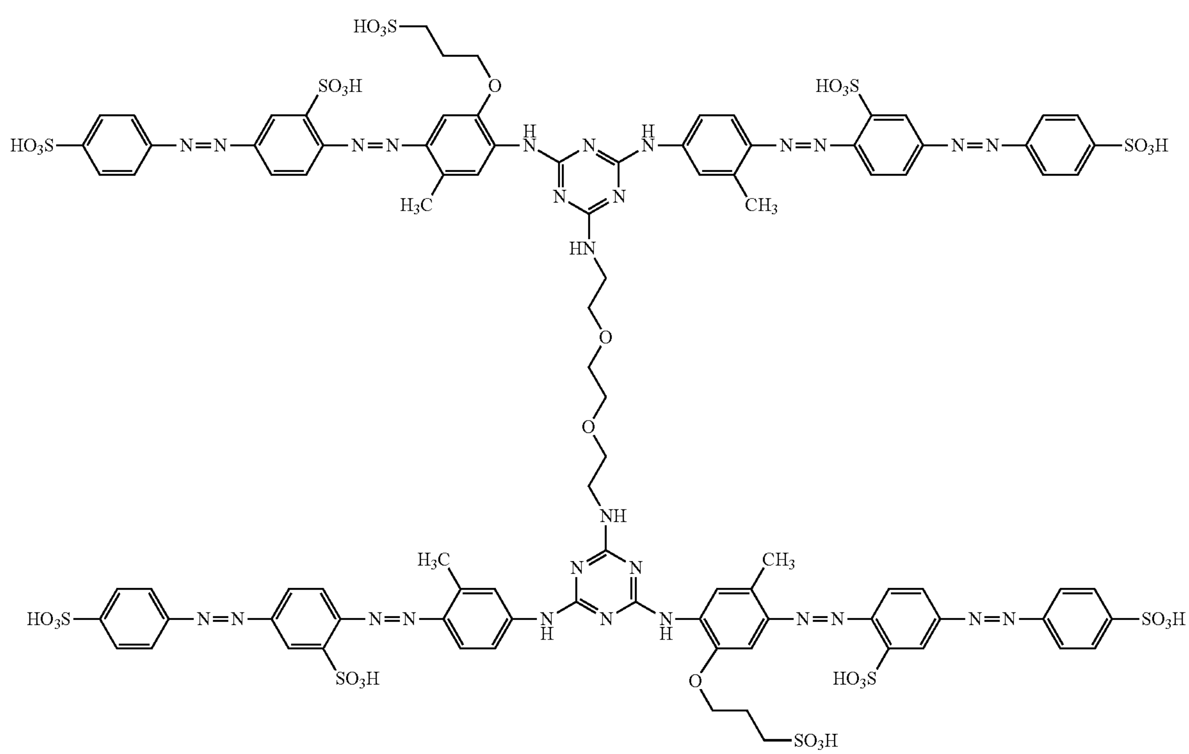

-continued
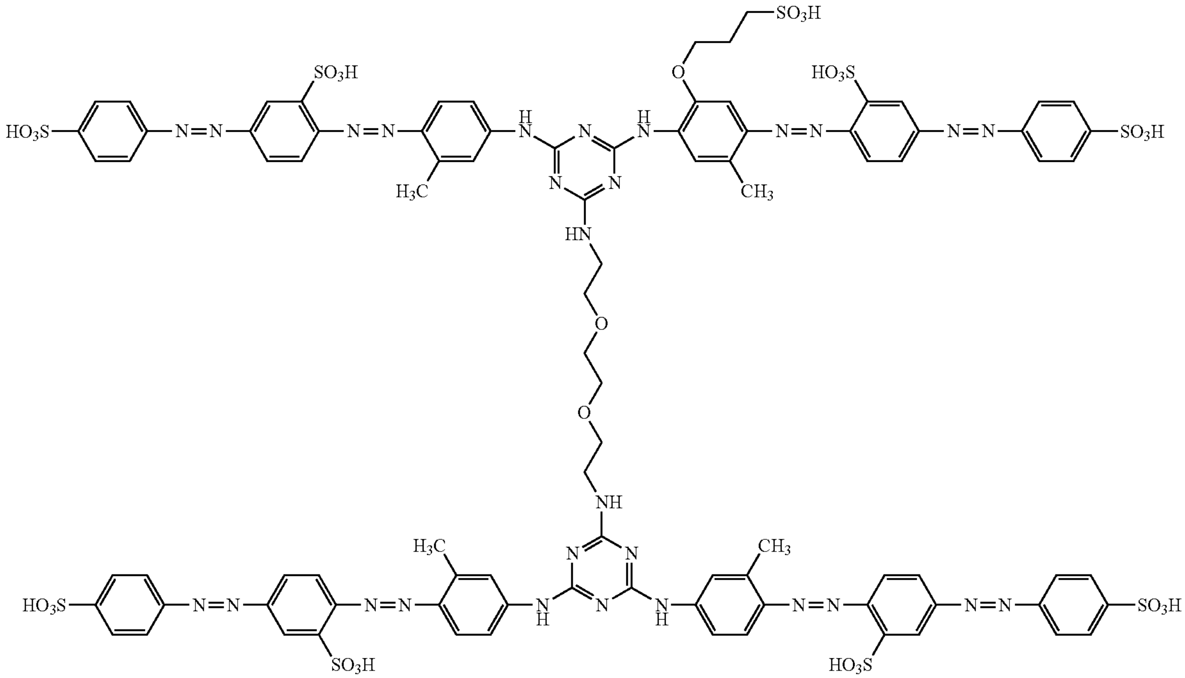
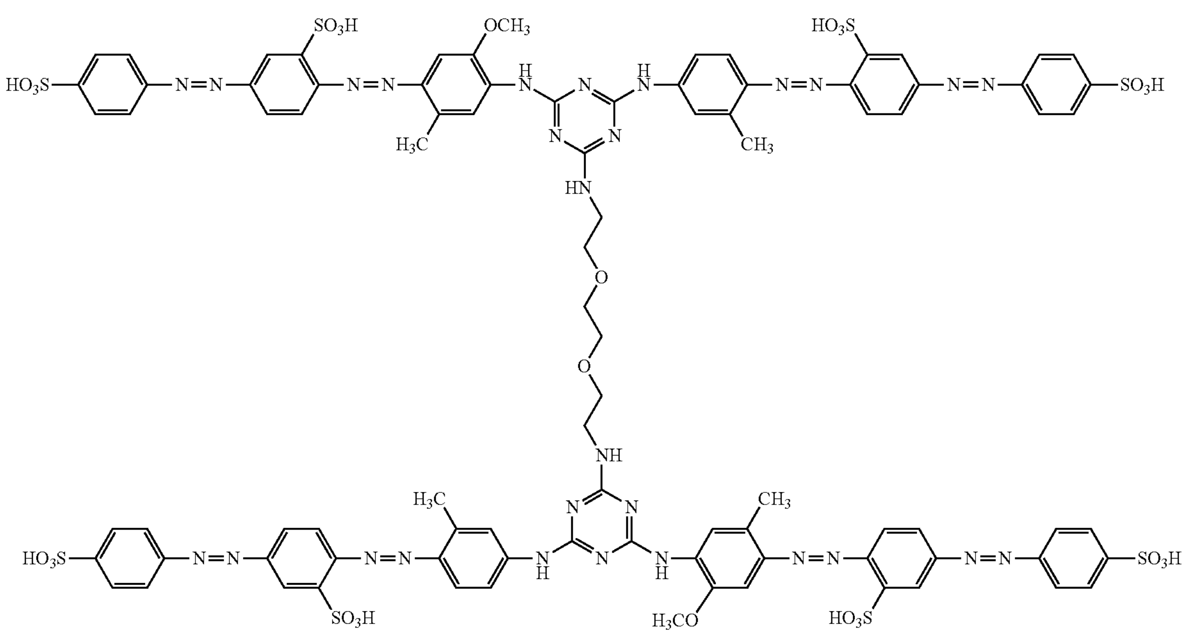

-continued
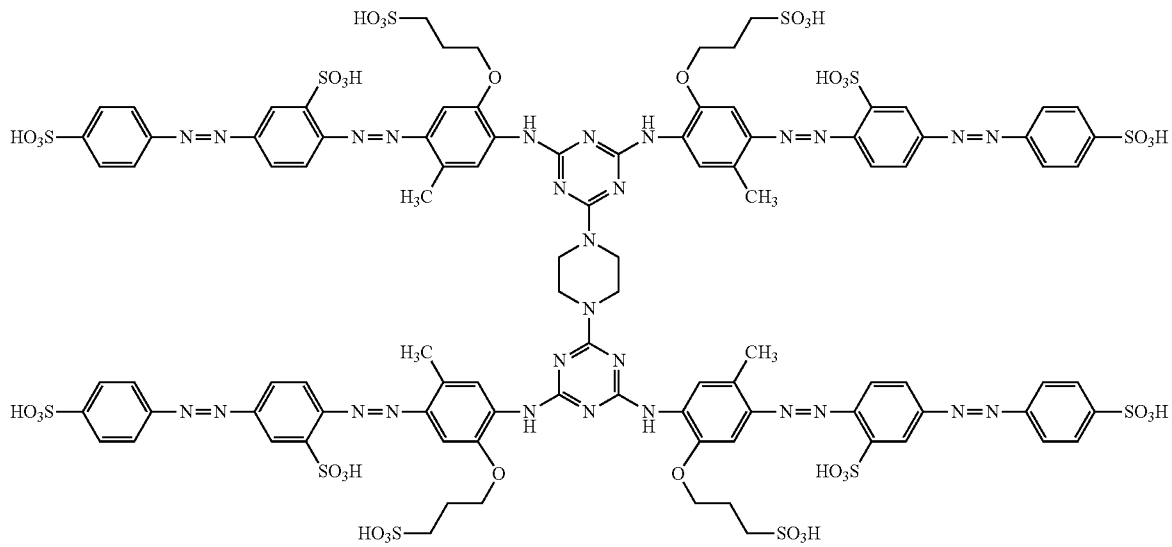
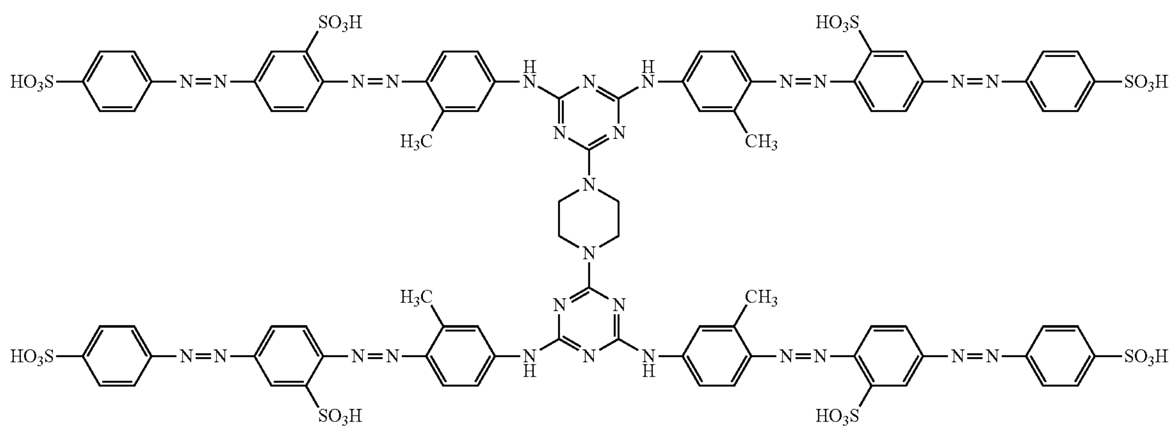
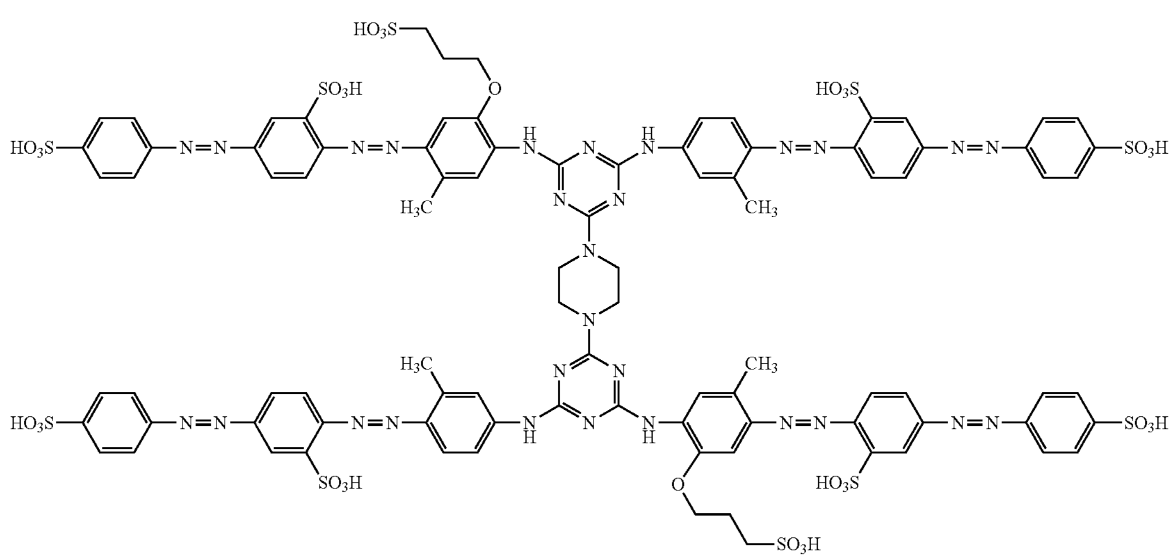

-continued
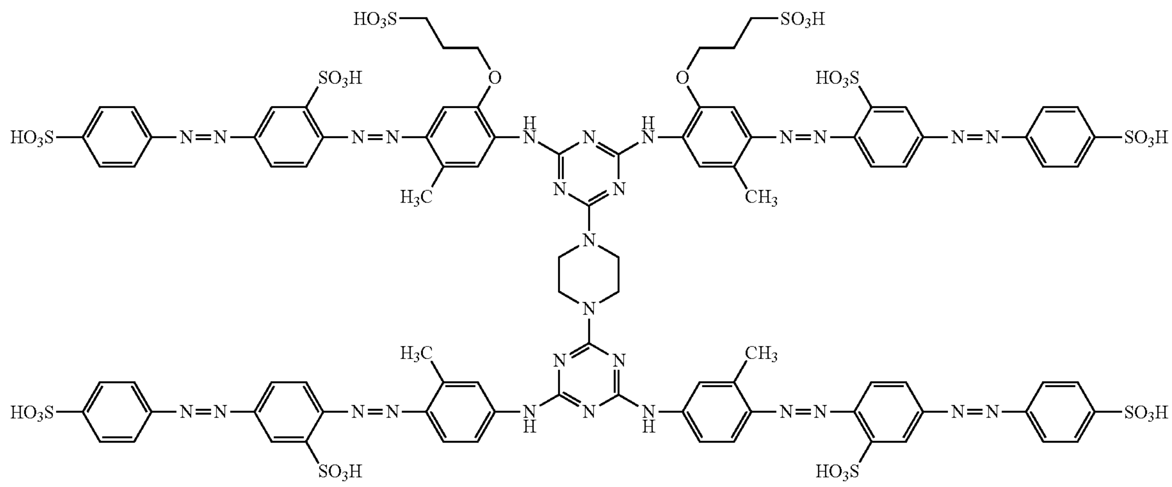
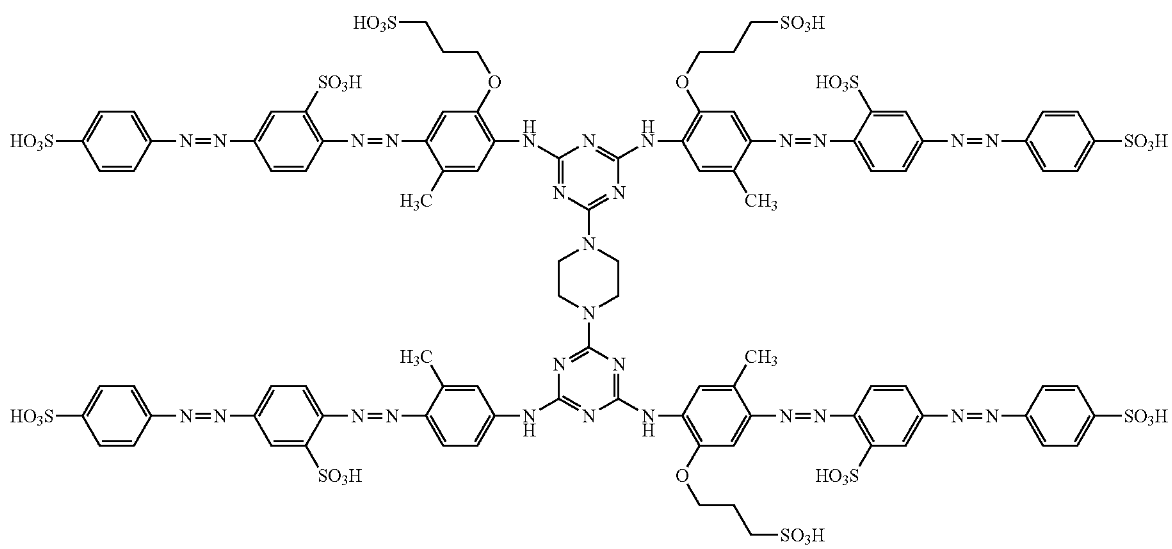
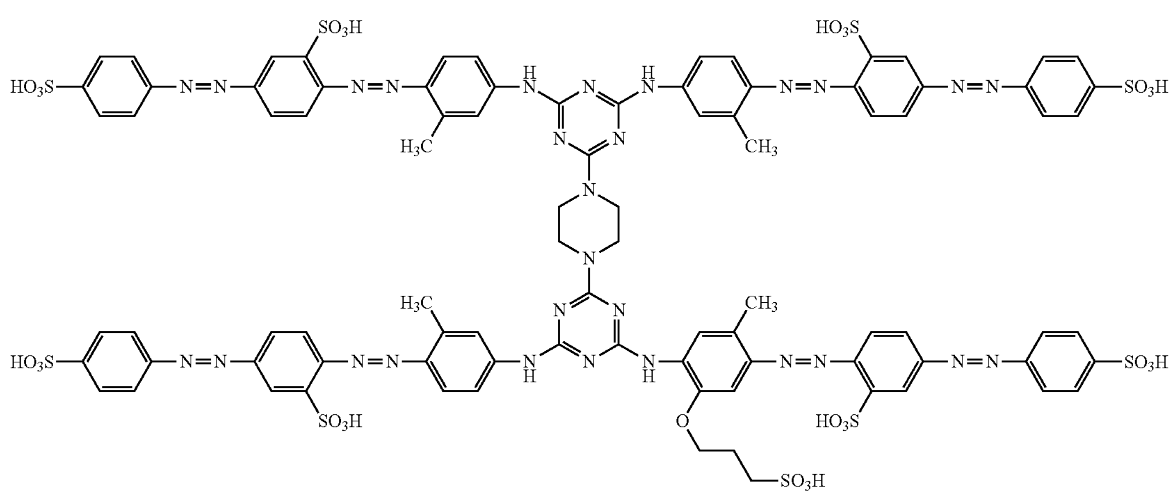

-continued
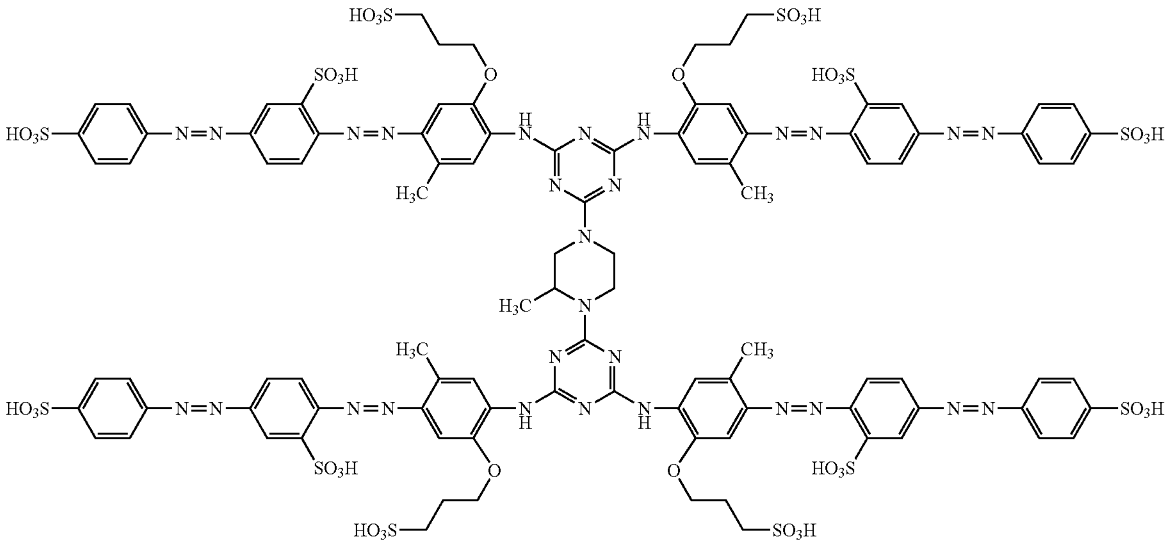 [SMILES: O=S(=O)(O)CCCOc1cc(Nc2nc(Nc3cc(OCCCS(=O)(=O)O)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(OCCCS(=O)(=O)O)c(N=Nc6ccc(N=Nc7ccc(S(=O)(=O)O)cc7)cc6S(=O)(=O)O)cc5OCCCS(=O)(=O)O)nc(Nc5cc(OCCCS(=O)(=O)O)c(N=Nc6ccc(N=Nc7ccc(S(=O)(=O)O)cc7)cc6S(=O)(=O)O)cc5OCCCS(=O)(=O)O)n4)CC3)n2)c(OCCCS(=O)(=O)O)cc1N=Nc1ccc(N=Nc2ccc(S(=O)(=O)O)cc2)cc1S(=O)(=O)O]
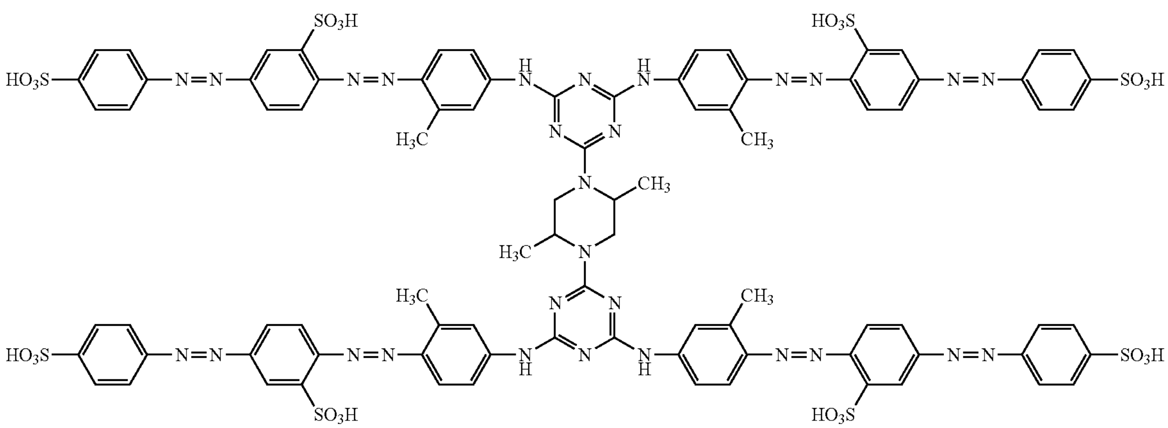
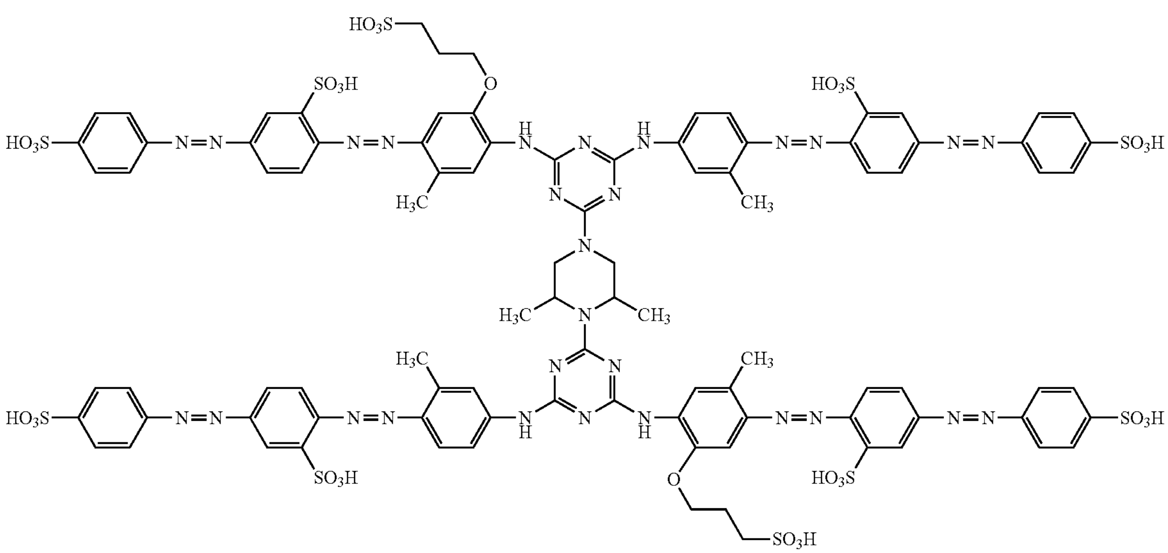

-continued
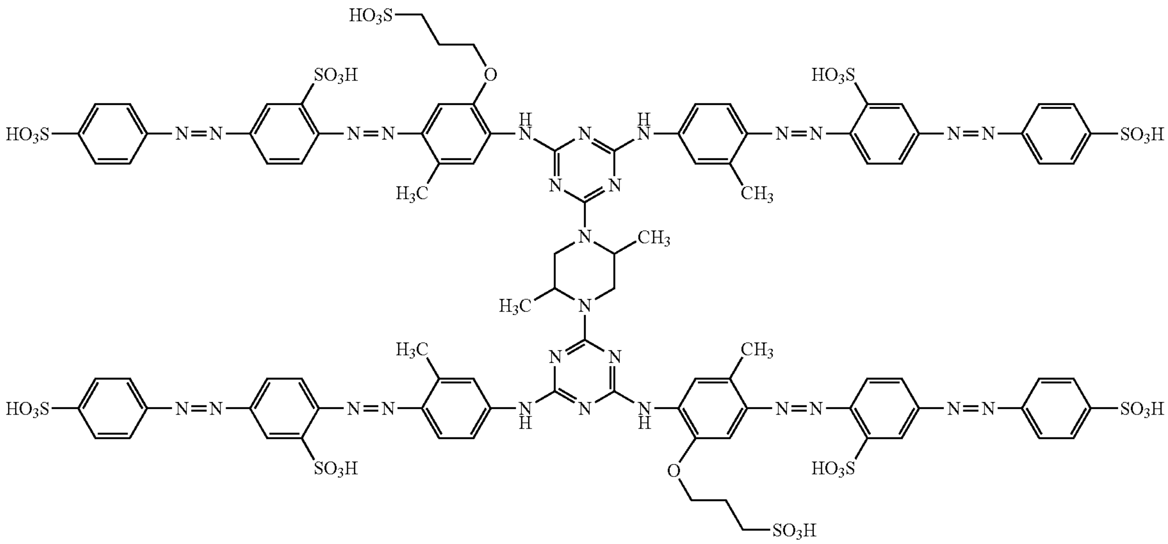
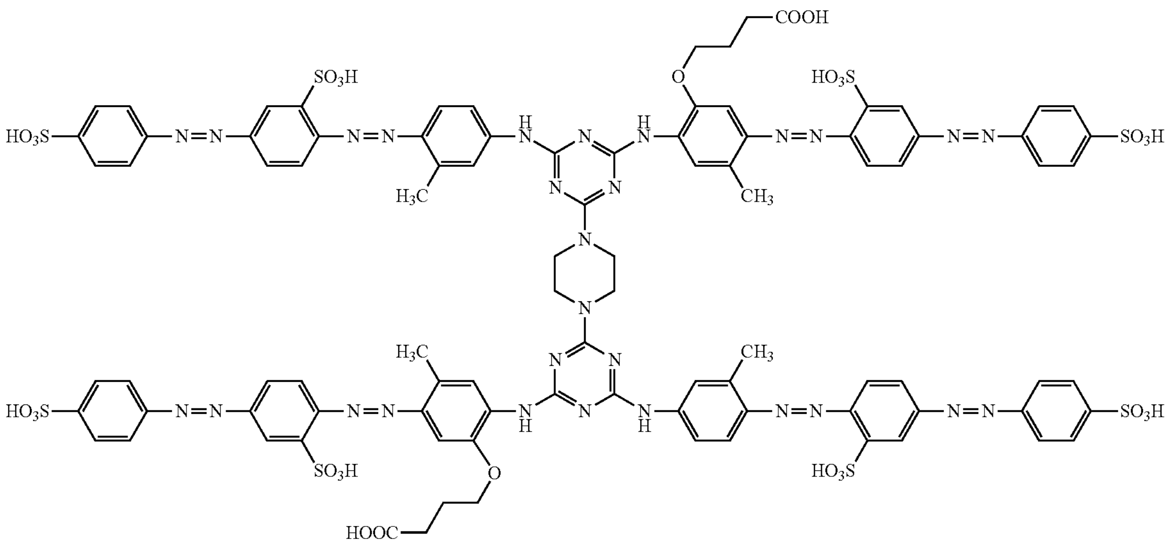
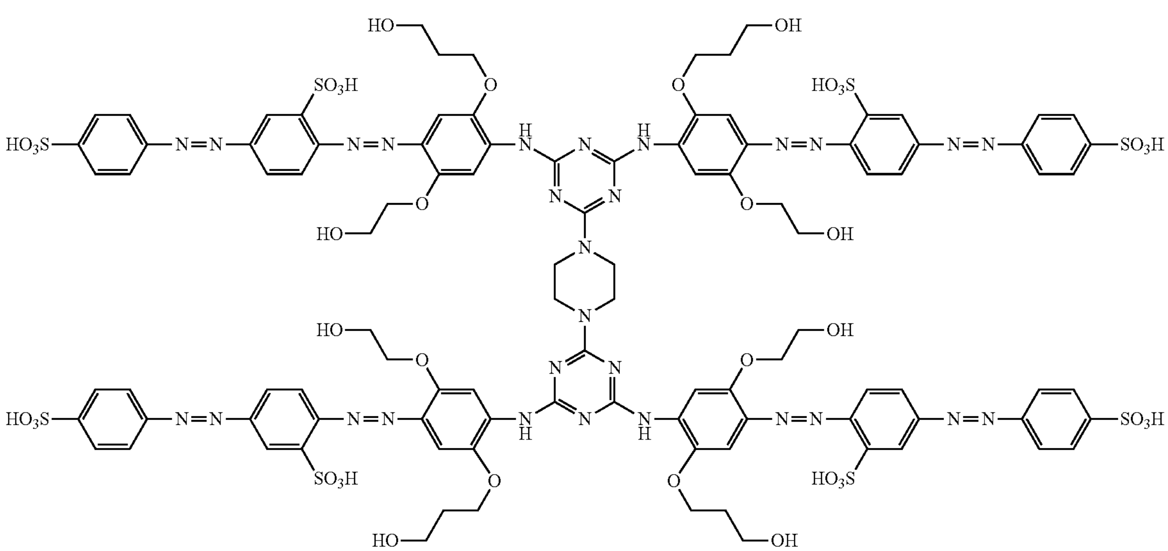

-continued
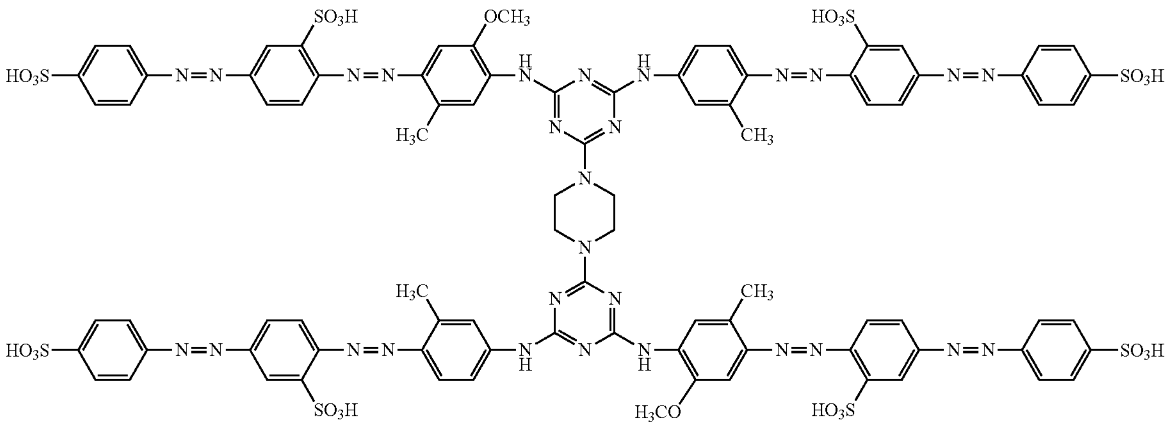
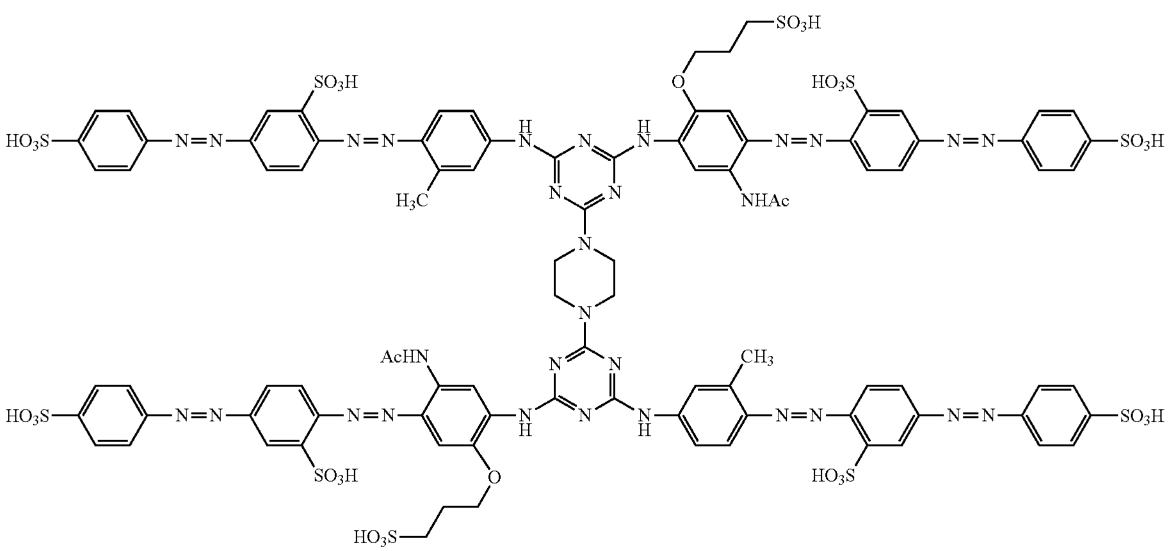
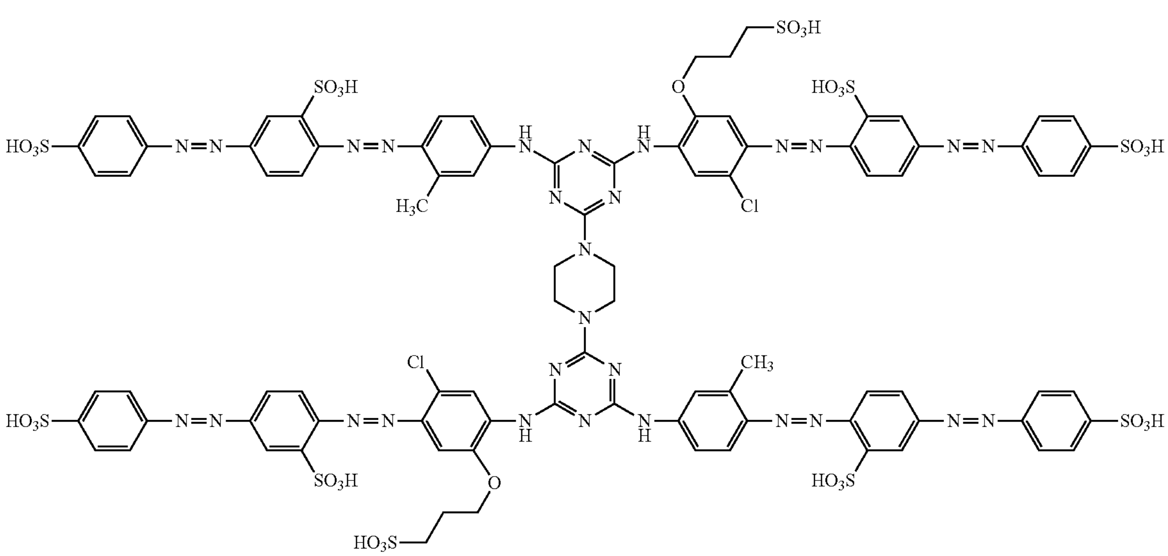

-continued
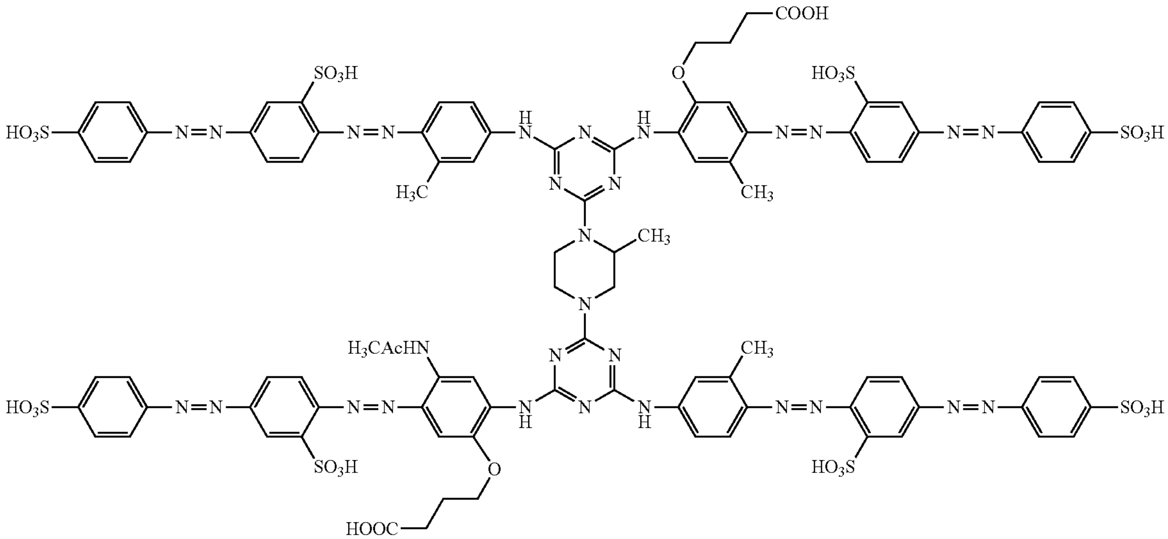
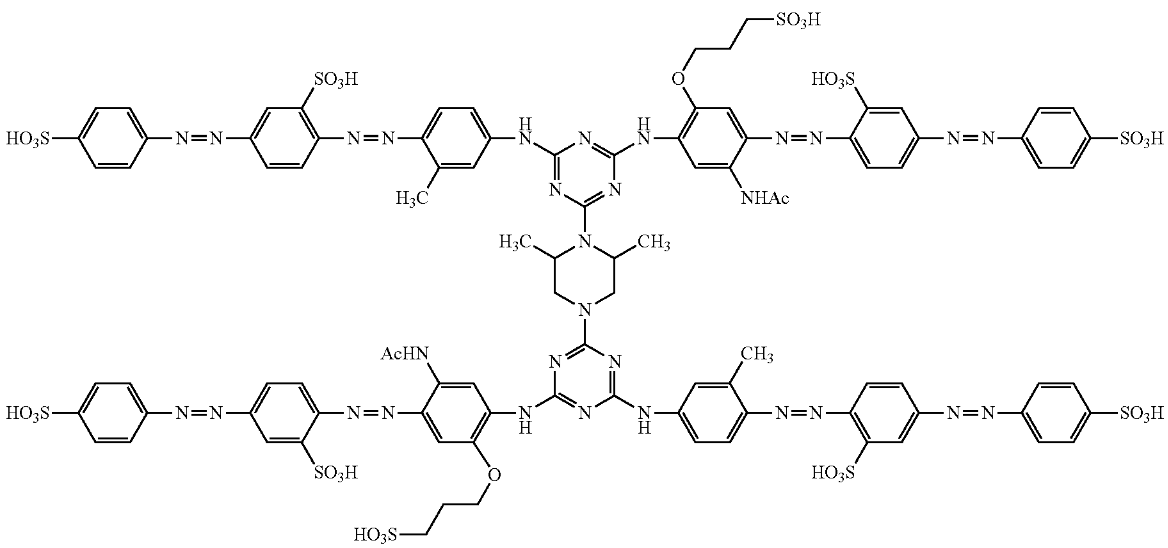
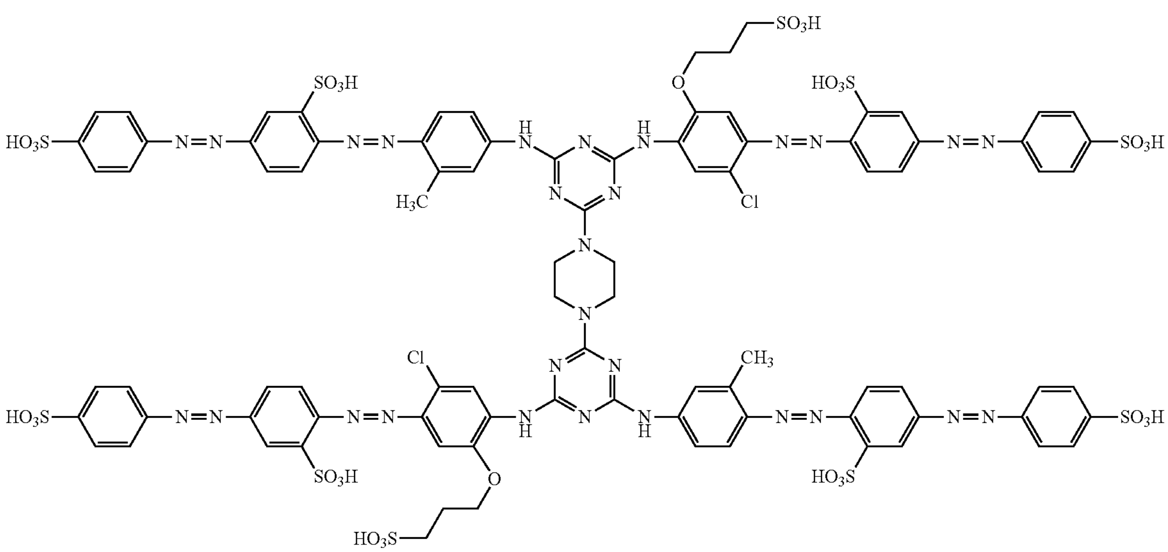

-continued

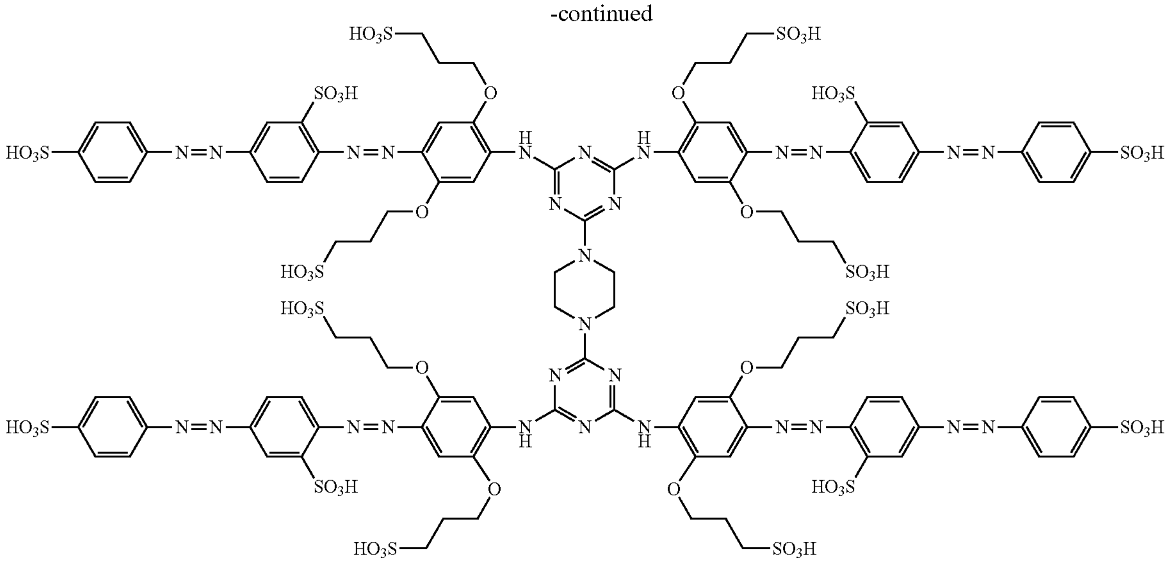

The synthesis method of the coloring materials represented by Formula (Bw-1) is not particularly limited, but a method described in JP-A-2012-172031 can be used. The content of the coloring material represented by Formula (Bw-1) is preferably in the range of 0.050% by mass to 5.0% by mass, more preferably in the range of 0.10% by mass to 3.0% by mass, and still more preferably in the range of 0.50% by mass to 1.0% by mass based on the total amount of the black ink. When the content of the coloring material represented by Formula (Bw-1) is in the above-described range, a visually excellent black color tends to be exhibited.

Coloring Material (Dye (b-1)) Represented by Formula (b-1)

Hereinafter, a coloring material represented by Formula (b-1) will be described. A dye (b-1) is represented by the following Formula (b-1). The dye (b-1) is unlikely to be decomposed in the ink even when irradiated with light or exposed to gas (particularly, ozone) in the air. Accordingly, since an image formed using the dye black ink has excellent light resistance and gas resistance, discoloration or decoloration caused by influence of light or the air is unlikely to occur.

In addition, the dye (b-1) has excellent moisture resistance. Accordingly, bleeding of the image caused by influence of water or the like is unlikely to occur.

The content of the dye (b-1) is preferably in the range of 1% by mass to 10% by mass, and more preferably in the range of 1% by mass to 5% by mass based on the total amount of the dye black ink. When the content of the dye (b-1) is in the above-described range, the coloring density of an image to be recorded can be improved, and the light resistance and the gas resistance can be improved.

In Formula (b-1), n is 0 or 1, $R^{B11}$ represents a carboxy group; a C1-C8 alkoxycarbonyl group; a C1-C4 alkyl group; a C1-C4 alkyl group which is substituted with a C1-C8 alkoxycarbonyl group or a carboxy group; a phenyl group; or a phenyl group which is substituted with a hydroxyl group, a sulfo group, or a carboxy group.

In addition, $R^{B12}$, $R^{B13}$, and $R^{B14}$ each independently represent a hydrogen atom; a chlorine atom; a hydroxy group; a sulfo group; a carboxy group; sulfamoyl group; a carbamoyl group; a C1-C4 alkyl group; a C1-C4 alkoxy group; a C1-C4 alkoxy group which is substituted with a hydroxy group, a C1-C4 alkoxy group, a hydroxy C1-C4 alkoxy group, a sulfo group, or a carboxy group; a mono or di-C1-C4 alkylamino group which is substituted with a hydroxy group, a sulfo group, or a carboxy group; a C1-C4 alkyl carbonyl amino group; a C1-C4 alkyl carbonyl amino group which is substituted with a hydroxy group or a carboxy group; a N'—C1-C4 alkylureido group which is substituted with a hydroxy group, a sulfo group, or a carboxy group; a phenylamino group whose benzene ring is substituted with a chlorine atom, a C1-C4 alkyl group, a nitro group, a sulfo group, or a carboxy group; a benzoylamino group whose benzene ring is substituted with a chlorine atom, a C1-C4 alkyl group, a nitro group, a sulfo group, or a carboxy group; or a phenyl sulfonyl amino group whose benzene ring is substituted with a chlorine atom, a C1-C4 alkyl group, a nitro group, a sulfo group, or a carboxy group.

In addition, a group $A^{B1}$ is a substituted heterocyclic group represented by the following Formula (b-1-1).

(b-1)

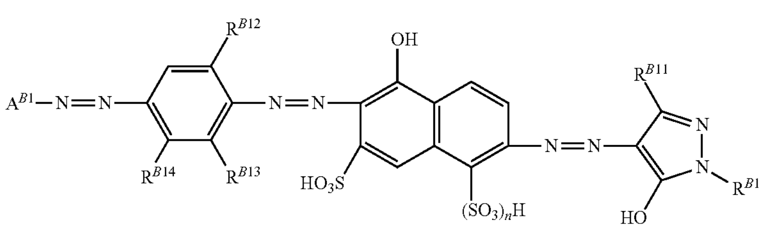

(b-1-1)

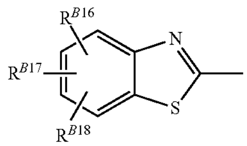

includes a substituent selected from a group consisting of a hydroxy group; a sulfo group; a C1-C4 alkoxy group; and a phenyl sulfonyl oxy group whose benzene ring is substituted with a methyl group, a nitro group, or a chlorine atom.

The dye (b-1) is a compound having a tautomer. Examples of the tautomer include compounds represented by the following Formulae (b-1-2) to (b-1-4), and these tautomers can also be used as the dye (b-1) according to the present embodiment.

(b-1-2)

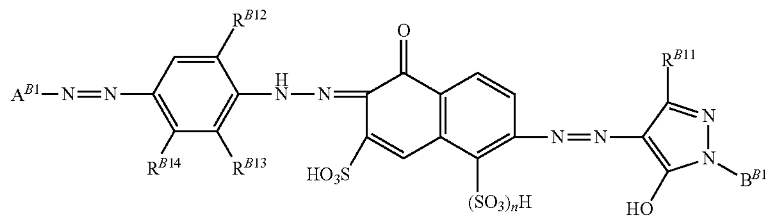

(b-1-3)

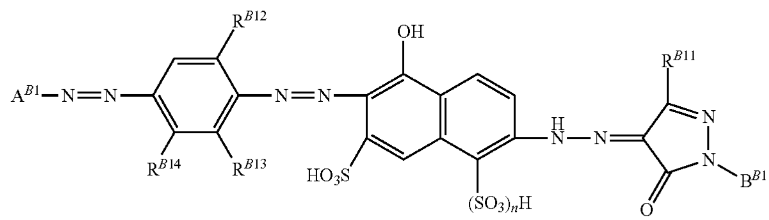

(B-1-4)

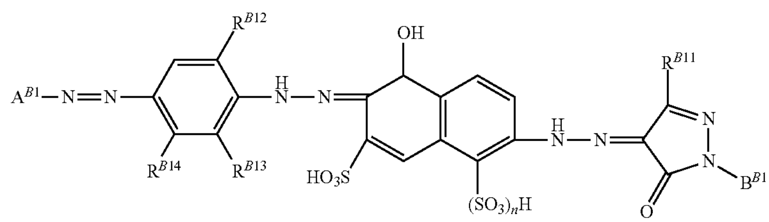

In Formula (b-1-1), $R^{B16}$, $R^{B17}$, and $R^{B18}$ each independently represent a hydrogen atom; a chlorine atom; a carboxy group; a sulfo group; a nitro group; a hydroxy group; a carbamoyl group; a sulfamoyl group; a C1-C4 alkyl group; a C1-C4 alkoxy group; a C1-C4 alkoxy group which is substituted with a hydroxy group, a C1-C4 alkoxy group, a sulfo group, or a carboxy group; a C1-C4 alkylsulfonyl group; a C1-C4 alkylsulfonyl group which is substituted with a hydroxy group, a sulfo group, or a carboxy group; and a phenyl sulfonyloxy group whose benzene ring is substituted with a chlorine atom, a C1-C4 alkyl group, a nitro group, a sulfo group, or a carboxy group.

In addition, a group $B^{B1}$ is a phenyl group or a substituted phenyl group, or a naphtyl group or a substituted naphtyl group. When the group $B^{B1}$ is the substituted phenyl group, the group includes a substituent selected from a group consisting of a hydroxy group; a sulfo group; a carboxy group; a C1-C4 alkyl group; a C1-C4 alkoxy group; a C1-C4 alkylsulfonyl group; a nitro group; an amino group; a mono or di-C1-C4 alkylamino group; an acetylamino group; and a benzoylamino group whose benzene ring is substituted with a chlorine atom, a C1-C4 alkyl group, a nitro group, a sulfo group, or a carboxy group. On the other hand, when the group $B^{B1}$ is the substituted naphtyl group, the group In the above-described Formulae (b-1-2) to (b-1-4), n, $R^{B11}$, $R^{B12}$, $R^{B13}$, $R^{M4}$, the group $A^{B1}$, and the group $B^{B1}$ have the same definitions as the above-described Formula (b-1).

Among the above examples, it is preferable that $R^{B11}$ in Formula (b-1) is a carboxy group; a C1-C4 alkoxy carbonyl group; an unsubstituted C1-C4 alkyl group; a C1-C4 alkyl group which is substituted with a carboxy group; or an unsubstituted phenyl group. Specific examples of $R^{B11}$ in Formula (b-1) include methyl, ethyl, tert-butyl, carboxymethyl, 3-carboxypropyl, carboxy, and phenyl, more preferably, methyl, carboxymethyl, carboxy, and phenyl, and still more preferably, methyl and carboxy.

Among the above examples, it is preferable that $R^{B12}$ to $R^{B14}$ in Formula (b-1) are a hydrogen atom; a sulfo group; a carboxy group; a C1-C4 alkyl group; a C1-C4 alkoxy group; or a N'—C1-C4 alkoxy group which is substituted with a sulfo group. Preferable specific examples of $R^{B12}$ to $R^{B14}$ in Formula (b-1) include a hydro atom, sulfo, methyl, methoxy, 2-sulfoethoxy, 3-sulfopropoxy, and 4-sulfobutoxy, and more preferably a hydro atom, sulfo, methyl, methoxy, and 3-sulfopropoxy.

A preferable combination of $R^{B12}$ to $R^{B14}$ in Formula (b-1) is that $R^{B12}$ is 3-sulfopropoxy or 4-sulfobutoxy, $R^{B13}$ is a hydrogen atom, and $R^{B14}$ is methyl.

Among the above examples, it is preferable that $R^{B16}$ to $R^{B18}$ in Formula (b-1-1) are a hydrogen atom; a chlorine atom; a carboxy group; a sulfo group; a nitro group; a C1-C4 alkyl group; a C1-C4 alkoxy group; and a C1-C4 alkyl sulfonyl group. Preferable specific examples of $R^{B16}$ to $R^{B18}$ in Formula (b-1-1) include a hydrogen atom, a chlorine atom, carboxy, sulfo, nitro, methyl, methoxy, and methylsulfonyl, and more preferably, a hydrogen atom, sulfo, and methoxy. In addition, it is preferable that among $R^{B16}$ to $R^{B18}$, at least one kind of them is a hydrogen atom, and at least one kind of them is a substituent other than the hydrogen atom.

A preferable combination of $R^{B16}$, $R^{B17}$, and $R^{B18}$ in Formula (b-1-1) is that $R^{B16}$, $R^{B17}$, and $R^{B18}$ are a hydrogen atom, methoxy, and sulfo, respectively, or one of them is sulfo and the others are hydrogen atoms. When one of them is sulfo, and the others are hydrogen atoms, it is more preferable that a substituent of sulfo is positioned at 6-th position of a benzothiazole ring.

The group $B^{B1}$ in Formula (b-1) is a phenyl group or a substituted phenyl group. When the group $B^{B1}$ is the substituted phenyl group, the group includes a substituent selected from a group consisting of a hydroxy group; a sulfo group; a carboxy group; a C1-C4 alkyl group, a C1-C4 alkoxy group; an amino group; a mono or di-C1-C4 alkylamino group; an acetylamino group; and a benzoylamino group whose benzene ring is substituted with a chlorine atom, a C1-C4 alkyl group, a nitro group, a sulfo group, or a carboxy group.

The group $B^{B1}$ in Formula (b-1) is a phenyl group having substituents. When each of the substituents is a C1-C4 alkoxy group, the alkoxy group may include substituents in the same manner as a case where $R^{B12}$ to $R^{B14}$ in Formula (b-1) are unsubstituted C1-C4 alkoxy groups, in addition to the preferred substituents.

When the group $B^{B1}$ in Formula (b-1) is a phenyl group which is substituted with a mono or di-C1-C4 alkylamino group, the mono or di-C1-C4 alkylamino group may include substituents in the same manner as a case where $R^{B12}$ to $R^{B14}$ in Formula (b-1) are unsubstituted mono or di-C1-C4 alkylamino groups, in addition to the preferred substituents.

In Formula (b-1), it is preferable that n is 1.

Among the above examples, the group $B^{B1}$ in Formula (b-1) is preferably a substituted phenyl group, and the substituent is preferably a hydroxy group; a sulfo group; a carboxy group; a C1-C4 alkyl group; and a C1-C4 alkoxy group. Preferable specific examples of the substituent when the group $B^{B1}$ in Formula (b-1) is a substituted phenyl group include hydroxy, sulfo, carboxy, methyl, and methoxy, and more preferable specific examples thereof include sulfo and carboxy.

Preferable specific examples of the group $B^{B1}$ in Formula (b-1) include 4-sulfophenyl, 2,4-disulfophenyl, 4-carboxyphenyl, 3,5-dicarboxyphenyl, 4-methylphenyl, 5-sulfo-3-carboxy-2-hydroxyphenyl, and 4-methoxyphenyl, and more preferable specific examples thereof include 4-sulfophenyl, 4-carboxyphenyl, and 3,5-dicarboxyphenyl.

In regard to the substitutions in Formulae (b-1), and (b-1-1) to (b-1-4), the compound obtained by combining preferable ones is more preferable and a combination obtained by combining more preferable ones is still more preferable. The same applies to the combinations of preferable compounds. As described above, the same applies to n, $R^{B11}$ to $R^{B14}$, the group $A^{B1}$ and the group $B^{B1}$ in Formulae (b-1-2) to (b-1-4) in the same manner as that of Formula (b-1).

A salt of the compound represented by Formula (b-1) is an organic or inorganic salt of a cation ion. Specific examples of the inorganic salt include an alkali metal salt, an alkaline earth metal salt, and an ammonium salt. Among these, preferable examples of the inorganic salt include salts such as lithium, sodium, or potassium, and an ammonium salt.

In addition, free acids of the dye (b-1) according to the present embodiment, tautomers thereof, and various salts thereof may be a mixture. Examples of the mixture include a mixture of sodium salts of the dye (b-1) and ammonium salts of the dye (b-1); a mixture of free acids of the dye (b-1) and sodium salts of the dye (b-1); and a mixture of lithium salts of a first dye, sodium salts of the dye (b-1), and ammonium salts of the dye (b-1), and any combination may be used. Since the physical properties such as solubility or the like vary depending on the kind of salt, a mixture having target physical properties can be obtained by selecting the suitable kind of salts according to the necessity and changing the ratio of salts when plural kinds of salts are contained.

Preferable specific examples of the dye (b-1), which are not particularly limited, include compounds represented by structural formulae shown in the following Tables. For the sake of convenience, functional groups such as a sulfo group and a carboxy group in respective Tables are described as a form of a free acid.

| Compound No. | Structural formula |
|---|---|
| 1 | 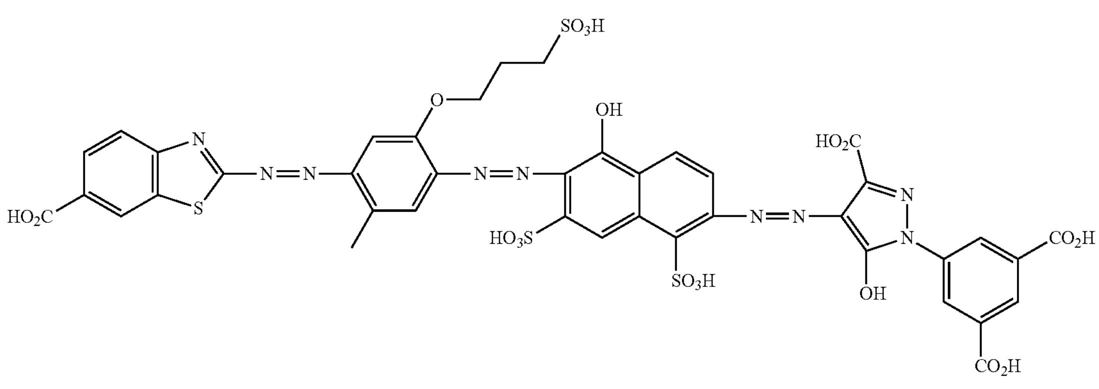 [SMILES: Cc1cc(N=Nc2c(S(=O)(=O)O)cc3c(S(=O)(=O)O)c(N=Nc4c(C(=O)O)nn(-c5cc(C(=O)O)cc(C(=O)O)c5)c4O)ccc3c2O)c(OCCCS(=O)(=O)O)cc1N=Nc1nc2ccc(C(=O)O)cc2s1] |

-continued
| Compound No. | Structural formula |
|---|---|
| 2 | 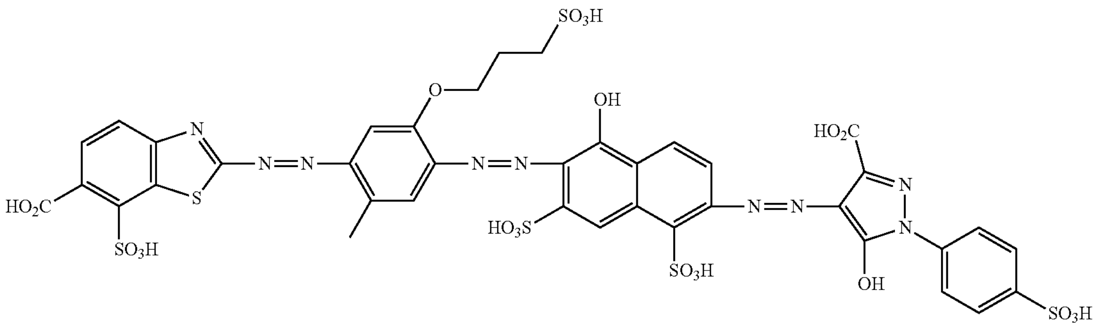 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2ccc(C(=O)O)c(S(=O)(=O)O)c2s1] |
| 3 | 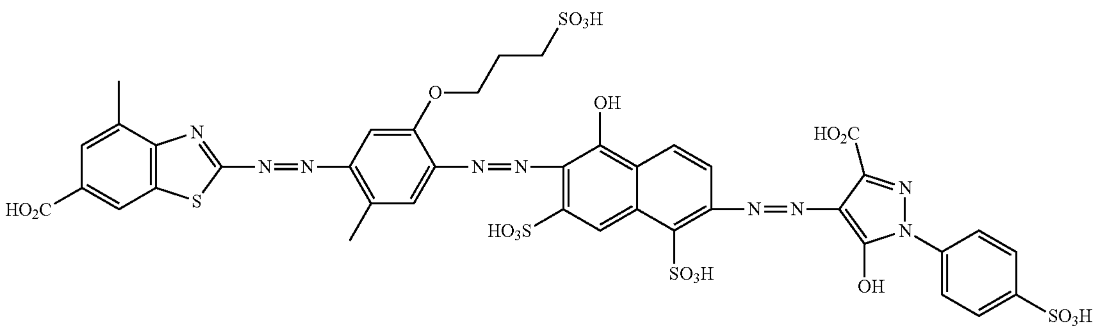 |
| 4 | 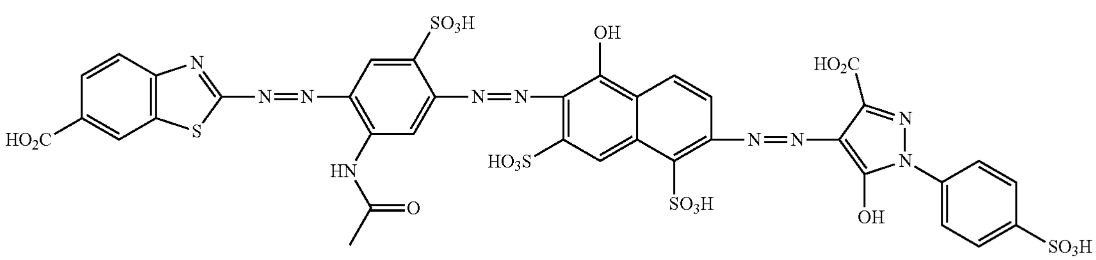 [SMILES: CC(=O)Nc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(S(=O)(=O)O)cc1N=Nc1nc2ccc(C(=O)O)cc2s1] |
| 5 | 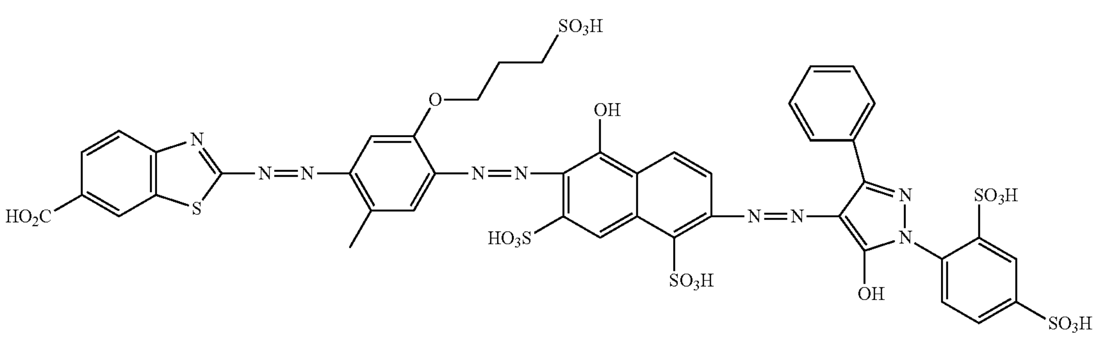 [SMILES: Cc1cc(N=Nc2c(S(=O)(=O)O)cc3c(S(=O)(=O)O)c(N=Nc4c(-c5ccccc5)nn(-c5ccc(S(=O)(=O)O)cc5S(=O)(=O)O)c4O)ccc3c2O)c(OCCCS(=O)(=O)O)cc1N=Nc1nc2ccc(C(=O)O)cc2s1] |

-continued
| Compound No. | Structural formula |
| --- | --- |
| 6 | 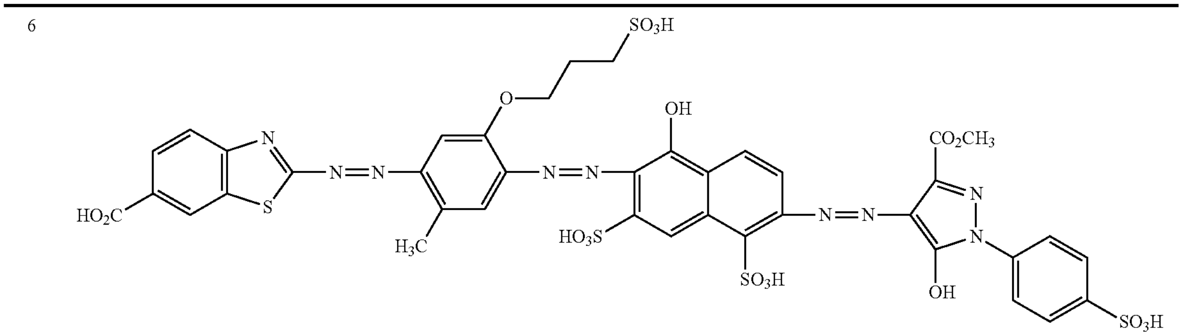 |
| Compound No. | Structural formula |
| --- | --- |
| 7 | 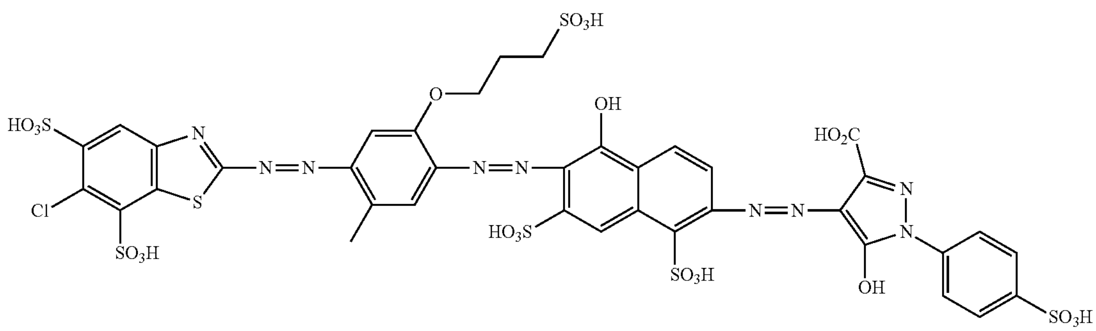 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2cc(S(=O)(=O)O)c(Cl)c(S(=O)(=O)O)c2s1] |
| 8 | 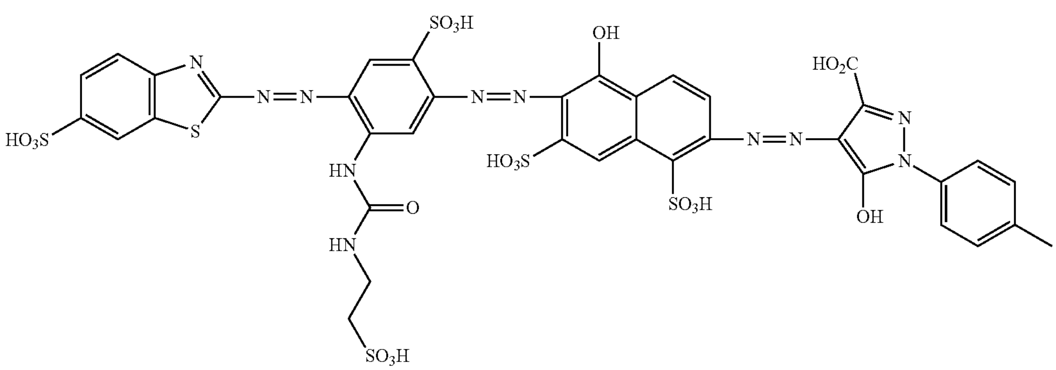 [SMILES: Cc1ccc(-n2nc(C(=O)O)c(N=Nc3ccc4c(O)c(N=Nc5cc(NC(=O)NCCS(=O)(=O)O)c(N=Nc6nc7ccc(S(=O)(=O)O)cc7s6)cc5S(=O)(=O)O)c(S(=O)(=O)O)cc4c3S(=O)(=O)O)c2O)cc1] |
| 9 | 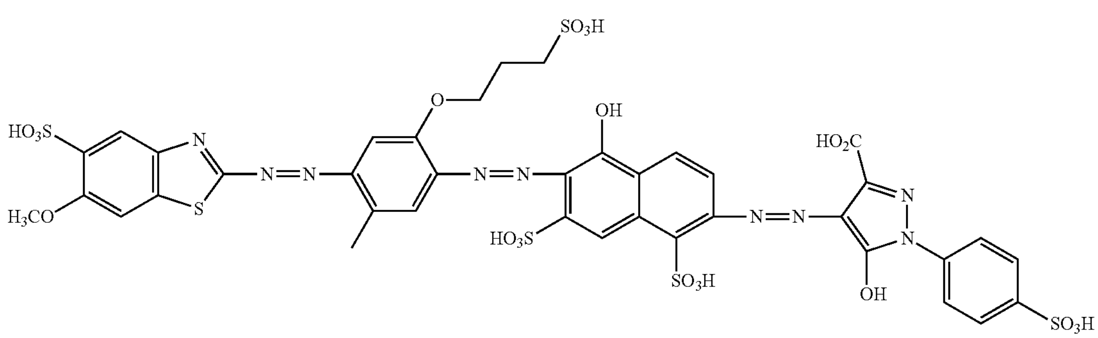 [SMILES: COc1cc2sc(N=Nc3cc(OCCCS(=O)(=O)O)c(N=Nc4c(S(=O)(=O)O)cc5c(S(=O)(=O)O)c(N=Nc6c(C(=O)O)nn(-c7ccc(S(=O)(=O)O)cc7)c6O)ccc5c4O)cc3C)nc2cc1S(=O)(=O)O] |

-continued
| Compound No. | Structural formula |
|---|---|
| 10 | 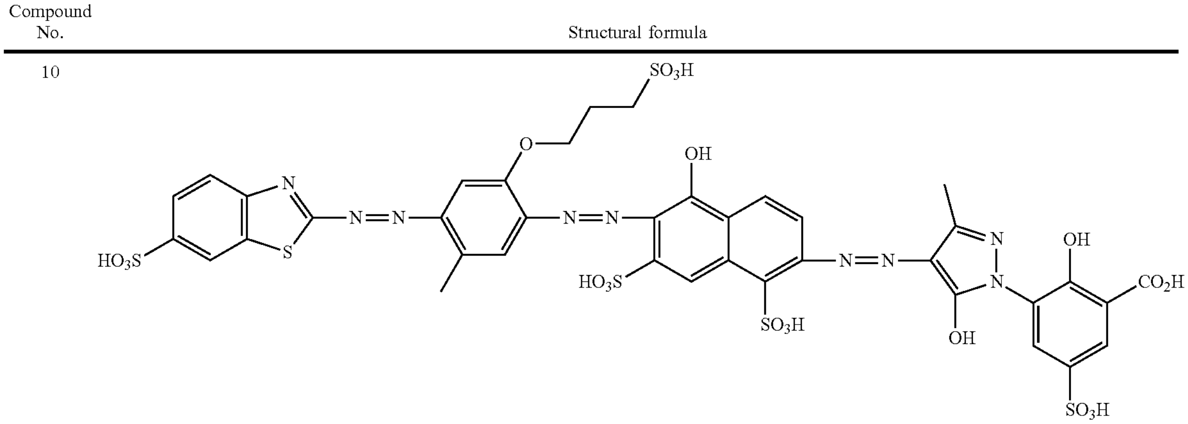 |
| 11 | 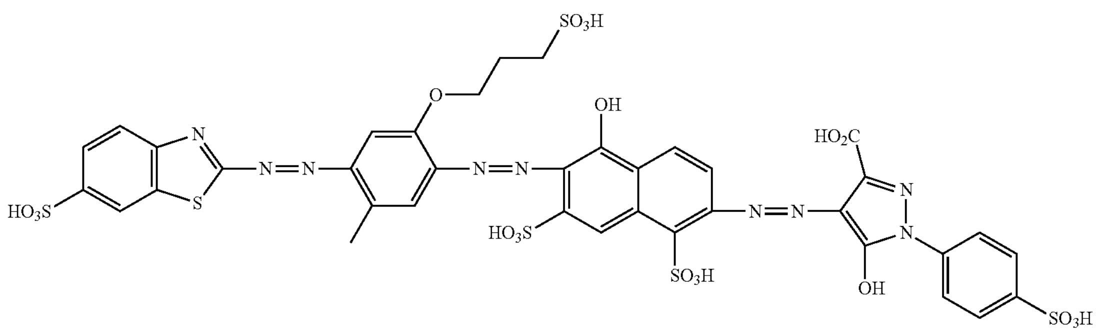 |
| Compound No. | Structural formula |
|---|---|
| 12 | 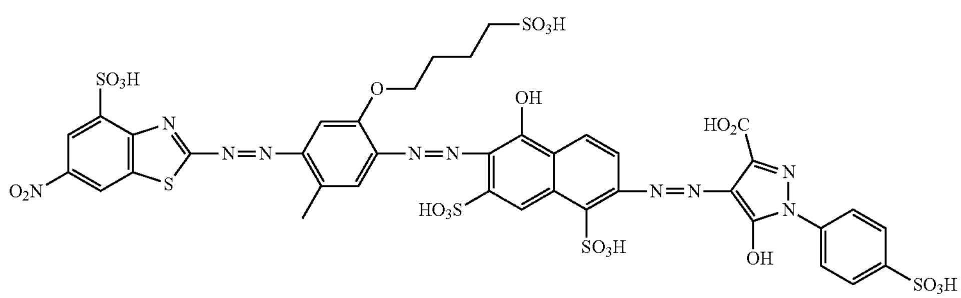 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCCS(=O)(=O)O)cc1N=Nc1nc2c(S(=O)(=O)O)cc([N+](=O)[O-])cc2s1] |
| 13 | 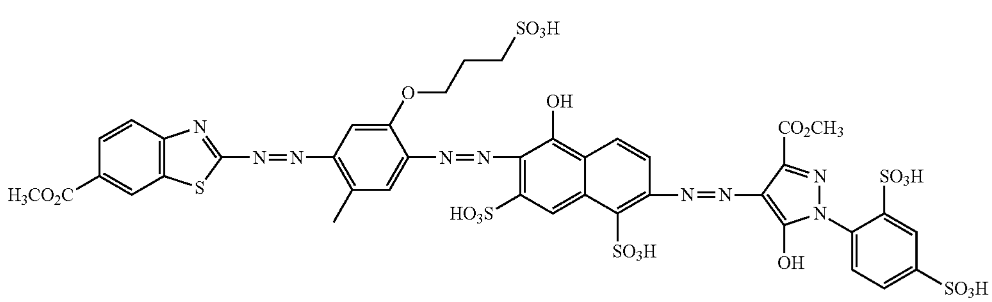 [SMILES: COC(=O)c1ccc2nc(N=Nc3cc(OCCCS(=O)(=O)O)c(N=Nc4c(S(=O)(=O)O)cc5c(S(=O)(=O)O)c(N=Nc6c(C(=O)OC)nn(-c7ccc(S(=O)(=O)O)cc7S(=O)(=O)O)c6O)ccc5c4O)cc3C)sc2c1] |

-continued
| Compound No. | Structural formula |
| --- | --- |
| 14 | 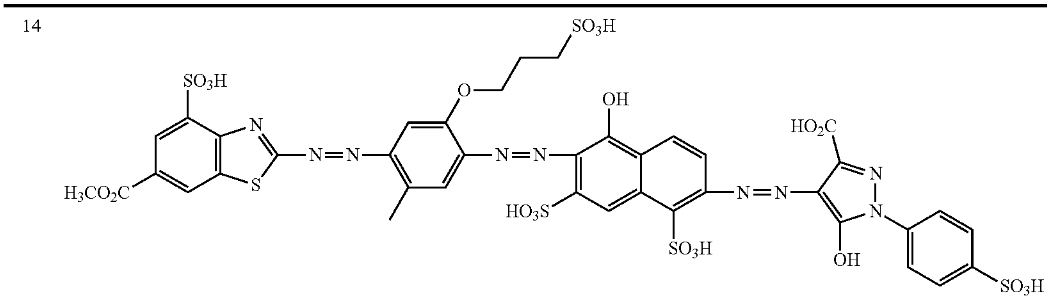 |
| 15 | 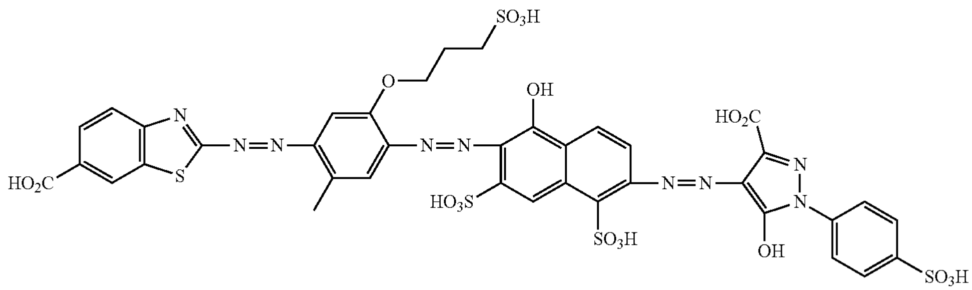 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2ccc(C(=O)O)cc2s1] |
| 16 | 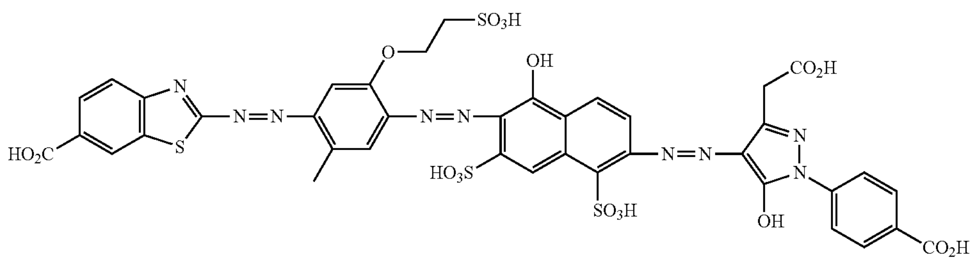 [SMILES: Cc1cc(N=Nc2c(S(=O)(=O)O)cc3c(S(=O)(=O)O)c(N=Nc4c(CC(=O)O)nn(-c5ccc(C(=O)O)cc5)c4O)ccc3c2O)c(OCCS(=O)(=O)O)cc1N=Nc1nc2ccc(C(=O)O)cc2s1] |
| Compound No. | Structural formula |
| --- | --- |
| 17 | 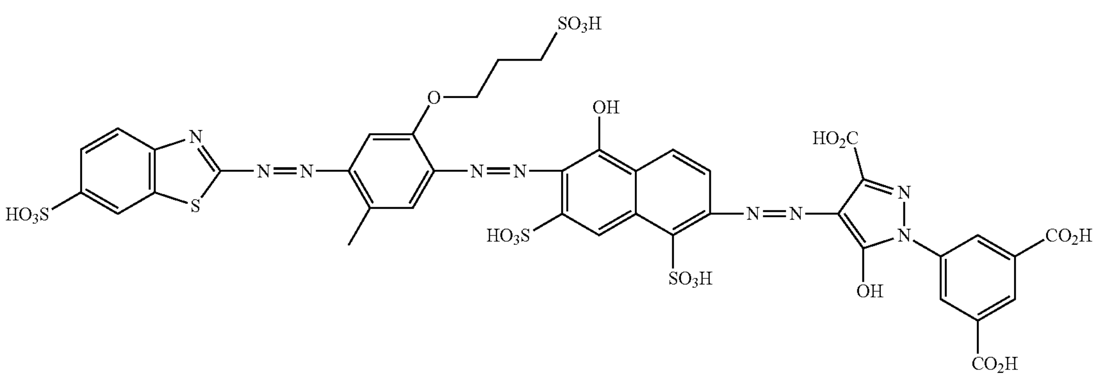 |

-continued

| Compound No. | Structural formula |
|---|---|
| 18 | 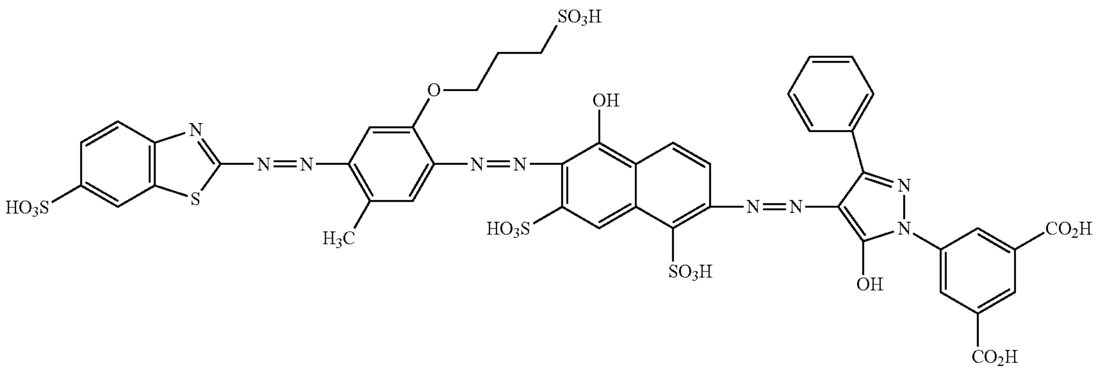 [SMILES: Cc1cc(N=Nc2c(S(=O)(=O)O)cc3c(S(=O)(=O)O)c(N=Nc4c(-c5ccccc5)nn(-c5cc(C(=O)O)cc(C(=O)O)c5)c4O)ccc3c2O)c(OCCCS(=O)(=O)O)cc1N=Nc1nc2ccc(S(=O)(=O)O)cc2s1] |
| 19 | 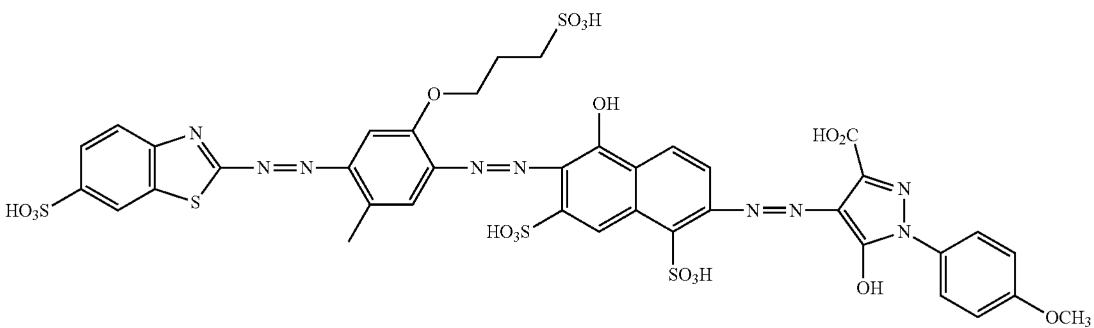 [SMILES: COc1ccc(-n2nc(C(=O)O)c(N=Nc3ccc4c(O)c(N=Nc5cc(C)c(N=Nc6nc7ccc(S(=O)(=O)O)cc7s6)cc5OCCCS(=O)(=O)O)c(S(=O)(=O)O)cc4c3S(=O)(=O)O)c2O)cc1] |
| 20 | 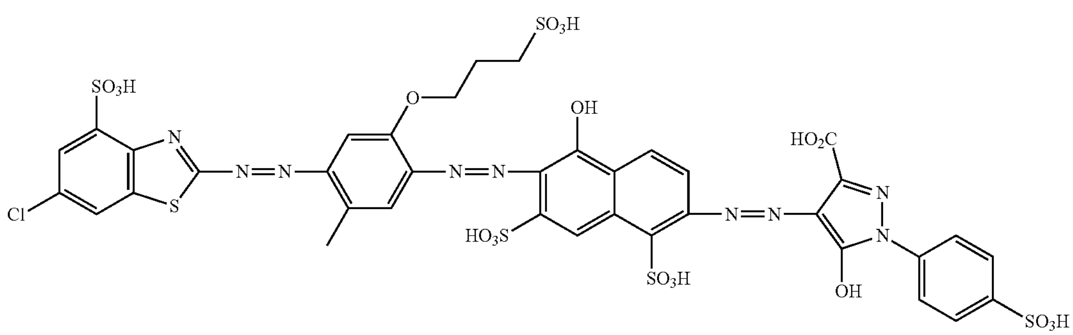 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2c(S(=O)(=O)O)cc(Cl)cc2s1] |

Coloring Material (Dye (b-3)) Represented by Formula (b-3)

Hereinafter, a coloring material represented by Formula (b-3) will be described. In a case where the dye black ink contains a dye (b-3), the ratio (MC/MA) of the content [MA (% by mass)] of the dye (b-1) to the content [MC (% by mass)] of the dye (b-3) is preferably in the range of 0.5 to 1.5, and more preferably in the range of 0.7 to 1.3. When the ratio of the content of the dye (b-1) to the content of the dye (b-3) is in the above-described range, an image exhibiting an excellent black color (close to an achromatic color) can further easily obtained, color reproducibility of an image to be recorded can be improved, and the light resistance can be improved.

(b-3)

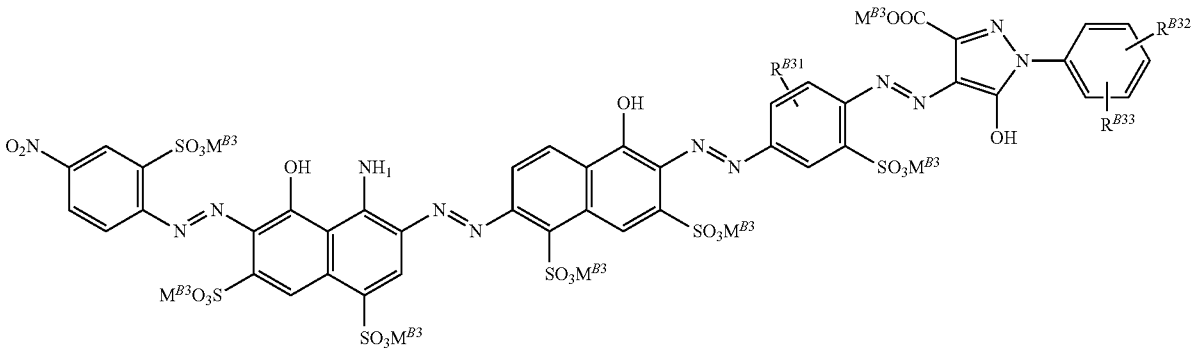

In the above-described Formula (b-3), $R^{B31}$ represents a halogen atom; a hydrogen atom; $SO_3M$; or COOM. In addition, $R^{B32}$ and $R^{B33}$ each independently represent a hydrogen atom; $SO_3M$; or COOM. In addition, $M^{B3}$s each independently represent at least one of Li and Na. However, in Formula (b-3), there is no case where any one of $R^{B32}$ and $R^{B33}$ is a hydrogen atom.

Examples of the compound represented by Formula (b-3) include a compound represented by the following Formula (b-31), a compound represented by the following Formula (b-32), and a compound represented by the following Formula (b-33). These compounds represented by Formulae (b-31) to (b-33) may be used alone, or used in combination of two or more kinds thereof. However, it is preferable to use the compound represented by Formula (b-31) alone.

(b-31)

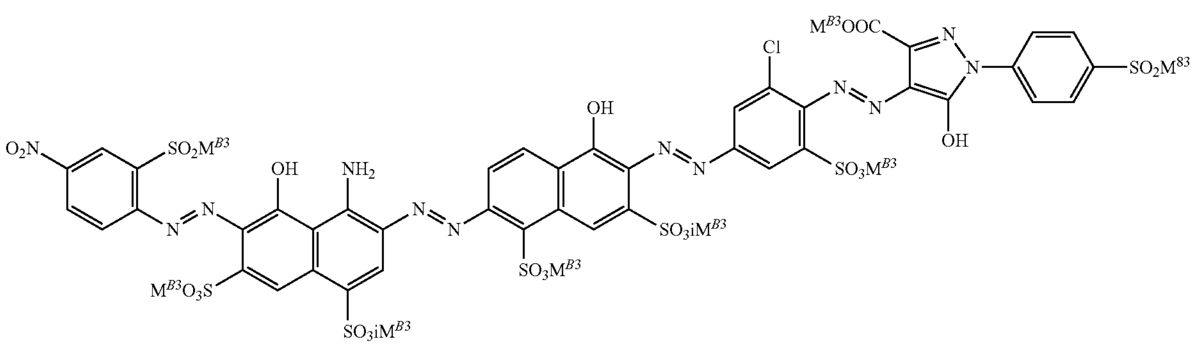

In Formula (b-31), $M^{B3}$s each independently represent at least one of Li and Na.

(b-32)

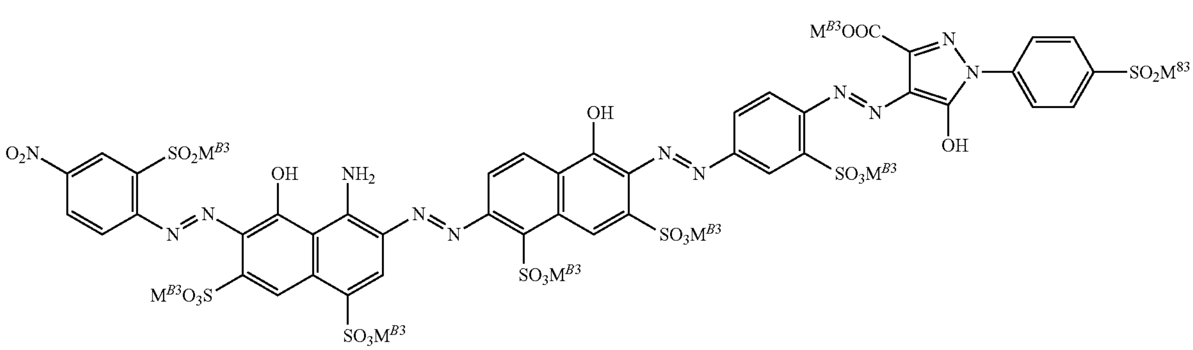

In Formula (b-32), $M^{B3}$s each independently represent at least one of Li and Na.

(b-33)

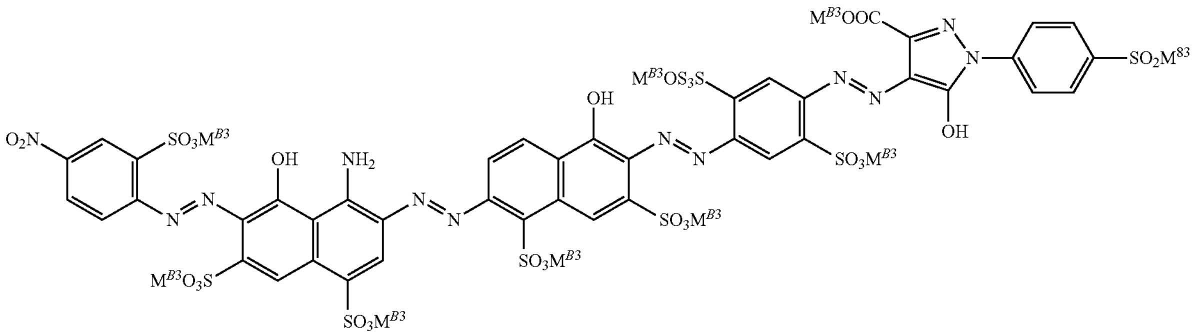

In Formula (b-33), $M^{B3}$s each independently represent at least one of Li and Na.

Pigment Black Ink

Examples of pigments used for the pigment black ink, which are not particularly limited, include No. 2300, No. 900, MCF88, No. 33, No. 40, No. 45, No. 52, MA7, MA8, MA100, and No. 2200B (all manufactured by Mitsubishi Chemical Corporation); Raven 5750, Raven 5250, Raven 5000, Raven 3500, Raven 1255, and Raven 700 (all manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all manufactured by CABOT JAPAN K.K.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (all manufactured by Degussa).

It is preferable that the pigment black ink contains a self-dispersion type pigment. The "self-dispersion type pigment" is a pigment which can be dispersed or dissolved in an aqueous solvent without using a dispersant. Here, the expression "the pigment is dispersed or dissolved in an aqueous solvent without using a dispersant" means that the pigment is stably present in an aqueous solvent because of a hydrophilic group on the surface thereof even when a dispersant used to disperse a pigment is not used. For this reason, bubbles are unlikely to be generated due to degradation of defoaming properties caused by a dispersant and an ink with excellent ejection stability tends to be prepared. In addition, since a significant increase in the viscosity caused by a dispersant can be suppressed, a large amount of pigment can be contained and the print density can be sufficiently increased. Accordingly, the pigment tends to be easily handled.

Examples of the above-described hydrophilic group, which are not particularly limited, include one or more hydrophilic groups selected from a group consisting of —OM, —COOM, —CO—, $—SO_3M$, $—SO_2M$, $—SO_2NH_2$, $—RSO_2M$, $—PO_3HM$, $—PO_3M_2$, $—SO_2NHCOR$, $—NH_3$, and $—NR_3$.

In addition, these chemical formulae, M represents a hydrogen atom, an alkali metal, ammonium, a phenyl group which may include a substituent, or organic ammonium and R represents an alkyl group having 1 to 12 carbon atoms or a naphthyl group which may include a substituent. Moreover, M and R are selected independently from each other.

The self-dispersion type pigment is produced by bonding (grafting) a hydrophilic group to the surface of the pigment through application of a physical treatment or a chemical treatment to the pigment. As the physical treatment, a vacuum plasma treatment or the like can be exemplified. Further, as the chemical treatment, a wet oxidation method of oxidizing a pigment in water using an oxidant or a method of bonding a carboxyl group through a phenyl group by bonding p-aminobenzoic acid to the surface of a pigment can be exemplified.

Components Other than Coloring Material

Hereinafter, components other than the coloring materials contained in a yellow ink, a magenta ink, a cyan ink, and a black ink (also collectively referred to as an "ink") will be described below.

Alkylene oxide adduct of acetylene glycol whose main chain has 12 or more carbon atoms and acetylene glycol whose main chain has 10 or more carbon atoms It is preferable that a yellow ink, a magenta ink, a cyan ink, or a black ink which is optionally used contains an alkylene oxide adduct of acetylene glycol whose main chain has 12 or more carbon atoms and acetylene glycol whose main chain has 10 or more carbon atoms. When an alkylene oxide adduct of acetylene glycol and acetylene glycol whose main chain has 10 or more carbon atoms are contained, color reproducibility and bleeding are suppressed and thus the image quality tends to be improved.

Alkylene Oxide Adduct of Acetylene Glycol Whose Main Chain has 12 or More Carbon Atoms The alkylene oxide adduct of acetylene glycol whose main chain has 12 or more carbon atoms (hereinafter, also referred to as "acetylene glycol A") is contained in an acetylene glycol-based surfactant (non-ionic surfactant) together with acetylene glycol whose main chain has 10 or more carbon atoms described below. A non-ionic surfactant acts on an ink to uniformly spread on a recording medium. Accordingly, in a case where ink jet recording is performed using an ink containing a non-ionic surfactant, a relatively high-definition image with less bleeding can be obtained. Moreover, the "main chain" in the present specification indicates a main chain according to Chemical nomenclature.

Particularly, since the main chain of the acetylene glycol A has 12 or more carbon atoms, the acetylene glycol A has excellent wettability with respect to foreign matters which may cause bubbles to be generated in a polymer member such as rubber or a plastic constituting an ink channel and an ink. Accordingly, when the acetylene glycol A is used, it is possible to prevent generated bubbles from remaining on the channel surface of the polymer member from an ink tank to a head. In addition, since initial filling properties are excellent and growth of remaining bubbles and dot omission caused by separation of bubbles adhered to the channel surface can be prevented, continuous printing stability becomes excellent. In addition, when the acetylene glycol A is an alkylene oxide adduct, the solubility in an ink becomes excellent.

A hydrophile-lipophile balance value (HLB) of the acetylene glycol A is preferably in the range of 8 to 15 since the above-described wettability becomes more excellent. Further, the HLB value here is an HLB value defined by a Griffin method.

Examples of the acetylene glycol A, which are not particularly limited, include compounds represented by the following Formula (1).

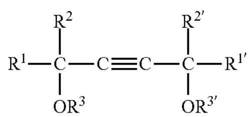
(1)

(In Formula (1), $R^1$, $R^{1\prime}$, $R^2$, and $R^{2\prime}$ each independently represent an alkyl group having 1 to 5 carbon atoms, the carbon atoms of the main chain is 12 or more, —$OR^3$ represents —OH or —$O(C_2H_4O)_mH$, and —$OR^{3\prime}$ represents —OH or —$O(C_2H_4O)_nH$. Here, m and n each independently represent a value including a decimal value of 0.5 to 25 and m+n is a value including a decimal value of 1 to 40 (in this case, a case where both of —$OR^3$ and —$OR^{3\prime}$ are —OH is excluded.))

Specific examples of the acetylene glycol A, which are not particularly limited, include an ethoxylate of 2,5,8,11-tetramethyl-6-dodecyl-5,8-diol and an ethoxylate of 5,8-dimethyl-6-dodecyl-5,8-diol. Among the alkylene oxide adduct of the acetylene glycol, an ethylene oxide adduct of acetylene glycol and a propylene oxide adduct of acetylene glycol are preferable and an ethylene oxide adduct of acetylene glycol is more preferable.

The addition molar number of an alkylene oxide unit in acetylene glycol is preferably in the range of 1 mole to 20 moles in each of $R^3$ and $R^{3\prime}$. In addition, the total number of the addition molar number (total number of $R^3$ and $R^{3\prime}$) is preferably in the range of 2 moles to 40 moles. When the total number of the addition molar number of alkylene oxide is 40 moles or less, static and dynamic surface tension can be minimized and absorption performance of an ink becomes excellent.

As a commercially available product of the acetylene glycol A, which is not particularly limited, Olefin EXP4300 (trade name, manufactured by Nissin Chemical Industry Co., Ltd., number of carbon atoms: 12, ethylene oxide adduct) is exemplified.

The acetylene glycol A may be used alone or in combination of two or more kinds thereof.

The content of the acetylene glycol A contained in a yellow ink, a magenta ink, a cyan ink, or a black ink which is used if necessary is preferably in the range of 0.050% by mass to 1.0% by mass, more preferably in the range of 0.075% by mass to 0.50% by mass, and still more preferably in the range of 0.10% by mass to 0.30% by mass based on the total amount of the ink. When the content of the acetylene glycol A is 0.050% by mass or more, the wettability expands to a hydrophobic surface and filling properties tend to be improved. When the content of the acetylene glycol A is 0.30% by mass or less, dissolution stability tends to be further improved.

It is preferable that the content of the acetylene glycol A contained in a yellow ink is larger than the content of the acetylene glycol A contained in a magenta ink or a cyan ink. In this manner, the bleeding balance between colors tends to be further improved.

Acetylene Glycol Whose Main Chain has 10 or More Carbon Atoms

The acetylene glycol whose main chain has 10 or more carbon atoms (hereinafter, also referred to as "acetylene glycol B") can effectively defoam bubbles generated in an ink. In this manner, initial filling properties and continuous printing stability can be improved.

The HLB value of the acetylene glycol B is preferably 7 or less and more preferably 3 to 5 from a viewpoint of excellent defoaming properties.

Examples of the acetylene glycol B, which are not particularly limited, include acetylene glycol represented by the following Formula (2).

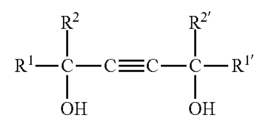
(2)

(In Formula (2), $R^1$, $R^{1\prime}$, $R^2$, and $R^{2\prime}$ each independently represent an alkyl group having 1 to 5 carbon atoms and the carbon atoms of the main chain is 10 or more. $R^1$, $R^{1\prime}$, $R^2$, and $R^{2\prime}$ in Formula (2) are not related to $R^1$, $R^{1\prime}$, $R^2$, and $R^{2\prime}$ in the above-described formula (1).)

Preferable specific examples of the acetylene glycol B, which are not particularly limited, include 2,5,8,11-tetramethyl-6-dodecyne-5,8-diol, 5,8-dimethyl-6-dodecyl-5,8-diol, 2,4,7,9-tetramethyl-5-decyne-4,7-diol, and 4,7-dimethyl-5-decyne-4,7-diol.

As a commercially available product of the acetylene glycol B, which is not particularly limited, SURFINOL 104PG50 (2,4,7,9-tetramethyl-5-decyne-4,7-diol) and SURFINOL DF110D (2,5,8,11-tetramethyl-6-dodecyne-5,8-diol) (trade names, both manufactured by Air Products and Chemicals, Inc.) are exemplified.

The acetylene glycol B may be used alone or in combination of two or more kinds thereof.

The content of the acetylene glycol B contained in a yellow ink, a magenta ink, a cyan ink, or a black ink which is used if necessary is preferably in the range of 0.050% by mass to 1.0% by mass, more preferably in the range of 0.075% by mass to 0.50% by mass, and still more preferably in the range of 0.10% by mass to 0.30% by mass based on the total amount of the ink. When the content of the acetylene glycol B is 0.050% by mass or more, antifoaming properties are increased and filling properties tend to be improved. When the content of the acetylene glycol B is 0.30% by mass or less, dissolution stability tends to be further improved.

The total content of the acetylene glycol A and the acetylene glycol B contained in a yellow ink, a magenta ink, a cyan ink, or a black ink which is used if necessary is preferably in the range of 0.10% by mass to 0.60% by mass, more preferably in the range of 0.10% by mass to 0.50% by mass, and still more preferably in the range of 0.20% by mass to 0.45% by mass based on the total amount of the ink. When the total content of the acetylene glycol A and the acetylene glycol B is in the above-described range, the solubility in an ink becomes excellent and aggregates generated when these acetylene glycols are mixed to each other can be effectively prevented.

Polyoxy Alkylene Alkyl Ether

A yellow ink, a magenta ink, a cyan ink, or a black ink which is used if necessary may contain polyoxy alkylene alkyl ether. When polyoxy alkylene alkyl ether is contained, the solubility and the dispersibility of the acetylene glycol A and the acetylene glycol B tend to be further improved. In addition, the polyoxy alkylene alkyl ether is unlikely to affect low dynamic surface tension of the acetylene glycol A and the acetylene glycol B.

Since an ink channel or an ink tank formed of hydrophobic materials is used in a continuous ink supply system (CISS) in many cases, it is effective that each ink uses a relatively hydrophobic surfactant in an ink set used for the continuous ink supply system. From this viewpoint, it is effective to combine the acetylene glycol A and the acetylene glycol B. Further, from viewpoints of obtaining effects of the acetylene glycol A and the acetylene glycol B and improving dissolution stability, initial filling properties, and continuous printing stability, it is preferable that an ink contains polyoxy alkylene alkyl ether in a case where the ink set of the present embodiment is used for a recording device having a continuous ink supply system (CISS).

Here, the "ink supply system" indicates a system including an ink container (ink tank) with an air inlet; a print head that has a nozzle ejecting the above-described liquid in the ink container; and an ink supply path that connects the ink container with the print head and supplies the above-described liquid to the print head from the ink container.

In addition, the "ink channel" indicates a channel for circulating an ink in an ink jet recording device. As the ink channel, the ink supply path that supplies an ink from the ink container storing an ink to the ink jet recording head and a channel that circulates an ink to a nozzle opening in the ink jet recording head are exemplified.

The HLB value of the polyoxy alkylene alkyl ether is preferably in the range of 11 to 16 and more preferably in the range of 12 to 15. When the HLB value of the polyoxy alkylene alkyl ether is in the above-described range, the initial filling properties and the continuous printing stability tend to be further improved.

As the polyoxy alkylene alkyl ether, which is not particularly limited, a compound represented by the following Formula (3) is exemplified. When such polyoxy alkylene alkyl ether is used, storage stability and continuous printing stability tend to be further improved.

$$R^6O(C_2H_4O)_w(C_3H_6O)_x(C_2H_4O)_y(C_3H_6O)_zH \quad (3)$$

(In Formula (3), $R^6$ represents an alkyl group having 1 to 20 carbon atoms, preferably an alkyl group having 5 to 15 carbon atoms, and more preferably an alkyl group having 10 to 15 carbon atom. In addition, w represents a value in the range of 1 to 20 and x, y, and z each independently represents a value 0 or in the range of 1 to 20. Further, w, x, y, and z satisfy a relationship of "5≤w+x+y+z≤30" and preferably satisfy a relationship of "5≤w+x+y+z≤25.")

Specific examples of the polyoxy alkylene alkyl ether, which are not particularly limited, include $C_{12}H_{25}O(C_2H_4O)_6(C_3H_6O)_2(C_2H_4O)_6(C_3H_6O)_8H$, $C_{13}H_{27}O(C_2H_4O)_6(C_3H_6O)_2(C_2H_4O)_6(C_3H_6O)_8H$, $C_{12}H_{25}O(C_2H_4O)_w(C_3H_6O)_x(C_2H_4O)_y(C_3H_6O)_zH$ (here, w+y=15 and x+z=4), $C_{13}H_{27}O(C_2H_4O)_w(C_3H_6O)_x(C_2H_4O)_y(C_3H_6O)_zH$ (here, w+y=$_{15}$ and x+z=4), $C_{12}H_{25}O(C_2H_4O)_8(C_3H_6O)_2(C_2H_4O)_6H$, $C_{13}H_{27}O(C_2H_4O)_8C_3H_6O)_2(C_2H_4O)_6H$, $C_{12}H_{25}O(C_2H_4O)_{12}(C_3H_6O)_2(C_2H_4O)_{12}H$, $C_{13}H_{27}O(C_2H_4O)_{12}(C_3H_6O)_2(C_2H_4O)_{12}H$, $CH_3(CH_2)_9(CH_3)CHO(C_2H_4O)_7(C_3H_6O)_{4.5}H$, $CH_3(CH_2)_{11}(CH_3)CHO(C_2H_4O)_7(C_3H_6O)_{4.5}H$, $CH_3(CH_2)_9(CH_3)CHO(C_2H_4O)_5(C_3H_6O)_{3.5}H$, $CH_3(CH_2)_{11}(CH_3)CHO(C_2H_4O)_5(C_3H_6O)_{3.5}H$, $C_{14}H_{29}O(C_2H_4O)_{14}(C_3H_6O)_2H$, $C_{11}H_{23}O(C_2H_4O)_8H$, $C_{10}H_{21}O(C_2H_4O)_{11}H$, and $C_{12}H_{25}O(C_2H_4O)_{15}H$.

Specific examples of the commercially available product of the polyoxy alkylene alkyl ether, which are not particularly limited, include NOIGEN DL-C415 ($R^6O(C_2H_4O)_w(C_3H_6O)_x(C_2H_4O)_y(C_3H_6O)_zH$ ($R^6$: alkyl having 12 or 13 carbon atoms, w+y=15, x+z=4, HLB value: 15.0), NOIGEN ET-116B ($R^6O(C_2H_4O)_7(C_3H_6O)_{4.5}H$ ($R^6$: alkyl having 12 or 14 carbon atoms, HLB value: 12.0), NOIGEN ET-106A ($R^6O(C_2H_4O)_5(C_3H_5O)_{3.5}H$ ($R^6$: alkyl having 12 or 14 carbon atoms, HLB value: 10.9), NOIGEN DH-0300 ($R^6O(C_2H_4O)_2H$ ($R^6$: alkyl having 14 carbon atoms, HLB value: 4.0), NOIGEN YX-400 ($R^6O(C_2H_4O)_{40}H$ ($R^6$: alkyl having 12 carbon atoms, HLB value: 18.1), and NOIGEN EA-160 ($C_9H_{19}C_6H_4O(C_2H_4O)$ 16.8H HLB value: 15.4) (all manufactured by Dai-ichi Kogyo Seiyaku Co., Ltd.) and EMULGEN 1108 (trade name, manufactured by Kao Corporation, $R^6O(C_2H_4O)_8H$, $R^6$: alkyl having 11 carbon atoms, HLB value: 13.4).

The polyoxy alkylene alkyl ether may be used alone or in combination of two or more kinds thereof.

The content of the polyoxy alkylene alkyl ether contained in a yellow ink, a magenta ink, a cyan ink, or a black ink which is used if necessary is preferably in the range of 0.010% by mass to 0.50% by mass, more preferably in the range of 0.050% by mass to 0.30% by mass, and still more preferably in the range of 0.10% by mass to 0.30% by mass based on the total amount of the ink. When the content of the polyoxy alkylene alkyl ether is in the above-described range, storage stability and continuous printing stability tend to be further improved.

In addition, the content of the polyoxy alkylene alkyl ether is preferably in the range of 0.10 to 1.0 and more preferably in the range of 0.30 to 0.70 based on 1 part by mass of the content of the acetylene glycol A. When the content of the polyoxy alkylene alkyl ether is in the above-described range, the acetylene glycol A becomes sufficiently solubilized and water solubility tends to be improved. Accordingly, it is possible to prevent generation of aggregates at the time of mixing the polyoxy alkylene alkyl ether with the acetyl glycol A or generation of unevenness in absorbency of an ink.

In addition, the content of the polyoxy alkylene alkyl ether is preferably in the range of 0.10 to 0.5 and more preferably in the range of 0.10 to 0.40 based on 1 part by mass of the total content of the acetylene glycol A and the acetylene glycol B. When the content of the polyoxy alkylene alkyl ether is in the above-described range, the acetylene glycol A and the acetylene glycol B become sufficiently solubilized and water solubility tends to be improved. Accordingly, it is possible to prevent generation of aggregates at the time of mixing the polyoxy alkylene alkyl ether, the acetylene glycol A, and the acetylene glycol B or generation of unevenness in absorbency of an ink.

Other Surfactants

It is preferable that an ink used in the present embodiment contains a surfactant. As the surfactant, which is not particularly limited, at least one of a fluorine-based surfactant and a silicone-based surfactant is preferable. When the ink contains these surfactants, drying properties of the ink adhered to cloth are further improved and high-speed printing becomes possible.

Among the above-described surfactants, a silicone-based surfactant is more preferable because the solubility in an ink becomes increased and foreign matters are unlikely to be generated in the ink.

Examples of the fluorine-based surfactant, which are not particularly limited, include perfluoroalkyl sulfonate, perfluoroalkyl carboxylate, perfluoroalkyl phosphoric acid ester, a perfluoroalkyl ethylene oxide adduct, a perfluoroalkyl betain, and a perfluoroalkylamine oxide compound. Examples of the commercially available product of the fluorine-surfactant, which are not particularly limited, include S-144 and S-145 (manufactured by ASAHI GLASS CO., LTD.); FC-170C, FC-430, Fluorad FC4430 (manufactured by Sumitomo 3M Limited); FSO, FSO-100, FSN, FSN-100, and FS-300 (manufactured by Dupont Limited); and FT-250 and FT-251 (manufactured by NEOS COMPANY LIMITED). The fluorine-based surfactant may be used alone or in combination of two or more kinds thereof.

Examples of the silicone-based surfactant include a polysiloxane-based compound and polyether-modified organosiloxane. Specific examples of the commercially available product of the silicone-based surfactant, which are not particularly limited, include BYK-306, BYK-307, BYK-333, BYK-341, BYK-345, BYK-346, BYK-347, BYK-348, and BYK-349 (trade names, manufactured by BYK-Chemie GmbH); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

The content of the surfactant is preferably in the range of 0.1% by mass to 5% by mass and more preferably in the range of 0.1% by mass to 3% by mass based on the total mass of an ink. When the content of the surfactant is in the above-described range, the wettability of the ink adhered to the recording medium tends to be further improved.

Solvent

An ink may further contain a solvent. As a solvent, which is not particularly limited, an organic solvent or water can be used.

Examples of water include water from which ionic impurities are removed as much as possible, for example, pure water such as ion exchange water, ultrafiltration water, reverse osmosis water, or distilled water and ultrapure water. Further, when water sterilized by irradiating with ultraviolet rays or adding hydrogen peroxide is used, generation of mold and bacteria can be prevented in a case where the ink needs to be stored for a long period of time. In this manner, the storage stability tends to be further improved.

Among organic solvents, a volatile aqueous organic solvent is more preferable. Specific examples of the organic solvent, which are not particularly limited, include alcohols or glycols such as glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol; N,N-dimethylformamide, N,N-dimethylacetamide, 2-pyrrolidone, N-methyl-2-pyrrolidone, 2-oxazolidone, 1,3-dimethyl-2-imidazolidinone, dimethyl sulfoxide, sulfolane, and 1,1,3,3-tetramethylurea.

The solvent may be used alone or in combination or two or more kinds thereof. The content of an organic solvent is not particularly limited and can be suitably determined according to the necessity. For example, in a case where permeability of a recording medium to an ink is intended to be improved, it is preferable to use one or more kinds selected from a group consisting of 1,2-hexanediol, triethylene glycol monobutyl ether, and dipropylene glycol monopropyl ether. pH adjusting agent An ink used in the present embodiment may contain a pH adjusting agent. The pH adjusting agent can easily adjust the pH value of the ink. Examples of the pH adjusting agent, which are not particularly limited, include inorganic acids (such as sulfuric acid, hydrochloric acid, and nitric acid); inorganic acid groups (such as lithium hydroxide, sodium hydroxide, potassium hydroxide, and ammonia), organic acid groups (such as triethanolamine, diethanolamine, monoethanolamine, and tripropanolamine), and organic acids (such as adipic acid, citric acid, and succinic acid). The pH adjusting agent may be used alone or in combination of two or more kinds thereof.

Other Components

For the purpose of maintaining storage stability and ejection stability from a head to be excellent, improving clogging, or preventing deterioration of an ink, various additives such as a dissolution aid, a viscosity adjusting agent, a pH adjusting agent, an antioxidant, a preservative, an anti-mold agent, an anti-corrosion agent, and a chelating agent used for capturing metal ions that affect dispersion can be suitably added to the ink used in the present embodiment.

Examples

Hereinafter, the invention will be described with reference to Examples and Comparative Examples in detail. The invention is not limited by Examples described below.

Material for Ink

Main materials for an ink used in Examples and Comparative Examples described above are as follows.

(See Tables 8 to 12)

Coloring Materials

Y-1: see Table 8
Y-2: see Table 8
Y-3: Direct Yellow 132
Y-4: Acid Yellow 23
M-1: see Table 9
M-2: see Table 9
M-3: Reactive Red 141
M-4: Acid Red 249
C-1: see Table 10
C-2: see Table 10

C-3 Direct Blue 199

C-4: Acid Blue 9

Bk-1: see Table 11

Bw-1: see Table 11

Bk-2: Direct Black 195

Bk-3: see Table 12

Bk-4: see Table 12

Pig-Bk: CWE-50, material: carbon black (self-dispersion type)

Surfactant

SAA1: Olefin EXP4300: number of carbon atoms of main chain: 12, addition of ethylene oxide, 2,5,8,11-tetramethyl-6-dodecyne-5,8-diolethoxyate, (manufactured by Nissin Chemical Industry Co., Ltd.)

SAA2: SURFINOL DF110D: number of carbon atoms of main chain: 12, no addition of ethylene oxide, 2,5,8,11-tetramethyl-6-dodecyne-5,8-diol, (manufactured by Air Products and Chemicals, Inc.)

pH Adjusting Agent triethanolamine

Preparation of Ink

Respective materials were mixed in compositions listed in Tables 1 to 5 below and sufficiently stirred, thereby obtaining respective inks. Specifically, the respective inks were prepared by uniformly mixing respective materials and removing insoluble materials using a filter. In addition, in Tables 1 to 5 below, the unit of numerical values is % by mass and the total is 100.0% by mass.

Preparation of Ink Set

The respective inks obtained in the above-described manner were combined in compositions listed in Tables 4 and 5 to form an ink set.

TABLE 1

| | C-01 | C-02 | C-03 | C-04 | M-01 | M-02 | M-03 | M-04 | M-05 | Y-01 | Y-02 | Y-03 | Y-04 | Bk-01 | Bk-02 | Bk-03 |
|---|---|---|---|---|---|---|---|---|---|---|---|---|---|---|---|---|
| Y-1 | | | | | | | | | | 2.0 | | | | | | |
| Y-2 | | | | | | | | | | 2.0 | 4.0 | | | | | |
| Y-3 | | | | | | | | | | | | 4.0 | | | | |
| Y-4 | | | | | | | | | | | | | 4.0 | | | |
| M-1 | | | | | 3.0 | 7.0 | | | | | | | | | | |
| M-2 | | | | | 1.0 | | 5.0 | | | | | | | | | |
| M-3 | | | | | 1.0 | | | 5.0 | | | | | | | | |
| M-4 | | | | | | | | | 5.0 | | | | | | | |
| C-1 | 0.4 | | | | | | | | | | | | | | | |
| C-2 | 3.6 | 4.0 | | | | | | | | | | | | | | |
| C-3 | | | 4.0 | | | | | | | | | | | | | |
| C-4 | | | | 4.0 | | | | | | | | | | | | |
| Bk-1 | | | | | | | | | | | | | | 4.0 | | |
| Bw-1 | | | | | | | | | | | | | | 1.0 | | |
| Bk-2 | | | | | | | | | | | | | | | 5.0 | |
| Pig-Bk | | | | | | | | | | | | | | | | 5.0 |
| Ozone resistance | ○ | ○ | x | ○ | ○ | ○ | ○ | x | x | ○ | ○ | x | x | ○ | | x |
| Color reproducibility | ○ | Δ | Δ | ○ | ○ | Δ | ○ | ○ | ○ | ○ | Δ | x | ○ | ○ | | ○ |

SAA3: SURFINOL 104PG50: number of carbon atoms in main chain: 10, no addition of ethylene oxide, 2,4,7,9-tetramethyl-5-decyne-4,7-diol, (manufactured by Air Products and Chemicals, Inc.)

SAA4: OLEFIN E1010: number of carbon atoms of main chain: 10, addition molar number of ethylene oxide, ethoxylate of 10,2,4,7,9-tetramethyl-5-decyne-4,7-diol, (manufactured by Nissin Chemical Industry Co., Ltd.)

SAA5: OLEFIN E1004: number of carbon atoms of main chain: 10, addition molar number of ethylene oxide, ethoxylate of 4,2,4,7,9-tetramethyl-5-decyne-4,7-diol, (manufactured by Nissin Chemical Industry Co., Ltd.)

SAA6: OLEFIN 82W: number of carbon atoms of main chain: 8, no addition of ethylene oxide, 3,6-dimethyl-4-octyl-3,6-diol (manufactured by Nissin Chemical Industry Co., Ltd.) Polyoxy alkylene alkyl ether POAAE1: NOIGEN DL-C415 (manufactured by Dai-ichi Kogyo Seiyaku Co., Ltd.)

POAAE2: NOIGEN ET-116B (manufactured by Dai-ichi Kogyo Seiyaku Co., Ltd.)

POAAE3: NOIGEN ET-106A (manufactured by Dai-ichi Kogyo Seiyaku Co., Ltd.)

Solvent

Triethylene glycol

Triethylene glycol monobutyl ether

Propylene glycol

Dipropylene glycol

Glycerin

TABLE 2

| Component | Content |
|---|---|
| Coloring material | Table 1 |
| Surfactant | Table 3 |
| Polyoxy alkylene alkyl ether | Table 3 |
| Triethylene glycol | 10 |
| Triethylene glycol monobutyl ether | 8 |
| Propylene glycol | 1 |
| Dipropylene glycol | 1 |
| Glycerin | 10 |
| Triethanolamine | 0.5 |
| Water | Residual amount |
| Total | 100 |

TABLE 3

| | Bk-04 |
|---|---|
| Bk-3 | 2.0 |
| Bk-4 | 2.0 |
| Bw-1 | 1.0 |
| Ozone resistance | ○ |
| Moisture resistance | ○ |
| Color reproducibility | ○ |

TABLE 4

| | Configuration of coloring material | | | | | Cyan surfactant | | | | Magenta surfactant | |
|---|---|---|---|---|---|---|---|---|---|---|---|
| | Cyan | Magenta | Yellow | Dye-Bk | Pig-Bk | Type | Content | Type | Content | Type | Content |
| Example 1 | C-01 | M-01 | Y-01 | — | — | SAA1 | 0.10 | SAA3 | 0.15 | SAA1 | 0.15 |
| Example 2 | C-02 | M-02 | Y-02 | — | — | SAA1 | 0.10 | SAA3 | 0.15 | SAA1 | 0.15 |
| Example 3 | C-01 | M-03 | Y-01 | — | — | SAA1 | 0.10 | SAA3 | 0.15 | SAA1 | 0.15 |
| Example 4 | C-01 | M-01 | Y-01 | Bk-01 | — | SAA1 | 0.10 | SAA3 | 0.15 | SAA1 | 0.15 |
| Example 5 | C-01 | M-01 | Y-01 | — | Bk-03 | SAA1 | 0.10 | SAA3 | 0.15 | SAA1 | 0.15 |
| Example 6 | C-01 | M-01 | Y-01 | Bk-01 | Bk-03 | SAA1 | 0.10 | SAA3 | 0.15 | SAA1 | 0.15 |
| Comparative Example 1 | C-03 | M-01 | Y-01 | — | — | SAA1 | 0.10 | SAA3 | 0.15 | SAA1 | 0.15 |
| Comparative Example 2 | C-03 | M-04 | Y-04 | — | — | SAA1 | 0.10 | SAA3 | 0.15 | SAA1 | 0.15 |
| Comparative Example 3 | C-04 | M-05 | Y-04 | — | — | SAA1 | 0.10 | SAA3 | 0.15 | SAA1 | 0.15 |
| Comparative Example 4 | C-03 | M-02 | Y-03 | — | — | SAA1 | 0.10 | SAA3 | 0.15 | SAA1 | 0.15 |
| Comparative Example 5 | C-01 | M-01 | Y-01 | Bk-02 | — | SAA1 | 0.10 | SAA3 | 0.15 | SAA1 | 0.15 |
| Example 7 | C-01 | M-01 | Y-01 | Bk-01 | — | SAA1 | 0.10 | SAA2 | 0.15 | SAA1 | 0.15 |
| Example 8 | C-01 | M-01 | Y-01 | Bk-01 | — | SAA1 | 0.10 | SAA3 | 0.15 | SAA1 | 0.15 |
| Example 9 | C-01 | M-01 | Y-01 | Bk-01 | — | SAA1 | 0.10 | SAA3 | 0.15 | SAA1 | 0.15 |
| Example 10 | C-01 | M-01 | Y-01 | Bk-01 | — | SAA1 | 0.10 | SAA2 | 0.10 | SAA1 | 0.15 |
| Example 11 | C-01 | M-01 | Y-01 | Bk-01 | — | SAA1 | 0.45 | SAA2 | 1.00 | SAA1 | 0.50 |
| Comparative Example 6 | C-01 | M-01 | Y-01 | Bk-01 | — | SAA1 | 0.15 | SAA2 | 0.15 | SAA1 | 0.15 |
| Comparative Example 7 | C-01 | M-01 | Y-01 | Bk-01 | — | SAA3 | 0.10 | — | — | SAA3 | 0.15 |
| Comparative Example 8 | C-01 | M-01 | Y-01 | Bk-01 | — | SAA1 | 0.10 | SAA2 | 0.15 | SAA1 | 0.15 |
| Comparative Example 9 | C-01 | M-01 | Y-01 | Bk-01 | — | SAA1 | 0.10 | — | — | SAA1 | 0.15 |
| Comparative Example 10 | C-01 | M-01 | Y-01 | Bk-01 | — | SAA1 | 0.10 | SAA6 | 0.15 | SAA1 | 0.15 |
| Comparative Example 11 | C-01 | M-01 | Y-01 | Bk-01 | — | SAA1 | 0.10 | SAA5 | 0.15 | SAA1 | 0.15 |
| Comparative Example 12 | C-01 | M-01 | Y-01 | Bk-01 | — | SAA1 | 0.10 | SAA4 | 0.15 | SAA1 | 0.15 |

| | Magenta surfactant | | Yellow surfactant | | | | Polyoxy alkylene alkyl ether | |
|---|---|---|---|---|---|---|---|---|
| | Type | Content | Type | Content | Type | Content | Type | Content |
| Example 1 | SAA3 | 0.15 | SAA1 | 0.30 | SAA3 | 0.15 | POAAE1 | 0.15 |
| Example 2 | SAA3 | 0.15 | SAA1 | 0.30 | SAA3 | 0.15 | POAAE1 | 0.15 |
| Example 3 | SAA3 | 0.15 | SAA1 | 0.30 | SAA3 | 0.15 | POAAE1 | 0.15 |
| Example 4 | SAA3 | 0.15 | SAA1 | 0.30 | SAA3 | 0.15 | POAAE1 | 0.15 |
| Example 5 | SAA3 | 0.15 | SAA1 | 0.30 | SAA3 | 0.15 | POAAE1 | 0.15 |
| Example 6 | SAA3 | 0.15 | SAA1 | 0.30 | SAA3 | 0.15 | POAAE1 | 0.15 |
| Comparative Example 1 | SAA3 | 0.15 | SAA1 | 0.30 | SAA3 | 0.15 | POAAE1 | 0.15 |
| Comparative Example 2 | SAA3 | 0.15 | SAA1 | 0.30 | SAA3 | 0.15 | POAAE1 | 0.15 |
| Comparative Example 3 | SAA3 | 0.15 | SAA1 | 0.30 | SAA3 | 0.15 | POAAE1 | 0.15 |
| Comparative Example 4 | SAA3 | 0.15 | SAA1 | 0.30 | SAA3 | 0.15 | POAAE1 | 0.15 |
| Comparative Example 5 | SAA3 | 0.15 | SAA1 | 0.30 | SAA3 | 0.15 | POAAE1 | 0.15 |
| Example 7 | SAA2 | 0.15 | SAA1 | 0.30 | SAA2 | 0.15 | POAAE1 | 0.15 |
| Example 8 | SAA3 | 0.15 | SAA1 | 0.30 | SAA3 | 0.15 | POAAE2 | 0.15 |
| Example 9 | SAA3 | 0.15 | SAA1 | 0.30 | SAA3 | 0.15 | POAAE3 | 0.15 |
| Example 10 | SAA2 | 0.10 | SAA1 | 0.30 | SAA2 | 0.10 | POAAE1 | 0.05 |
| Example 11 | SAA2 | 1.00 | SAA1 | 1.00 | SAA2 | 1.00 | POAAE1 | 0.30 |
| Comparative Example 6 | SAA2 | 0.15 | SAA1 | 0.15 | SAA2 | 0.15 | POAAE1 | 0.15 |
| Comparative Example 7 | — | — | SAA3 | 0.30 | — | — | — | — |
| Comparative Example 8 | SAA2 | 0.15 | SAA1 | 0.30 | SAA2 | 0.15 | — | — |
| Comparative Example 9 | — | — | SAA1 | 0.30 | — | — | POAAE1 | 0.15 |
| Comparative Example 10 | SAA6 | 0.15 | SAA1 | 0.30 | SAA6 | 0.15 | POAAE1 | 0.15 |
| Comparative Example 11 | SAA5 | 0.15 | SAA1 | 0.30 | SAA5 | 0.15 | POAAE1 | 0.15 |
| Comparative Example 12 | SAA4 | 0.15 | SAA1 | 0.30 | SAA4 | 0.15 | POAAE1 | 0.15 |

TABLE 5

| | Configuration of coloring material | | | | | Cyan surfactant | | | | Magenta surfactant | |
|---|---|---|---|---|---|---|---|---|---|---|---|
| | Cyan | Magenta | Yellow | Dye-Bk | Pig-Bk | Type | Content | Type | Content | Type | Content |
| Example 13 | C-01 | M-01 | Y-01 | Bk-02 | - | SAA1 | 0.1 | SAA3 | 0.15 | SAA1 | 0.15 |
| Example 14 | C-01 | M-01 | Y-01 | Bk-02 | Pig-Bk | SAA1 | 0.1 | SAA3 | 0.15 | SAA1 | 0.15 |

| | Magenta surfactant | | Yellow surfactant | | | | Polyoxy alkylene alkyl ether | |
|---|---|---|---|---|---|---|---|---|
| | Type | Content | Type | Content | Type | Content | Type | Content |
| Example 13 | SAA3 | 0.15 | SAA1 | 0.3 | SAA3 | 0.15 | POAAE1 | 0.15 |
| Example 14 | SAA3 | 0.15 | SAA1 | 0.3 | SAA3 | 0.15 | POAAE1 | 0.15 |

Ozone Resistance

A recorded material was prepared by printing a solid image which was formed of yellow, magenta, cyan, and black (in this case, black is included when the ink set contains a black ink composition) on photo paper “Luster” (manufactured by Seiko Epson Corporation) and in which OD values of respective colors were adjusted to be in the range of 0.9 to 1.1 using an ink jet printer EP-803 (manufactured by Seiko Epson Corporation) and the above-described ink set.

The OD value (D0) of the obtained recorded material was measured using a reflection densitometer (trade name: Spectrolino, manufactured by Gretag, Inc.). Next, the recorded material was exposed under the conditions of a temperature of 23° C., a humidity of 50% RH, and an ozone density of 5 ppm for 40 hours, 60 hours, and 80 hours using an ozone weather meter (trade name: OMS-L, manufactured by Suga Test Instruments Co., Ltd.). After the exposure, the OD value (D) of the recorded material was measured using a reflection densitometer (trade name: Spectrolino, manufactured by Gretag, Inc.), an optical density residual rate (ROD) was acquired using the following Formula, and ozone resistance was evaluated according to the following criteria.

$$ROD(\%)=(D/D0)\times 100$$

Measurement conditions: no light source filter, light source: D50, view angle: 2°

Evaluation Criteria

A: The ROD was 70% or more even when the recorded material was exposed for 80 hours.

B: The ROD was 70% or more even when the recorded material was exposed for 60 hours, but the ROD became lower than 70% when exposed for 80 hours.

C: The ROD was 70% or more even when the recorded material was exposed for 40 hours, but the ROD became lower than 70% when exposed for 60 hours.

D: The ROD became less than 70% when the recorded material was exposed for 40 hours.

Color Balance

A difference between the maximum value and the minimum value of the ROD of each color (ROD difference) was acquired using the exposed recorded material obtained by the above-described “evaluation of ozone resistance” and the color balance was evaluated according to the following criteria.

Evaluation Criteria

A: The ROD difference was less than 15 points even when the recorded material was exposed for 80 hours.

B: The ROD difference was less than 15 points even when the recorded material was exposed for 60 hours, but the ROD difference exceeded 15 points when the recorded material was exposed for 80 hours.

C: The ROD difference was less than 15 points even when the recorded material was exposed for 40 hours, but the ROD difference exceeded 15 points when the recorded material was exposed for 60 hours.

D: The ROD difference exceeded 15 points when the recorded material was exposed for 40 hours.

Moisture Resistance

A recorded material was prepared by printing characters with colors of yellow, magenta, cyan, and black (in this case, black is included when the ink set contains a black ink composition) on photo paper “Luster” (manufactured by Seiko Epson Corporation) and outline characters (the outline of the characters are formed on a solid image formed of respective colors) and drying the recorded material under the conditions of 24° C., 50% RH for 24 hours using an ink jet printer EP-803 (manufactured by Seiko Epson Corporation) and the above-described ink set.

The obtained recorded material was allowed to stand still under the conditions of 40° C. and 85% RH for 7 days. The characters of the recorded material and the extent of bleeding of the outline characters were visually observed and the moisture resistance was evaluated according to the following criteria.

Evaluation Criteria

A: Bleeding of a coloring material was not observed.

B: Bleeding of the coloring material was not almost observed.

C: Bleeding of the coloring material was observed and the contour of the characters was collapsed.

D: Bleeding of the coloring material was observed, the characters were thickened and the whole outline characters were dyed in the color of the coloring material.

Color Reproducibility

A recorded material was prepared by printing a look-up table on photo paper “Luster (manufactured by Seiko Epson Corporation)” in a mode without photo paper setting, cleaning, Bi-D, and color correction using an ink jet printer EP-803 (manufactured by Seiko Epson Corporation) and the above-described ink set.

The volume of the color reproducing range (gamut volume) was calculated from an L* value, an a* value, and a b* value obtained by measuring the recorded material by setting the gamut volume at the time when all of the L* value, the a* value, and the b* value defined by CIE were 1 as 1. Further, in the same manner, the gamut volume was calculated by creating a recorded material using the ink set (reference ink set) described in Example 2 of JP-A-2005-105135. The gamut volume rate of the ink set in a case where the gamut volume of the reference ink set was set as 100% was calculated and the color reproducibility was evaluated according to the following criteria.

Evaluation Criteria

A: The gamut volume rate exceeded 110%.

B: The gamut volume rate was in the range of more than 105% to 110%.

C: The gamut volume rate was in the range of more than 100% to 105%.

D: The gamut volume rate was 100% or less.

Dissolution Stability

When a yellow ink, a magenta ink, a cyan ink, and a black ink (in this case, a black ink is contained in a case where the ink set contains a black ink composition) were prepared, respective components were mixed to each other and stirred for 2 hours. Subsequently, the respective inks were visually observed whether material components were uniformly dissolved (dispersed) and the dissolution stability was evaluated according to the following criteria.

Evaluation Criteria

A: The raw material components were uniformly dissolved (dispersed) and undissolved floating matters were not observed.

B: The raw material components were uniformly dissolved (dispersed) by being stirred at room temperature for 1 hour or longer and undissolved floating matters were not observed.

C: The raw material components were not dissolved (dispersed) and undissolved floating matters were observed.

Initial Filling Properties

An ink tank of an ink jet printer (trade name: L800, manufactured by Seiko Epson Corporation) was filled with the respective prepared ink sets. An initial filling operation was performed on a head according to the initial filling sequence set by L800. Next, nozzle check was performed in order to confirm whether an ink was allowed to be ejected from all nozzles of the head. In a case where a nozzle that was not capable of ejecting an ink was present, the head was cleaned (the ink in the nozzle was suctioned) and then the nozzle was checked again. The initial filling properties were evaluated according to the following criteria based on the number of cleaning operations required to perform until the ink was ejected from all nozzles. The evaluation results were listed in Tables 6 and 7.

Evaluation Criteria

A: An ink was ejected from all nozzles using only the initial filling sequence.

B: The number of cleaning operations required to perform until the ink was ejected from all nozzles was one.

C: The number of cleaning operations required to perform until the ink was ejected from all nozzles was two or more.

Continuous Printing Stability

After it was confirmed that the ink was ejected from all nozzles of the head according to the above-described "evaluation of initial filling properties," evaluation of the continuous printing stability was performed by printing an image with a 70% Duty using respective ink compositions and A4-size plain paper (P paper (trade name), manufactured by Fuji Xerox Co., Ltd.). The number of printed sheets was set to 1000 in total by performing continuous printing on 500 sheets twice. Subsequently, nozzles were checked and the continuous printing stability was evaluated based on the number of omitted nozzles according to the following criteria. The evaluation results were listed in Tables 6 and 7.

Evaluation Criteria

A: The number of omitted nozzles was 1 or less.

B: The number of omitted nozzles was 2 or less.

C: The number of omitted nozzles was 3 or more.

Bleed Resistance

A recorded material was prepared by printing solid images with a Duty of 80%, 90%, and 100% on photo paper "Luster (manufactured by Seiko Epson Corporation)" in a mode without photo paper setting, cleaning, Bi-D, and color correction using an ink jet printer EP-803 (manufactured by Seiko Epson Corporation) and the above-described ink set.

The bleeding on the color boundaries in a recording area of the obtained recorded material was visually observed and bleed resistance was evaluated according to the following criteria.

Evaluation Criteria

A: Bleeding was not generated between colors at a Duty of 100%.

B: Bleeding was not generated between colors at a Duty of 90%.

C: Bleeding was not generated between colors at a Duty of 80% or less.

The entire disclosure of Japanese Patent Application No. 2014-15036, filed Jul. 24, 2014 and No. 2015-125231, filed Jun. 23, 2015 are expressly incorporated by reference herein.

TABLE 6

| | Ozone resistance of single color | | | | Ozone resistance of ink set | | Moisture resistance of single color | | | | | | | | Initial | |
|---|---|---|---|---|---|---|---|---|---|---|---|---|---|---|---|---|
| | | | | | Ozone | Color | | | | | Moisture | Color | | Disso- | filling | Contin- |
| | Cyan | Magenta | Yellow | Black | resistance | balance | Cyan | Magenta | Yellow | Black | resistance of ink set | reproducibility | Bleeding | lution stability | properties | uous printing |
| Example 1 | A | A | A | — | A | A | A | A | A | — | A | A | A | A | A | A |
| Example 2 | A | A | A | — | A | A | A | A | A | — | A | B | A | A | A | A |
| Example 3 | A | A | A | — | A | A | A | B | A | — | B | A | A | A | A | A |
| Example 4 | A | A | A | A | A | A | A | A | A | A | A | A | A | A | A | A |
| Example 5 | A | A | A | A | A | A | A | A | A | A | A | A | A | A | A | A |
| Example 6 | A | A | A | A | A | A | A | A | A | A | A | A | A | A | A | A |
| Comparative Example 1 | D | A | A | — | D | D | A | A | A | — | A | B | A | A | A | A |

TABLE 6-continued

| | Ozone resistance of single color | | | | Ozone resistance of ink set | | Moisture resistance of single color | | | | | | | | | |
|---|---|---|---|---|---|---|---|---|---|---|---|---|---|---|---|---|
| | Cyan | Magenta | Yellow | Black | Ozone resistance | Color balance | Cyan | Magenta | Yellow | Black | Moisture resistance of ink set | Color reproducibility | Bleeding | Dissolution stability | Initial filling properties | Continuous printing |
| Comparative Example 2 | D | D | D | — | A | A | A | A | C | — | C | B | A | A | A | A |
| Comparative Example 3 | A | D | D | — | D | D | D | D | C | — | D | A | A | A | A | A |
| Comparative Example 4 | D | A | A | — | D | D | A | A | A | — | A | D | A | A | A | A |
| Comparative Example 5 | A | A | A | D | D | D | A | A | A | D | D | A | A | A | A | A |
| Example 7 | A | A | A | — | A | A | A | A | A | A | A | A | A | B | A | A |
| Example 8 | A | A | A | — | A | A | A | A | A | A | A | A | A | B | A | A |
| Example 9 | A | A | A | — | A | A | A | A | A | A | A | A | A | B | A | A |
| Example 10 | A | A | A | — | A | A | A | A | A | A | A | A | A | B | A | B |
| Example 11 | A | A | A | — | A | A | A | A | A | A | A | A | A | B | A | A |
| Comparative Example 6 | A | A | A | — | A | A | A | A | A | A | A | A | C | A | A | A |
| Comparative Example 7 | A | A | A | — | A | A | A | A | A | A | A | A | A | C | C | C |
| Comparative Example 8 | A | A | A | — | A | A | A | A | A | A | A | A | C | C | C | C |
| Comparative Example 9 | A | A | A | — | A | A | A | A | A | A | A | A | A | A | C | C |
| Comparative Example 10 | A | A | A | — | A | A | A | A | A | A | A | A | A | A | C | C |
| Comparative Example 11 | A | A | A | — | A | A | A | A | A | A | A | A | A | A | C | C |
| Comparative Example 12 | A | A | A | — | A | A | A | A | A | A | A | A | A | A | C | C |

TABLE 7

| | Ozone resistance of single color | | | | Ozone resistance of ink set | | Moisture resistance of single color | | | | | | | | | |
|---|---|---|---|---|---|---|---|---|---|---|---|---|---|---|---|---|
| | Cyan | Magenta | Yellow | Black | Ozone resistance | Color balance | Cyan | Magenta | Yellow | Black | Moisture resistance of ink set | Color reproducibility | Bleeding | Dissolution stability | Initial filling stability | Continuous printing |
| Example 13 | A | A | A | A | A | A | A | A | A | A | A | A | A | A | A | A |
| Example 14 | A | A | A | A | A | A | A | A | A | A | A | A | A | A | A | A |

TABLE 8

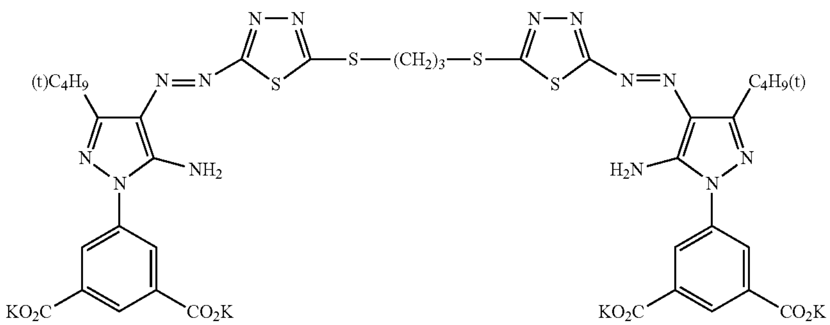
Y-1

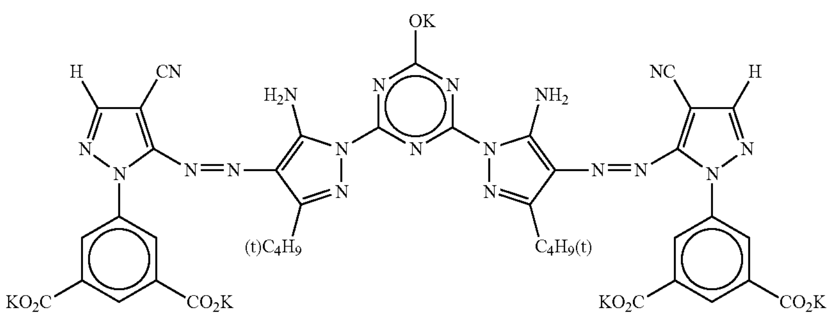
Y-2

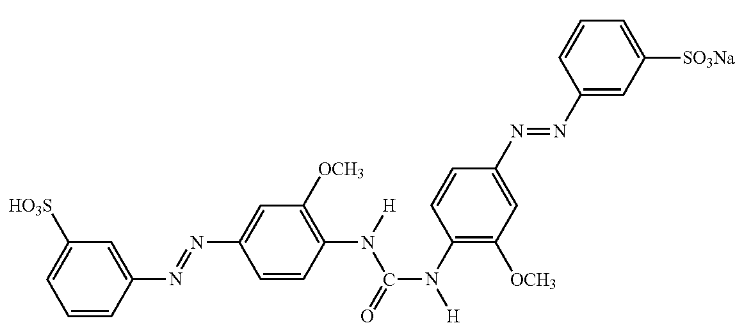
Y-3

Direct Yellow 132

TABLE 8-continued
Y-4
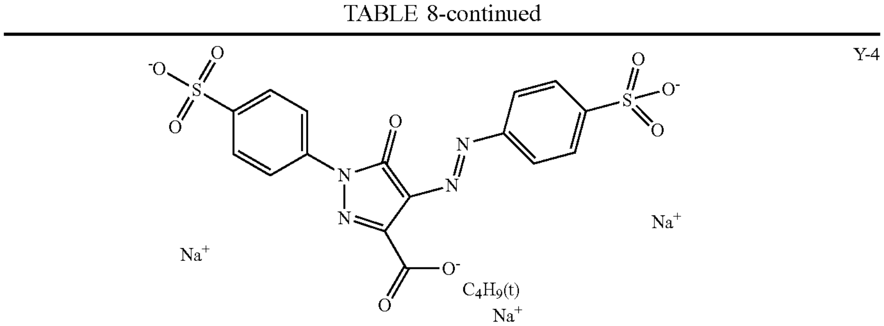
Acid Yellow 23
TABLE 9
C-1
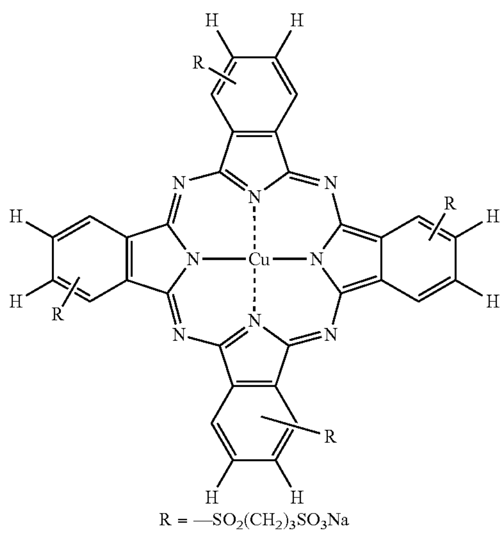
R = —$SO_2(CH_2)_3SO_3Na$
C-2
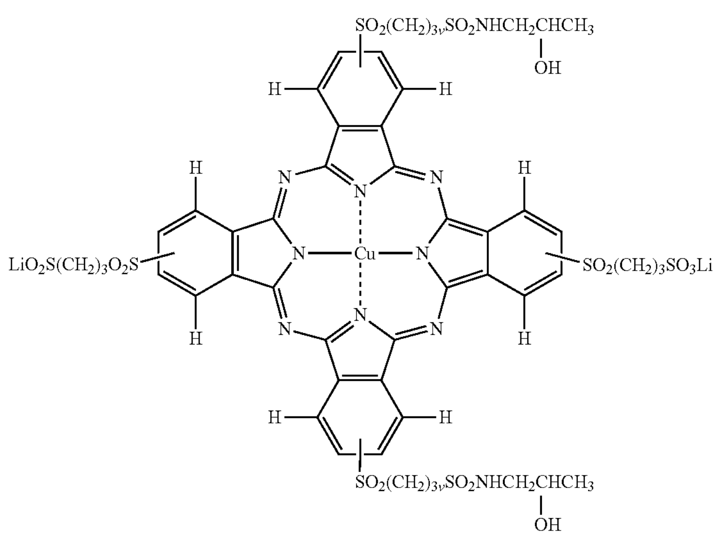

TABLE 9-continued
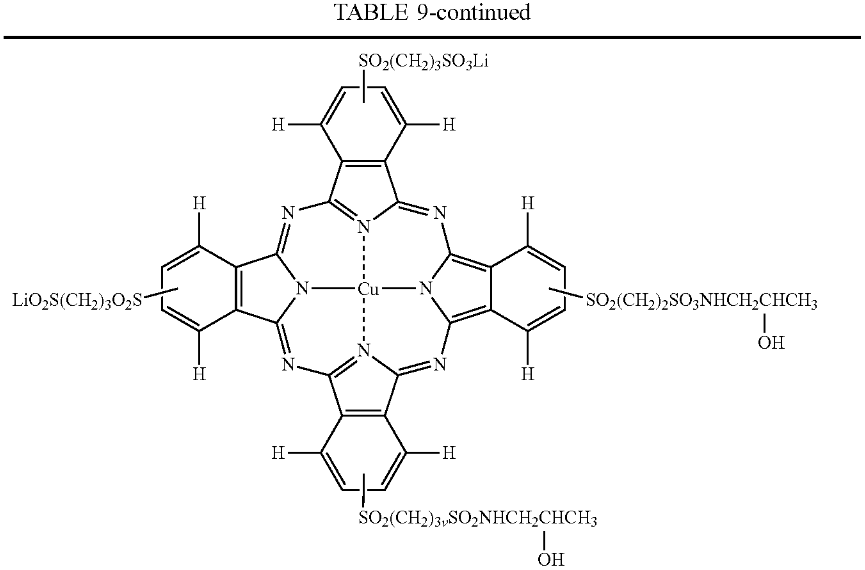
C-3
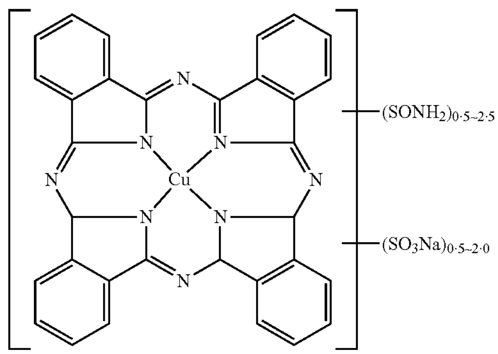
Direct Blue 199
C-4
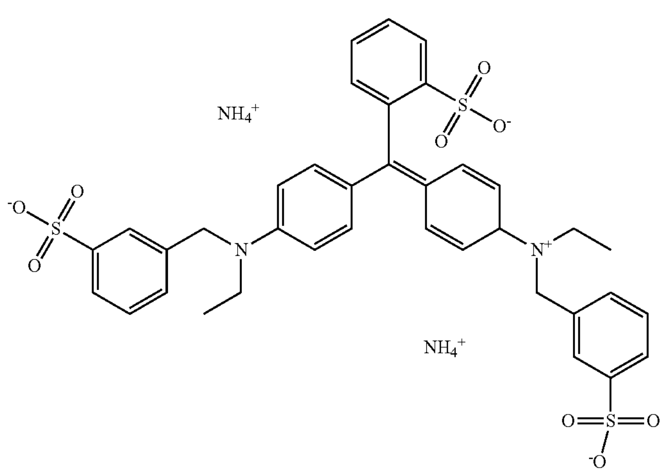
Acid Blue 9

TABLE 10
M-1
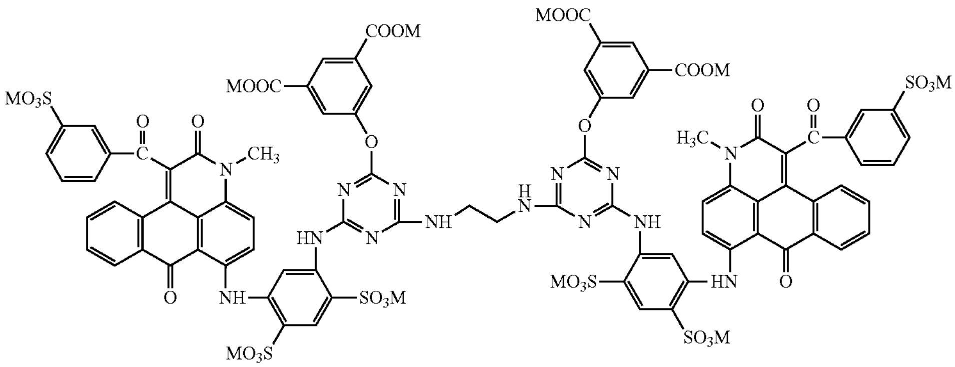
M = Na or $NH_4$
M-2
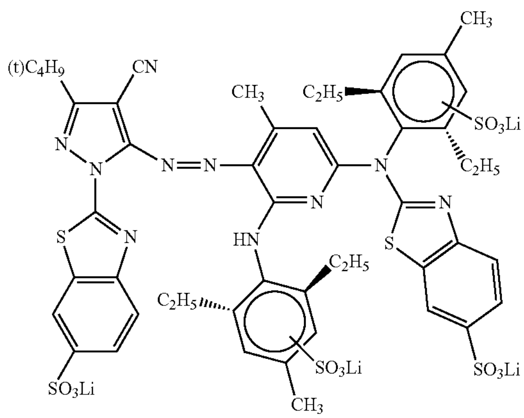
M-3
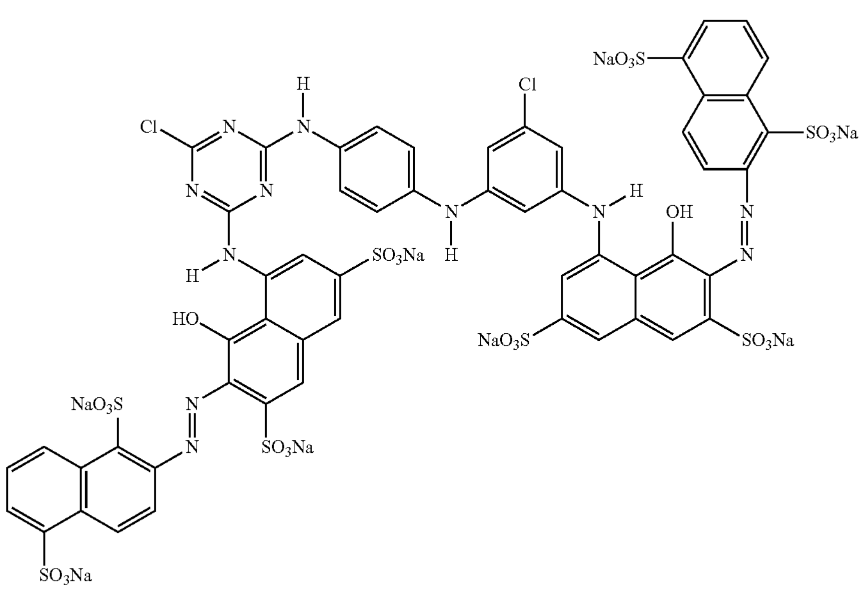
Reactive Red 141

TABLE 10-continued
M-4
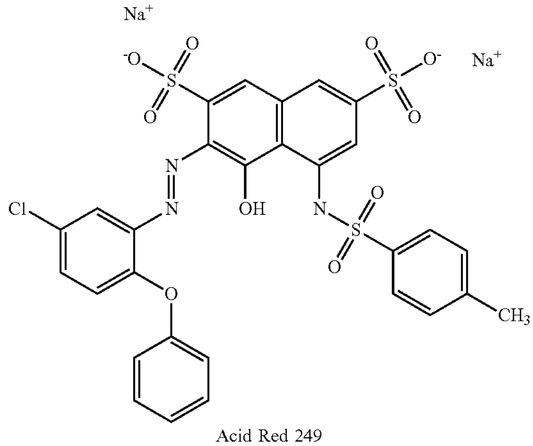
Acid Red 249
TABLE 11
Bk-1
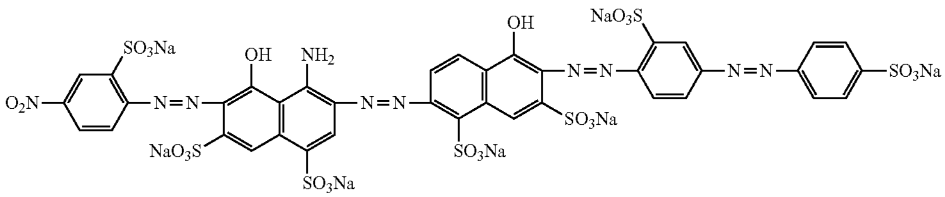
Bw-1
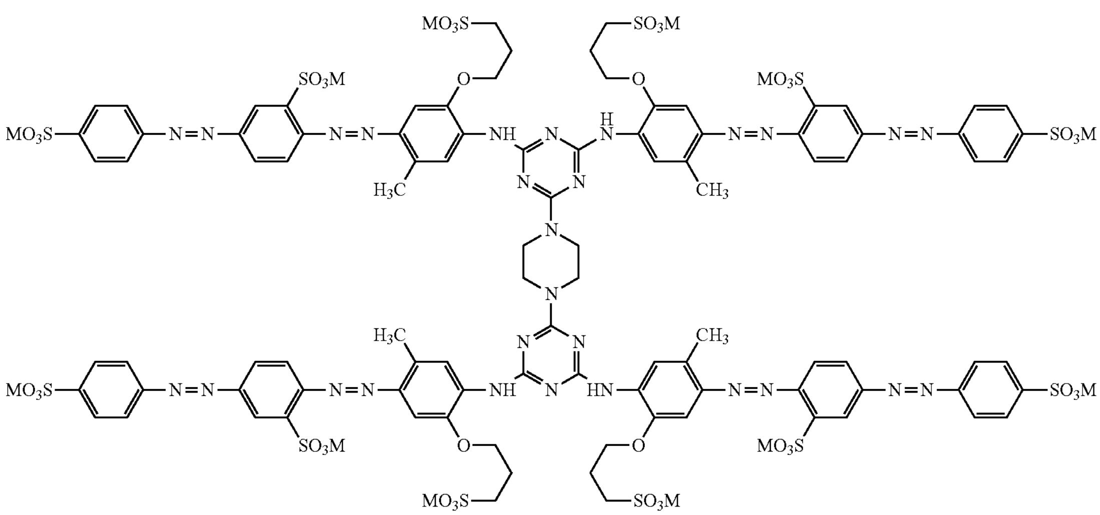
(M = Na or Li)

TABLE 11-continued

Bk-2

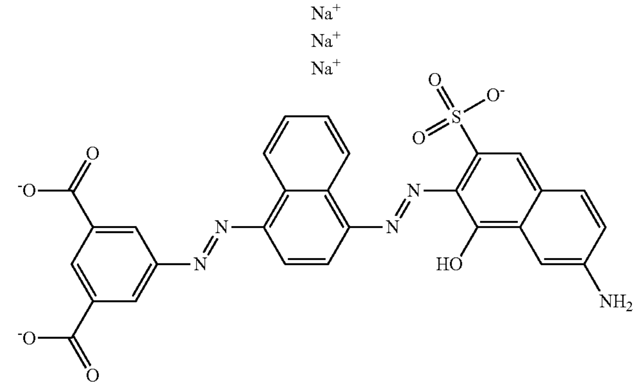

Direct Black 195

TABLE 12

Bk-3

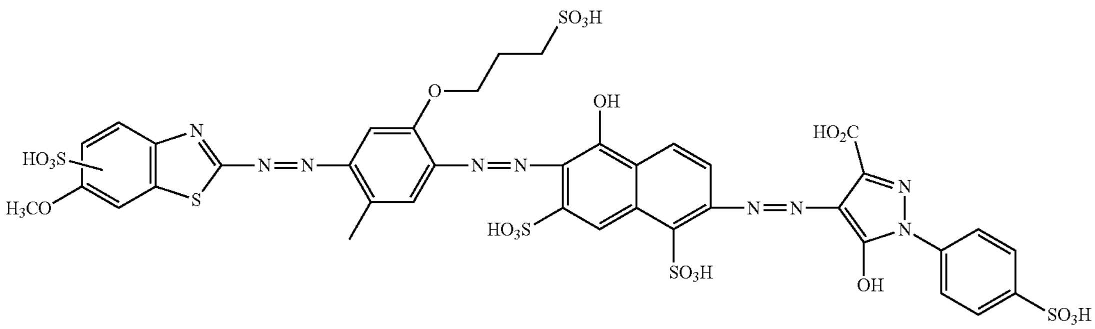

Bk-4

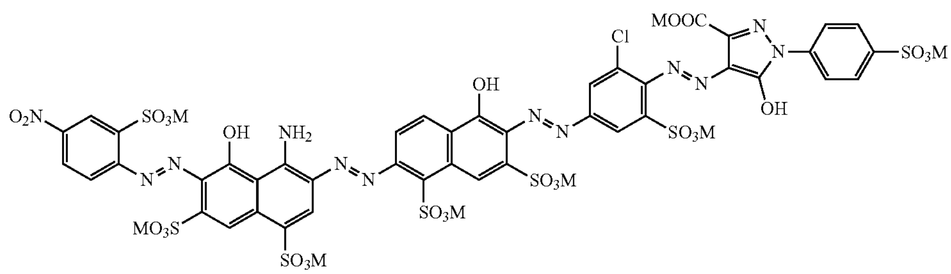

(M = Li or Na)

What is claimed is:

1. An ink set comprising at least:

a yellow ink;

a magenta ink; and a cyan ink, wherein the yellow ink includes coloring materials represented by Formula (Y-1), the magenta ink includes one or more kinds selected from a group consisting of coloring materials represented by the following Formulae (M-1) and (M-2), and the cyan ink includes one or more kinds selected from a group consisting of coloring materials represented by the following Formulae (C-1) and (C-2), (Y-1)

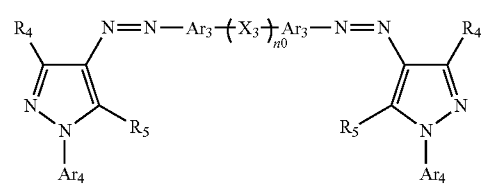

wherein in Formula (Y-1), $R_4$ represents a substituent; $R_5$ represents —$OR_6$ or —$NHR_7$; $R_6$ and $R_7$ each represent a hydrogen atom or a substituent; $X_3$ represents a divalent linking group; n0 represents 0 or 1; $Ar_3$ represents a divalent heterocyclic group; and $Ar_4$ represents an alkyl group, an aryl group, or a triazine group, (M-1)

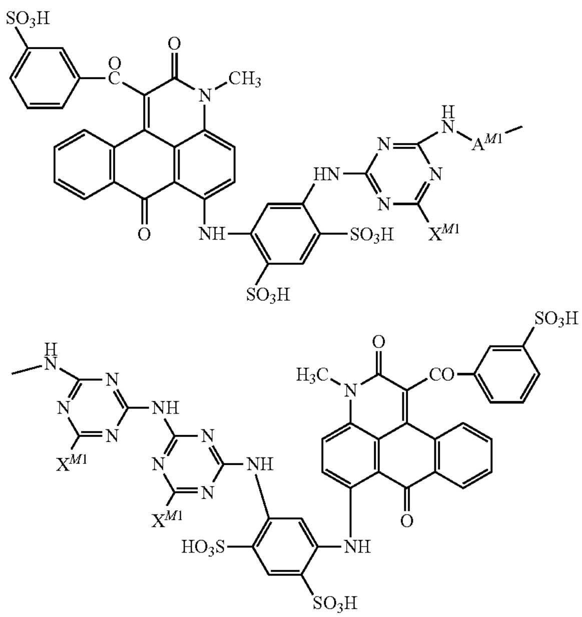

wherein in Formula (M-1), $A^{M1}$ represents an alkylene group having 1 or 2 carbon atoms, an alkylene group which contains a phenylene group and has 1 or 2 carbon atoms, or a group represented by the following Formula (M-1-1); and $X^{M1}$ represents an amino group, a hydroxy group, a chlorine atom, or a phenoxy group substituted with a sulfo group or a carboxy group, (M-1-1)

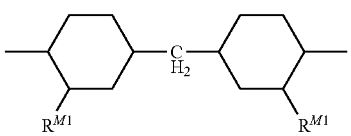

wherein in Formula (M-1-1), $R^{M1}$ represents a hydrogen atom or an alkyl group, (M-2)

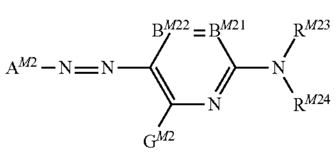

wherein in Formula (M-2), $A^{M2}$ represents a 5-membered heterocyclic group; $B^{M21}$ and $B^{M22}$ each represents —$CR^{M21}$= or —$CR^{M22}$=, or one of $B^{M21}$ and $B^{M22}$ represents a nitrogen atom and the other represents —$CR^{M21}$= or —$CR^{M22}$=; $R^{M23}$ and $R^{M24}$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group and $R^{M23}$ and $R^{M24}$ may further include a substituent; $G^{M2}$, $R^{M21}$, and $R^{M22}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group, or a heterocyclic group, an acylamino group, an ureido group, a sulfamoylamino group, an alkoxycarbonylamino group, an aryloxycarbonylamino group, an alkyl and arylsulfonylamino group, an aryloxycarbonylamino group, a nitro group, an alkyl and arylthio group, an alkyl and arylsulfonyl group, an alkyl and arylsulfinyl group, a sulfamoyl group, a sulfo group, or a heterocyclic thio group and $G^{M2}$, $R^{M21}$, and $R^{M22}$ may be further substituted; and $R^{M21}$ and $R^{M23}$ or $R^{M23}$ and $R^{M24}$ may be bonded to each other to form a 5- or 6-membered ring, (C-1)

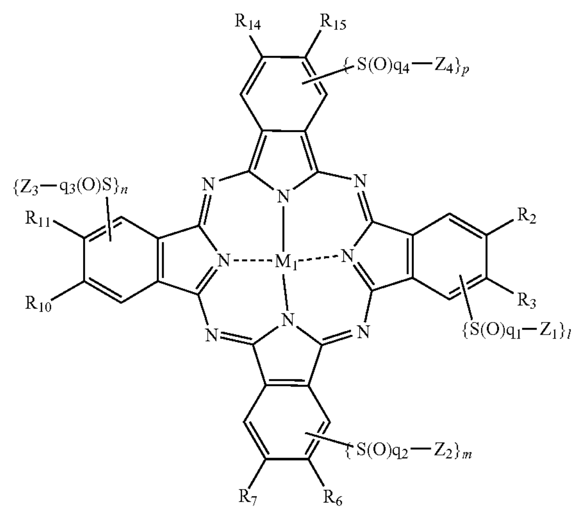

in Formula (C-1), $R_2$, $R_3$, $R_6$, $R_7$, $R_{10}$, $R_{11}$, $R_{14}$, and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group, wherein these groups may further include a substituent; $Z_1$, $Z_2$, $Z_3$, and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; wherein, at least one of $Z_1$, $Z_2$, $Z_3$, and $Z_4$ includes an ionic hydrophilic group as a substituent; l, m, n, p, $q_1$, $q_2$, $q_3$, and $q_4$ each independently represent 1 or 2; $M_1$ represents a hydrogen atom, a metal atom, a metal oxide, a metal hydroxide, or a metal halide, (C-2)

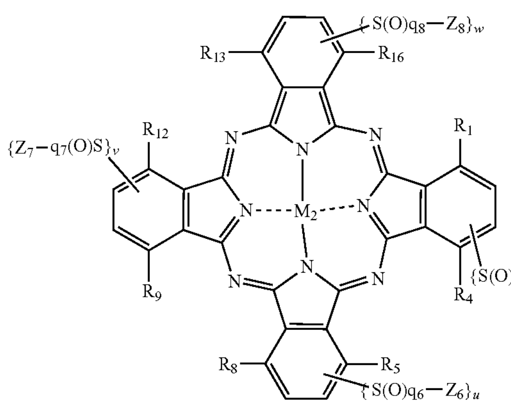

wherein in Formula (C-2), $R_1$, $R_4$, $R_5$, $R_8$, $R_9$, $R_{12}$, $R_{13}$, and $R_{16}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group, wherein these groups may further include a substituent; $Z_5$, $Z_6$, $Z_7$, and $Z_8$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; wherein at least one of $Z_5$, $Z_6$, $Z_7$, and $Z_8$ includes an ionic hydrophilic group as a substituent; t, u, v, w, $q_5$, $q_6$, $q_7$, and $q_8$ each independently represent 1 or 2; $M_2$ represents a hydrogen atom, a metal atom, a metal oxide, a metal hydroxide, or a metal halide.

2. The ink set according to claim 1, wherein the yellow ink, the magenta ink, or the cyan ink contains an alkylene oxide adduct of acetylene glycol whose main chain has 12 or more carbon atoms and acetylene glycol whose main chain has 10 or more carbon atoms.

3. The ink set according to claim 1, wherein the yellow ink, the magenta ink, or the cyan ink contains polyoxy alkylene alkyl ether.

4. The ink set according to claim 1, wherein the content of the alkylene oxide adduct of acetylene glycol whose main chain has 12 or more carbon atoms, which is contained in the yellow ink, is larger than the content of the alkylene oxide adduct of acetylene glycol whose main chain has 12 or more carbon atoms, which is contained in the magenta ink or the cyan ink.

5. The ink set according to claim 2, wherein the content of the alkylene oxide adduct of acetylene glycol whose main chain has 12 or more carbon atoms, which is included in the yellow ink, the magenta ink, or the cyan ink is in a range of 0.050% by mass to 1.0% by mass.

6. The ink set according to claim 3, wherein the content of the polyoxy alkylene alkyl ether which is contained in the yellow ink, the magenta ink, or the cyan ink is in a range of 0.10% by mass to 0.30% by mass.

7. The ink set according to claim 1, wherein the magenta ink contains a coloring material represented by the Formulae (M-1) and (M-2).

8. The ink set according to claim 1, wherein the cyan ink contains a coloring material represented by the Formulae (C-1) and (C-2).

9. The ink set according to claim 1, wherein the yellow ink further contains coloring materials represented by the following Formula (Y-2), (Y-2)

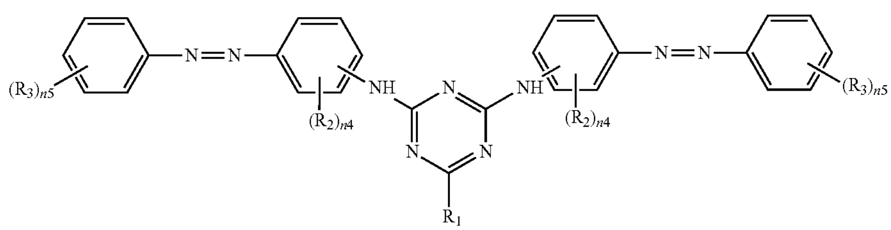

wherein in Formula (Y-2), $R_1$ represents a hydrogen atom or a substituent; $R_2$ represents a substituent; $R_3$ represents an ionic hydrophilic group or an alkyl group which may form a ring; n4 represents 0 to 4; and n5 represents 2 to 5.

10. The ink set according to claim 1, further comprising at least one of a dye black ink and a pigment black ink.

11. The ink set according to claim 10, wherein the dye black ink contains an azo compound represented by the following Formula (Bk-1) or a salt thereof and at least one kind selected from a group consisting of coloring materials represented by the following Formula (Bw-1), (Bk-1)

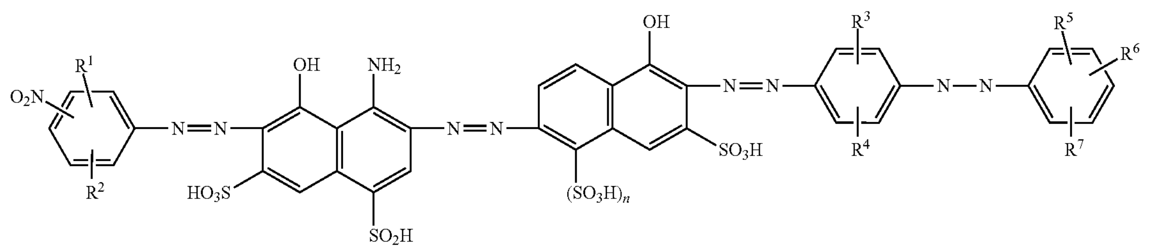

wherein in Formula (Bk-1), $R^1$, $R^2$, $R^5$, $R^6$, and $R^7$ each independently represent a hydrogen atom, a halogen atom, a cyano group, a hydroxyl group, a carboxyl group, a sulfo group, a sulfamoyl group, a N-alkylaminosulfonyl group, a N-phenylaminosulfonyl group, an alkylsulfonyl group which may be substituted with a hydroxyl group and has 1 to 4 carbon atoms, a phospho group, a nitro group, an acyl group, an ureido group, an alkyl group having 1 to 4 carbon atoms which may be substituted with a hydroxyl group or an alkoxy group having 1 to 4 carbon atoms, an alkoxy group having 1 to 4 carbon atoms wherein an alkyl group may be substituted with a hydroxyl group, an alkoxy group having 1 to 4 carbon atoms, a sulfo group, or a carboxyl group, an acylamino group, an alkylsulfonylamino group, or a phenylsulfonylamino group wherein a phenyl group may be substituted with a halogen atom, an alkyl group, or a nitro group; $R^3$ and $R^4$ each independently represent a hydrogen atom, a halogen atom, a cyano group, a carboxyl group, a sulfo group, a nitro group, an alkyl group having 1 to 4 carbon atoms which may be substituted with a hydroxyl group or an alkoxy group having 1 to 4 carbon atoms, an alkoxy group having 1 to 4 carbon atoms wherein an alkyl group may be substituted with a hydroxyl group, an alkoxy group having 1 to 4 carbon atoms, a sulfo group, or a carboxyl group, an acylamino group, an alkylsulfonylamino group, or a phenylsulfonylamino group wherein a phenyl group may be substituted with a halogen atom, an alkyl group, or a nitro group); and n represents 0 or 1, of a hydroxy group, an alkoxy group having 1 to 4 carbon atoms, an alkoxy group having 1 to 4 hydroxycarbon atoms, a sulfo group, and a carboxy group as substituents and has 1 to 4 carbon atoms, an alkylcarbonylamino group having 1 to 4 carbon atom, an alkylcarbonylamino group which is substituted with a carboxy group and has 1 to 4 carbon atoms, an ureido group, an alkyl ureido group having 1 to 4 monocarbon atoms, an alkylureido group having 1 to 4 dicarbon atoms, an alkylureido group which is substituted with at least one kind selected from a group consisting of a hydroxy group, a sulfo group, and a carboxy group as substituents and has 1 to 4 monocarbon atoms, an alkylureido group which is substituted with at least one kind selected from a group consisting of a hydroxy group, a sulfo group, and a carboxy group as substituents and has 1 to 4 dicarbon atoms, a benzoylamino group, a benzoylamino group whose benzene ring is substituted with at least one kind selected from a group consisting of a halogen atom, an alkyl group having 1 to 4 carbon atoms, a nitro group, a sulfo group, and a carboxy group, a benzenesulfonylamino group, or a phenylsulfonylamino group whose benzene ring is sub stituted with at least one kind selected from a group consisting of a halogen atom, an alkyl group having 1 to 4 carbon atoms, a nitro group, a sulfo group, and a carboxy group; and X represents a divalent crosslinking group.

(Bw-1)

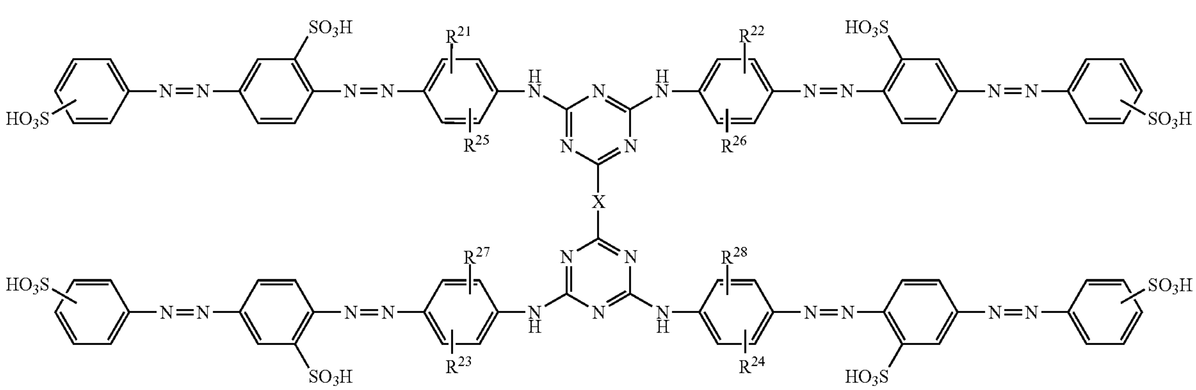

wherein in Formula (Bw-1), $R^{21}$, $R^{22}$, $R^{23}$, $R^{24}$, $R^{25}$, $R^{26}$, $R^{27}$, and $R^{28}$ each independently represent a hydrogen atom, a halogen atom, a sulfo group, a carboxy group, a sulfamoyl group, a carbamoyl group, an alkyl group having 1 to 4 carbon atoms, an alkoxy group having 1 to 4 carbon atoms, an alkoxy group which is substituted with at least one kind selected from a group consisting

12. The ink set according to claim 10, wherein the dye black ink contains an azo compound represented by the following Formula (Bk-3) or a salt thereof and at least one kind selected from a group consisting of coloring materials represent by the following Formula (Bk), (Bk-3)
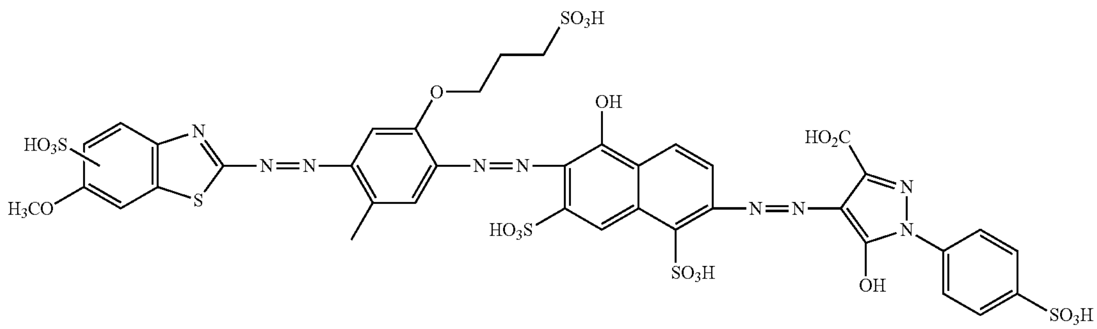
(Bk-4)
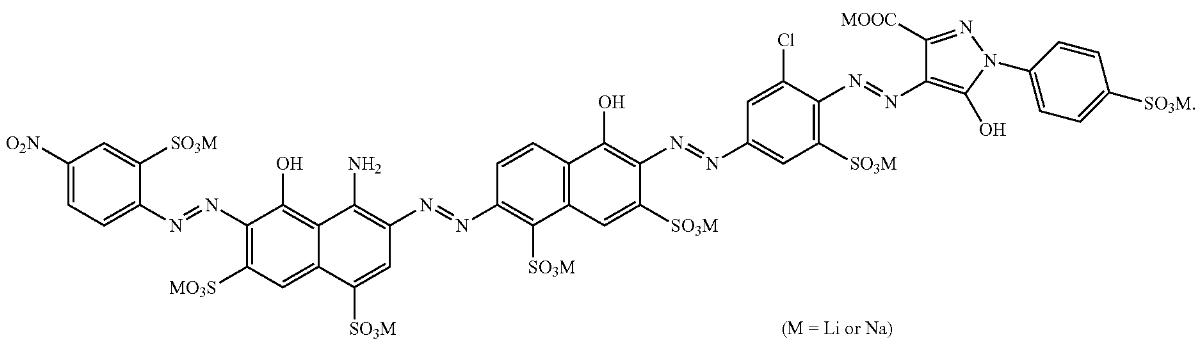
(M = Li or Na)
13. The ink set according to claim 10, wherein the pigment black ink contains a self-dispersion type pigment.
* * * * *